(12) United States Patent
Berger et al.

(10) Patent No.: US 8,279,067 B2
(45) Date of Patent: Oct. 2, 2012

(54) SECURING, MONITORING AND TRACKING SHIPPING CONTAINERS

(75) Inventors: Thomas R. Berger, Cumming, GA (US); Joseph E. Denny, Atlanta, GA (US); David S. Robins, Buffalo Grove, IL (US); LaMonte Peter Koop, Alpharetta, GA (US); Edward Allen Payne, Lawrenceville, GA (US); Robert W. Twitchell, Jr., Cumming, GA (US)

(73) Assignee: Google Inc., Mountain View, CA (US)

( * ) Notice: Subject to any disclaimer, the term of this patent is extended or adjusted under 35 U.S.C. 154(b) by 484 days.

(21) Appl. No.: 12/468,047

(22) Filed: May 18, 2009

(65) Prior Publication Data

US 2009/0322510 A1 Dec. 31, 2009

Related U.S. Application Data

(63) Continuation-in-part of application No. PCT/US2009/044276, filed on May 16, 2009, and a continuation-in-part of application No. PCT/US2009/044277, filed on May 16, 2009.

(60) Provisional application No. 61/053,665, filed on May 16, 2008, provisional application No. 61/109,494, filed on Oct. 29, 2008, provisional application No. 61/140,882, filed on Dec. 25, 2008, provisional application No. 61/140,887, filed on Dec. 25, 2008, provisional application No. 61/140,888, filed on Dec. 25, 2008, provisional application No. 61/141,021, filed on Dec. 29, 2008, provisional application No. 61/147,839, filed on Jan. 28, 2009, provisional application No. 61/147,917, filed on Jan. 28, 2009, provisional application No. 61/151,168, filed on Feb. 9, 2009, provisional application No. 61/155,887, filed on Feb. 26, 2009.

(51) Int. Cl.
*G08B 13/06* (2006.01)

(52) U.S. Cl. ............... 340/572.1; 340/572.8; 340/572.9; 340/539.13; 340/545.6; 455/456.1; 370/401

(58) Field of Classification Search ............... 340/572.1, 340/572.4, 572.8, 572.9, 539.1, 539.13, 539.26, 340/545.6; 370/401; 455/456.1
See application file for complete search history.

(56) References Cited

U.S. PATENT DOCUMENTS 4,165,024 A 8/1979 Oswalt et al.
(Continued)

FOREIGN PATENT DOCUMENTS

EP 0467036 1/1992
(Continued)

OTHER PUBLICATIONS

Information Disclosure Statement (IDS) Letter Regarding Common Patent Application(s), dated Mar. 30, 2011.
(Continued)

*Primary Examiner* — George Bugg
*Assistant Examiner* — Anne Lai
(74) *Attorney, Agent, or Firm* — Tillman Wright, PLLC; Chad D. Tillman; Jeremy C. Doerre

(57) ABSTRACT

A method of securing a container includes inserting, into a seal device at a container, an electronic bolt; reading, by the seal device, a serial number stored in the electronic bolt; communicating, from the seal device, to a user application, insertion of the bolt; scanning, by the user via a handheld device, a barcode on the seal device representative of an identification of the seal device; communicating, from the handheld device to the user application, the identification of the seal device; inputting, by a user at the container via the handheld device, information associated with the container; communicating, from the handheld device to the user application, the information associated with the container; associating, in a database by the user application, the information associated with the container with the bolt serial number and the identification of the seal device; communicating, by the user application, a confirmation to the seal device.

13 Claims, 63 Drawing Sheets

U.S. PATENT DOCUMENTS

| | | |
|---|---|---|
| 4,688,244 A | 8/1987 | Hannon et al. |
| 4,750,197 A | 6/1988 | Denekamp et al. |
| 4,807,224 A | 2/1989 | Naron et al. |
| 4,817,537 A | 4/1989 | Cripe et al. |
| 5,424,720 A | 6/1995 | Kirkpatrick |
| 5,565,858 A | 10/1996 | Guthrie |
| 5,598,142 A | 1/1997 | Winner, Jr. |
| 5,648,763 A | 7/1997 | Long |
| 5,656,996 A | 8/1997 | Houser |
| 5,682,379 A | 10/1997 | Mahany et al. |
| 5,719,771 A | 2/1998 | Buck et al. |
| 5,835,012 A | 11/1998 | Wilk |
| 5,892,441 A | 4/1999 | Woolley |
| 5,907,491 A | 5/1999 | Canada et al. |
| 5,913,180 A | 6/1999 | Ryan |
| 5,917,423 A | 6/1999 | Duvall |
| 5,917,433 A | 6/1999 | Keillor et al. |
| 5,939,982 A | 8/1999 | Gagnon et al. |
| 5,959,568 A | 9/1999 | Woolley |
| 5,977,913 A | 11/1999 | Christ |
| 6,046,675 A | 4/2000 | Hanna |
| 6,072,784 A | 6/2000 | Agrawal |
| 6,125,306 A | 9/2000 | Shimada et al. |
| 6,127,928 A | 10/2000 | Issacman |
| 6,127,976 A | 10/2000 | Boyd et al. |
| 6,134,587 A | 10/2000 | Okanoue |
| 6,154,658 A | 11/2000 | Caci |
| 6,192,400 B1 | 2/2001 | Hanson et al. |
| 6,225,894 B1 | 5/2001 | Kyrtsos |
| 6,354,493 B1 | 3/2002 | Mon |
| 6,409,082 B1 | 6/2002 | Davis |
| 6,437,692 B1 | 8/2002 | Petite |
| 6,481,222 B1 | 11/2002 | Denniston |
| 6,512,478 B1 | 1/2003 | Chien |
| 6,542,114 B1 | 4/2003 | Eagleson et al. |
| 6,547,137 B1 | 4/2003 | Begelfer et al. |
| 6,559,620 B2 | 5/2003 | Zhou et al. |
| 6,600,418 B2 | 7/2003 | Francis et al. |
| 6,614,349 B1 | 9/2003 | Proctor et al. |
| 6,665,585 B2 | 12/2003 | Kawase |
| 6,700,533 B1 | 3/2004 | Werb |
| 6,720,888 B2 | 4/2004 | Eagleson et al. |
| 6,737,974 B2 | 5/2004 | Dickinson |
| 6,747,558 B1 | 6/2004 | Thorne et al. |
| 6,753,775 B2 | 6/2004 | Auerbach et al. |
| 6,816,063 B2 | 11/2004 | Kubler et al. |
| 6,847,892 B2 | 1/2005 | Zhou et al. |
| 6,870,476 B2 | 3/2005 | Cockburn et al. |
| 6,882,274 B2 | 4/2005 | Richardson et al. |
| 6,892,230 B1 | 5/2005 | Gu et al. |
| 6,900,731 B2 | 5/2005 | Kreiner |
| 6,919,803 B2 | 7/2005 | Breed |
| 6,927,688 B2 | 8/2005 | Tice |
| 6,934,540 B2 | 8/2005 | Twitchell |
| 6,940,392 B2 | 9/2005 | Chan et al. |
| 6,972,682 B2 | 12/2005 | Lareau et al. |
| 6,975,614 B2 | 12/2005 | Kennedy |
| 7,012,529 B2 | 3/2006 | Sajkowsky |
| 7,038,585 B2 | 5/2006 | Hall |
| 7,072,668 B2 | 7/2006 | Chou |
| 7,088,229 B2 | 8/2006 | Johnson |
| 7,098,784 B2 * | 8/2006 | Easley et al. ............. 340/539.13 |
| 7,123,599 B2 | 10/2006 | Yano et al. |
| 7,126,470 B2 | 10/2006 | Clift et al. |
| 7,142,121 B2 | 11/2006 | Chan et al. |
| 7,148,800 B2 | 12/2006 | Cunningham |
| 7,148,803 B2 | 12/2006 | Bandy |
| 7,155,238 B2 | 12/2006 | Katz |
| 7,196,622 B2 | 3/2007 | Lambright et al. |
| 7,209,037 B2 | 4/2007 | Webb, Sr. |
| 7,209,771 B2 | 4/2007 | Twitchell |
| 7,212,122 B2 | 5/2007 | Gloekler et al. |
| 7,233,958 B2 | 6/2007 | Weng |
| 7,239,238 B2 | 7/2007 | Tester et al. |
| 7,248,160 B2 * | 7/2007 | Mangan et al. .......... 340/539.13 |
| 7,253,731 B2 | 8/2007 | Joao |
| 7,270,353 B2 | 9/2007 | Sironi et al. |
| 7,273,172 B2 | 9/2007 | Olsen |
| 7,274,295 B2 | 9/2007 | Koch |
| 7,277,009 B2 | 10/2007 | Hall |
| 7,283,052 B2 | 10/2007 | Bohman |
| 7,299,068 B1 | 11/2007 | Halla |
| 7,313,421 B2 | 12/2007 | Dejanovic |
| 7,315,281 B2 | 1/2008 | Dejanovic |
| 7,317,382 B2 | 1/2008 | Pratt |
| 7,319,397 B2 | 1/2008 | Chung |
| 7,323,981 B2 | 1/2008 | Peel |
| 7,333,015 B2 | 2/2008 | Ekstrom |
| 7,339,469 B2 | 3/2008 | Braun |
| 7,340,260 B2 | 3/2008 | McAlexander |
| 7,342,496 B2 | 3/2008 | Muirhead |
| 7,342,497 B2 | 3/2008 | Chung |
| 7,348,875 B2 | 3/2008 | Hughes |
| 7,378,957 B2 | 5/2008 | Twitchell |
| 7,378,958 B2 | 5/2008 | Twitchell |
| 7,378,959 B2 | 5/2008 | Twitchell |
| 7,378,960 B1 | 5/2008 | Binding |
| 7,382,251 B2 | 6/2008 | Bohman |
| 7,394,358 B2 | 7/2008 | Cherry |
| 7,394,372 B2 | 7/2008 | Gloekler |
| 7,397,363 B2 | 7/2008 | Joao |
| 7,417,543 B2 | 8/2008 | Bergman |
| 7,419,101 B2 | 9/2008 | Kawai |
| 7,423,534 B2 | 9/2008 | Dhanjal |
| 7,423,535 B2 | 9/2008 | Chung |
| 7,438,334 B2 | 10/2008 | Terry |
| 7,440,781 B2 | 10/2008 | Beach et al. |
| 7,482,920 B2 | 1/2009 | Joao |
| 7,528,719 B2 * | 5/2009 | Hopman .................... 340/572.1 |
| 7,538,672 B2 | 5/2009 | Lockyer et al. |
| 7,595,727 B2 | 9/2009 | Grijalva et al. |
| 7,782,200 B1 * | 8/2010 | Fleischmann .............. 340/542 |
| 7,986,238 B2 * | 7/2011 | Cho .......................... 340/572.1 |
| 2002/0030596 A1 | 3/2002 | Finn et al. |
| 2002/0050932 A1 | 5/2002 | Rhoades et al. |
| 2002/0089434 A1 | 7/2002 | Ghazarian |
| 2002/0093982 A1 | 7/2002 | Joy et al. |
| 2002/0098861 A1 | 7/2002 | Doney et al. |
| 2002/0099567 A1 | 7/2002 | Joao |
| 2002/0130778 A1 | 9/2002 | Nicholson |
| 2003/0011474 A1 * | 1/2003 | Ng ............................ 340/568.1 |
| 2003/0132853 A1 | 7/2003 | Ebert |
| 2003/0141973 A1 | 7/2003 | Yeh et al. |
| 2003/0179073 A1 | 9/2003 | Ghazarian |
| 2003/0182077 A1 | 9/2003 | Emord |
| 2003/0189491 A1 | 10/2003 | Ng |
| 2003/0209601 A1 | 11/2003 | Chung |
| 2004/0021572 A1 | 2/2004 | Schoen et al. |
| 2004/0041706 A1 | 3/2004 | Stratmoen et al. |
| 2004/0041731 A1 | 3/2004 | Hisano |
| 2004/0100379 A1 | 5/2004 | Boman et al. |
| 2004/0100394 A1 | 5/2004 | Hitt |
| 2004/0100415 A1 | 5/2004 | Veitch et al. |
| 2004/0119588 A1 | 6/2004 | Marks |
| 2004/0135691 A1 | 7/2004 | Duron et al. |
| 2004/0174259 A1 | 9/2004 | Peel |
| 2004/0183673 A1 | 9/2004 | Nageli |
| 2004/0215532 A1 | 10/2004 | Boman et al. |
| 2004/0233041 A1 | 11/2004 | Bohman et al. |
| 2004/0233054 A1 | 11/2004 | Neff et al. |
| 2005/0073406 A1 | 4/2005 | Easley et al. |
| 2005/0088299 A1 | 4/2005 | Bandy et al. |
| 2005/0099292 A1 * | 5/2005 | Sajkowsky ............... 340/539.13 |
| 2005/0128080 A1 | 6/2005 | Hall et al. |
| 2005/0154527 A1 * | 7/2005 | Ulrich .......................... 701/207 |
| 2005/0226201 A1 | 10/2005 | McMillin |
| 2006/0132485 A1 | 6/2006 | Milinusic |
| 2006/0158326 A1 | 7/2006 | Easley et al. |
| 2006/0164232 A1 | 7/2006 | Waterhouse et al. |
| 2006/0164239 A1 | 7/2006 | Loda |
| 2006/0187026 A1 | 8/2006 | Kochis |
| 2006/0202817 A1 | 9/2006 | Mackenzie et al. |
| 2006/0255934 A1 | 11/2006 | Easley et al. |
| 2007/0008408 A1 | 1/2007 | Zehavi |
| 2007/0032951 A1 | 2/2007 | Tanenhaus et al. |
| 2007/0040732 A1 | 2/2007 | Burgett et al. |
| 2007/0044524 A1 | 3/2007 | Coutermarsh et al. |

| | | | |
|---|---|---|---|
| 2007/0113882 A1 | 5/2007 | Meyers | |
| 2007/0115114 A1 | 5/2007 | Meyers | |
| 2007/0115115 A1 | 5/2007 | Meyers | |
| 2007/0115859 A1 | 5/2007 | Meyers | |
| 2007/0118332 A1 | 5/2007 | Meyers | |
| 2007/0121557 A1* | 5/2007 | Sylvain | 370/338 |
| 2007/0133980 A1 | 6/2007 | Meyers | |
| 2007/0139197 A1* | 6/2007 | Hopman | 340/572.1 |
| 2007/0152815 A1 | 7/2007 | Meyers | |
| 2007/0200765 A1 | 8/2007 | Meyers | |
| 2008/0066658 A1 | 3/2008 | Muirhead | |
| 2008/0094209 A1 | 4/2008 | Braun | |
| 2008/0117040 A1 | 5/2008 | Peel | |
| 2008/0180252 A1* | 7/2008 | Vogt | 340/572.4 |
| 2008/0234878 A1 | 9/2008 | Joao | |
| 2008/0264888 A1 | 10/2008 | Zakula et al. | |
| 2008/0315596 A1 | 12/2008 | Terry | |
| 2009/0146805 A1 | 6/2009 | Joao | |
| 2009/0217718 A1 | 9/2009 | Porter | |
| 2009/0290512 A1 | 11/2009 | Twitchell | |
| 2009/0295564 A1 | 12/2009 | Twitchell | |
| 2010/0013635 A1 | 1/2010 | Berger et al. | |
| 2010/0214060 A1 | 8/2010 | Twitchell | |

FOREIGN PATENT DOCUMENTS

| | | |
|---|---|---|
| EP | 0748083 | 12/1996 |
| EP | 0748085 | 12/1996 |
| EP | 0829995 | 3/1998 |
| EP | 1317733 | 6/2003 |
| EP | 1692599 | 8/2006 |
| EP | 1692668 | 8/2006 |
| WO | 0068907 | 11/2000 |
| WO | 03098175 | 11/2003 |
| WO | 2009140669 A2 | 11/2009 |
| WO | 2009151877 A2 | 12/2009 |
| WO | 2009140669 A3 | 3/2010 |
| WO | 2009151877 A3 | 3/2010 |

OTHER PUBLICATIONS

Information Disclosure Statement (IDS) Letter Rgarding Common Patent Application(s), dated Feb. 18, 2011.

Stojmenovic et al., Design Guidelines for Routing Protocols in Ad Hoc and Sensor Networks with a Realistic Physical Layer, Communications Magazine, IEEE, vol. 43, Issue 3, Mar. 2005, pp. 101-106.

Information Disclosure Statement Letter dated Nov. 30, 2011 discussing below listed NPL references.

Information Disclosure Statement Letter dated Dec. 2, 2011discussing below listed NPL reference.

"International Search Report" and "Written Opinion of the International Search Authority" (Korean Intellectual Property Office) in Terahop Networks, Inc. et al., International Patent Application Serial No. PCT/US2009/044277, dated Jan. 27, 2010, 13 pages.

"International Search Report" and "Written Opinion of the International Search Authority" (Korean Intellectual Property Office) in Terahop Networks, Inc. et al., International Patent Application Serial No. PCT/US2009/044276, dated Jan. 11, 2010, 7 pages.

Information Disclosure Statement (IDS) Letter Regarding Common Patent Application(s), dated May 18, 2012.

Information Disclosure Statement Letter dated Dec. 8, 2011 disscussing below listed NPL references.

NPL-1, TeraHop Networks Feb. 2008.

NPL-2, TeraHop Networks Dec. 2007.

* cited by examiner

Main Screen

System Time: 13:22 GMT 16 April 08

For seals currently assigned to: Fenwick Logistics, Ltd.

Current Status – All Seals

Sorted by: Seal Number

| Seal Number | Use Status | Container Number | Shipment Number | Bolt Serial Number | Security Alarms | Last Reported Location |
|---|---|---|---|---|---|---|
| 974556371TH | De-activated | | | | | Woodinville |
| 347697402TH | De-activated | | | | | Woodinville |
| 975651446TH | Idle | | | | | Woodinville |
| 384769823TH | Idle | | | | | Mu Chin, PRC |
| 127855923TH | Idle | | | | | Dim Son, PRC |
| 885643201TH | Armed/Authorized | BXTU820020 | | S14579223 | | Savannah |
| 547965301TH | Armed/Authorized | MWLU260051 | Y54770921 | R24476991 | | Mu Ching, PRC |
| 804368130TH | Armed/Authorized | EISU437830 | LKL3395631 | M99562312 | | Tacoma |
| 229106734TH | Idle | HAMU336103 | NTJ75390B | S24299015 | Seal Breach | Rotterdam A |
| 056327581TH | Armed/Authorized | HAMU319906 | K9924780 | K43994205 | | Baltimore |
| 005826562TH | Armed/Authorized | EISU684903 | 08KM466230 | S66352209 | Motion Alarm | Charleston Wando |
| 658359002TH | Armed/Authorized | COSU256891 | 08DT506278 | S30046713 | | Shanghai 22 |
| 749603421TH | Armed/Authorized | COSU775640 | 08DT329077 | M51498867 | | SS Minnow |
| 400968321TH | Armed/Un-authorized | | | | | Pusan Cont. Term. |
| 111890438TH | Idle | | | | | Lebanon, TN |
| 132732172TH | Armed/Authorized | COSU957432 | Y64590133 | L10915536 | Low Battery | HK Cont. Term. |
| 566433302TH | Armed/Authorized | MAEU775022 | NLN47239Z | S87990346 | | HK Cont. Term. |
| 438933056TH | Armed/Un-authorized | | | | | Dim Son, PRC |
| 243719038TH | Armed/Authorized | HAMU342871 | 442J29312 | P33116352 | | Wal-Mart Laurens |

| Help | Send Email | Data Refresh | Search | Open Arming Tool | Print This Screen |
|---|---|---|---|---|---|

*FIG. 6*

Current Summary as of: 13:21 GMT 16 Apr 08              Sorted by: Seal Number System Time: 13:22 GMT 16 April 08

| | | | |
|---|---|---|---|
| Seal Number: | 005826562TH | Last Reported Location: | Charleston Wando |
| Container Number: | EISU684903 | Registration Time/Date: | 14:44 GMT 15 Apr 08 |
| Shipment Number: | 08KM466230 | Last Check-In: | 10:07 GMT 16 Apr 08 |
| Bolt Ser. Number: | S66352209 | Use Status: | Armed/Authorized |
| | | Security Alarms: | Motion Alarm |

[Add Missing Data]

Shipment Details

Origin/Shipper: F. Handel Musical Instruments
52 Globe St.
Stratford upon Avon, UK
Attn: J. Bach Destination/Buyer: Wichita Band
300 Main Street
Wichita, KS 49763 USA 3PL Contact: Ruff & Reddy Logistics
222 Broad St.
Charleston, SC 24672 USA
Attn: M. Munimula Contents Type: Musical Instruments

Detail Reports
[Location Details]
[Alarm Details]
[Arm/Disarm Details]

[Read Shipment Notes]
[Enter/Edit Shipment Details]
[Send Email]
[Manifest]

Detail Histories
[Location History]
[Alarm History]
[Arm/Disarm History]

[Print This Screen]

[Back to Main Page]

*FIG. 7*

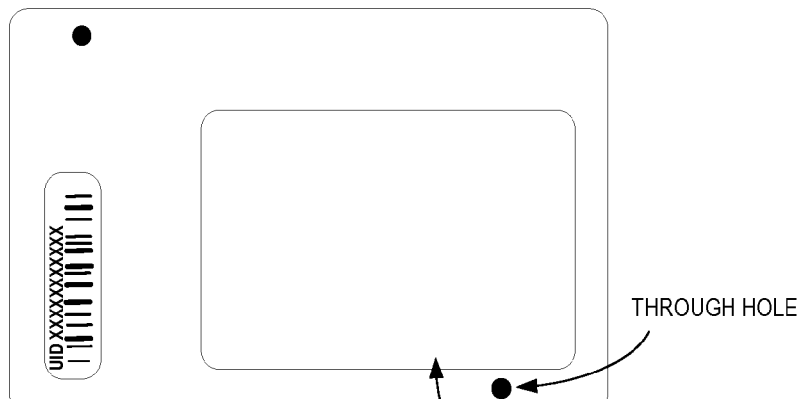
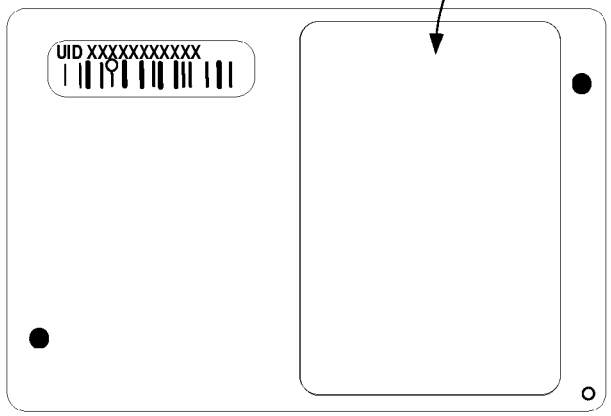
FIG. 13

Scan or Type Seal Number

Seal Number: [          ]

( Enter )

*FIG. 21*

Sorry. Cannot proceed. Seal number is invalid.

( Abort Arming )  ( Try Again )

*FIG. 22*

Confirm container is ready to ship.

( Confirm )

*FIG. 23*

Arm & Associate Seal

Seal Number:
Shipment Number:
Container Number:
Bolt Ser. Number:

☒ ☒ ☒ ☒

Arming & association NOT complete.

[ New Seal Arming ]    [ View Shipment Data ]

[ Help ]

[ Exit to Main Page ]    [ Go to Disarming ]

System Time: 10:15 GMT 5 Apr 08

*FIG. 20*

Disarm Seal

Seal Number:
Shipment Number:
Container Number:
Bolt Ser. Number:

Disarming NOT complete.

New Disarm      View Shipment Data

Help

Exit to Main Page      Go to Seal Arming

System Time: 10:15 GMT 5 Apr 08

*FIG. 25*

Arm & Associate Seal

Seal Number:        005826562TH
Shipment Number:    08KM466230
Container Number:   EISU6849037
Bolt Ser. Number:   S66352209

Arming & association complete.

New Seal Arming    View Shipment Data

Help

Exit to Main Page    Go to Disarming

System Time: 10:21 GMT 5 Apr 08

*FIG. 24*

View Seal Data

Scan or enter ONE of the following:

Seal Number: ☐

Shipment Number: ☐

Container Number: ☐

Bolt Ser. Number: ☐

[View Data]

[Exit to Main Page] [Go To Seal Disarming] [Go To Seal Disarming]

*FIG. 29*

Cut bolt & push stub out of Seal.

[Done]

*FIG. 26*

Sorry. Cannot proceed. Remove bolt stub.

[Done]

*FIG. 27*

Table 1

| Seal is Registered | PADD Available | Voice Comm. Available | Description/Requirement |
|---|---|---|---|
| X | X | | Standard Association |
| | | | <ul><li>Bolt is inserted to activate seal.</li><li>The Seal shall store/buffer the activation EDR until the Seal registers with a network, whereupon it immediately reports the EDR (which the network/system forwards to appropriate user applications).</li><li>Upon encountering an appropriate network, the Seal shall be permitted to register and shall be otherwise treated by the system as if fully Associated. When registration is reported, the absence of the "Authorized" flag shall cause a notification to appear in the Seal Management application.</li></ul> |
| | X | | <ul><li>Bolt is inserted to activate seal.</li><li>Association data are entered manually with the PADD.</li><li>The Seal shall store/buffer the activation EDR until the Seal registers with a network, whereupon it immediately reports the EDR (which the network/system forwards to appropriate user applications).</li><li>Upon encountering an appropriate network, the Seal shall be permitted to register and shall be otherwise treated by the system as if fully Associated. When registration is reported, the absence of the "Authorized" flag shall cause a notification to appear in the Seal Management application.</li></ul> |
| | | X | <ul><li>Bolt is inserted to activate seal.</li><li>Worker using Seal Management application manually enters Association data read/reported by a worker at the Seal.</li><li>The Seal shall store/buffer the activation EDR until the Seal registers with a network, whereupon it immediately reports the EDR (which the network/system forwards to appropriate user applications).</li><li>Upon encountering an appropriate network, the Seal shall be permitted to register and shall otherwise treated by the system as if fully Associated. When registration is reported, the absence of the "Authorized" flag shall cause a notification to appear in the Seal Management application.</li></ul> |
| X | | X | <ul><li>The process replicates the standard Association process, but has the worker at the Seal Management application entering the Association data with the assistance of the worker at the Seal. Seal is Authorized.</li><li>Seal is treated by the network/system as if Associated by the standard process.</li></ul> |
| X | | | <ul><li>Bolt is inserted to activate seal.</li><li>Seal activation is immediately reported to appropriate applications as is done for a standard association. If the bolt is a e-Bolt, then the e-Bolt's serial number is also reported.</li><li>Upon encountering an appropriate network, the Seal shall be permitted to register and shall be otherwise treated by the system as if fully Associated. When registration is reported, the absence of the "Authorized" flag shall cause a notification to appear in the Seal Management application.</li></ul> |
| X | X | | Standard opening. |
| | | | <ul><li>Bolt is cut/pushed-through.</li><li>Event is stored/buffered until the Seal registers with a network, whereupon it immediately reports the EDR (which the network/system forwards to appropriate user applications).</li><li>Upon encountering an appropriate network, the Seal shall be permitted to register and shall be otherwise treated by the system as if fully Associated. When registration is reported, the absence of the "Authorized" flag shall cause a notification to appear in the Seal Management application.</li></ul> |
| | X | | <ul><li>Bolt is cut/pushed-through.</li><li>Seal UID, bolt number, and container number are entered manually by worker using Seal Management application with data read/reported by a worker at the Seal.</li><li>Event is stored/buffered until the Seal registers with a network, whereupon it immediately reports the EDR (which the network/system forwards to appropriate user applications).</li><li>Upon encountering an appropriate network, the Seal shall be permitted to register and shall be otherwise treated by the system as if fully Associated. When registration is reported, the absence of the "Authorized" flag shall cause a notification to appear in the Seal Management application.</li></ul> |
| | X | | <ul><li>Bolt is cut/pushed-through.</li><li>Seal UID, bolt number, and container number are entered manually with the PADD.</li><li>Event is stored/buffered until the Seal registers with a network, whereupon it immediately reports the EDR (which the network/system forwards to appropriate user applications).</li><li>Upon encountering an appropriate network, the Seal shall be permitted to register and shall be otherwise treated by the system as if fully Associated. When registration is reported, the absence of the "Authorized" flag shall cause a notification to appear in the Seal Management application.</li></ul> |
| X | | X | <ul><li>The process replicates the standard opening process, but has the worker at the Seal Management application entering the opening data with the assistance of the worker at the Seal. Opening is Authorized.</li></ul> |
| X | | | <ul><li>Bolt is cut/pushed-through.</li><li>Event is immediately reported to appropriate applications as is done for a standard opening. If the bolt is a e-Bolt, then the e-Bolt's serial number is also reported.</li><li>No "Authorized" flag shall be set. For any subsequent registration/reporting of the Seal before a new bolt is inserted, the absence of the "Authorized" flag shall cause a notification to appear in the Seal Management application.</li></ul> |

Note: at times the PADD may be unavailable because of device failure, there not being one, or no communications between the PADD and a network; and voice communications are between a worker at the Seal and another worker who has access to a Seal Management Application.

*FIG. 28*

Disarm Seal

Alarm Details

Seal Number: 005826562TH
Shipment Number: 08KM466230
Container Number: EISU6849037

Alarm Type: Motion
Event Time: 09:44 GMT 16 Apr 08
Time Reported: 09:45 GMT 16 Apr 08

Reporting Location: Charleston Wando

[Close Popup] [Help] [Clear Alarm]

System Time: 10:15 GMT 5 Apr 08

*FIG. 31*

Seal Data

Seal Number: 005826562TH
Shipment Number: 08KM466230
Container Number: EISU6849037
Bolt Ser. Number: S66352209

Contents Type: Musical Instruments
Origin/Shipper: F. Handel Musical Instru
Stratford upon Avon, UK Destination/Buyer: Wichita Band
Wichita, KS 49763 USA 3PL Contact: Ruff & Reddy Logistics
Charleston, SC 24672 USA

[Main Page] [Arming] [Disarming]
[Add Notes] [Help] [Read Notes]

System Time: 13:22 GMT 16 Apr 08

*FIG. 30*

About This Tool

TeraHop iSeal Arm/Disarm Tool
Version: 1.0

Developed and licensed by:
   TeraHop Networks, Inc.
   Alpharetta, GA  30005 USA For assistance:        1-877-846-2467 (US only)
                       www.terahop.com This Tool is intended to be used only by licensed users in conjunction with the TeraHop iSeal Management Application and with TeraHop network infrastructure, to arm and disarm TeraHop iSeals for shipping containers.

Exit to Main Page

*FIG. 32*

Location Details

Shipment Number: 08KM466230
Container Number: EISU6849037
Seal Number: 005826562TH Location Name: Charleston, Wando River Seaport
Location Type: Port of Charleston
Owner/Agent: 5257 South Bay Rd.
Street Address: Charleston, SC 24672 USA Latitude: 32.829N
Longitude: -79.892W
Access Pt. Name: Light tower 23
Time Zone: EST (-5 hrs. to GMT)

Contact: Ed Teach
803-787-9819

Registration: 14:44 GMT    15 April 08
Last Check-in: 02:53 GMT    16 April 08

[View Location History] [View Map]
[Close Popup] [Help] [Print This Popup]

Current

Add Missing Information

Type in missing information.

Seal Number: 400968321TH
Shipment Number:
Container Number:
Bolt Ser. Number:

[Update Information]

[Close] [Go to Main Page]

*FIG. 34*

Location History

System Time: 13:22 GMT 16 April 08

Shipment Number: 08KM466230

| Container Number | Seal Number | Bolt Number | Reporting Location | Registration Time/Date | Last Check-in Time/Date |
|---|---|---|---|---|---|
| EISU684903 | 0058265622TH | S66352209 | Charleston Wando | 14:44 GMT 15 Apr 08 | 10:07 GMT 16 Apr 08 |
| EISU684903 | 0058265622TH | S66352209 | RMS Gigantic | 13:20 GMT 9 Apr 08 | 12:00 GMT 14 Apr 08 |
| EISU684903 | 0058265622TH | S66352209 | ThamesPort B | 08:15 GMT 7 Apr 08 | 13:07 GMT 9 Apr 08 |
| EISU684903 | 0058265622TH | G41739046 | McDougal's 27 | 11:46 GMT 7 Apr 08 | 12:34 GMT 7 Apr 08 |
| EISU684903 | 0058265622TH | G41739046 | Fenwick Logistics | 15:22 GMT 5 Apr 08 | 7:55 GMT 7 Apr 08 |
| EISU684903 | 0058265622TH | G41739046 | F. Handel Musical Instr. | 10:21 GMT 5 Apr 08 | 10:27 GMT 5 Apr 08 |
| | | | | | |
| | | | | | |
| | | | | | |
| | | | | | |
| | | | | | |
| | | | | | |
| | | | | | |
| | | | | | |

Close This Page     Help     Print This Screen     Page 1 of 1

*FIG. 36*

Alarm Details

Shipment Number: 08KM466230
Container Number: EISU6849037
Seal Number: 005826562TH Alarm Type: Motion
Event Time: 09:44 GMT    16 April 08
Time Reported: 09:45 GMT    16 April 08

Reporting Location: Charleston, Wando River

[View Alarm History] [View Location Details] [View Map]

[Close Popup] [Clear Alarm] [Print This Popup]

*FIG. 37*

Arm/Disarm History

System Time: 13:22 GMT 16 April 08

Shipment Number: 08KM466230

| Container Number | Seal Number | Bolt Number | Reporting Location | Arm/Disarm Event | Event Time/Date |
|---|---|---|---|---|---|
| EISU684903 | 0058265562TH | S66352209 | ThamesPort B | Seal Associated | 18:44 GMT 7 Apr 08 |
| EISU684903 | 0058265562TH | S66352209 | ThamesPort B | Bolt inserted - authorized | 18:23 GMT 7 Apr 08 |
| EISU684903 | 0058265562TH | G41739046 | ThamesPort B | Bolt cut - authorized | 17:39 GMT 7 Apr 08 |
| EISU684903 | 0058265562TH | G41739046 | F. Handel Music Instr. | Seal Associated | 10:20 GMT 5 Apr 08 |
| EISU684903 | 0058265562TH | G41739046 | F. Handel Music Instr. | Bolt inserted - authorized | 10:21 GMT 5 Apr 08 |

Close This Page · Help · Print This Screen

Page 1 of 1

*FIG. 38*

Search

Type in ONE of the following:

Seal Number:

Shipment Number:

Container Number:

Bolt Ser. Number:

View Data

Close

Go to Main Page

*FIG. 39*

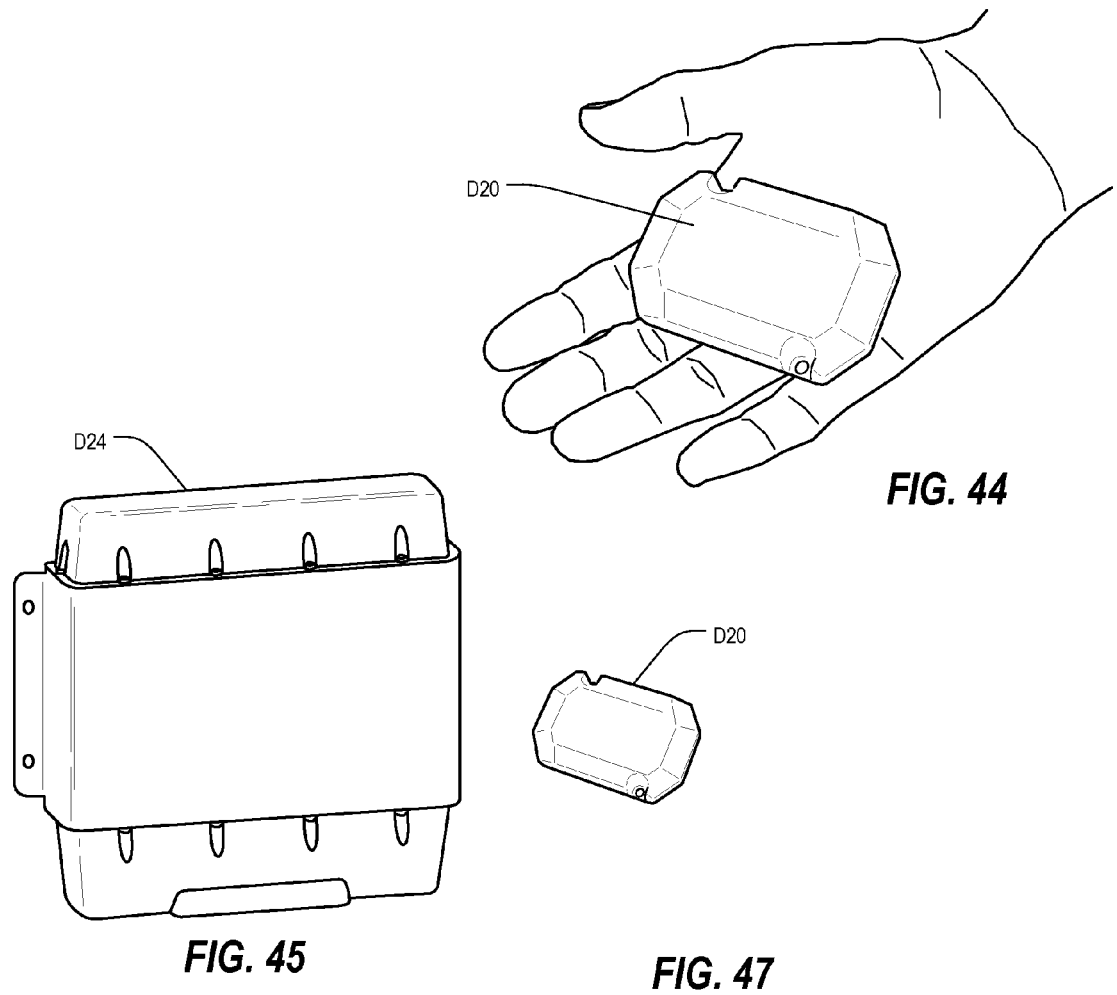
FIG. 44
FIG. 45
FIG. 47
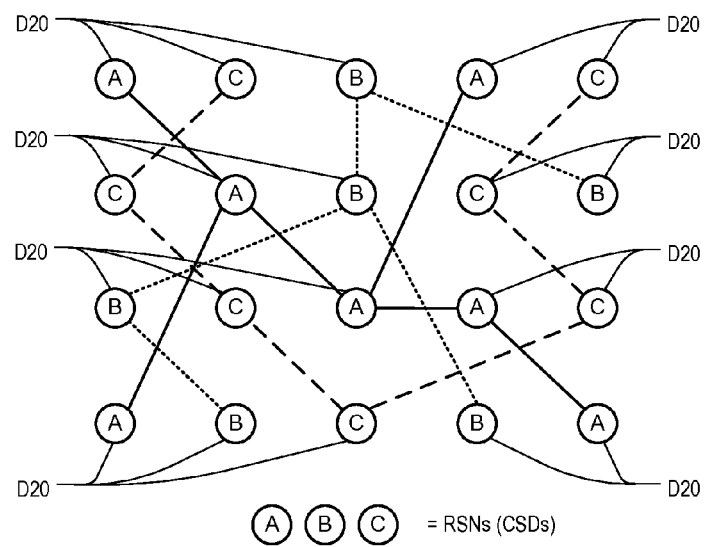
Ⓐ Ⓑ Ⓒ = RSNs (CSDs)

CSD ARMING OPERATIONAL FLOW

CSD ARMING LOGICAL DATA FLOW

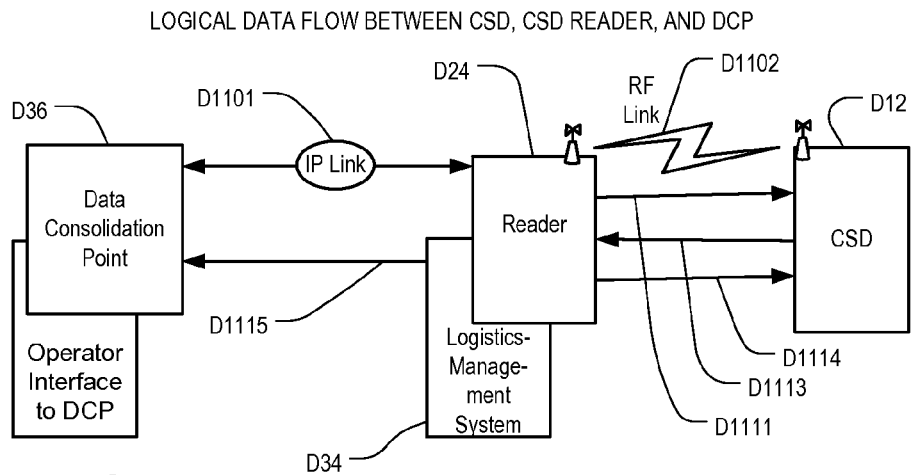
FIG. 56
FIG. 57
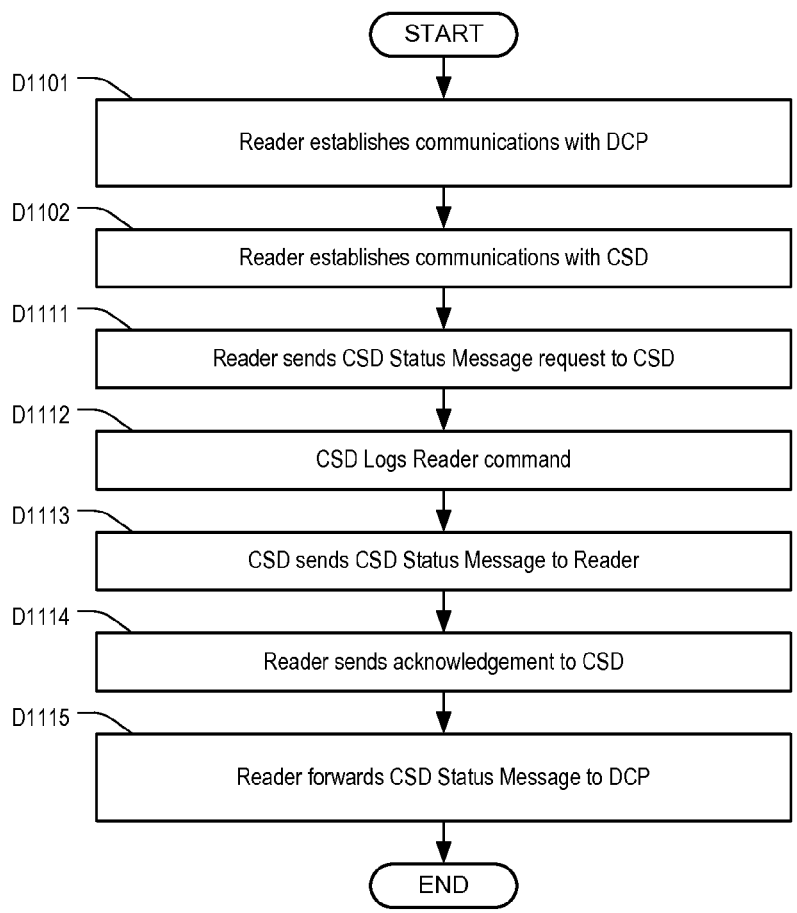

LOGICAL DATA FLOW BETWEEN CSD, DCP AND APPLICATION SERVER IN DEEP WATER
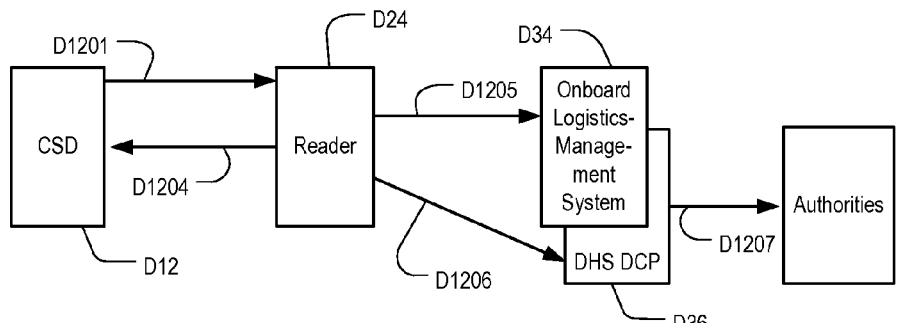
FIG. 58
FIG. 59
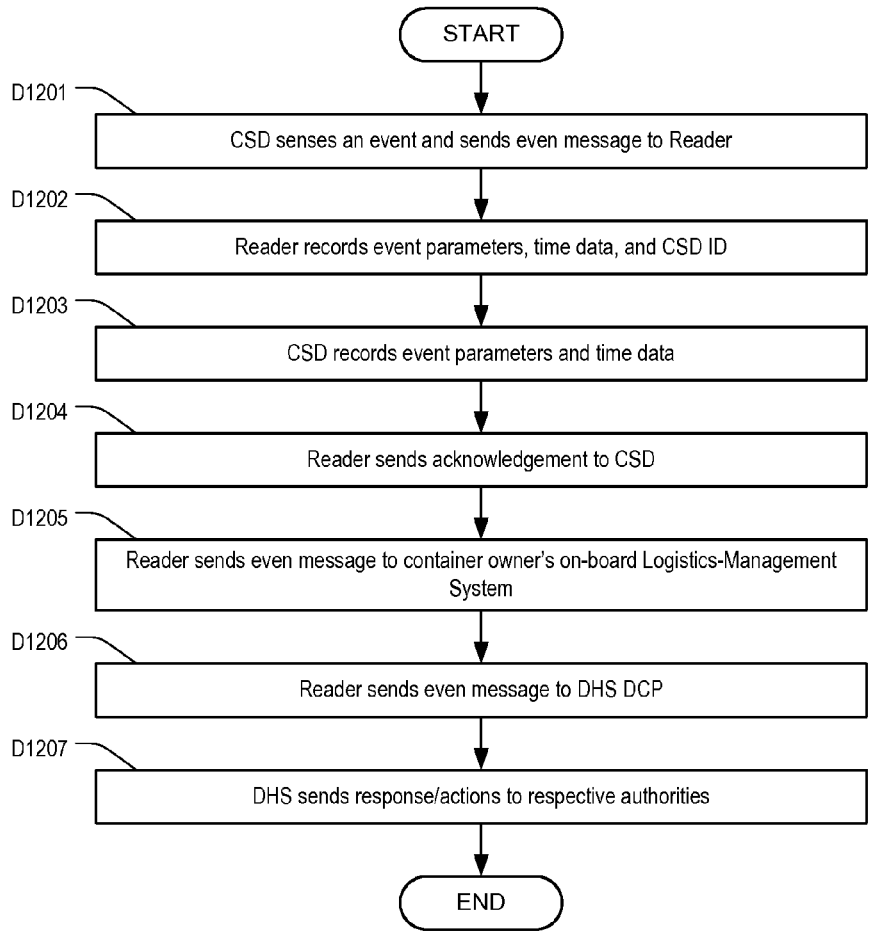

RCR FAR Network Layer
- All network layer datagrams are ACK'ed by receiver
- For multi-pack datagrams, the ACK is delayed until the final packet is received

RCR Data and Control Network Layer
- Each Datagram Command has additional data fields Greater field-level detail for each layer is provided in the RCR MAC and Network Protocol Specification.

| Nodes | No. of Hops per Node | No. of Nodes | Total No. of Node Hops (Retransmissions) |
|---|---|---|---|
| 211, 213, 215 | 8 | 3 | 24 |
| 217, 219, 221 | 6 | 3 | 18 |
| 223, 225, 227 | 4 | 3 | 12 |
| 229, 231, 233 | 2 | 3 | 6 |
| 235, 237, 239 | 0 | 3 | 0 |
| | | | 60 |

Table 3

TeraHop networks

32 bit Class ID Fields

Class ID (32 bits)

| Owner/User Group (18 bits) | Entity (4 bits) | Asset Type (10 bits) |

Class ID (32 bits)

| #bits | Field Label | Quantity | Description/Examples |
|---|---|---|---|
| 18 | Owner/User Group | 256K | "Customer" Responsible for Assets/Nodes, assigned by THN. Also used for User Groups to inter-communicate among nodes. UPS, FBI, Toyota, Wal-Mart, Mitco, ... |
| 4 | Entity | 16 | Business/Group Entity within Owner LTL/Air/Express/.... |
| 10 | Asset Type | 1K | Used to Address Partitions/Groups of Nodes/Assets Top 960: Standard, "Reserved", recommended partitions Perishable, HazMat, hi priority, low priority, empty load, full load, partial, propane, ... Bottom 64 (00 00xx xxxx): Customer-defined partitions LCD TV's, loaned to Company X, ... |

Note: All "1"'s in any field indicates to the receiver to automatically "match that field".

*FIG. 80*

| FEATURE | ISO E-BOLT SEALS | MATTS (GPS-BASED) | COMMERCEGUARD (RFID-BASED) | The Solution (TeraHop Networks) |
|---|---|---|---|---|
| RESISTS DOOR OPENING | ✓ | | | ✓ |
| RECORD OF OPENED DOOR | | | LIMITED | ✓ |
| REPORTS DOOR OPENING (AUTOMATIC) | | | | ✓ |
| DOOR SEAL | ✓ | | | ✓ |
| SEAL CUT/BREACH EVIDENT | ✓ | | | ✓ |
| SEAL CUT/BREACH ALARM (AUTOMATIC) | | | | ✓ |
| CHAIN OF SEAL NUMBERS | | | | ✓ |
| DEVICE TAMPER RESISTANCE | MEDIUM | NONE | LOW | HIGH |
| CONTAINER BREACH ALARM | | | | ✓ |
| MOVEMENT ALARM | | | | ✓ |
| SHOCK ALARM | | | | ✓ |
| ARRIVAL/DEPARTURE REPORTING (AUTOMATIC) | | | IF PROXIMATE TO READER | |
| PRESENCE REPORTING (AUTOMATIC) | | | | ✓ |
| LOCATION REPORTING (AUTOMATIC) | | GLOBAL | BY READER LOCATION | "ISLAND" AREA |
| IN-STACK COMMUNICATIONS | | | | ✓ |
| ACCOMMODATES IN-CONTAINER SENSORS | | ✓ | | ✓ |
| ACCOMMODATES MANIFEST IN DEVICE | | ✓ | | ✓ |
| RE-USABLE | | ✓ | ✓ | ✓ |
| OVER-THE-HORIZON ALARMS | | | | ✓ |
| SUPPORTS GREEN LANES | | | | ✓ |
| PER-USE COST (PRO-RATED DEVICE COST + SERVICES) | $1 | $250 | $20 | $40 |
| INFRASTRUCTURE COST | ZERO | LOW | HIGH | MEDIUM |
| BATTERY LIFE | NA | DAYS-WEEKS | WEEKS-MONTHS | YEARS |

Table 4

FIG. 88

Technology Comparison

| | RFID | RTLS | THN | Mesh | Satellite |
|---|---|---|---|---|---|
| Device cost | Very Low | Low | Medium | Low | Very High |
| Infrastructure Cost | Low | High | Medium | Medium | None |
| Subscription Cost | None | None | Low | None | High |
| Annual TOC | Very Low | Low | Medium | Low | High |
| Device Size | Very Small | Small | Medium | Small | Large |
| Internal Battery Life | No Battery Needed | 2 Years | > 2 Years | < 1 year | Unavailable |
| Location Precision | At a Gate | 10-50' | Site presence | Site presence | 10-30' |
| Range or Coverage Area | Very Limited | Site, Limited | Site, extended | Site, limited | Very Wide |
| Sensor Monitoring | None | None | Standard | Optional | Optional |
| Query Capability | No | Limited | Standard | Standard | Standard |
| Data Storage | No | No | Standard | Optional | Optional |
| Device Density | Unlimited | Limited | High | Limited | Unlimited |
| Use at Temporary Sites | Limited | No | Unlimited | Limited | Unlimited |
| Infrastructure Complexity | Low | High | Low | Medium | NA |

Table 5

FIG. 89

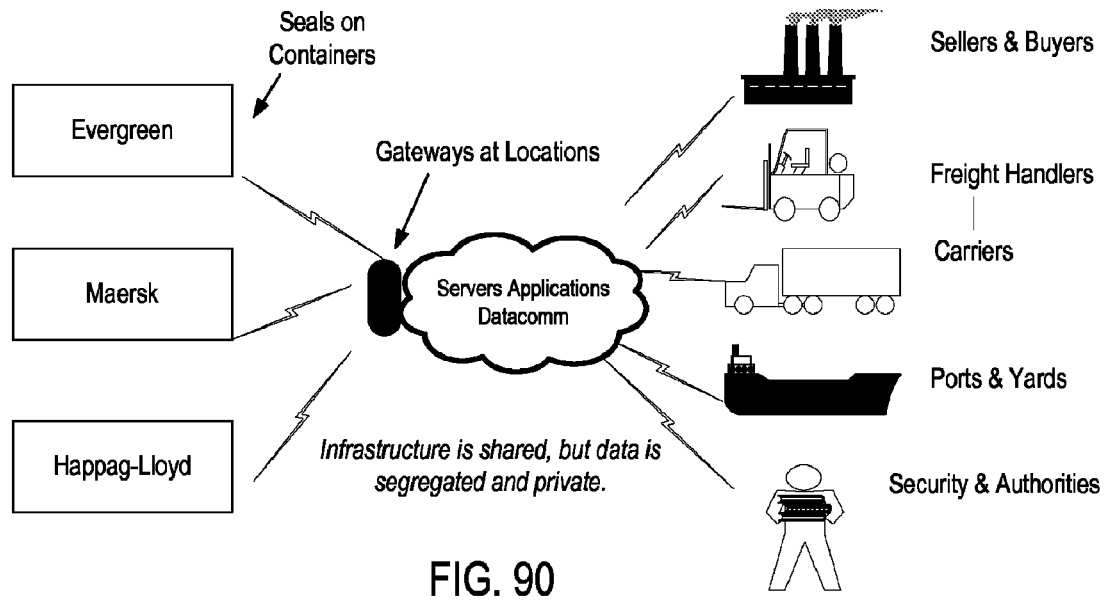
FIG. 90
FIG. 91
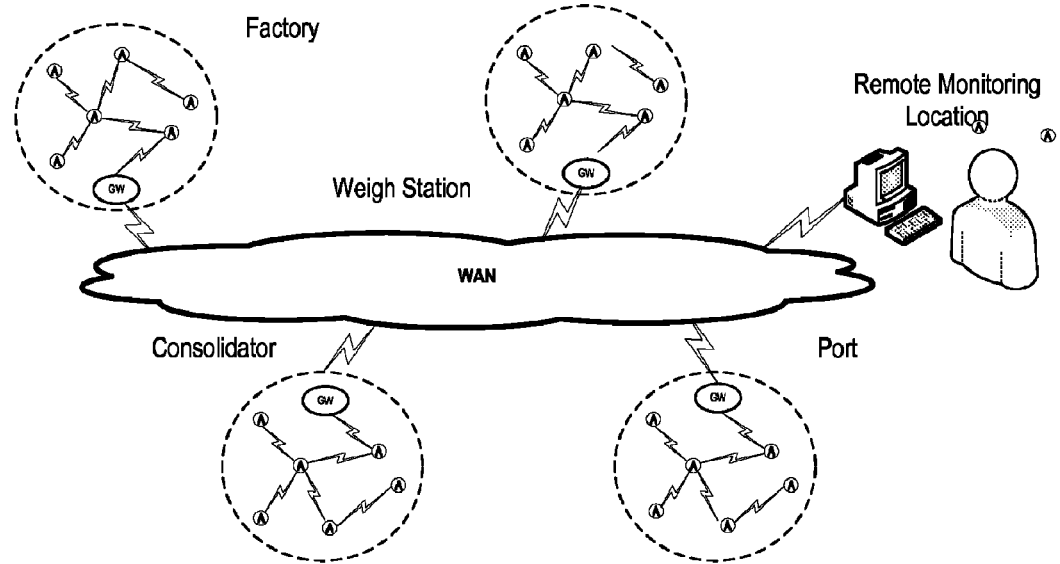
Islands of coverage are linked via the WAN,
enabling visibility as cargo moves from origin to destination.

SECURING, MONITORING AND TRACKING SHIPPING CONTAINERS

CROSS-REFERENCE TO RELATED APPLICATIONS

The present application is a continuation-in-part of, and claims priority under 35 U.S.C. §120 to, each of: international patent applications PCT/US09/44276 and PCT/US09/44277, both filed in English on May 16, 2009, and both designating the United States. The present application is a nonprovisional of, and claims priority under 35 U.S.C. §119(e) to, each of: U.S. provisional patent application 61/053,665, filed May 16, 2008; U.S. provisional patent application 61/109,494, filed October 29, 2008; and U.S. provisional patent application 61/151,168, filed Feb. 9, 2009. The present application further is a nonprovisional application of, and claims priority under §119(e) to, each of U.S. provisional patent application nos.: 61/140,882 filed Dec. 25, 2008; 61/140,887 filed Dec. 25, 2008; 61/140,888 filed Dec. 25, 2008; 61/141,021 filed Dec. 29, 2008; 61/147,917 filed Jan. 28, 2009; 61/147,839 filed Jan. 28, 2009; and 61/155,887 filed Feb. 26, 2009. Each of these provisional applications from which priority is claimed, and the disclosures thereof, are incorporated herein by reference.

Additionally, the present application hereby incorporates herein by reference each of the following identified U.S. patent applications—as well as any publications thereof and any patents issuing therefrom; the following identified U.S. patent application publications; and the following identified U.S. patent Ser. Nos. 12/367,544; 12/367,543; 12/367,542; 12/353,197; 12/352,992; 12/343,865 (US 2009-0104902 A1); Ser. No. 12/343,822 (US 2009-0103462 A1); Ser. No. 12/271,850 (US 2009-0092082 A1); Ser. No. 12/140,253 (US 2008-0303897 A1); Ser. No. 11/930,797 (US 2008-0151850 A1); Ser. No. 11/930,793 (US 2008-0112378 A1); Ser. No. 11/930,788 (US 2008-0165749 A1); Ser. No. 11/930,785 (US 2008-0143484 A1); Ser. No. 11/930,782 (US 2008-0212544 A1); Ser. No. 11/930,779 (US 2008-0129458 A1); Ser. No. 11/930,777 (US 2008-0111692 A1); Ser. No. 11/930,770 (US 2008-0144554 A1); Ser. No. 11/930,761 (US 2008-0112377 A1); Ser. No. 11/930,753 (US 2008-0142592 A1) now U.S. Pat. No. 7,535,339; Ser. No. 11/930,749 (US 2008-0130536 A1) now U.S. Pat. No. 7,538,658; Ser. No. 11/930,740 (US 2008-0150723 A1) now U.S. Pat. No. 7,538,657; Ser. No. 11/930,736 (US 2008-0143483 A1) now U.S. Pat. No. 7,538,656; Ser. No. 11/847,309 (US 2007-0291724 A1); Ser. No. 11/847,295 (US 2007-0291690 A1); Ser. No. 11/832,998 (US 2007-0273503 A1) now U.S. Pat. No. 7,378,959; Ser. No. 11/832,991 (US 2007-0268134 A1) now U.S. Pat. No. 7,378,958; Ser. No. 11/832,979 (US 2007-0268126 A1) now U.S. Pat. No. 7,378,957; Ser. No. 11/610,427 (US 2007-0159999 A1); Ser. No. 11/618,931 (US 2007-0155327 A1); Ser. No. 11/555,173 (US 2007-0099629 A1); Ser. No. 11/555,164 (US 2007-0099628 A1); Ser. No. 11/465,466 (US 2007-0043807 A1); Ser. No. 11/465,796 (US 2007-0041333 A1); Ser. No. 11/460,976 (US 2008-0315596 A1); Ser. No. 11/428,536 (US 2007-0002793 A1); Ser. No. 11/428,535 (US 2007-0002792 A1); Ser. No. 11/425,047 (US 2007-0069885 A1); Ser. No. 11/425,040 (US 2006-0287008 A1) now U.S. Pat. No. 7,539,520; Ser. No. 11/424,850 (US 2007-0004331 A1); Ser. No. 11/424,849 (US 2007-0004330 A1); Ser. No. 11/424,847 (US 2007-0001898 A1); Ser. No. 11/424,845 (US 2006-0287822 A1); Ser. No. 11/423,127 (US 2006-0289204 A1); Ser. No. 11/422,306 (US 2006-0282217 A1); Ser. No. 11/422,304 (US 2006-0276963 A1) now U.S. Pat. No. 7,526,381; Ser. No. 11/422,321 (US 2006-0276161 A1); Ser. No. 11/422,329 (US 2006-0274698 A1) now U.S. Pat. No. 7,529,547; Ser. No. 11/306,765 (US 2008-0136624 A1) now U.S. Pat. No. 7,394,361; Ser. No. 11/306,764 (US 2006-0237490 A1) now U.S. Pat. No. 7,391,321; Ser. No. 11/193,300 (US 2007-0024066 A1) now U.S. Pat. No. 7,438,334; Ser. No. 11/161,550 (US 2007-0002808 A1) now U.S. Pat. No. 7,430,437; Ser. No. 11/161,545 (US 2006-0018274 A1) now U.S. Pat. No. 7,221,668; Ser. No. 11/161,542 (US 2006-0023679 A1) now U.S. Pat. No. 7,522,568; Ser. No. 11/161,540 (US 2007-0004431 A1) now U.S. Pat. No. 7,200,132; Ser. No. 11/161,539 (US 2006-0023678 A1) now U.S. Pat. No. 7,209,468; Ser. No. 10/987,964 (US 2005-0093703 A1) now U.S. Pat. No. 7,155,264; Ser. No. 10/987,884 (US 2005-0093702 A1) now U.S. Pat. No. 7,133,704; Ser. No. 10/604,032 (US 2004-0082296 A1) now U.S. Pat. No. 6,934,540; Ser. No. 10/514,336 (US 2005-0215280 A1) now U.S. Pat. No. 7,209,771; and Ser. No. 09/681,282 (US 2002-0119770 A1) now U.S. Pat. No. 6,745,027.

Each of these foregoing patent properties is hereby incorporated herein by reference for purposes of disclosure of common designation ("CD") technology (such as, e.g., class-based network ("CBN") technology); wake-up ("WU") technology; and networks and systems that utilize such technologies, such as those of TeraHop Networks ("THN"), Inc. of Alpharetta, Ga. It is intended that the CD/CBN and WU technologies—and related features, improvements, and enhancements—as disclosed in these incorporated patent references may be utilized in combination with various embodiments and implementations of the present invention.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND

Field of the Invention

The primary invention of focus in the present application relates to the securing, monitoring and tracking of shipping containers.

Preferred embodiments of systems, methods and apparatus of the present invention represent a solution (hereinafter the "Solution") to needs believed to exist in business and government relating to the securing, monitoring and tracking of shipping containers as the secured shipping containers move from origin to destination, whether national or international in scope. The Solution combines sophisticated radio and data-networking technologies with container sealing technologies so as to enable effective near-real-time, end-to-end monitoring and tracking of the location and status of secured shipping containers. Moreover, such knowledge is consolidated at one or more remote locations and utilized by one or more entities having access to such knowledge.

Shipping Container Use

It is believed that intermodal, international shipping containers made their first appearance in the 1950s, as a brainchild of North Carolina trucking entrepreneur Malcolm McLean. Although the use of containers had immediate potential for greatly increasing port and shipping efficiencies, the high infrastructure cost for port facilities, e.g., cranes, made initial adoption slow. The Vietnam War triggered the initial growth in container use, as the U.S. Army sought to improve its logistics efficiency and security.

The eventual widespread adoption of containers tremendously increased the rate at which cargo could be loaded and unloaded and greatly reduce in-port time with corresponding cost reductions. Specifically, in 1959, U.S. ports were loading and unloading 0.627 tons per man-hour. By 1976, with container shipping well established, the loading/un-loading rate was 4,234 tons per man-hour, and in-port time shrank from an average of three weeks to 18 hours—for larger ships, with larger loads.

Various sizes of containers have been used since their inception. However, the industry has settled on variants of the 20-foot ISO-standard container (20'×8'×8.5'), such that the industry overwhelmingly uses 20-footers and 40-footers, and refers to container capacity in TEUs: Twenty-foot Equivalent Units (with a volume of 1169 cubic feet). Thus, a 40-foot container is referred to as a "2-TEU" container. Container ships now have capacity for over ten thousand TEU containers.

Each container has a unique alphanumeric ID painted on its exterior that identifies the owner and the container number. There is an international clearing house that keeps track of the ownership, leasing, and use of containers, and coordinates payments from users and lessees to owners. Today there are about 20 million containers in global use, and about half of all containers enter U.S. ports each year. Each one has the potential for loss and for concealing smuggling, including smuggling of weapons of mass destruction (WMDs). The annual value of cargo lost to theft alone is estimated at twelve to twenty-four billion, not including associated insurance and recovery costs. Security measures added since Sep. 9, 2001 (e.g., open-door inspections, radiation inspections, etc.) have slowed throughput at ports.

Therefore, there is great potential for technologies that can further improve efficiency and security of cargo transport using shipping containers.

It is furthermore of interest to note that shipping containers have an average container life span of ten years; shipping containers embark on average between five-to-six times per year; a 2-TEU container has an average new cost of $3,500; the typical shipping cost (end-to-end, transoceanic, including transport, handling fees, documentation fees, etc.) is about $3,800-$4,800; the average value of the contents of a shipping container is about $66,000; there is usually a single seal that is used during transit of a shipping container, but as many as five or more seals may be used; there are twenty or more handoffs during transit of a shipping container; and there can be more than twenty-five documents associated with a shipping container during transit.

With particular regard to the structure of a shipping container, a shipping container is basically a welded steel box used to moved goods from an origin to a destination. The steel is heavy-gauge, and the sides, front end, and top are corrugated. The bottom can be wood decking over steel supports or can be linoleum over sheet steel. The rear end has two hinged doors. There are small ventilation holes spaced along the upper few inches of both sides. The doors have rubber gaskets to seal around the door frame and where the doors meet against casual ingress of liquids. Containers have only basic mechanical security features. Other than the sides, top, and front end being solid steel, those features are all at the doors. The hinges are either welded or attached with carriage bolts. Each door has two locking bars that are seated in the upper and lower edges of the door frame. The locking handle is on the right-hand door, and it has a hasp that fits over it when in the closed position and accept a lock or seal device. The locking handle and hasp are also secured with carriage bolts. There is a steel plate/box welded to the right-hand door that extends several inches over the left-hand door, to inhibit opening of the left-hand door without first opening the right-hand door. There is some variability of the location of strengthening ribs of the doors versus the locking handles, which may affect seal positioning.

With reference to FIG. 1, the most commonly used seal device is a sheathed steel bolt, as defined by the International Standards Organization (ISO) in the *Standard for Freight Containers Mechanical Seals* (ISO-17712). Not all ISO-17712-compliant bolts are the same, however. Although most have the form of a large nail, almost all differ by shank length and outer diameter, latching-groove configuration, and head shape. This variability is acceptable because each bolt is paired with a matching "nut," and the two need only mate with each other. There is no requirement for mating between bolts of different manufacturers or contours.

Some bolts are naked steel with an abrupt head-to-shank joint. Others have a plastic jacket and an angled head-to-shank transition. The jacket helps minimize surreptitious bolt-cutting by making any attempt to glue the pieces back together obvious. An angled transition further minimizes surreptitious cut-and-glue by making it more difficult to hide a glued joint at the head-shank interface.

In the use of such bolts, there is also no requirement for using the same type or brand of bolt on a given container as the bolt is changed, nor as the container moves through the supply chain, nor is there any need for continuity and tracking of bolt serial numbers All that is required, either by some ports, some jurisdictions, and/or some users, is that some bolt is affixed to the container and that the bolt and its nut have matching serial numbers. So, when a bolt is needed, whoever is affixing the bolt simply grabs whatever bolt is handy and affixes it to the container.

At the origin, an empty container arrives, goods are loaded into the container, and the loaded container is hauled away. At the destination, the loaded container arrives, goods are removed, and the empty container is hauled away. For large operations—either origin or destination—empty containers may be stored on-site or nearby for ready use. These stored containers may be in mountainous stacks up to 7 containers high, with near-zero spacing. However, for the overwhelming number of shipments, containers are around only when actually loading or unloading goods. Containers have no wheels nor have motive power of their own. So, at both origin and destination, containers arrive/leave on a chassis. A chassis is a steel frame with wheels (tires) and a suspension suitable to hold a container securely and to carry the weight, pulled by a tractor. For any given transit, containers overwhelmingly pass through two marine ports-one at or near the country of origin, and one at or near the country of destination. Between origin or destination and a port, containers are always transported by over-the-road chassis and, over some segment of the route, may also be transported by rail. Containers may stop for consolidation or de-consolidation between origin/destination and a port. At these stops, the container may be opened and contents added or removed, and/or the tractor may be changed, but only rarely is the chassis changed. Containers may also stop at truck stops and weigh stations. There is no handling of the container at such stops, unless unauthorized.

It is at the ports that the overwhelming majority of container handling takes place. From the time a container enters a port until it is loaded onto a ship, a container is typically lifted and changes conveyance about five times. In particular, a container is lifted from the transport chassis and placed in a temporary stack; is lifted from the temporary stack, set on yard chassis, and taken to a staging stack; is lifted from a yard chassis and placed in a staging stack; is lifted from the staging stack, set on a yard chassis, and taken to the dock; and is lifted from the yard chassis on the dock and placed onto/into a ship. In the temporary stacks, if a given container is behind or beneath other containers, and/or it blocks a targeted container, then it may be lifted and placed several additional times. When unloaded from a ship, the reverse occurs, except that the container is placed in just one holding stack to await pickup by transport. The exception would be for any container that requires a customs or other security inspection. FIG. 2 illustrates these foregoing steps in traveling from origin to destination of a shipping container, together with the entities involved.

Containers arriving at a port, regardless whether by truck or rail, are initially placed in temporary stacks. The temporary stacks are a place for the containers to be put so that the transport carrier who brought the container in can leave and take his chassis with him. Each container is taken to a specific row/aisle per directions given to the transport driver, at the gate, when he enters the port. At the designated row/aisle, an over-size, fork-lift-like machine called a "picker" lifts the container from the chassis and places it in the appropriate stack. These stacks are usually up to five containers high, with one-to-two foot spaces in-between stacks, which minimally allows for yard equipment and people to move among the rows/aisles for later retrieval.

Within 24 hours of the expected arrival of its ship, a given container is removed from the temporary stacks and taken to the staging stacks. The container is lifted from the temporary stacks, again using a picker, is set on yard chassis/tractor belonging to the port, and is taken to a specific location among the staging stacks. The staging stacks are mapped per a ship's load-plan. This plan is optimized to place each container in a specific position in/on the ship, per its weight, its size, its contents, and at what port it will be off-loaded. The staging stacks are similarly up to five containers high, with five-to-six rows that are hundreds of feet in length.

With the ship at the dock, the containers destined for that ship are lifted—in order, per the load plan—from the staging stacks, and set onto a yard chassis/tractor. This lift is usually done by a Rubber Tired Gantry (RTG), which straddles several rows. From there containers are taken to the dock. At the dock, they are lifted and placed into/onto the ship by a Rail Mounted Gantry (RMG). RMGs are the cyclopean cranes along the dock that have the giant arms that extend over the ship and that one always sees in port photos.

Ports operations usually occur twenty-four hours a day year round, with only a few holidays being observed. However, port gates usually are open only from about 6:00 AM to about 6:00 PM on weekdays for in-coming and out-going traffic. Ship loading and off-loading can occur at any time. However, the overnight and weekend hours are used to stage containers for ship loading, without the danger and disruption of delivery/removal vehicles buzzing around the port.

A given container may sit in the port up to three days, but usually no more than eighteen hours. Having containers piled up in a port too far in advance of a ship's arrival causes congestion. Consequently, transport carriers receive notices of when their ships are due in port and are given a time window in which to arrive. If they arrive too early, they may be turned away. If they fail to pick up within their window, they may be charged a demurrage fee.

If a truck arrives with a container after the gates are closed, the driver may choose to unload the container in a nearby, off-site storage yard, still on its chassis. Arrangements are then made to pickup and transport the container to the port when the gates are open.

Notably, there are many handoffs among various players in an end-to-end container shipment, and each player may have an effect on the seals and/or an interest in their performance in rendering improved efficiency and security. Those players include: the originating shipper and the buyer of the goods (including the owner/management, dock workers and any associated unions, logistics managers and staff); drayage providers (including owner/management and drivers); shipment consolidators and freight forwarders (including owner/management, dock workers and any associated unions, logistics managers and staff); intermodal freight yards (including operations such as yard workers and management, security, and unions); road and rail transporters (including owner/management, drivers, logistics managers and staff); ports and terminals (including port operations, port security, long-shore labor unions, and steamship lines and crew); government authorities (including customs and border protection ("CBP"), the Coast Guard, and the Department of Homeland Security ("DHS")); logistics management companies; and insurers representing the shippers, steamship lines, buyers, and other container handlers.

Problems in Shipping Container Use

Mechanical seals commonly used in the industry with shipping containers are single-use devices that are applied to the doors and/or door handles of containers and function as an indicator of whether the container has been opened. If a shipper, Customs, or other authorized player in a given shipment discovers a broken seal, then it is likely that the container has been opened improperly, and goods have been taken or added. Mechanical seals may be simple paper strips across the door seam, metal strips laced through the handle hasp and crimped, fancy tie-wraps through the hasps, or high-strength-steel bolts through the hasp with a one-way nut to hold it in place. Some mechanical seals may be numbered.

Mechanical container seals are better than no seals; however, even when numbered seals are mated to matched housings, there is often no end-to-end record of seal serial numbers as they are changed in the normal course of a given end-to-end shipment. Consequently, valid seals can be removed, goods taken or added to a container, and a counterfeit-but perfectly legitimate-looking-seal installed. Similarly, valid seals can be cut and repaired to appear intact. The next entity in the supply chain will likely be none the wiser that something is amiss (including customs and yard/terminal security). Mechanical seals have no memory, nor do they have any kind of reporting capability. Consequently, no one but the criminals themselves know that something improper has occurred until the container fails to arrive at its intended destination, or until it arrives and the contents are not what are expected.

Similarly, mechanical seals may be left in place and the hinge pin of the container's latch lever can be drilled out, allowing the container doors to be opened without disturbing the seal. The seal has no sensitivity to such tampering, and the tampering is easily disguised with a new pin and paint. While the door is open, goods may be taken and/or added.

Further, brute-force methods can be applied to circumvent the door and any seal entirely. Portable power saws can quickly and easily cut holes into the sides of containers large enough to remove contents. Some thieves simply bring in a tractor to take the entire container away and remove the contents later at a concealed location, while others coerce or bribe the tractor driver and steal the entire rig.

Mechanical seals also have no radio-reporting nor locating capability. In none of the above examples is any timely reporting made that could launch real-time interruption of the events or lead to recovery of the container and its contents. Also, in none of the above examples is any date/time record of the events made, which could greatly aid making successful claims for damages and loss.

Current Technological Solutions in Use: RFID Technology

One technology currently in use to aid container efficiency and security involves radio frequency identification (RFID) devices.

RFID, "active" and "passive," is employed in certain types of container seals and are sometimes referred to as electronic seals or "e-seals", as opposed to simply mechanical seals without electronics, which are referred to herein as merely "mechanical seals". E-seals may be single-use or reusable. These seals are about the size of a matchbox and are used to record/store time-stamped seal open/close events associated with the container number. Each has a bolt that is inserted into the seal housing to effect sealing. The bolt must be cut to open the seal. Reporting of stored seal data requires an interrogation by a reader or a monitoring beacon in close proximity (tens of feet). These seals are covered by the standard set forth in ISO-18185, which issued in the Spring of 2007. RFID-based systems can be used for custody forensics and for coarse locating. They can also be used to detect/record arrival to and departure from a controlled-access area.

Although these seals are an improvement on mechanical seals, they have several shortcomings. For example, the e-seals are not autonomous, in that they do not initiate a report when a breach occurs and they must wait until they are interrogated before delivering their data. The e-seal systems rely on choke-point infrastructure to assure accurate reading of stored seal data. Furthermore, the e-seal, and the container to which it is attached, must be brought within close proximity to a reader (such as a gate or portal), or the reader must be brought within close proximity to the e-seal, in order for the e-seal to be read. Of course, if a container is high on or deep within a stack, reading of the e-seal can be problematic. Additionally, e-seals also have no motion-sensing capability. They have no capability to detect or report unauthorized movement or mechanical disturbance. Consequently, whole containers could be stolen from a monitored facility, with e-seals intact and little risk of timely discovery.

Furthermore, e-seals are used in RFID-based systems that are limited in detecting and reporting presence of the e-seal and respective container to which it is attached. The e-seals must either periodically broadcast their presence, thereby consuming battery power and diminishing the useful life of the e-seal, or wait to be interrogated as to whether they are still present, which requires extensive infrastructure and opens time windows during which losses can occur.

Moreover, e-seals also generally have no hopping capabilities. Each e-seal must be able to "see" a reader/beacon directly. Consequently, the amount of infrastructure required to cover an entire port, yard, ship, or train can be very extensive; coverage can therefore be spotty; and/or readers must be located at choke points, which can slow traffic considerable. For mobile applications (e.g., ships and trains), effective infrastructure may be unworkable.

Still further, the locating of e-seals can be done only at monitored facilities. The cost of the infrastructure required for even this capability appears to be prohibitive for most yards and ports to justify, and out of question for other public sites such as weigh stations and truck stops.

E-seals also have no capabilities for sharing infrastructure among several parties (in order to minimize per-use costs) while providing privacy and data security as between such parties. Operational life and efficiency can also be negatively impacted, especially in areas of high traffic RF transmissions. Indeed, confusion often results when a multitude of e-seals are in close proximity and attempt to transmit over each other. Needless to say, battery life can also be limited, especially for single-use, disposable e-seals.

It will thus be appreciated that systems utilizing RFID technology in such e-seals are limited by poor scalability, poor wireless security, RF noise and interference, lack of real-time alerting, and high infrastructure requirements.

Current Technological Solutions in Use: RTLS Technology

Another technology that is used to aid container efficiency and security is referred to as RTLS or Real Time Locating System. RTLS technology uses active RFID and either precise transmission timing and/or precise transmission angle-of-arrival to determine the location of a device, within the confines of some covered area. RTLS can be incorporated into container seals and offers the prospect of precise locating of containers within a yard or port, including covered areas where GPS would not work. However, in addition to most of the limitations cited above for RFID, RTLS is additionally limited by extensive/expensive infrastructure that is required to achieve useful precision across a large area. The nature of the technology is such that a device requires a favorable position relative to at least three—and preferably four—locating transceivers in order to achieve high precision (e.g., less than ten feet). If the device is offset far towards one side, precision diminishes rapidly. Also, the effectiveness of RTLS technology is affected by changes in RF propagation, and the movement and storage of large numbers of containers at yards and ports can change RF propagation significantly. Consequently, many locating transceivers are needed, and they must be very carefully calibrated and maintained.

Due to the limitations of RTLS technology, its use in cargo and shipping container implementations is usually limited to yard management, for which RTLS technology is used to pinpoint the location of containers, to possibly enable faster retrieval of staged containers, and to improve yard/port throughput.

Current Technological Solutions in Use: GPS Technology

Global Positioning System or "GPS" technology is used to track the exact location of containers. Devices with a GPS receiver, processor, and battery are mounted to containers and to over-the-road cargo tractors. Either on-demand or at programmed intervals, the devices report their GPS location, either by satellite or cellular/GSM/3G/4G (or later version) data link.

GPS-based systems—and similar systems like SkyBitz—are useful for route management; however, for container applications, GPS-based system have severe shortcomings. For example, no real-time motion detection is provided. Motion can only be deduced by comparing GPS positions after some time interval. The time interval and the resolution of the associated mapping application make it unlikely that there could be timely intervention to thwart a theft.

Additionally, no mechanical disturbance detection or reporting is provided, and no seal breach detection or reporting is provided.

GPS technology also enables very limited presence detection. In this respect, presence can be detected only if a GPS reading happens to be made when a container is at a specific location. A container could easily be stolen if the timing and interval of the GPS readings were off, unless GPS updates and reports were frequent. However, frequent reporting is usually very expensive.

GPS technology also works poorly, if at all, when containers are stacked, as GPS devices must have visibility to a large portion of the sky.

Thus, systems utilizing GPS really are no more ideal, as GPS requires line-of-sight reception from multiple satellites, which limits system utility with assets that are located indoors or in other obscured sites. It will be appreciated that systems utilizing GPS are limited by its high consumption of battery power, high device costs, high operating costs, and need for a separate data communications link to report asset position and/or to report sensor data.

As will thus be appreciated, Mechanical seals are in widespread use. On the other hand, the use of e-seals has not been widely or rapidly adopted. The principal objections appear to be the cost of infrastructure (which the ports are unwilling to bear), cost of the devices ($10s each), lack of a complete standard, and lack of a government mandate.

Therefore, for any e-seal design to be adopted, it is likely that it will have to be driven by shippers/buyers whose cargo has sufficient value, for which the seals return sufficient benefit, as to make it worthwhile to bear the costs of seals and infrastructure. The benefits derive from protecting the cargo from loss. For effective protection of high-value cargo, one needs tracking (presence), seal-change/breach, and movement/intrusion detection and reporting benefits. To render these benefits at an acceptable per-use cost, the seal device must be re-usable. To make the seal fail-safe compatible with current practices and capabilities along the entire end-to-end logistics path (over most of which a shipper may not have complete control), the seal must also use a standard one-time-use seal bolt.

In view of the foregoing, it is believed that to achieve an acceptable per-use cost, and to promote adoption, the cost of infrastructure must be shared. Although the cost may initially be borne by ports and yards, the cost is eventually borne by shippers. Therefore, infrastructure (and the systems that support it) must accommodate sharing among the diverse users of the ports and yards. For example, Maersk containers and Evergreen containers must be able to share port infrastructure (e.g., GWs and data links) with each other and with port authorities. Similarly, containers with Samsung TVs must be able to share infrastructure with containers carrying Sony TVs. This sharing, though, must also accommodate preferential hopping and data privacy.

The wild card is government mandate. In its absence, adoption will be driven by economics, which means that satisfying commercial needs will determine success. However, a government mandate focused on a particular design could force widespread and rapid adoption of that design. So far, the US government has been the global driver for a solution but has been slow to define requirements, apparently not wishing to disrupt commerce or irritate commercial interests with a solution that is focused overwhelmingly on security. For instance, the U.S. government has implemented the Customs-Trade Partnership Against Terrorism (C-TPAT) program and while compliance with C-TPAT is not mandatory, those shippers that do not comply may encounter added delays when passing through customs checkpoints. To comply with the C-TPAT, containers must be sealed with an ISO-17712-compliant seal and shippers must meet other supply-chain integrity requirements. Because the ISO-seals are better than nothing, because they are easy to use and inexpensive (generally less than a dollar), and because there are real incentives for using them, ISO-17712-compliant seals are in widespread use.

The U.S. Department of Homeland Security (DHS) also has attempted to define requirements for electronic seal devices and systems. The two principal efforts in this respect are the Marine Asset Tag Tracking System (MATTS) program and the Conveyance Security Device (CSD) program. MATTS—as the name implies—is aimed at tracking and monitoring for a possible problem with a shipping container before it arrives at a U.S. port; however, MATTS is currently a GPS-based means simply for tracking container location as it progresses from origin to destination and reporting deviations. The CSD program is aimed at minimizing the time/effort needed to accurately determine the history of the openings and closures of a container's door after the container is at a terminal location. The CSD program is based on RFID technology and closely resembles a system known as CommerceGuard and provided by General Electric. Unfortunately, the RDI technology requires that the container pass close by a reader or that a reader be brought close to the CSD device for the historical data to be read from the RFID technology of the CSD. The two MATTS and CSD systems are primary focused on security. Neither includes a physical seal or lock. Neither (so far) considers the needs of commercial interests, nor the burdens that these security-driven systems may put on those interests. DHS has a long-term goal of eventually combining the two into an integrated system. MATTS has been tested in a single field trial with no published results, and the CSD program has only recently been the subject of an open request for information (RFI).

Needless to say, the integrity of cargo container seals affects both commercial interests (businesses) and national security (government). Commercial interests (including ports) are overwhelmingly concerned with speed of cargo movement (affecting capacity, transport, and carrying costs) and cargo losses (things removed from the container or damage). Government is more concerned with whether things have been added to a container, such as WMDs and drugs. Checking whether things having been added requires some level of inspections, which costs time. So, the concerns of commercial interest and government are sometimes at odds. Regarding WMDs, the sooner a security alert can be received and the farther away from shore, the better. If a given container is inspected, and a device is consequently detonated (or detonates automatically), better that detonation occurs at sea or away from populated areas. Consequently, government desires solutions that enable over-the-horizon (i.e., blue-water) notification of problem containers.

Accordingly, it is believed that a solution is in high demand that meets the needs of both commercial interests and government, and that can be brought to market ahead of a government mandate. One or more embodiments or the present invention are believed to meet such demand. In particular, it is believed that the Solution addresses the following problems related to the security and efficiency of using shipping containers:

Mechanical seals are easily circumvented, tampered with, or substituted with counterfeit seals.

When mechanical seals are circumvented, tampered with, or substituted: the event often occurs at a time and place that makes detection and recovery unlikely (e.g., at night when no one is around to observe or react to the event), the method foils timely detection (e.g., the latch hinge pin is removed and replaced), there is no date/time/location record associated with the tampering, making claims for loss and damages problematic.

Checking mechanical seals visually/manually adds time and is prone to error.

Re-checking containers because seal integrity is suspect adds time.

Current practice does not provide for seal serial number integrity as a container moves through the supply chain for any given transit.

Visual/manual and common electronic methods for detecting and recording the arrival and departure of containers are unreliable in detecting and reporting the continued presence of a container. Consequently, in a busy or congested yard, one cannot be sure that a given container is still in the yard, and one may not be alerted that a checked-in container is missing.

Drivers are often (some say, nearly always) complicit in unauthorized-opening events (theft or addition).

Paperwork associated with shipments (primarily manifests) move separately from the shipments, which can cause throughput delays.

In addressing these problems, the Solution enables the following capabilities:

The automatic detection and reporting of the installation and removal of container bolt seals, and the continuous monitoring of their integrity as the containers travel through the supply chain and as custody changes hands, combined with reporting that occurs immediately when at monitored locations.

The automatic detection and visibility of seal serial numbers throughout the end-to-end transit of a container.

The automatic detection and immediate reporting of inappropriate disturbance and unauthorized movement of individual containers when at monitored locations, during user-set times and conditions.

The automatic detection and reporting of the presence of individual containers at certain fixed points, in near real-time.

The minimization of the required involvement of drivers in initiation, maintenance, and completion of a seal transit, and minimization of the effect of driver actions on seal integrity.

The provision of coverage at the key/most-vulnerable points along the supply chain, including at ships, ports, weigh stations, struck stops, and distribution centers.

The physically storing of an electronic copy of shipment manifest and/or other documents in the e-seal attached to the container.

Using the Solution, shippers, logistics providers, ports, customers, and others are equipped to:

Add impediments to hinder unauthorized activities and add forensic tools to capture perpetrators. The impediments add little added cost to either commercial or government operations, but significantly increase the risks and costs for thieves and others to act.

Automatically receive timely and accurate information regarding the location of containers and determine when, and in some cases where, container seals were installed and removed.

Automatically receive alerts when a container at monitored locations is being disturbed or moved at times when there should be no disturbance or movement (e.g., after normal business hours), and have that alert provided soon enough either to interrupt the event or to recover the container before serious loss or contents tampering.

Automatically receive alerts when a checked-in container is no longer present, and have that alert soon enough that a search has much higher likelihood of recovery than by current means.

Have an accurate, sequential, date/time-stamped records of all events, which records are automatically collected and stored.

Automatically receive "over-the-horizon" (i.e., "blue-water") notifications of anomalies.

Have both mechanical and electronic features to protect shipments from unauthorized activity, wherein the structural features will be familiar to users of the container seals and will work regardless of enablement of the electronic features It is further believed that the Solution equips a logistics provider with a clearly visible and differentiable service to their customers while, at the same time, reducing time spent on manually tracking shipments and determining where and when container and contents losses occur. With the loss knowledge in hand, future losses may be able to be avoided or procedures put in place to reduce their likelihood of occurrence (with possible corresponding reductions in insurance costs).

End-customers, in turn, are able to better determine when containers are likely to arrive and the condition of the container seals to determine if sealing and opening has occurred as expected. This information will allow them to better plan their business logistics after the containers have been received.

The Solution moreover includes such high/trusted integrity that it can be integrated into a risk-scoring system of containers at origin that permits customs/security green-lanes at the destination, thereby minimizing inspection-related delays.

The Solution thus addresses the needs/concerns of both commercial and governmental interests. Moreover, the Solution addresses these needs with small, incremental changes to existing standard operating procedures and systems.

In deploying the Solution, it is believed that shippers will be likely buyers of seals and likely buyers/users of the supporting infrastructure. In this respect, shippers desire to minimize losses (both to minimize direct costs and insurance costs) and maximum speed (to minimize working capital costs). Their dock workers will likely install seals. Their logistics staff will likely want to track shipments and seal status, and will respond to alarms.

Consolidators and freight forwarders also are likely buyers of seals and likely buyers/users of infrastructure. They desire minimum losses (to minimize claims and insurance costs) and maximum speed (to maximize utilization of their facilities, people, and equipment). Their dock workers may remove seals and will likely install seals. Their logistics staff will likely want to track shipments and seal status, and they will likely respond to alarms.

It is believed that port and terminals operators and authorities are likely buyers/users/sharers of infrastructure. They desire minimum losses (to minimize claims and insurance costs) and maximum speed (to maximize utilization of their facilities, people, and equipment). Their operations staff will likely want to track shipments and seal status, and they and security may respond to alarms. They will likely never remove, or replace a seal. Their infrastructure will likely be shared with all users of the port.

Additionally, it is believed that steamship companies may be likely buyers of infrastructure and may be providers of infrastructure services on their ships, but they will likely not use the infrastructure. They desire minimum losses to minimize claims and insurance costs. In contract, it is believed that steamship companies will likely not install, remove or replace a seal, nor even be aware of an alarm initiated by a seal.

It is also believed that transporters and other yards will be likely buyers/users/sharers of infrastructure. These parties desire minimum losses in order to minimize claims and insurance costs, and desire maximum speed in order to maximize utilization of their facilities, people, and equipment. Similar to steamship companies, these parties will likely never install, remove, or replace a seal. Their infrastructure also will likely be shared with all users of the yard as a service, and their logistics staff may desire to track shipments and seal status and may respond to alarms.

Governmental authorities are believed to be likely buyers of seals and may be buyers of limited infrastructure. Such authorities desire integrity of the seal, container, and goods, and such authorities may remove and replace seals. The authorities further may use infrastructure provided by the port, but may also have their own that only they use. Authorities also may respond to alarms and may desire access to shipment records as evidence in investigations.

Logistics management companies are likely users of infrastructure, especially software, which they will likely purchase or pay to use. These parties also desire minimum losses to minimize claims and insurance costs, and desire to maximum speed in order to maximize utilization of their facilities, people, and equipment. They also will likely never install, remove, or replace a seal (unless they are also engaged in other functions, such as consolidation); however, their logistics staff will likely desire to track shipments and seal status and will likely respond to alarms. If used in a closed-loop system, such parties also will likely have to manage seals for reuse.

The buyers of the shipped goods will likely be buyers of seals and likely buyers/users of the infrastructure. These parties desire minimum losses (both to minimize direct costs and insurance costs) and maximum speed (to minimize working capital costs). Their dock workers will likely remove seals, and their logistics staff will likely desire to track shipments and seal status and respond to alarms. If used in a closed-loop system, buyers also will likely have to manage seals for reuse.

Insurance companies are neither buyers nor users of either seals or infrastructure; however, they will desire to minimize losses from claims by their insureds. It is believed that their interest and involvement with seals is solely as a means to satisfy this desire to minimize losses.

All of these parties are illustrated in FIG. 2.

SUMMARY OF THE INVENTION

The invention generally relates to networks, apparatus, methods and systems for securing, monitoring and tracking shipping containers.

The present invention includes many aspects and features. Moreover, while many aspects and features relate to, and are described in, the context of container security, the present invention is not limited to use only in container security, as will become apparent from the following summaries and detailed descriptions of aspects, features, and one or more embodiments of the present invention.

Accordingly, one aspect of the present invention relates to a method of reconfiguring a wireless communications device in a network, comprising: connecting, by a wireless communications device of a plurality of wireless communications devices, to a network via a gateway of a plurality of gateways, each gateway of the plurality of gateways being associated with a location; communicating an indication of the wireless communications device's connection to a user application running at a remote server; comparing, by the user application at the remote server, the location associated with the gateway to a stored database; selecting, based on this comparison, a profile corresponding to the location associated with the gateway; communicating, from the user application at the remote server, to the wireless communications device, an instruction to engage the selected profile; and engaging, by the wireless communications device, the identified profile.

Another aspect of the present invention relates to a method of reconfiguring a wireless communications device in a network, comprising: connecting, by a wireless communications device of a plurality of wireless communications devices, to a network via a gateway of a plurality of gateways, each gateway of the plurality of gateways being associated with a location; communicating an indication of the wireless communications device's connection to a user application running at a remote server; comparing, by the user application at the remote server, the location associated with the gateway to a stored database; selecting, based on this comparison, a profile corresponding to the location associated with the gateway; communicating, from the user application at the remote server, to the wireless communications device, an identification of the selected profile together with an instruction to engage the selected profile; comparing, by the wireless communications device, the communicated identification of the selected profile to a list of profiles stored at the wireless communications device; determining, based on such comparison, that the selected profile does not correspond to any profile of the list of profiles stored at the wireless communications device; communicating, from the wireless communications device, an identification of the selected profile to a remote database; comparing, at the remote database, the communicated identification of the selected profile to stored profiles; selecting, from the remote database, a stored profile corresponding to the selected profile; communicating, to the wireless communications device, the stored profile; engaging, by the wireless communications device, the identified profile.

Another aspect of the present invention relates to a system, comprising: a plurality of gateways connected to a network, each gateway being associated with a location; a plurality of wireless communications devices, each wireless communications device being configured to connect to the network via a gateway of the plurality of gateways; wherein each wireless communications device is configured, upon connecting to the network via a gateway of the plurality of gateways, to engage a profile selected based on the location associated with the gateway.

Another aspect of the present invention relates to a method, comprising registering, by a wireless communications device, with a first gateway of a network; receiving, by the wireless communications device from the first gateway, a first location identification stored at the first gateway; engaging, by the wireless communications device, a first profile corresponding to the received first location identification; registering, by the wireless communications device, with a second gateway of the network; receiving, by the wireless communications device from the second gateway, a second location identification stored at the second gateway; engaging, by the wireless communications device, a second profile corresponding to the received second location identification.

Another aspect of the present invention relates to a method of beaconing, comprising broadcasting, by a gateway of a network, a beacon; receiving, by a wireless communications device of the network, the beacon; selecting, by the wireless communications device, a random value; setting, by the wireless communications device, a timer of the wireless communications device based on the randomly selected value;

if a beacon is received by the wireless communications device prior to expiration of the timer, then selecting, by the wireless communications device, a random value, and setting, by the wireless communications device, the timer based on the randomly selected value; upon expiration of the timer, broadcasting, by the wireless communications device, a beacon.

Another aspect of the present invention relates to a method, comprising broadcasting, by a gateway of a network, a beacon including a location identification; receiving, at a wireless communications device, the beacon; in response to receiving the beacon, communicating, by the wireless communications device to the gateway, a registration request; communicating, by the gateway, an acknowledgment to the wireless communications device; receiving, at the wireless communications device, the acknowledgment; engaging, by the wireless communications device, a profile corresponding to the location identification.

Another aspect of the present invention relates to a method of beaconing, comprising: broadcasting, by a gateway of a network, a first beacon, and setting, by the gateway, a timer of the gateway based on a pre-selected maximum value; receiving, by a first wireless communications device of the network, the first beacon; upon receipt of the first beacon, setting, by the first wireless communications device, a timer of the first wireless communications device based on a randomly selected value which is less than the pre-selected maximum value; broadcasting, by a second wireless communications device of the network, a second beacon, and setting, by the second wireless communications device, a timer of the second wireless communications device based on a randomly selected value which is less than the pre-selected maximum value; upon receipt of the second beacon, setting, by the first wireless communications device, the timer of the first wireless communications device based on the pre-selected maximum value.

Another aspect of the present invention relates to a method of securing a container, comprising: inserting, into a seal device at a container, an electronic bolt; reading, by the seal device, a serial number stored in the electronic bolt; communicating, from the seal device, to a user application, insertion of the bolt; inputting, by a user at the container via a handheld device, information associated with the container; communicating, from the handheld device to the user application, the information associated with the container; associating, in a database by the user application, the information associated with the container with the bolt serial number and an identification of the seal device; communicating, by the user application, a confirmation to the seal device.

A method of securing a container, comprising: inserting, into a seal device at a container, a bolt;

communicating, from the seal device, to a user application, insertion of the bolt; inputting, by a user at the container via a handheld device, a serial number of the bolt; communicating, from the handheld device to the user application, the serial number of the bolt; inputting, by a user at the container via a handheld device, information associated with the container; communicating, from the handheld device to the user application, the information associated with the container; associating, in a database by the user application, the information associated with the container with the bolt serial number and an identification of the seal device; communicating, by the user application, a confirmation to the seal device.

Another aspect of the present invention relates to a method of securing a container, comprising:

inserting, into a seal device at a container, a bolt; communicating, from the seal device, to a user application, insertion of the bolt; communicating, by a worker at the container to a remote user, via a voice channel, a serial number of the bolt; inputting, by the remote user via a user application, the serial number of the bolt; inputting, by the remote user via the user application, information associated with the container; associating, in a database by the user application, the information associated with the container with the bolt serial number and an identification of the seal device; communicating, by the user application, a confirmation to the seal device.

Another aspect of the present invention relates to a method of securing a container, comprising: inserting, into a seal device at a container, an electronic bolt; reading, by the seal device, a serial number stored in the electronic bolt; communicating, from the seal device, to a user application, insertion of the bolt; scanning, by the user via a handheld device, an electronically readable element on the seal device representative of an identification of the seal device; communicating, from the handheld device to the user application, the identification of the seal device; inputting, by a user at the container via the handheld device, information associated with the container; communicating, from the handheld device to the user application, the information associated with the container; associating, in a database by the user application, the information associated with the container with the bolt serial number and the identification of the seal device; communicating, by the user application, a confirmation to the seal device.

Another aspect of the present invention relates to a method of securing a container, comprising: inserting, into a seal device at a container, an electronic bolt; reading, by the seal device, a serial number stored in the electronic bolt; communicating, from the seal device, to a user application, insertion of the bolt; scanning, by the user via a handheld device, an electronically readable element on the seal device representative of an identification of the seal device; communicating, from the handheld device to the user application, the identification of the seal device; associating, in a database by the user application, the bolt serial number and the identification of the seal device; communicating, by the user application, a confirmation to the seal device; communicating, by the user application, a confirmation to the handheld device.

Another aspect of the present invention relates to a system comprising: a shipping container; a seal device attached to the shipping container configured for receipt of a bolt and including a barcode thereon representative of a unique identification of the seal device; a handheld device configured to scan the barcode located on the seal device; a user application in electronic communications with both the seal device and the handheld device, and configured to associate the unique identification of the seal device with a serial number of a bolt inserted into the seal device in response to an association request received from the handheld device.

Another aspect of the present invention relates to a system comprising: a shipping container a seal device attached to a container and having a bolt received therein effectively locking the container, and including a barcode thereon representative of a unique identification of the seal device; a handheld device configured to scan the barcode located on the seal device; a user application in electronic communications with both the seal device and the handheld device, and configured to disarm the seal device in response to a disarm request received from the handheld device.

Another aspect of the present invention relates to a system comprising: a shipping container; a seal device attached to the shipping container configured for receipt of a bolt and including a barcode thereon representative of a unique identification of the seal device; a handheld device configured to scan the barcode located on the seal device; a user application in electronic communications with both the seal device and the handheld device, and configured to associate the unique identification of the seal device with a serial number of a bolt inserted into the seal device in response to an association request received from the handheld device, and further configured to disarm the seal device in response to a disarm request received from the handheld device.

Another aspect of the present invention relates to a method of unsecuring a shipping container secured with an armed seal device having a bolt received therein, the method comprising: scanning, by a user via a handheld device, an electronically readable element on the seal device representative of an identification of the seal device; communicating, from the handheld device to a user application, the identification of the seal device; associating, in a database by the user application, the bolt serial number and the identification of the seal device; communicating, by the user application, a confirmation to the seal device; communicating, by the user application, a confirmation to the handheld device.

Another aspect of the present invention relates to a method of alerting a user of unauthorized tampering with a shipping container, comprising: securing a seal device to a shipping container, the seal device including a bolt receiving area; inserting, by a user at the container, an electronic bolt into the bolt receiving area of the seal device; reading, by the seal device, a serial number stored in the electronic bolt; communicating, from the seal device, to a user application, insertion of the bolt; scanning, by the user via a handheld device, an electronically readable element on the seal device representative of an identification of the seal device; communicating, from the handheld device to the user application, the identification of the seal device; associating, in a database by the user application, the bolt serial number and the identification of the seal device; communicating, by the user application, a confirmation to the seal device; communicating, by the user application, a confirmation to the handheld device; receiving, at the seal device, sensor data indicative of tampering; communicating, by the seal device to the user application, an alert.

Another aspect of the present invention relates to a method of alerting a user of unauthorized tampering with a shipping container, comprising: securing a seal device to a shipping container, the seal device including a bolt receiving area and at least one sensor; inserting, by a user at the container, a bolt into the bolt receiving area of the seal device; inputting, by the user via a handheld device, information associated with the seal device; communicating, by the handheld device, the information associated with the seal device to a user application; communicating, from the user application to the seal device, an arming confirmation; receiving, at the seal device, sensor data indicative of tampering; communicating, by the seal device, an alarm.

Another aspect of the present invention relates to a method of providing data on a shipment, comprising securing a seal device to a shipping container, the seal device including a bolt receiving area and at least one sensor; scanning, by a user at the container via a handheld device, an electronically readable element on the seal device representative of an identification of the seal device; communicating, from the handheld device to the user application, the identification of the seal device; retrieving, by the user application, information associated with the seal device based on the communicated identification; communicating, from the user application to the handheld device, the information associated with the seal device; displaying, on a screen of the handheld device, the information associated with the seal device.

Another aspect of the present invention relates to a system comprising: a plurality of networks, each network comprising one or more gateways, and a plurality of wireless communications devices connected to the respective network via the one or more gateways; one or more user applications running on one or more computing devices; a management system comprising control software running on one or more servers, the management system being configured to handle requests for, and establish, connections between a network of the plurality of networks and a user application of the one or more user applications.

Another aspect of the present invention relates to a wireless two-way RF data communication device that forms a node of a data communications network, the device comprising: a memory having stored therein an unique identifier of the wireless two-way RF data communication device that uniquely identifies the wireless two-way RF data communication device within the data communications network; a receiver configured to receive radio frequency transmissions; a transmitter configured to make radio frequency transmissions; and electronic components arranged and configured, such that the wireless two-way RF data communication device communicates with other nodes of the data communications network in communicating messages from originating nodes to destination nodes, such that each message that is communicated by the wireless two-way RF data communication device either as an originating node or an intermediate node includes the unique identification of the wireless two-way RF data communication device, such that the wireless two-way RF data communication device communicates a presence message to a presence server at routine intervals based on a chronometer; and such that the measurement of the time until the next check-in message is to be sent by the wireless two-way RF data communication device is reset upon, communicating, as an intermediate node, a check-in message originating at another node of the data communications network, and receiving, for delivery to the originating node of the check-in message, an acknowledgement of receipt by the presence server for such check-in message.

Another aspect of the present invention relates to a data communications network, comprising: a plurality of wireless two-way radio frequency (RF) data communication devices, each wireless two-way RF data communication device forming a node of the data communications network and each wireless two-way RF data communication device including a memory having stored therein an unique identifier of the wireless two-way RF data communication device; wherein each wireless two-way RF data communication device comprises, a receiver configured to receive radio frequency transmissions, a transmitter configured to make radio frequency transmissions, and electronic components arranged and configured such that the wireless two-way RF data communication device communicates with other nodes of the data communications network in communicating messages from originating nodes to destination nodes, such that each message that is communicated by the wireless two-way RF data communication device, either as an originating node or an intermediate node, includes the unique identification of the wireless two-way RF data communication device, whereby a pathway by which each message is communicated in the data communications network is included with the message as the message is communicated in the data communications network, such that the wireless two-way RF data communication device communicates a presence message to a presence server at routine intervals based on a chronometer, and such that the measurement of the time until the next check-in message is to be sent by the wireless two-way RF data communication device is reset upon, communicating, as an intermediate node, a check-in message originating at another node of the data communications network, and receiving, for deliver to the originating node of the check-in message, an acknowledgement of receipt by the presence server for such check-in message.

Another aspect of the present invention relates to, in a data network comprising a plurality of wireless two-way radio frequency (RF) data communication devices, each wireless two-way RF data communication device forming a node of the data communications network, a method of tracking a pathway by which a message is communicated within a data communications network, a method comprising the steps of: maintaining a unique identification of each of the plurality of wireless two-way RF data communication devices that form a node of the data communications network; and for each wireless two-way RF data communication device that communicates a message in the data communications network, including with the message the unique identification of the wireless two-way RF data communication device such that the pathway by which the message is sent from an originating node to a destination node is communicated to the destination node upon delivery of the message to the destination node, and wherein each wireless two-way RF data communication device performs the steps of, communicating a message from a first node of the data communications network to a gateway device along a pathway, the pathway including the wireless data communication device as an intermediary node of the pathway, including with the message the pathway by which the message is communicated in the wireless data communication device, storing, in a computer readable medium at the gateway device, information representing the pathway, updating, at the gateway device, presence information of the wireless data communication device, communicating an acknowledgment of the message to the first node along the reverse pathway, and upon communicating the acknowledgement of the message by the wireless data communication device in said step (f), resetting a timer used by the wireless data communication device to trigger the sending of a presence indication of the wireless data communication device to the gateway device.

Another aspect of the present invention relates to a method of maintaining presence information associated with a wireless data communication device of a data communications network, comprising the steps of: communicating a message from a first node of the data communications network to a gateway device along a pathway, the pathway including the wireless data communication device as an intermediary node of the pathway; including with the message the pathway by which the message is communicated in the wireless data communication device; storing, in a computer readable medium at the gateway device, information representing the pathway; updating, at the gateway device, presence information of the wireless data communication device; communicating an acknowledgment of the message to the first node along the reverse pathway; and upon communicating the acknowledgement of the message by the wireless data communication device in said step (f), resetting a timer used by the wireless data communication device to trigger the sending of a presence indication of the wireless data communication device to the gateway device.

Another aspect of the present invention relates to a method of indicating presence by a wireless data communication device that forms a node in a data communications network, comprising the steps of: receiving, at the wireless data communication device, a message originating at a first node and addressed to a gateway device; storing, in a computer readable medium of the wireless data communication device, information associated with the message; communicating, by the wireless data communication device, for delivery to gateway device, the message to another node of the data communications network; receiving, at the wireless data communication device, an acknowledgment of the message by the gateway device; resetting a timer at the wireless data communication device; and communicating, by the wireless data communication device, for delivery to the first node, the acknowledgment of the message by the gateway device; wherein the wireless data communication device is configured to communicate a message to the gateway device indicating the presence of the wireless data communication device as a node in the data communications network at predetermined intervals based on the timer.

In addition to the aforementioned aspects and features of the present invention, it should be noted that the present invention further encompasses the various possible combinations and subcombinations of such aspects and features.

The present invention according to one aspect is a method for arming a shipping container security system as disclosed herein.

In features of this aspect, an identification of the shipping container, an identification of a bolt locking the shipping container door, and an identification of the locking module receiving the bolt in locking engagement, may be all bound by a server application in a database remotely located to the shipping container; the locking module may include a locking body in which a portion of the bolt is received and an articulating electronics housing connected to the locking body and containing electronic components of a remote sensor node or "RSN" (and sometimes also referred to as a remote sensor interface or "RSI"); the binding may be performed commensurate with the sealing of the shipping container; and the binding may be performed following sealing of the shipping container and commensurate with the availability of a Reader for communications with the RSN.

In further features of this aspect, the identification of the bolt and the identification of the locking module may be communicated by the RSN to the server application over a satellite communications network, a cellular network, a wired network including the Internet, an intranet, or any combination of the foregoing; the identification of the shipping container and the identification of the locking module may be communicated by a wireless handheld data communication device to the server application over a satellite communications network, a cellular network, a wired network including the Internet, an intranet, or any combination of the foregoing; the identification of the shipping container may be obtained from an exterior surface of the shipping container; the identification of the shipping container may be manually read from an exterior surface of the shipping container and manually entered into the wireless handheld data communication device; and the identification of the locking module may be manually read from an exterior surface of the shipping container and manually entered into the wireless handheld data communication device.

In still further features of this aspect, the identification of the bolt and the identification of the locking module may be communicated by the RSN to the server application generally at the same time as the identification of the shipping container and the identification of the locking module are communicated by a wireless handheld data communication device to the server application; the identification of the shipping container and the identification of the locking module may be communicated by a wireless handheld data communication device to the server application, and wherein the server application may communicate with the RSN identified by the wireless handheld data communication device, whereupon the RSN communicates the identification of the bolt to the server application; the identification of the locking module may be acquired by the wireless handheld data communication device by reading a bar code displayed on the RSN; and the locking module may be activated upon the locking insertion of the bolt within the bolt and the identification of the RSN is communicated by the RSN upon insertion of the bolt and reading of a bar code displayed on the locking module.

Another aspect of the present invention relates to a system that includes a gateway corresponding to a location identification; and a wireless communications device. The gateway is configured to broadcast a beacon signal, including the location identification, upon expiration of a beacon timer of the gateway, and upon broadcasting the beacon signal, reset the beacon timer of the gateway based on a pre-selected maximum value. The wireless communications device is configured to, in response to receipt of the beacon signal, attempt to register with the gateway, when registered with the gateway, utilize a beacon timer of the wireless communications device to control broadcasting of beacon signals, in response to receipt of another beacon signal which includes the location identification, reset the beacon timer of the wireless communications device based upon a randomly selected value, upon expiration of the beacon timer of the wireless communications device, broadcast a device beacon signal, which device beacon signal includes the location identification, and upon broadcasting the device beacon signal, reset the beacon timer of the wireless communications device based on the pre-selected maximum value. The wireless communications device is further configured to, when registered with the gateway, forward messages received from other wireless communications devices registered with the gateway to the gateway, and append an identification of the wireless communication device to the message; communicate a check-in message to the gateway, upon expiration of a check-in timer of the wireless communications device, upon communicating the check-in message, reset the check-in timer of the wireless communications device. The gateway is further configured to, in response to receipt of a message originated by one of the other wireless communications devices that was forwarded by the wireless communications device, communicate an acknowledgment message to the wireless communications device. The wireless communications device is still further configured to, in response to receiving the acknowledgment message, reset the check-in timer of the wireless communications device, and forward the acknowledgment message to the originating one of the other wireless communications devices.

Additional features of the foregoing principal aspects also are set forth elsewhere herein.

The present invention according to another aspect is a shipping container security system in which a shipping container is armed as disclosed herein.

The present invention according to another aspect is a shipping container tracking system in which a shipping container is armed as disclosed herein.

The present invention according to another aspect is a shipping container monitoring system in which a shipping container is armed as disclosed herein.

The present invention according to another aspect is a method for disarming a shipping container security system as disclosed herein.

The present invention according to another aspect is a method for tracking a shipping container as disclosed herein.

The present invention according to another aspect is a method for monitoring a shipping container as disclosed herein.

The present invention according to another aspect is a system for disarming a shipping container security system as disclosed herein.

The present invention according to another aspect is a system for tracking a shipping container as disclosed herein.

The present invention according to another aspect is a system for monitoring a shipping container as disclosed herein.

The present invention according to another aspect is a system in accordance with any of the foregoing claimed systems, wherein coverage islands are utilized in the system as disclosed herein. Moreover, in this regard, an "island" is considered to be the location defined by a gateway, as fully described below.

The present invention according to another aspect is a method in accordance with any of the foregoing claimed methods, wherein coverage islands are utilized in the method as disclosed herein.

The present invention according to another aspect is a method in accordance with any of the foregoing claimed methods, wherein unsecured PDAs and secured PDAs (SSHRs) are both utilized in the method as disclosed herein.

The present invention according to another aspect is a system in accordance with any of the foregoing claimed systems, wherein unsecured PDAs and secured PDAs (SSHRs) are both utilized in the system as disclosed herein.

The present invention according to another aspect is a method in accordance with any of the foregoing claimed methods, wherein operational parameter sets are utilized by RSNs in the method as disclosed herein.

The present invention according to another aspect is a system in accordance with any of the foregoing claimed systems, wherein operational parameter sets are utilized by RSNs in the system as disclosed herein.

The present invention according to another aspect is software utilized in any of the foregoing claimed systems as disclosed herein.

The present invention according to another aspect is software utilized in any of the foregoing claimed methods as disclosed herein.

It should be understood that it is explicitly contemplated that preferred embodiments of systems, networks, and apparatus of the present invention may employ and utilize—and do employ and utilize—each and any of the inventive aspects and features of the incorporated patent references including, by way of example, and not limitation: the inventive aspects and features of incorporated U.S. patent application publication titled "Class Switched Networks for Tracking Articles"; the inventive aspects and features of incorporated U.S. patent application publication titled "Systems and Methods Having LPRF Device Wake Up Using Wireless Tag"; the inventive aspects and features of incorporated U.S. patent application publication titled "Forming Communication Cluster of Wireless Ad Hoc Network Based on Common Designation"; the inventive aspects and features of incorporated U.S. patent application publication titled "Forming Ad Hoc RSI Networks Among Transceivers Sharing Common Designation"; the inventive aspects and features of incorporated U.S. patent application publication titled "Communications Within Population of Wireless Transceivers Based On Common Designation"; the inventive aspects and features of incorporated U.S. patent application publication titled "Transmitting Sensor-Acquired Data Using Step-Power Filtering"; the inventive aspects and features of incorporated U.S. patent application publication titled "Network Formation in Asset-Tracking System Based on Asset Class"; the inventive aspects and features of incorporated U.S. patent application publication titled "LPRF Device Wake Up Using Wireless Tag"; the inventive aspects and features of incorporated U.S. patent application publication titled "Propagating Ad Hoc Wireless Networks Based on Common Designation and Routine"; the inventive aspects and features of incorporated U.S. patent application publication titled "Remote Sensor Interface (RSI) Stepped Wake-Up Sequence"; the inventive aspects and features of incorporated U.S. patent application publication titled "All Weather Housing Assembly for Electronic Components"; the inventive aspects and features of incorporated U.S. patent application publication titled "Operating GPS Receivers in GPS-Adverse Environment"; the inventive aspects and features of incorporated U.S. patent application publication titled "Remote Sensor Interface (RSI) Having Power Conservative Transceiver for Transmitting and Receiving Wakeup Signals"; the inventive aspects and features of incorporated U.S. patent application publication titled "Event-Driven Mobile HAZMAT Monitoring"; the inventive aspects and features of incorporated U.S. patent application publication titled "Communicating via Nondeterministic and Deterministic Network Routing"; the inventive aspects and features of incorporated U.S. patent application publication titled "Maintaining Information Facilitating Deterministic Network Routing"; the inventive aspects and features of incorporated U.S. patent application publication titled "Determining Relative Elevation Using GPS and Ranging"; the inventive aspects and features of incorporated U.S. patent application publication titled "Using GPS and Ranging to Determine Relative Elevation of an Asset"; the inventive aspects and features of incorporated U.S. patent application publication titled "Determining Presence of Radio Frequency Communication Device"; the inventive aspects and features of incorporated U.S. patent application publications titled "Communications and Systems Utilizing Common Designation Networking"; and the inventive aspects and features of incorporated U.S. patent application publications titled "Bolt-Type Seal Lock".

In addition to the aforementioned aspects and features of the present invention, it should be noted that the present invention further encompasses the various possible combinations, subcombinations, and permutations of such aspects and features.

BRIEF DESCRIPTION OF THE DRAWINGS

One or more preferred embodiments of the present invention now will be described in detail with reference to the accompanying drawings wherein:

FIG. 6 and FIG. 7 each illustrate a screenshot of the Solution's Seal Management Application or "SMA" of the Solution.

FIG. 13 and FIG. 14 illustrate the RSN housing component of the CSD of FIGS. 11 and 12.

FIG. 20 illustrates an exemplary arming and association screen of the PADD software.

FIG. 21 illustrates an exemplary input popup screen of the PADD software for entering a unique number of a seal and, specifically, a unique ID of the RSN of the Seal, which may be manually entered but preferably is scanned from a barcode displayed on the Seal.

FIG. 22 illustrates an exemplary error popup screen of the PADD software that is displayed upon entry of an invalid Seal number.

FIG. 23 illustrates an exemplary popup screen of the PADD software that is displayed for prompting a user to confirm that the container is ready for transit after the Seal has been armed.

FIG. 24 illustrates a main arming screen of the PADD software that has been updated to show the information associated during the arming process.

FIG. 25 illustrates an exemplary disarming screen of the PADD software that is displayed.

FIG. 26 illustrates an exemplary popup screen of the PADD software that prompts the user to cut the bolt and push the bolt stub out of the seal.

FIG. 27 illustrates an exemplary popup screen of the PADD software that again prompts the user to cut the bolt and push the bolt stub out of the seal, FIG. 28 illustrates a Table setting forth various scenarios that may occur in arming and disarming a Seal.

FIG. 29 illustrates an exemplary lookup screen of the PADD software that is displayed.

FIG. 30 illustrates an exemplary seal data screen of the PADD software that is displayed.

FIG. 31 illustrates an alarm popup that may be displayed upon an attempt to disarm a seal when an alarm flag has been set.

FIG. 32 illustrates an exemplary "About" page displaying information about the PADD software.

FIG. 34 illustrates an exemplary popup screen of the SMA that enables the user to add information about a shipment.

FIG. 35 illustrates an exemplary a location details popup screen of the SMA.

FIG. 36 illustrates an exemplary location history screen of the SMA.

FIG. 37 illustrates an exemplary alarm details page of the SMA.

FIG. 38 illustrates an exemplary arm/disarm history page of the SMA.

FIG. 39 illustrates an exemplary search screen of the SMA.

FIG. 44 is a perspective view of an RSN.

FIG. 45 is a perspective view of a Gateway with the RSN of FIG. 44 for comparative size reference.

FIG. 47 is a schematic diagram illustrating common designation networking.

FIG. 56 is a schematic diagram illustrating the logical data flow between the CSD, a Reader, and the DCP.

FIG. 57 is a flowchart illustrating the steps of the process of FIG. 56.

FIG. 58 is a schematic diagram illustrating the logical data flow between a CSD, a DCP and an application server in a logistics-management system in which deep water notification is provided.

FIG. 59 is a flowchart illustrating the steps of the process of FIG. 58.

FIG. 66 illustrates point to multi-point networking where connectivity is determined by proximity in a conventional ad hoc network.

FIG. 80 illustrates that a Class ID is represented by a 32 bit (4 byte) field which is partitioned into three sub-fields: an owner sub-field, an entity sub-field, and an asset type sub-field.

FIG. 88 shows a table that represents a summary comparison of the major seal categories and what each offers, wherein features and benefits of the Solution are compared with those offered by GPS-based and RFID-based technologies.

FIG. 89 shows a table illustrating additional technology comparisons regarding the Solution.

FIG. 90 illustrates the shared infrastructure that is enabled in accordance with the Solution, wherein data is segregated and secure.

FIG. 91 illustrates visibility at a remote monitoring location that is provided throughout the transit process by the islands of coverage that are linked by the WAN, from origin to destination, in accordance with the Solution.

DETAILED DESCRIPTION

Figure 1:
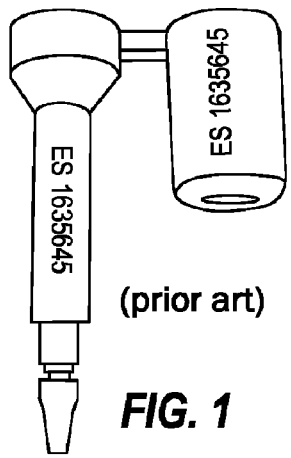
FIG. 1 is a perspective view of a prior art mechanical seal.
Figure 2:
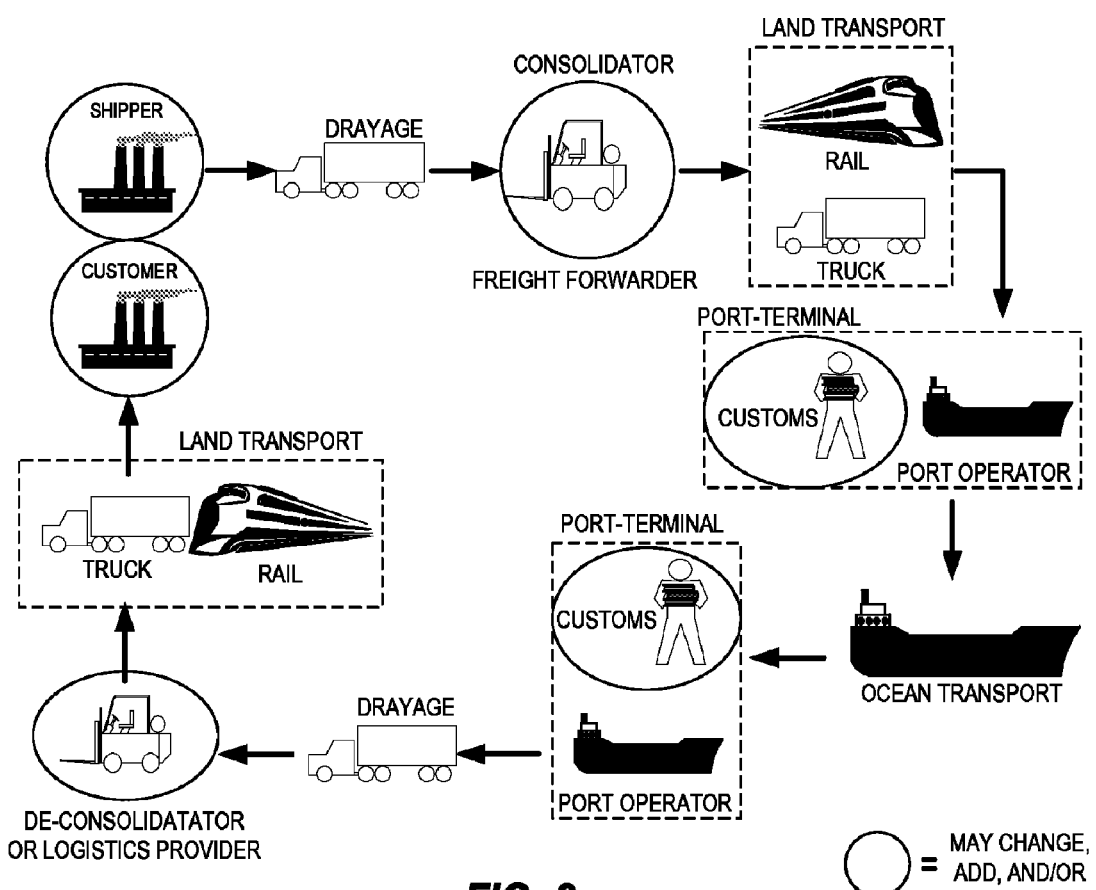
FIG. 2 illustrates steps or stages through which a shipping container passes in traveling from an origin to a destination, together with the entities involved.

As a preliminary matter, it will readily be understood by one having ordinary skill in the relevant art ("Ordinary Artisan") that the present invention has broad utility and application. Furthermore, any embodiment discussed and identified as being "preferred" is intended to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

Brief Overview Of Elements, Architecture And Operation Of The Solution

Use of the Solution is believed to require few if any changes in normal container operations and management along the entire end-to-end shipping path. The electronic seals of the Solution ("Seals") are attached to shipping containers and each includes a mechanism configured to receive in secure engagement therewith a bolt for locking of a shipping container and, in combination, a remote sensor node or "RSN"—which sometimes is referred to as a remote sensor interface or "RSI". The RSN generally is a wireless device—preferably about the size of a deck of cards—that is attached to or carried by assets in which monitoring or tracking interests are taken. The RSN includes radiofrequency (RF) components and either sensor components or sensor interface components, or both. RSNs also preferably include an internal power source such as batteries, and RSNs may be incorporated into other devices as components thereof, like in Seals of the Solution. RSNs collect data about the assets and forward the data to gateways, which then forward the data to database and/or application servers over other, external networks. With the data, users know the condition and location of the assets and make decisions accordingly.

In accordance with the Solution, each Seal detects, stores and reports: descriptive information about the shipping container; the opening and closing of the door; movement and disturbance; shock; deviations from sensors, e.g., temperature and gas sensors. Moreover, Seals communicate only when an event meets a predetermined threshold so as to warrant an alarm; otherwise, the an event data record is created and merely stored for later communication via a gateway.

Each Seal furthermore preferably is able to change profiles/operating parameters based on either a command that is received or based on predetermined conditions detected per sensor input(s). Each profile comprises a set of operating conditions including the predetermined thresholds for sending alarms. The thresholds may be day and time dependent as well as location dependent. Moreover, Seals preferably are configured to download and implement new or updated profiles from configurators via gateways. The gateways or "GWs"—which term generally refers to gateway routers ("GRs"), gateway servers ("GSs"), or gateways controllers ("GCs")—are installed at various monitoring points between origin and destination.

As used herein, reference to a "gateway" generally means a wireless electronic device that communicates with RSNs of the Seals for collecting and forwarding data collected by RSNs to database and/or application servers over other networks. Gateways are about the size of a pizza box, and preferably are mounted, for example, to or on vehicles, buildings, poles, ships, aircraft, bridges, and trains for gathering status and data from Seals as the Seals and associated containers travel from origin to destination. The precise location of gateways can be known when gateways include optional internal GPS capability. Moreover, gateways may be powered from external sources or may include an internal power source, or both.

Persons along the path between origin and destination are provided with handheld portable arm/disarm devices ("PADDs") for arming and disarming the Seals of the shipping containers, as necessary.

Computer systems—including servers with system-management and logistics-management software—implement the Solution in the background, monitoring the Seals and supplying information to existing logistics-management and security systems, including status and alarm information. Alarms are raised only when conditions warrant, per user-defined configurations. The only noticeable added activity is the management of the Seals between shipments when the Seals are to be reused by the parties. Configurators are used to setup and maintain the systems as well as customize various features of the systems.

Figure 3:
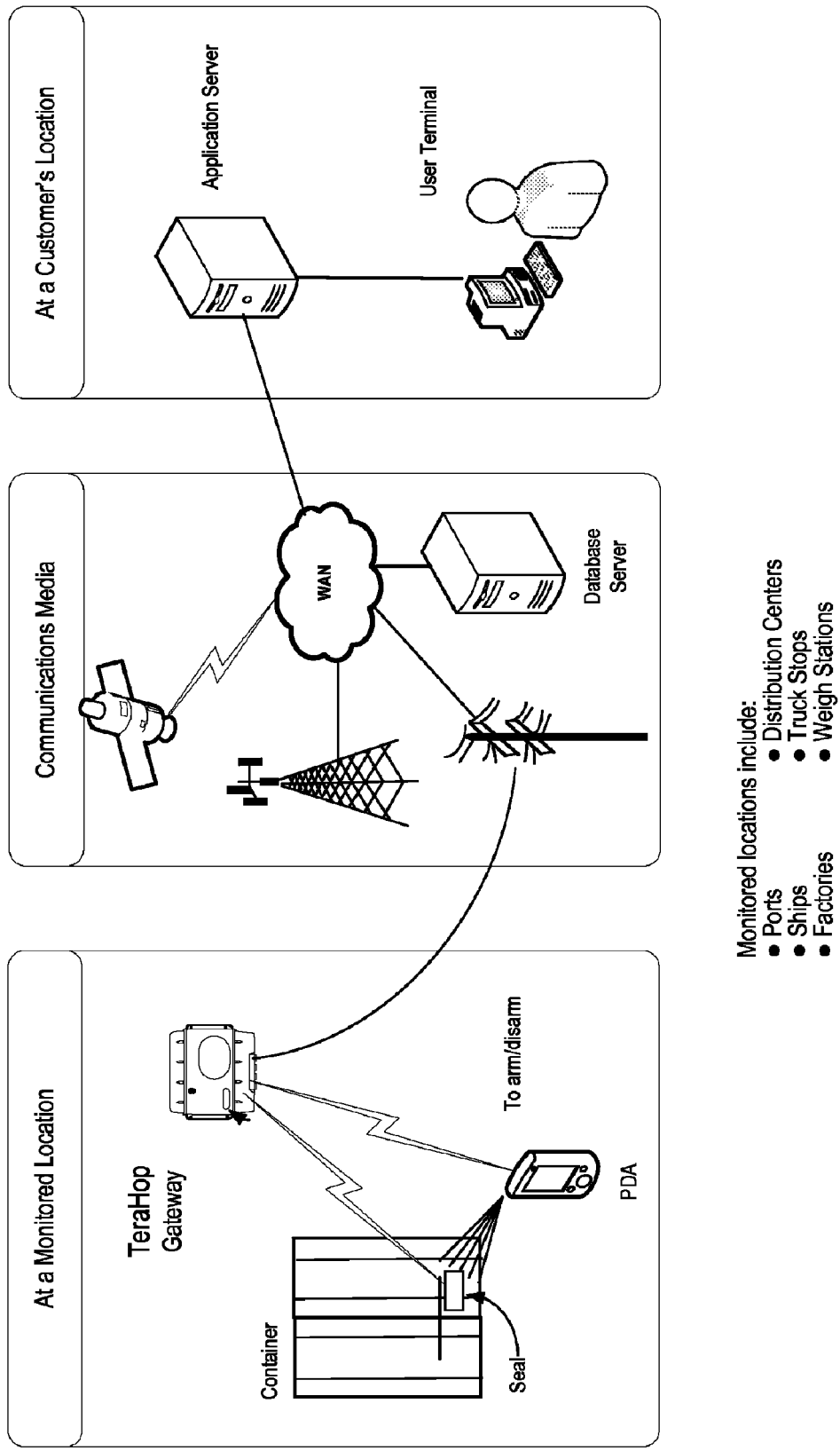
FIG. 3 generally illustrates the overall system of the Solution.
Figure 4:
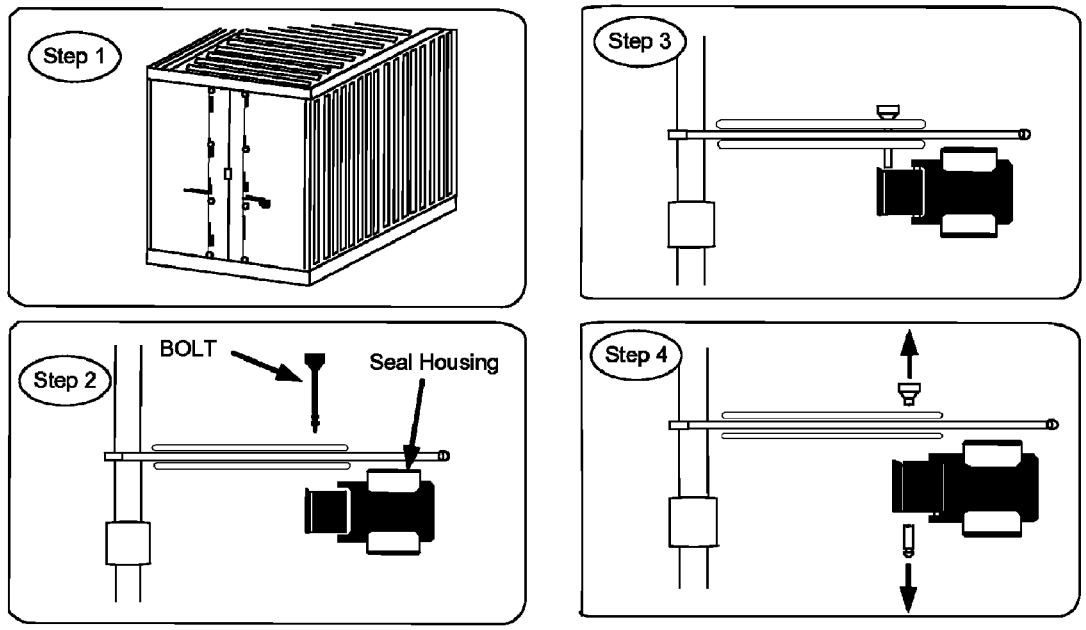
FIG. 4 illustrates the process for arming a seal in "Step 1", "Step 2" and "Step 3" as well for removing a seal after it has been disarmed in "Step 4".
Figure 5:
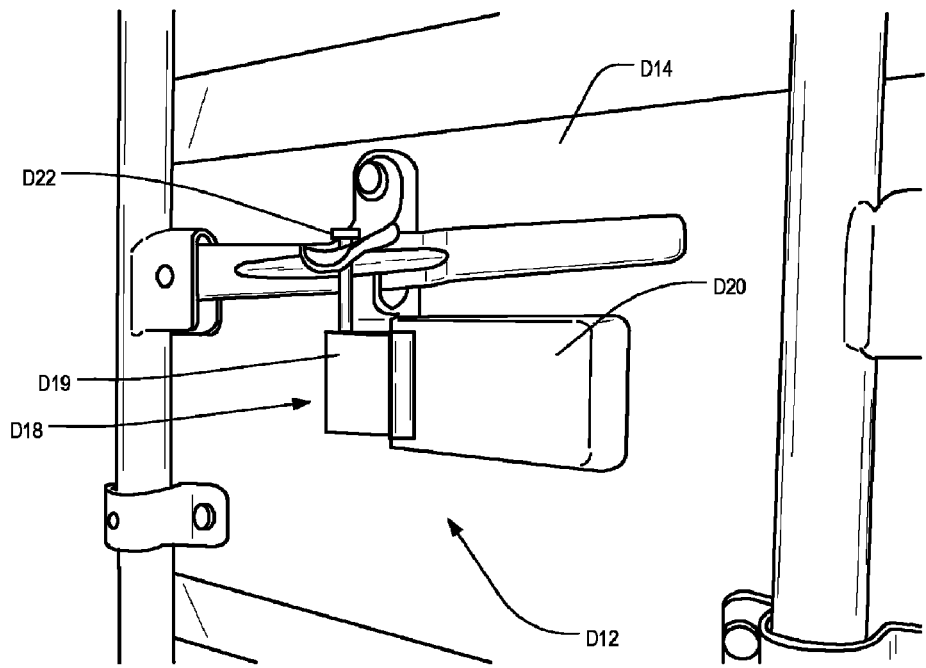
FIG. 5 is a perspective view of a shipping container secured by a Seal that has been armed.

FIG. 3 generally illustrates the overall system of the Solution. In basic operation of the Solution, the Seals are attached to shipping containers in much the same way as conventional mechanical seals. Specifically, an ISO-17712 compliant bolt is inserted through the locking-handle hasp and is received and secured in locking engagement within the Seal. This process is represented by "Step 1", "Step 2" and "Step 3" in FIG. 4. A perspective view of a shipping container secured by an armed Seal is shown in FIG. 5. FIG. 4 further illustrates removal of the bolt after disarming the Seal by cutting the bolt and removing the head of the bolt from the top of the Seal housing and the remainder of the bolt from the bottom of the Seal housing. (Moreover, after removal of the bolt, the Seal is ready for accepting the next bolt.)

Upon secured engagement by the Seal, the Seal preferably automatically activates and communicates its activation and the fact that the shipping container has been sealed, via a gateway, to the central database server. If a gateway is not present at the time, then the Seal communicates its activation and sealing of the shipping container to the central database server at a later time when communications with a gateway (either direct or via hopping) are available.

During the container closing process, a PADD is used by the person closing and sealing the container (i.e., arming the shipping container). This process associates the Seal—and specifically, the unique ID of the RSN of the Seal—with both a unique identification of the shipping container and a unique identification of the contents of the shipping container comprising the shipment number—including any identification of reference documents pertaining to the contents of the shipping container. This information is communicated from the PADD, via a gateway, to a central database server and accessed and used by the application server at a customer's location. In conjunction therewith, the Seal communicates the unique ID of the RSN and the serial number read from the bolt (if an e-bolt), via a gateway, to the central database server and accessed and used by the application server at customer's location. The unique ID of the RSN is used to match the bolt serial number with the unique identification of the shipping container and a unique identification of the contents of the shipping container comprising the shipment number, as communicated by the PADD. A PADD also is used to disarm the Seal for opening of the shipping container, either when the shipping container arrives at the destination, or when the shipping container arrives at a consolidation or deconsolidation center or requires actual inspection of the contents, such as by customs. As will be appreciated, a particular Seal, a particular bolt, a particular container, and a particular shipment number are uniquely associated together when the seal is armed during each transit. Moreover, if the Seal is broken, such as during consolidation or inspection, a new bolt is used to reseal the shipping container by repeating this process of arming the Seal using a PADD. In this respect, a plurality of bolts may be used in series and associated with a particular transit of the Seal and associated shipping container.

It will also be appreciated that, as shipping containers with their respective Seals travel from origin to destination, they encounter gateways along the way at monitored locations. Such monitored locations may include, for example, ports, ships, factories, distribution centers, consolidation and deconsolidation centers, truck stops, weigh stations, border crossings, transient parking, and major highway structures like bridges, tollbooths, and tunnels. As the Seals encounter gateways, the Seals communicate with the gateways, automatically exchanging data as to the Seal identity and status, including any events that may have been monitored and recorded by the Seal for communication to the central database server. The data then can be accessed by appropriate users and customers, affording them near-real-time, end-to-end visibility using the seal management application from an office workstation or a logged-in laptop, for example.

Importantly, in day-to-day use the Solution operates in a "seal-and-forget" modem, in that the Seals behave autonomously. Data and messages are automatically routed to/from each of the Seals, and current data is automatically displayed and updated to a customer's office computer via application software of the Solution. For example, illustrative screen-shots of the Solution's Seal Management Application or "SMA" are shown in FIG. 6 and FIG. 7. In FIG. 6, the status of Seals pertaining to shipments for which the customer is responsible (here, the customer is identified as "Fenwick Logistics, Ltd.") are conveniently shown. Because this information is near-real time, this information can be extremely valuable to the customer. FIG. 7 represents an example of the customer drilling down on data regarding a particular one of the Seals/shipments. Specifically, the user has selected one of the Seals listed in the screen shot of FIG. 6 (i.e., the Seal having unique ID 005826562TH).

The data also is automatically updated, as locations and status change, in near-real time or on demand by query of the user (e.g., by selecting the "Refresh Data" button shown in FIG. 6). The SMA further provides access to historical data of Seals and their corresponding shipments. Preferably, the SMA is used at an office workstation or is accessed from anywhere using a laptop with Internet connectivity.

Thus, in accordance with the Solution, automatic notification is provided by the Seal if something is amiss; current and historical seal and shipment data are available at a mouse-click; alarm status and alerts are provided when conditions meet predetermined criteria; all events are date and time stamped, including when events were reported and by which location, i.e., by which gateway.

Figure 8:
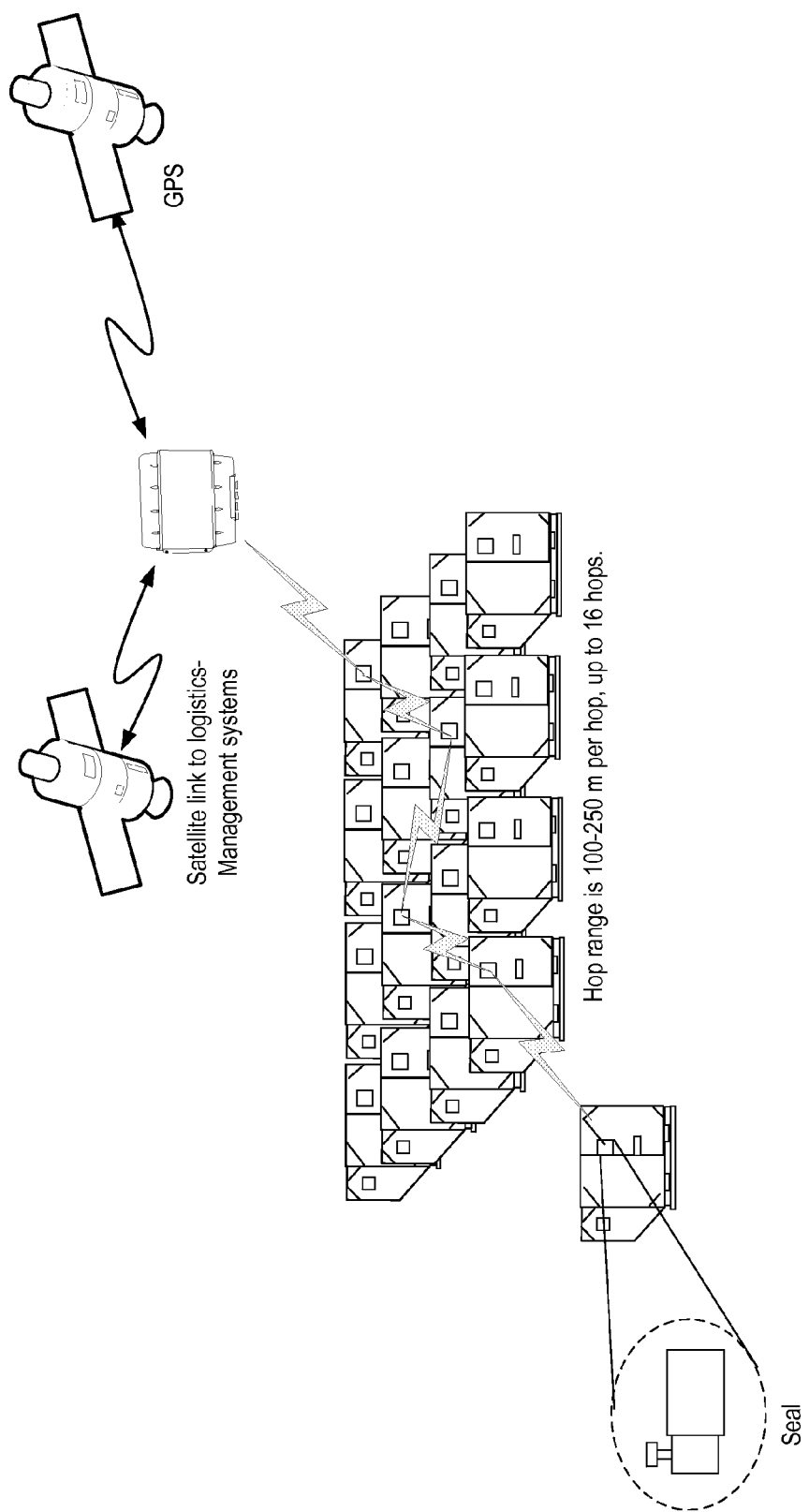
FIG. 8 illustrates deep penetration into container stacks that is achieved in accordance with the Solution, as well as the ability to communicate with a gateway by Satellite and the capability of a gateway to determine its position using GPS technology.

Furthermore, the Solution obviates the current problems of choke-points and special travel lanes; deep penetration into container stacks, whether in yards or aboard ships, is provided (as illustrated, for example, in FIG. 8); necessary infrastructure is minimized, as the infrastructure may be shared among system users while keeping data segregated and private; arming of shipping containers is accommodated when the shipping containers are away from monitored locations; and after a Seal is armed, human involvement is required only to disarm the Seal, barring any exception event requiring human investigation (e.g., receipt of an alarm).

It also is believed that the sealing operation adds less than 90 seconds to the time required by current processes and that the added cost per container-transit for implementing the Solution is less than $40.

A detailed, walk-through illustration of the basic operation of the Solution is set forth in greater detail below with regard to a shipment of flutes from China.

The elements of the Solution are now further addressed in turn below.

Elements of the Solution: The Seals

Each Seal includes a housing comprising two parts that are hinged together and that articulate relative to one another. A first one of the parts includes a mechanism for receiving and securing a bolt therein, and the other part includes the RSN therein.

The Seal accommodates two types of bolts, both of which are high-strength security bolts that preferably bear an externally-marked, unique serial number. This serial number preferably is marked or stamped on the bolt's shank or on a sleeve that may be disposed over the shank. The first type of bolt further includes a matching, embedded electronic component having the same serial-number stored therein, which serial number is readable by electronic components in the housing when the bolt is inserted and secured therein. Such bolts of the Solution are sometimes referred to as "e-bolts". The other type of bolt does not include a matching, embedded electronic component having the same serial-number stored therein; however, the insertion of this bolt into the housing in secured engagement therein nevertheless is detected by electronic components in the housing, whereby sealing of the container is determined.

Figure 9:
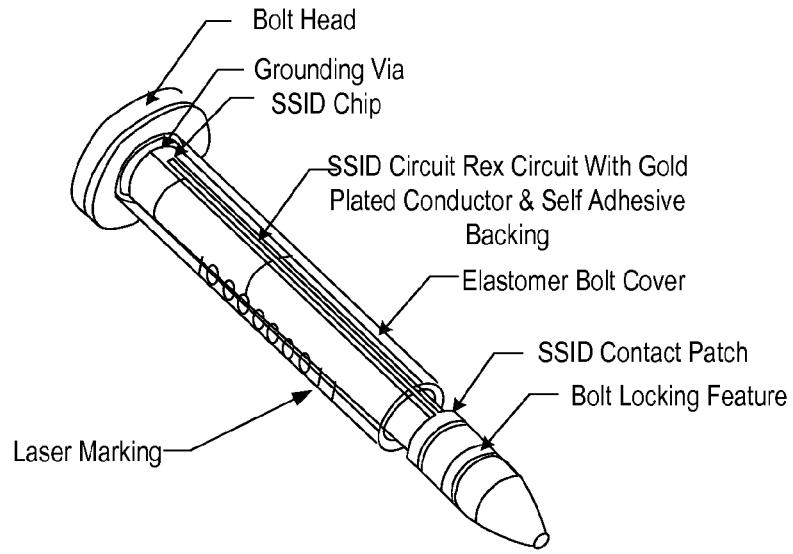
FIG. 9 and FIG. 10 illustrate detailed views of a preferred e-bolt and a fragmented view of the Seal for use therewith, in accordance with the Solution.
Figure 10:
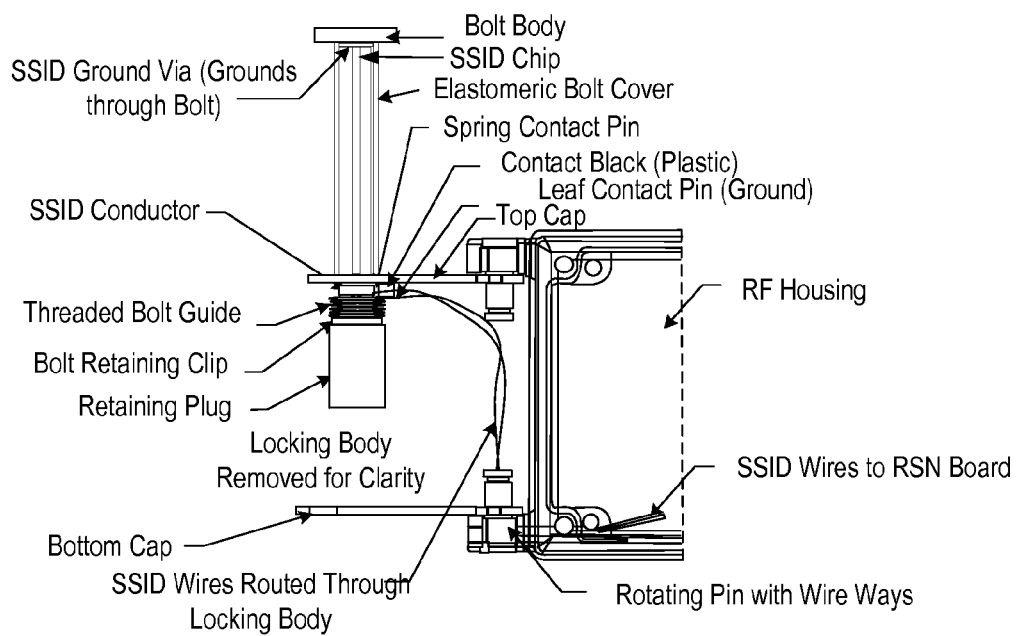

Detailed views of the preferred e-bolt and a fragmented view of the Seal for use therewith collectively are shown in FIG. 9 and FIG. 10.

Thus, using either type of bolt, the electronic components facilitate automatic detection of the insertion of the bolt into the bolt-receiving opening in the housing orifice. This detection furthermore causes the Seal to activate, if not already activated. Furthermore, if an e-bolt is used, then the detection of the insertion preferably comprises the reading of the serial number from the e-bolt.

Moreover, as a bolt is inserted into the Seal and locks in engagement therewith, the Seal reads the bolt's serial number and associates each new serial number with the Seal and the container. The Seal also records the date/time that each bolt is inserted and, if at a monitored location, immediately transmits all of the new bolt information to a gateway, and on to the appropriate logistics-management systems of those who have an interest/involvement in a given shipment, as further described in detail below.

Both types of bolts preferably are very similar in dimensions and configuration to bolts currently in use. Both types of bolts and the bolt-receiving portion of the housing are configured to meet ISO-17712 standards, and the bolt dimensions and configuration preferably mirror a bolt model offered by E. J. Brooks, which bolt dimensions and configuration are considered to be a de facto industry standard subject to widespread use and adoption.

The materials and configuration should be sufficient to meet mechanical and environmental requirements while not impairing RF communications.

The overall dimensions of the Seal should not exceed 6"×4"×1½". The entire integrated package of the Seal is about the size of a paperback book.

Rare-earth magnets are located on the back surface of the RSN housing portion of the Seal and serve to mount the RSN housing portion to the right hand door of an ISO-standard cargo container immediately below the locking handle and in general alignment with the locking hasp.

The articulation between the two parts of the housing enabled by the hinge permits accommodation of variation in locking hasp configuration. In particular, the articulation preferably accommodates up to one-half of an inch misalignment between the bolt-receiving hole of the housing and the container door-handle hasp, with the bolt-receiving hole of the housing still able to receive a bolt through the hasp, when the Seal is magnetically mounted to the container door.

It is believed that, due to the use of rare Earth magnets and the number of magnets, the Seal is held to the door with sufficient force that the full range of non-damaging container movement and handling has less that about 1% probability dislodging the Seal from the door.

Furthermore, because of the magnetic attachment, a Seal attached to a container that is taken out of service can readily be removed from that container and reused on another container. The process requires no screws or user-applied adhesive. It is believed that this process requires, at most, an ordinary screwdriver, to be used as a lever, for removing the Seal from the door without damage to either the Seal or the door.

For additional details regarding the structure of the Seal, reference is hereby made to FIGS. 8-17 and the accompanying text of incorporated patent reference US Patent Application Publication 2008-0315596 A1 which includes a similar structure.

Optionally, the RSN portion of the Seal housing includes a set of appropriately sized holes for securely holding unused bolts, sometimes referred to as a "quiver". The quiver preferably includes a minimum capacity of three bolts, aligned vertically, side-by-side, inserted from the top along the rear face of the RSN portion of the Seal housing.

Exemplary RSN of the Seal

An exemplary RSN in accordance with one or more preferred embodiments will now be described. It will be appreciated that although described as including various elements and functionality, in alternative embodiments and implementations, an RSN might reasonably be practiced in the absence of one or more of these elements, or in the absence of some or all of this functionality.

Exemplary RSN: General Overview

To begin, the RSN includes an onboard controller, i.e. a processor, that manages radios, messaging, memory, state-changes, power consumption, and IO functionality of the RSN, and controls all other RSN functionality.

The RSN further includes non-volatile memory, i.e. computer-readable storage, sufficient to store data and instructions needed for the functionality described herein. This memory is sufficiently large as to allow for at least 64 KB of user/asset data. User/asset data stored in one or more user/asset data fields is configurable using one or more configuration tools as described in more detail elsewhere herein. Further, user/asset data is capable of being rendered unreadable, e.g. erased or over-written, in response to a configuration tool or user application command.

The RSN includes a pre-loaded, i.e. factory loaded, basic load of software and firmware minimally required for basic RSN functionality and post-factory customization to applications. Preferably, the RSN is implemented utilizing Mini-PEOS. This factory-new state is preferably utilized as a reference point and supports verification test suites. The RSN is configured to be reset to this factory-new state, and its factory defaults as discussed in more detail hereinbelow, upon receipt of a wireless command from the managing entity, or in response to a command from a configuration tool. Preferably, such reset is not possible by command from a user application.

The RSN is configured to allow updating and upgrading of both its onboard software and its onboard firmware. This can be accomplished either via a wireless link or by a physical connection to a suitable configuration device. Notably, any messages queued at the RSN must be transferred to a gateway router or gateway controller, or storage device, and such transfer acknowledged, prior to processing of an update or upgrade. Preferably, however, neither updates nor upgrades disrupt or erase any stored data.

An indicator of the version of any and all RSN software, firmware, and hardware is readable via a radio network the RSN is a part of, such as, for example, in response to a gateway router or gateway controller inquiry, in response to a configuration tool inquiry, or via an appropriate user application.

The RSN includes a unique ID (UID) encoded into firmware at the manufacturer. UIDs are unique, i.e. are not duplicated, in that no two RSNs have the same UID. The numbering system used for the UID accommodates at least ten billion (i.e. 10^9, or 10,000,000,000) unique IDs.

The RSN includes data fields for common user attributes that have a fixed configuration, but which are field-populated using a configuration tool or an appropriate user application. The common user attribute fields preferably include: an owner/company name field, which preferably includes one line of fifteen characters; a location field, which preferably includes three lines of fifteen characters each; an assigned-to field, which preferably includes an indication of an asset or function the RSN is assigned to and preferably includes two lines of fifteen characters each; and another data field, which preferably includes four lines of fifteen characters each. Notably, the common user attribute fields do not use user/asset data storage. Common user attributes are readable via a radio network the RSN is a part of, such as, for example, in response to a gateway router or gateway controller inquiry, in response to a configuration tool inquiry, or via an appropriate user application with appropriate authentication.

Exemplary RSN: Internal Radio Components

The RSN also includes a reduced complexity radio (RCR), i.e. a wake-up transceiver, together with one or more appropriate internal antennas. The RCR is normally in a dormant state in which it is ready to receive an incoming transmission, but is not ready to transmit. When in the dormant state, the RCR awaits an event input or an appropriate wake-up message. The RCR generally functions in accordance with RCR technology as described both hereinabove, and in several of the references incorporated herein.

The RSN is further configured in accordance with class-based networking as described in many of the incorporated references, as well as elsewhere herein, such that an appropriate wake-up message is preferably an in-band wake-up message associated with a class that the RSN belongs to. The RCR is configured to communicate using messages having a total message length sufficient to provide class functionality, reliability, a payload, authentication, routing functionality, error correction, and other data or instructions as needed to ensure that the RSN communicates with only in-class networks and in a manner appropriate to those networks and attendant applications, which may be user applications or otherwise.

Notably, the RSN is not limited to membership in a single class. The RSN is configured for assignment of multiple, concurrently active classes, and thus, for example, may be configured to respond to wake-up messages of two or more different classes. Preferably, the RSN is capable of maintaining up to 16 concurrently active class memberships.

The RSN includes a Bluetooth radio, i.e. a complex transceiver, configured in accordance with IEEE 802.15, together with one or more appropriate internal antennas. The Bluetooth radio is normally in an off state until turned on by a command from the onboard controller, e.g. a command triggered by an event.

Preferably, both the RCR and Bluetooth radio, using their internal antennas, have a range, for communications with the RCR or Bluetooth radio of another RSN, or of a gateway router or gateway controller, of at least three hundred feet in the most challenging RF environment contemplated for the target applications. Similarly, both the RCR and Bluetooth radio preferably enjoy an open-space, line-of-sight range of at least eight hundred feet.

The RSN is configured to receive commands from a gateway router or gateway controller that sets frequencies on which the radios, i.e. the RCR and Bluetooth radio, operate. It will be appreciated that a gateway router or gateway controller can thus be configured to command the RSN to utilize particular frequencies based on regulatory requirements of the country in which the gateway router or gateway controller is located.

Similarly, the radios, i.e. the RCR and Bluetooth radio, are configured to transmit at a maximum power that does not exceed the lowest power level of any applicable country/jurisdiction in which the RSN is intended to be used.

Each radio, i.e. the RCR and Bluetooth radios, preferably exhibit a generally omni-directional radiation pattern. Radiation patterns are preferably optimized in anticipation that the RSN is likely to be in close proximity or contact with metal objects and/or masses with high water content.

It will be appreciated from the description herein that the RSN can "hop" messages through other RSNs to reach a gateway router or gateway controller. The RSN includes hopping algorithms and rules such that up to 16 hops can be made, using appropriate Classes, in the appropriate order, e.g. fifteen RSN to RSN hops, and then one RSN to gateway router or gateway controller hop. The RSN is configured to learn and store hop-path information that helps minimize network latency and battery consumption. As described hereinbelow, the RSN is configurable via profile parameters to enable or disable hopping, such as, for example, when the battery is low.

It will further be appreciated that the RSN may be in range of more than one gateway router or gateway controller. Preferably, the RSN includes preferential registration functionality which allows one or more gateway routers or gateway controllers to be indicated as preferred, and ranked in order of preference.

Exemplary RSN: Motion/Vibration Sensor

The RSN includes a motion/vibration sensor, i.e. sensing capability, that can sense, differentiate, and report the commencement of motion or the absence of motion (no/motion). Preferably, motion is characterized as the commencement of vibration or acceleration that is associated with movement or with physical disturbance.

The sensitivity of the motion/vibration sensor is configurable and selectable using either an appropriate configuration tool or an appropriate user application. The motion/vibration sensor includes five sensitivity levels ranging from 1, which is the lowest sensitivity level, to 5, which is the highest sensitivity level. A user can select one of the five sensitivity levels, and additionally can set each of the five sensitivity levels, using an appropriate configuration tool or an appropriate user application.

Factory default values are provided for each sensitivity level. The factory default lowest sensitivity level is calibrated to detect the motion of an RSN in a seal (as described hereinbelow) that is attached to a shipping container being hauled on a chassis through a yard or port. The factory default highest sensitivity level is calibrated to detect the motion of an RSN due to casual walking and bending motions by an adult. The remaining factory default sensitivity levels are set linearly between the factory default lowest and highest sensitivity levels. Preferably, levels are calibrated such that motion of the RSN during the associated activity has a high probability, e.g. ninety percent of being detected, but the probability of a false positive owing to nearby activities which are not desired to be sensed is less than ten percent. Notably, it is contemplated that factory default calibration levels might be changed in response to characterization of sensor behavior. A factory default selection is made as to which sensitivity level is initially in effect.

With respect to this motion/vibration sensor, the RSN includes three motion sensing modes: a "disabled" motion sensor mode in which the motion/vibration sensor is non-functioning, an "enabled-motion" motion sensor mode in which the RSN senses and reports the commencement of motion, and an "enabled-no/motion" motion sensing mode in which the RSN senses and reports that motion has failed to occur during some period of defined length. The length of the no/motion period is selectable using a configuration tool or an appropriate user application. Preferably, the period is selectable in: one minute intervals for lengths between one minute and ten minutes; five minute intervals for lengths between ten minutes and thirty minutes; and ten minute intervals for lengths between thirty and sixty minutes.

In some implementations, the same sensitivity settings are utilized regardless of what mode the RSN is in, while in other implementations the RSN utilizes different sensitivity settings in its "enabled-motion" motion sensor mode as compared to its "enabled-no/motion" motion sensor mode.

The RSN is capable of both self-assuming a motion sensing mode, and of assuming a motion sensing mode in response to a command from a configuration tool or an appropriate user application.

More specifically, the RSN is capable of self-assuming a motion-sensing mode based on any combination of programmable conditions, such as, for example, a time of day, a day of the week, whether the RSN is captured by a gateway controller, and an identifier included a beacon message, e.g. an identifier that a gateway controller is associated with a marine port, an airport, or a ship. These conditions are configurable and programmable via both a configuration tool and an appropriate user application.

Exemplary RSN: Shock Sensor

The RSN includes an internal shock sensor and appropriate conditioning circuitry capable of detecting and reporting moderate-magnitude, i.e. damage-causing rough-handling, shocks in at least one axis. Preferably, no measurement is required. Further, preferably, a preferential axis of the shock sensor is horizontal, e.g. when the RSN is mounted on the door of an ISO shipping container, the preferential axis is perpendicular to the long axis of the shipping container.

The sensitivity of the shock sensor is configurable and selectable using either an appropriate configuration tool or an appropriate user application. The shock sensor includes five sensitivity levels ranging from 1, which is the lowest sensitivity level, to 5, which is the highest sensitivity level. A user can select one of the five sensitivity levels, and additionally can set each of the five sensitivity levels, using an appropriate configuration tool or an appropriate user application.

Factory default values are provided for each sensitivity level. The factory default lowest sensitivity level is calibrated to detect to detect the dropping of a container from 5 feet onto asphalt. Preferably, the lowest sensitivity level is set to correspond to between 10-20 Gs. The factory default highest sensitivity level is calibrated to just avoid detection of a banging container door-closures, common loading-dock bump-ups which are non-damage-causing, and rail-yard humping collisions. Preferably, the highest sensitivity level is set to correspond to at least approximately 3 Gs. The remaining factory default sensitivity levels are set linearly between the factory default lowest and highest sensitivity levels. Notably, it is contemplated that factory default calibration levels might be changed in response to characterization of sensor behavior. A factory default selection is made as to which sensitivity level is initially in effect.

With respect to the shock sensor, the RSN includes two shock sensing modes: enabled and disabled. The shock sensor can be enabled or disabled in response to a command from a configuration tool or an appropriate user application.

Exemplary RSN: Magnetic Reed Switch

The RSN includes a magnetic reed switch. The reed switch, together with associated circuitry, acts as a sensor that enables the RSN to detect and report whether a gate or door has been opened or closed, i.e. has changed from open to closed, or vice-versa. The reed switch sensing circuitry includes "debounce" circuitry to prevent false tripping due to sudden transient shocks or motion. The reed switch is located, internally, along one side of a case of the RSN and otherwise configured and arranged such that the RSN can be used directly to detect the opening or closing of, inter alia, a door, lid, or gate.

With respect to this sensing functionality, the RSN includes two magnetic reed sensing modes: enabled and disabled. This sensing functionality can be enabled or disabled in response to a command that is received.

The RSN is capable of both self-assuming a magnetic reed sensing mode, and of assuming a magnetic reed sensing mode in response to a command from a configuration tool or an appropriate user application.

More specifically, the RSN is capable of self-assuming a magnetic reed sensing mode based on any combination of programmable conditions, such as, for example, a time of day, a day of the week, whether the RSN is captured by a gateway controller, and an identifier included a beacon message, e.g. an identifier that a gateway controller is associated with a marine port, an airport, or a ship. These conditions are configurable and programmable via both a configuration tool and an appropriate user application.

Additionally, sensor data from this magnetic reed sensing functionality can be used as a trigger to awaken the RSN from a dormant state into an enabled state.

Specifically, the RSN following manufacture is in a dormant state, in which all radios are powered off and the only current drawn is that sufficient to respond to an enable signal. The enable signal is preferably a non-RF signal, such as, for example, an electrical, mechanical, or magnetic signal. In a preferred implementation, a magnetic enable signal which is sensed by the magnetic reed sensing functionality is used to awaken the RSN from the dormant state to a fully functional, enabled state. Thereafter, the RSN can be rendered back into the dormant state by an RF or electrical command, and can be repeatedly transitioned between its dormant state and its enabled state in this manner.

Exemplary RSN: Power

The RSN includes an internal battery of sufficient capacity to operate the RSN at full capability for a period of at least 2 years, assuming at least 10,000 message events per year, per the environmental profile and space/weight constraints described herein. Each message event is assumed to include a wake-up/find-path transmission, a path-found receipt, a data transmission, and an acknowledgment data receipt. This requirement is exclusive of powering external sensors. The battery has a manufacturer code and date printed on its exterior.

Notably, the battery is preferably not user replaceable, but is implemented to facilitate replacement at a factory or service-center, preferably without soldering.

The RSN is configured to monitor and report a battery level of the internal battery, both on-demand, i.e. upon a query from a configuration tool or an appropriate user application, and automatically per fixed threshold settings. There are two thresholds that trigger such automatic reporting. A low battery alert threshold corresponds to approximately thirty days of useful battery life, assuming average usage, and a critical low battery alert corresponds to approximately ten days of useful battery life, assuming average usage. When each threshold is reached, a message is sent to a user application providing an alert that a low-battery condition exists for that RSN. The reporting preferably merely indicates either a "Low Battery Alert" or a "Critical Low Battery Alert".

Additionally, battery level reporting is capable of being used to transition, either automatically or by a user via a configuration tool or user application in response to a report, the RSN into a state where it no longer facilitates hopping for other RSNs, thus conserving its battery.

The RSN is preferably configured to suspend messaging in the event of a mass event, such as, for example, an earthquake, high winds, a storm, etc., until the mass event is over so as to prevent excess battery drain and network congestion caused by events that affect large numbers of RSNs in a given area simultaneously. This functionality is preferably implemented via logic, i.e. programming, at the RSN. Alternatively, the RSN is configured to receive instructions from a gateway router or gateway controller indicating either the occurrence of such a mass event or that the RSN should suspend messaging.

Exemplary RSN: Behavioral States

The RSN is capable of being assigned to user application-level behavioral states, such as, for example, via a gateway router or gateway controller message, or user input, and these states affect how the RSN behaves, e.g. with respect to subsequent inputs. For example, if the RSN is attached to a container that is not scheduled to move, then the RSN is sent a message that changes the RSN's behavioral state such that it reports movement.

The RSN is also capable of self-assuming such states, based on known or sensed conditions, such as, for example, the commencement of motion or a lack of motion for a specified length of time, a time of day, a magnetic reed switch state change, a sensed shock, a battery level, or a change in state from captured to free or vice-versa.

Exemplary RSN: Integrated Seal Device

Figure 11:
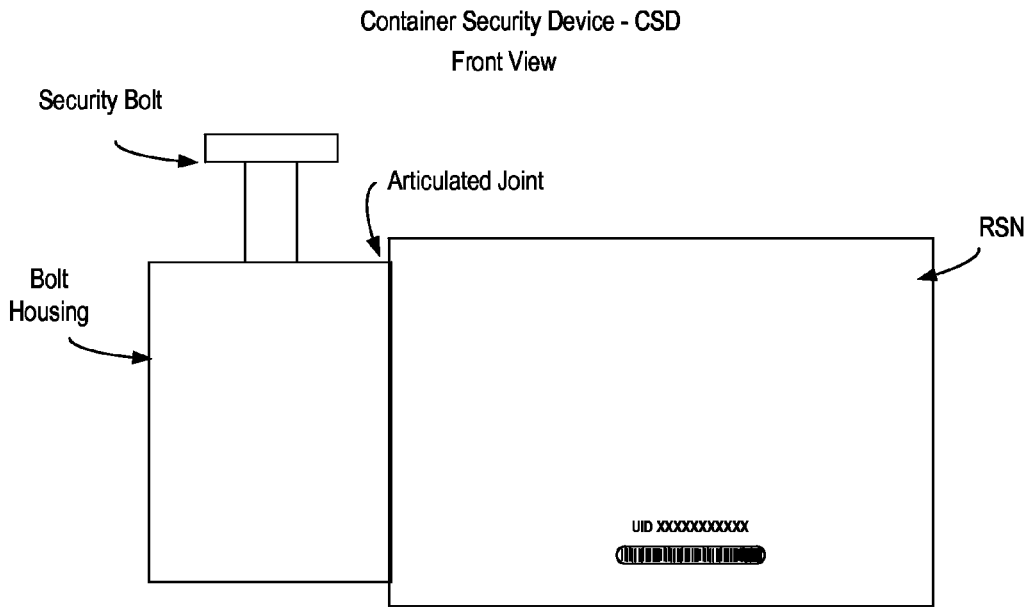
FIG. 11 and FIG. 12 each illustrates an exemplary seal for use in the CSD context.
Figure 12:
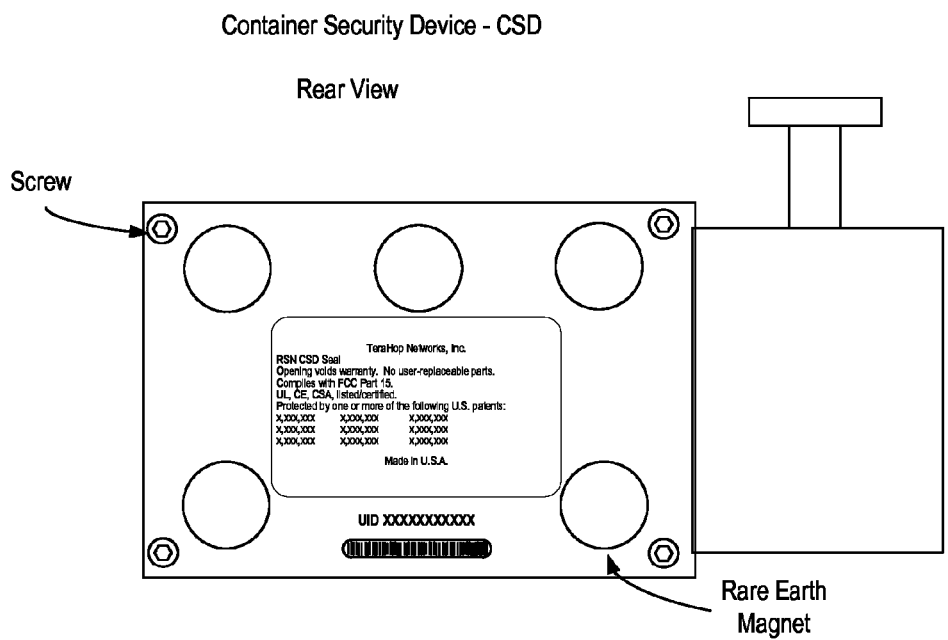

In a preferred implementation, the RSN is incorporated into an integrated wireless security-bolt-seal device, i.e. a seal, for container-monitoring applications. For example, a bolt-type seal lock module as disclosed in incorporated U.S. Patent Application Publication 2008-0315596 may be used. FIG. 11 and FIG. 12 each illustrates an exemplary seal for use in the CSD context (discussed in great detail below). More specifically, the RSN does not include its own separate housing, but instead an integrated board of the RSN is mounted as a component within a housing of the seal. The board preferably includes a version indicator printed thereon. Notably, the RSN and the seal are configured such that, in implementations in which the RSN is integrated in the seal, the RSN still performs RF wise at least as well as in implementations in which the RSN includes its own housing, as described hereinbelow.

The seal housing, in addition to the RSN, further incorporates an electronic bolt receiver, a battery, and, in at least some embodiments, special antennas. Rather than being configured simply to satisfy the requirements of the RSN, the battery is configured to satisfy the requirements of the integrated seal device. The seal housing preferably includes one or more external labels, one of which preferably includes the UID of the RSN and a barcode corresponding to the UID.

As detailed more fully elsewhere herein, the RSN is configured to read and report states, conditions, and properties of electronic bolts, i.e. e-bolts, including, for example: the insertion of such an e-bolt; an event leading to compromised functionality of such an e-bolt, such as, for example cutting; the removal of such an e-bolt; or the serial number of such an e-bolt. The RSN is also configured to detect, record, and report the insertion and subsequent removal of any metallic bolt or rod conforming to the dimensions of an ISO-17712-compliant bolt, i.e. a compliant bolt, or the insertion and subsequent removal of any metallic bolt or rod conforming to the dimensions of an e-bolt. Preferably, the RSN will not respond to the insertion of any item that is not conductive or that does not conform to the dimensions of an ISO-17712 bolt.

In at least some implementations, the seal comprises separate bolt receiver and RSN units joined mechanically by a hinge, and connected electrically by a wire running through the hinge. The RSN is configured to detect whether a bolt is in the bolt receiver, and monitor the integrity of a bolt, if the bolt has a circuit loop along its shank.

In use, a seal is preferably mounted on the exterior of a container, at the door. A bolt is run through a locking hasp and locking bar, and into the seal. The seal is held to the door by either temporary means, such as, for example, magnets, or permanent means, such as, for example, rivets or screws.

In at least some implementations, external sensors are mounted within the container or on its exterior. Data from these external sensors is treated the same as data from an RSN's internal sensors and as bolt-presence data.

Both internal sensors and external sensors of a seal or RSN can be configured to detect gas concentrations, radiation, humidity and moisture, atmospheric pressure, or the passing of sensor thresholds of any of these.

The RSN preferably further includes up to 8 MB of user/asset-data in non-volatile memory located within the seal housing, although in alternative embodiments this amount may be exceeded. The RSN is configured to manage, write to, and read from this user/asset-data memory. Read-write operations are preferably carried out via a wireless link with a gateway controller.

The seal is configured to be rendered into a suspended state in which all radios and other subsystems of the seal are powered down to a level sufficient only to respond to an awakening signal. The insertion of any metallic rod or bolt that conforms to the dimensions of an ISO-17712-compliant bolt functions as the awakening signal. It will be appreciated that the suspended state of the seal is substantially similar to the dormant state described hereinabove.

Exemplary RSN: Housing

Figure 14:
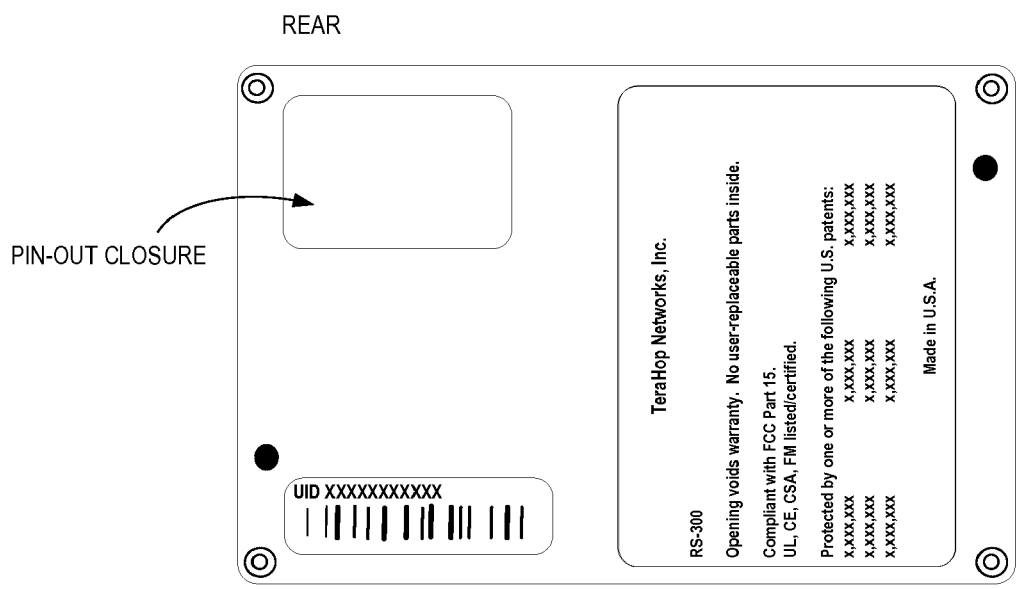

In an alternative implementation, the RSN includes its own housing. The housing is in the shape of a chamfered, elongated, and compressed box which is slightly rounded at its ends, and is illustrated in FIG. 13 and FIG. 14. The housing is bilaterally symmetrical along all 3 axes. The housing does not exceed an envelope having dimensions of three and a half inches by two and a half inches by one and a half inches. The housing preferably comprises molded plastic. A bottom of the housing is preferably flat over at least 75% of its surface, to facilitate attachment to flat surfaces. The housing preferably includes a quality-forensics code, e.g. a date code, molded into an interior surface. The housing further preferably includes one or more external labels, one of which preferably includes the UID of the RSN and a barcode corresponding to the UID.

Exemplary RSN: Interfaces and Sleds

Whether housed in a seal housing, or in its own housing, the RSN preferably includes one or more physical/electrical interfaces, and the respective housing is preferably configured to provide access to such interfaces, although at least some implementations may not include interfaces or may not provide access to such interfaces.

Each interface includes some form of physical protection to prevent inadvertent metal-to-metal contact across connector pins when the interface is not engaged, i.e. in use. Each interface preferably also includes a means to minimize the probability of electrostatic discharge (ESD) damage, and to thwart reverse-polarity connections. The housing preferably includes covers and other interface-access features configured for manipulation by qualified service technicians in a service-depot environment. Such covers and features are configured to minimize the probability of inadvertent opening, deliberate tampering, and incorrect re-installation.

The interfaces are configured for connection to "sleds", which are separate components configured for attachment to the RSN which expand the functionality of the RSN. Further, preferably, the interfaces provide connectivity to at least one TTL-level serial port.

Preferably, sleds are configured to mate smoothly, electrically and physically, with the bottom of the RSN, with no gaps between the mating surfaces of the respective housings.

Upon connection to a sled, or other external device, the RSN preferably does not reset any data, configuration, or state, and does not make attempt to transmit or transfer data, unless configured or commanded to do so. A sled is preferably attached in such a manner as to resist accidental detachment due to shock or vibration, and as to resist casual tampering, such as, for example, using Torx screws.

The RSN is configured to report to other network elements and to a configuration tool or appropriate user application information corresponding to a sled attached to it, e.g. a model number. The RSN is further configured to ascertain, and report, whether it has connectivity and communications with a sled.

The RSN is also configured to be able to "turn off" a sled upon command from a user application. Preferably, this is accomplished via battery interrupt, unless otherwise defined for specific sled types, e.g., a sled is configured to be rendered into a dormant state.

Exemplary sleds include: a GPS sled; an external battery sled, which preferably includes circuitry configured to avoid conflicts with the internal battery; and external low-power sensor sleds. These low-power sensors are configured to be attached to, and read by, the RSN without the need for an additional battery, and preferably do not cause more than a 10% impairment in the battery life of the RSN.

Exemplary RSN: Timing and Events

The RSN includes a clock. The clock is configured to be synchronized with GPS time via a gateway router or gateway controller, but the RSN may keep, i.e. measure, time by any method. Time is reported or recorded for use by applications utilizing 24-hour GMT, plus a local-time offset indicator. All records requiring a time stamp are stamped per this time.

The RSN is configured to reset, or synchronize, its time while connected to a gateway router or gateway controller. This synchronization is configured to function properly even when the RSN is connected to the gateway router or gateway controller via a plurality of other RSNs. Even when so connected, the RSN's time is synchronized to within plus or minus five seconds of the gateway router's or gateway controller's time, including the time required for network transit. When such synchronization is not possible, the RSN's time drifts at most plus or five minutes per month.

The RSN is configured to store event data of defined events and activities in its memory. Defined events include, for example: the commencement of motion per a set threshold; a shock that exceeds a set threshold; a low battery warning; a critical low battery warning; sled sensor events; the insertion of a bolt; the cutting of a bolt; the removal of a bolt; the serial reporting of a serial number of a bolt; and a magnetic switch state change.

Event data includes an event-type identifier and a date/time stamp. The RSN is capable of transmitting raw event data to gateway routers and gateway controllers. The RSN preferably includes sufficient memory capacity to store at least thirty event records. When storage capacity of the RSN is exceeded, older events are overwritten by newer events in a first-in-first-out manner. The RSN is configured to erase all event records upon the command of an appropriate user application, after proper authentication.

The RSN is capable of timing the duration of activities, and of timing intervals between events, based on the needs of an application, e.g. a user application.

The RSN is configured to allow it to count events, and to use such counting to determine what state or condition the RSN is to assume. For example, the RSN can be configured such that it must "hear" three consecutive gateway router or gateway controller beacons before responding, in order to minimize abrupt connections and disconnections if the RSN is moving rapidly through an area.

Further, the RSN is configured to respond to queries for the current status of its sensors and the settings of all configurable items from a configuration tool or appropriate user application. The RSN is configured to supply data to gateway routers and gateway controllers as required to support network diagnostics. This data includes, for example, data related to or data that can be used to determine: latency, the percentage of instances that the RSNs are awakening due to in-band noise, the percentage of instances that RSNs are awakening due to wrong-class requests, the percentage of instances of initial message failures, the average number of message retries, and the average number of hops.

Elements of the Solution: Gateways

Gateways ("GW") provide management of local-network islands and local-WAN communications connectivity. GWs generally representing all gateway-associated devices, including gateway routers, gateway controllers, and gateway servers. Gateways generally establish whether and where a location is monitored. GWs are used to control and communicate with the Seals. The GWs also manage the network of Seals and act as a gateway from Seal networks to other networks and resources, as well as communicate with other GWs. It is the communications to/through other networks that enables the System to send information back to logistics providers regarding the state of Seals and containers. At a given site, GWs are arranged to communicate with each other (i.e., they are networked) so as to maximize coverage of the site, using the fewest GWs. Fixed GWs may be networked together via Wi-Fi or broadband wireline Ethernet or DSL links, which are commonly available at fixed sites.

Exemplary Gateway Controllers

With particular regard to GCs, a gateway controller can be implemented as a logical gateway controller, comprising a gateway server connected to a gateway router, or as an integrated gateway controller, comprising a gateway server physically integrated with a gateway router.

More specifically, in some preferred implementations, a logical gateway controller comprises a gateway router, as well as a gateway server that is hosted on, or comprises, a separate, e.g. remote, computer, and that is connected to the gateway router via a high-capacity, high-reliability data link.

In other preferred implementations, an integrated gateway controller comprises a gateway, i.e. a gateway router, and a gateway server housed in a gateway server module. This gateway server module is either contained within a housing of the gateway controller, or else is contained within a separate housing in intimate and semi-permanent attachment to the gateway controller housing. Power for the gateway server module is sourced through the gateway controller, but the module preferably includes all other hardware required to render the functionality described herein, although in at least some alternative implementations some or all hardware may be integrated with gateway server hardware.

Preferably, in both types of implementations, the gateway router generally provides for communications with RSNs, while the gateway server generally provides local network control and management, event data storage, and management of communications with external networks. Preferred elements and functionality of gateway controllers will now be described via description of one or more exemplary gateway controllers. Where possible, functionality and elements will be described in a manner generic to both integrated gateway controller implementations and logical gateway controller implementations. It will be appreciated that, to the extent practicable, and generally unless otherwise noted, the elements and functionality described are contemplated for use in both types of implementations. It will further be appreciated that although described as including various elements and functionality, in alternative embodiments and implementations, a gateway controller might reasonably be practiced in the absence of one or more of these elements, or in the absence of some or all of this functionality.

Exemplary GCs: General Overview

A gateway controller includes one or more onboard controllers, i.e. processors, that manage the radios, messaging, memory, state-changes, power consumption, IO functionality, and applications of the gateway controller, and that control all other gateway controller functions as described elsewhere herein. Preferably, both the gateway router and the gateway server of the gateway controller include such a processor. The processor is selected and configured such that its power and speed are sufficient to support all on-board applications at their normal performance levels.

The gateway controller further includes non-volatile memory, i.e. computer-readable storage, such as, for example, a hard drive, sufficient to store a plurality of event data records ("EDRs"), and other network management/control records, and to support network server functions, as described herein. The memory is partitionable as needed to provide the functionality described herein. This memory is preferably a part of gateway server hardware. Additionally, the gateway controller is preferably implemented using Linux, e.g. the gateway server and gateway router of the gateway controller are both implemented using Linux.

Furthermore, Each EDR preferably includes a time/date-stamp regarding the occurrence of some event related to the system and its operation, or of the of absence/failure of an expected event. EDRs record the nature of the event (e.g., bolt inserted or initial presence detected), what element of the system was affected (e.g., the bolt), and when the event occurred (time & date). Each EDR is associated with a container and shipment number. EDRs may be temporarily stored on gateways as generated until uploaded as a batch file to a central data archive server.

The gateway controller includes whatever BIOS, operating system, protocol converters, generic APIs, or other software or firmware are required to establish basic functionality, enable further programming, and support functionality described herein.

The gateway controller is configured to readily accept loading and use of APIs for user interfaces or applications. For example, it is anticipated that multiple logical connections might be required for event data records, a bi-directional API, and an interface for RSN routing and authentication. Further, different message types will sometimes require different routing and handling. Message types include, for example, event data record messages and API messages.

Multiple logical connections are also contemplated for use for a Simple Network Management Protocol (SNMP) manager for RSNs, and an SNMP agent for internal gateway controller function monitoring and control.

The gateway controller is configured such that the version of any and all software, firmware, and hardware of the gateway controller is readable via a configuration tool, the message management and routing (MMR) system (as described elsewhere herein), and appropriate user applications.

The gateway controller is configured such that its onboard software and firmware can be updated or upgraded through any available communications link supported by the gateway controller. In at least some implementations, the gateway controller can be upgraded or updated by physical connection to a suitable configuration device. Notably, no queued messages are lost due to such an update or upgrade, and no user-desirable stored data is erased or disrupted.

The timing of updates and upgrades is preferably selected or controlled by the owner of the gateway controller, so as to afford the owner the opportunity to minimize disruption of the owner's intra-network and inter-network message traffic. Notably, however, neither updating nor upgrading takes the gateway controller out of service, except in that a reboot might be required to implement some changes. In at least some implementations, updates or upgrades can effect changes to one or more profiles of the gateway controller.

The gateway controller includes a unique ID (UID) encoded into firmware at the manufacturer. UIDs are unique, i.e. are not duplicated, in that no two RSNs have the same UID. The numbering system used for the UID accommodates at least ten billion (i.e. $10^9$, or 10,000,000,000) unique IDs.

The gateway controller includes space in non-volatile memory for storing a unique Area ID, as described hereinabove. This Area ID is loaded using a configuration tool.

The gateway controller includes data fields for common user attributes that have a fixed configuration, but which are field-populated using a configuration tool or an appropriate user application. The common user attribute fields preferably include: an area name field, which preferably includes one line of fifteen characters; an owner/company name field, which preferably includes one line of fifteen characters; a location field, which preferably includes three lines of fifteen characters each; an assigned-to field, which preferably includes an indication of an asset or function the gateway controller is associated with and preferably includes two lines of fifteen characters each; and another data field, which preferably includes four lines of fifteen characters each. Common user attributes are readable over the network, e.g. in response to a configuration tool inquiry, or via an appropriate user application with appropriate authentication.

The gateway controller includes power-on self-test (POST) functionality, which includes a programmed script that runs when first turned on for purposes of checking basic, minimally-required operating behavior. Errors and/or exceptions are reported if detected. The gateway controller is also equipped with diagnostics, initiated by command via a user interface, e.g. a user application or configuration tool, capable of testing or detecting: operating system anomalies; TX & RX operation of all transceivers; LAN connectivity; and WAN connectivity. The gateway controller maintains and stores statistics and peg counters that can be read and reset remotely to aide in performance monitoring, including, but not limited to: POST anomalies; latency; a percentage of instances that RSNs are awakening due to in-band noise; a percentage of instances that RSNs are awakening due to wrong-class requests; a percentage of initial message failures; an average number of message retries; and an average number of hops.

The gateway controller is configured to be capable of rebooting its gateway server upon command, either wirelessly or via a wired line. This command is issue-able only by the affected network owner or administrator. The gateway controller preferably also includes a fail-safe means of rebooting the gateway server that can be effected in the absence of wireless or wireline connectivity, such as, for example, a power interrupt. Preferably, however, no means or method of server rebooting corrupts settings, configurations, or stored data.

The gateway controller includes an audio codec and low-level analog circuitry capable of playing prerecorded, messages stored digitally onboard. The messages are downloadable via a configuration tool. The messages are played back via an external audio speaker connected through a port on the gateway controller housing. Messages are played upon command of a user application. Preferably, messages are at most ten seconds long, and comprise low-fidelity, e.g. AM-radio, speech. Preferably, fewer than ten messages are stored at any one time.

Exemplary GCs: Gateway Controller Communications

The gateway controller includes a reduced complexity radio (RCR), i.e. a wake-up transceiver, together with one or more appropriate internal antennas. Preferably, this RCR is part of gateway router hardware of the gateway controller. The RCR is normally in a dormant state in which it is ready to receive an incoming transmission, but is not ready to transmit. When in the dormant state, the RCR awaits an event input or an appropriate wake-up message. The RCR generally functions in accordance with RCR technology as described both hereinabove, and in several of the references incorporated herein.

The gateway controller is further configured in accordance with class-based networking as described in many of the incorporated references, as well as elsewhere herein, such that an appropriate wake-up message is preferably an in-band wake-up message associated with a Class that the gateway controller belongs to. The RCR is configured to communicate using messages having a total message length sufficient to provide Class functionality, reliability, a payload, authentication, routing functionality, error correction, and other data or instructions as needed to ensure that the gateway controller communicates with only in-Class networks and in a manner appropriate to those networks and attendant applications, which may be user applications or otherwise.

The gateway controller is configurable to operate in one of three operational modes. In a private mode, the gateway controller is configured to respond to a fixed set of classes, which fixed set can be modified and updated. In a public mode, the gateway controller is configured to respond to any class. Lastly, in a shared mode, the gateway controller is configured to respond to a fixed number of classes, selected by the owner of the gateway controller. Preferably, in this shared mode, whether the gateway controller responds is based at least in part upon the identity of the user or owner of the asset sending a message, as described in a user-ID portion of the message header. Preferably, this identity is verified by a DNS query.

The gateway controller includes a Bluetooth radio, i.e. a complex transceiver, configured in accordance with IEEE 802.15, together with one or more appropriate internal antennas. Preferably, this Bluetooth radio is part of gateway router hardware of the gateway controller. The Bluetooth radio is normally in an off state until turned on by a command from the onboard controller, e.g. a command triggered by the need to communicate with an RSN.

Preferably, both the RCR and Bluetooth radio, using their internal antennas, have a range, for communications with the RCR or Bluetooth radio of another RSN, or of a gateway router or gateway controller, of at least three hundred feet in the most challenging RF environment contemplated for the target applications. Similarly, both the RCR and Bluetooth radio preferably enjoy an open-space, line-of-sight range of at least eight hundred feet, and more preferably enjoy an open-space, line-of-sight range of at least 300 meters.

The RSN is configured to receive commands from a gateway router or gateway controller that sets frequencies on which the radios, i.e. the RCR and Bluetooth radio, operate. It will be appreciated that a gateway router or gateway controller can thus be configured to command the RSN to utilize particular frequencies based on regulatory requirements of the country in which the gateway router or gateway controller is located.

The gateway controller includes at least one Wi-Fi transceiver configured in accordance with IEEE 802.11, together with one or more appropriate antennas, for backhaul communication and for communications with user-interface devices and other gateway controllers. Preferably, this Wi-Fi transceiver is part of gateway router hardware of the gateway controller. Wi-Fi is available for electronic communications with local user devices, such as, for example, a laptop or PDA running a user application.

Preferably, in an office or an urban environment, Wi-Fi range is at least 300 feet, while in open areas, Wi-Fi range is preferably at least 800 feet, line-of-sight, and more preferably at least 300 meters, line-of-sight. The number of transceivers and operating bands is preferably engineered to minimize the likelihood of in-band interference disrupting network performance.

In at least some implementations, Wi-Fi is available for electronic communications between the gateway controller and a separate gateway router.

The gateway controller is configured for 10/100 Ethernet connectivity. Ethernet connectivity is provided through a connector on the gateway controller housing. The connector preferably conforms to a commonly available, industry-standard design, suitable for Ethernet connectivity and environment requirements. The connector interface includes an automatic cable polarity detection switch, such that either straight or crossed cables may be used for interconnection. In at least some implementations, both gateway router hardware and gateway server hardware includes Ethernet connectivity.

The gateway controller is preferably capable of being quickly modified to allow for the use of GSM/3G/4G (or later version) or CDMA bi-directional data communications. This may be accomplished, for example, via insertion of a card by a technician, and the use of a configuration tool.

The gateway controller contains internal, customer configurable logic that allows the gateway controller to establish connections based upon: an elapsed time since a previously established successful connection; a set periodic interval; the occurrence of some number of 'buffered' messages.

The gateway controller is preferably capable of being quickly modified to support a 9.6 KB/sec. bi-directional serial link, which can be used to interface with external satellite or Land-Mobil Radio (LMR) devices. This may be accomplished, for example, via insertion of a card by a technician, and the use of a configuration tool. This functionality is capable of being implemented with hardware flow-control.

Gateway router hardware of the gateway controller is capable of providing point-to-point, bi-directional gateway functionality within a local network island via WiFi, LMR, fixed terrestrial RF link, or satellite, if equipped with one or more appropriate cards or modules as described. Preferably, these links will appear to be 'nailed-up', i.e. non-dialup, connections, that exhibit latency consistent with other timeout and re-try time intervals established for the overall system. Gateway router hardware is configured to store in nonvolatile memory the addresses of wireless link LAN and WAN connections.

The radios of the gateway controller preferably transmit at a power and frequency acceptable in all jurisdictions in which the gateway controller is intended to be operated. If the radios are not inherently compliant for all jurisdictions, the gateway controller preferably includes one or more tables or rules to govern gateway controller and RSN operating frequencies and transmit power levels for non-US jurisdictions. The selection of power levels and frequencies is preferably governed by a fixed selection made using a configuration tool, or based on current GPS coordinates.

Each internal radio preferably exhibits a generally omnidirectional radiation pattern. Radiation patterns are preferably optimized in anticipation that the gateway controller is likely to be in close proximity, e.g. less than one half of an inch, with a conductive surface. Preferably, the gateway controller is mounted such that a narrow side of the gateway controller with connectors is facing downwards.

The gateway controller is configured to communicate with user-input devices, e.g. a laptop or PDA, and is preferably configured to recognize and authenticate such user-input devices. For example, this functionality might be achieved utilizing a stored list of unique identifiers of specific trusted user devices or accepted passwords and encryption keys, where any user device that does not have a matching identifier or accepted password or key shall not be permitted to communicate with the gateway controller, and the identifiers, passwords, and keys are configurable using a configuration tool, but not user applications. Such functionality may be implemented in a similar manner as commercial Wi-Fi routers. Such functionality preferably applies to both wireless and wired communications, but may differ for each.

As noted hereinabove, radio networks are configured to allow for "hopping" between RSNs and other network devices. The gateway controller includes hopping algorithms and rules such that up to 16 hops can be managed, using appropriate Classes, with appropriate priority.

The gateway controller further includes message-handling algorithms and rules configured such that messages to or from RSNs or other gateway controllers are queued, messages are handled with appropriate priority, and no critical messages are inadvertently lost.

This functionality is applicable both among RSNs and gateway controllers of a local network island, and between a local network island and other networks, e.g. to or from a WAN.

The gateway controller is configured to support the management of RSN behavior-states as required to meet the needs of a network and user applications.

The gateway controller is programmed with operating parameters and instructions that are designed to: minimize instances of the local network and its RSNs responding to mass events, e.g. earth quakes, thunder, passing rail traffic, high winds, etc., avoid network paralysis; and prevent RSNs from wasting battery life with useless messages.

The gateway controller is further configured to collect and store event data records automatically, and to upload such EDRs via a WAN connection to appropriate servers and applications. Such uploading preferably occurs upon receipt of an EDR from another device or process when WAN connectivity is available, when a user-set time has a expired, when a user-set number of EDRs have been buffered, or upon command from a user application.

If WAN connectivity is not available, then EDRs are buffered until connectivity is re-established. If buffer capacity is exceeded, then buffered EDRs are discarded in a first-in-first-out manner. EDRs preferably include an EDR type, and in such event, EDRs are discarded in a first-in-first-out manner by EDR type.

The buffer is configured such that it has sufficient capacity to store, at least 2400 EDRs. The buffer medium is non-volatile. The gateway controller otherwise is capable of storing EDRs indefinitely until uploaded. Once uploaded, buffered EDRs may be cleared.

Notably, EDRs are handled by the gateway controller so as to not interfere with other messaging, e.g. control and status messaging. EDR functionality is configured to minimize the effect of EDRs on gateway controller and network loading. If EDR types are utilized, EDRs preferably are handled with priority based upon EDR type.

Exemplary GCs: Motion/Vibration Sensor

The gateway controller includes a motion/vibration sensor, i.e. sensing capability, that can sense, differentiate, and report the commencement of motion (motion) or the absence of motion (no/motion). Preferably, motion is characterized as the commencement of vibration or acceleration that is associated with movement or with physical disturbance.

The sensitivity of the motion/vibration sensor is configurable and selectable using either an appropriate configuration tool or an appropriate user application. The motion/vibration sensor includes five sensitivity levels ranging from 1, which is the lowest sensitivity level, to 5, which is the highest sensitivity level. A user can select one of the five sensitivity levels, and additionally can set each of the five sensitivity levels, using an appropriate configuration tool or an appropriate user application.

Factory default values are provided for each sensitivity level. The factory default lowest sensitivity level is calibrated to detect the motion of a gateway controller mounted to a passenger automobile driving on a paved asphalt surface at 20 MPH, while the factory default highest sensitivity level is calibrated to detect tool-assisted tampering attempts. The remaining factory default sensitivity levels are set linearly between the factory default lowest and highest sensitivity levels. Preferably, levels are calibrated such that motion of the gateway controller during the associated activity has a high probability, e.g. ninety percent of being detected, but the probability of a false positive owing to nearby activities which are not desired to be sensed is less than ten percent.

Notably, it is contemplated that factory default calibration levels might be changed in response to characterization of sensor behavior. A factory default selection is made as to which sensitivity level is initially in effect.

With respect to this motion/vibration sensor, the gateway controller includes three motion sensing modes: a "disabled" motion sensor mode in which the motion/vibration sensor is non-functioning, an "enabled-motion" motion sensor mode in which the gateway controller senses and reports the commencement of motion, and an "enabled-no/motion" motion sensing mode in which the gateway controller senses and reports that motion has failed to occur during some period of defined length. The length of the no/motion period is selectable using a configuration tool or an appropriate user application. Preferably, the period is selectable in: one minute intervals for lengths between one minute and ten minutes; five minute intervals for lengths between ten minutes and thirty minutes; and ten minute intervals for lengths between thirty and sixty minutes.

In some implementations, the same sensitivity settings are utilized regardless of what mode the gateway controller is in, while in other implementations the gateway controller utilizes different sensitivity settings in its "enabled-motion" motion sensor mode as compared to its "enabled-no/motion" motion sensor mode.

The gateway controller is capable of both self-assuming a motion sensing mode, and of assuming a motion sensing mode in response to a command from a configuration tool or an appropriate user application.

More specifically, the gateway controller is capable of self-assuming a motion-sensing mode based on any combination of programmable conditions, such as, for example, a time of day or a day of the week. These conditions are configurable and programmable via both a configuration tool and an appropriate user application.

Exemplary GCs: Temperature Sensor

The gateway controller includes an internal temperature sensor, as well as logic that can sense, differentiate, and report temperatures that exceed limits that could be dangerous to the gateway controller. The gateway controller is preferably initially programmed with a factory-default range of −20° C. to +55° C. The gateway controller is configured such that if temperatures measured by the temperature sensor are outside of this range for more than ten consecutive seconds, a message is sent to the MMR, and appropriate user applications, that a dangerous temperature condition exists. Such a warning is resent every 10 minutes until the condition is rectified.

Exemplary GCs: GPS and Clock

The gateway controller includes a GPS receiver. The gateway controller is configured to report its GPS coordinates, i.e. GPS data, to remote applications via an onboard or external WAN connection.

The GPS data is capable of being sent upon request from the MMR, another gateway controller, or by command that originates from either a remote or a local user application, e.g. in response to a user pressing a send-this-location button on a keypad in the operator's cabin of a port's rubber tired gantry (RTG).

GPS data is included in all inbound EDR messages. The data corresponds to the GPS-enabled device that is physically closest to the asset that originates the EDR, within the constraints of network connections.

Preferably, the GPS receiver outputs almanac, ephemeris, and timing information potentially for use by RSN GPS sleds, for network-aided GPS operation.

The gateway controller includes a clock, which is synchronized with GPS time. Time is reported or recorded for use by applications utilizing 24-hour GMT, plus a date indication. All records requiring a time stamp is stamped per this time and date.

The gateway controller synchronizes to GPS time, assuming it has satellite visibility, each time GPS coordinates are reported to any application, and at least once every 24 hours. The gateway controller may keep or measure time by any method, but preferably the clock is accurate to within plus or minus five seconds per day.

Clock operation and reporting is settable to a local time zone via the MMR, a configuration tool, or appropriate user applications; automatically adjusts for daylight savings time; is aware of the day of the week; automatically adjusts for leap years. The gateway controller clock is used to update RSN clocks, as described hereinabove.

Exemplary GCs: Power

The gateway controller does not include a power switch, but instead is configured to power on when power is applied via a power connector, i.e. a single plug-in connector on the housing. The gateway controller is operable from common vehicle power, i.e. nominal 12 VDC negative ground. The gateway controller preferably includes internal power-conditioning capability such that common vehicular power may be used without resorting to external devices. However, the gateway controller is configured for mounting of a power conditioner directly below and behind the gateway controller in contact therewith. The power conditioner accepts nominal 12/24 VDT input and provides conditioned 12 VDC out for the gateway controller. The power conditioner provides a delayed-turn-off relay to permit proper shutdown of the gateway controller, and further provides transient protection.

When power is applied, the gateway controller automatically boots, performs POST, runs other self-diagnostics as required to assure proper functioning of all onboard subsystems, and performs all other required and as-configured tasks to render it ready to perform its assigned network functions.

The gateway controller is capable of being functionally shut down, i.e. transitioned to a soft off, by command from a user application, via the MMR, or from a configuration tool. Removal of external power shall also cause the gateway controller to be powered off, but the gateway controller is configured to minimize problems should this occur.

More specifically, the gateway controller includes an internal means to protect the gateway controller from damage and to protect data from corruption in the event of an unexpected and sudden loss of external power. If engaged, this means immediately begins to render the gateway controller into an off state, but in a manner that avoids damage and corruption. This means preferably minimizes on-off cycling should external power be restored intermittently.

Notably, this means is not intended to provide sustained power nor sustained operation of the gateway controller.

The gateway controller includes fusing and other protection circuitry configured to protect the gateway controller from reverse polarity, over-voltage, spikes, etc., on all external connections.

Such fuses are preferably slow-blow fuses of appropriate capacity, mounted internally, and intended exclusively for depot replacement.

Alternatively or additionally, if the gateway controller is installed in a fixed installation, the gateway controller preferably includes an uninterruptible power supply and lightning protection on power and data lines.

The gateway controller is configured for attachment to an optional 12V AGM, 33AH rechargeable battery. The battery is powered from 90-130 VAC, 50/60 Hz fused; has 3 outputs at nominal 12 VDC, each fused at 6.3 A; fits within the dimensions of thirteen inches by eighteen inches by seven inches; weighs no more than 60 lb.; has an operating temp. range of −20° C. to +55° C.; and has a storage temp. range of −40° C. to +85° C. Preferably, power sensing allows for automatic switching to engage when line power to the gateway controller is list.

The gateway controller is configured for use with an outdoor power supply. The outdoor power supply accepts 110/208/220 VAC, 50-60 Hz, and provides 12 VDC out for the gateway controller. The input voltage is selectable via a mechanical switch. The outdoor power supply has fused input. The outdoor power supply is disposed in an enclosure that is suitable for protecting the device from outdoor environments, that has connection features suitable for hard-wiring into a site electrical system and for hard-wiring to a cable that plugs into the gateway controller, and that has features to facilitate mounting to a flat surface, e.g. mounting tabs.

The gateway controller is also configured for use with a basic power supply for 110 VAC, 50-60 Hz. The charger configuration may be a cube-on-the-wall plug and a cord, with a matching connector for the GC, or may be a table-sitting or floor-sitting "brick" with in and out cords. Preferably, the basic power supply has a cord length of at least six feet, and fused inputs.

Exemplary GCs: Housing

Figure 15:
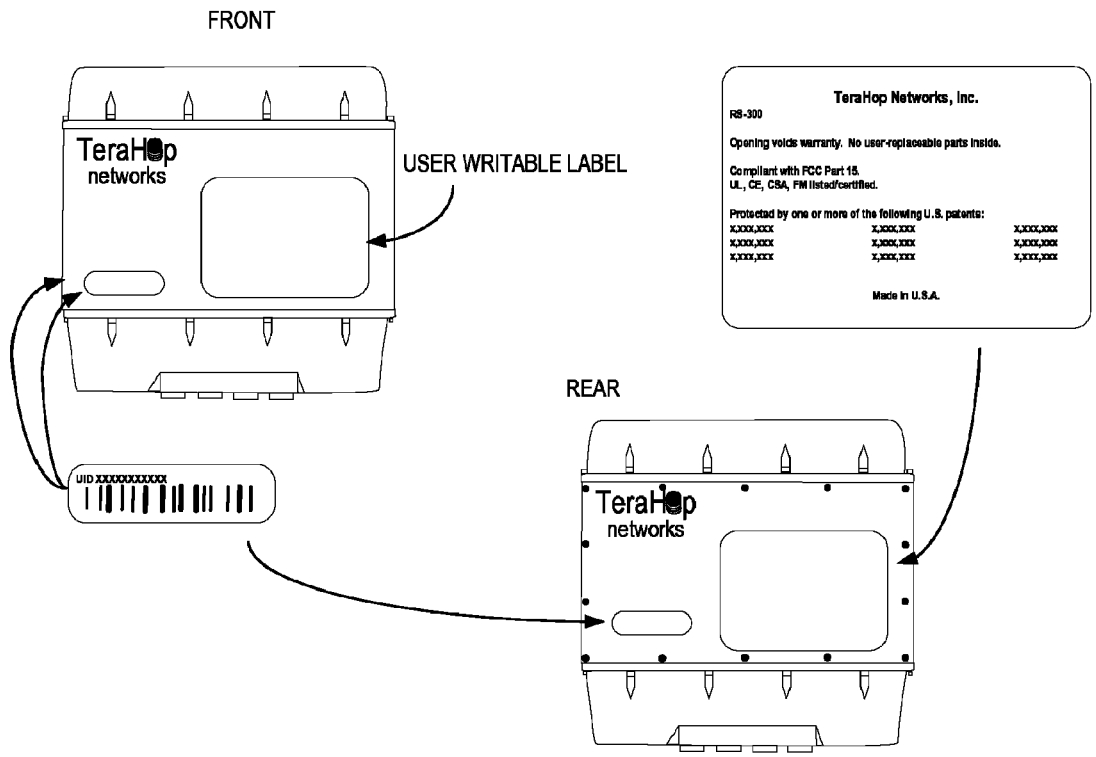
FIG. 15 illustrates an exemplary housing of the gateway controller.

The gateway controller preferably includes housing which is part metallic, for RF shielding and heat dissipation, and part plastic, for RF transparency. FIG. 15 illustrates an exemplary housing of the gateway controller. The housing preferably does not exceed an envelope having dimensions of ten inches by seven and a half inches by four and a half inches. The housing includes integral features for mounting to a flat surface, e.g. mounting feet or tabs. The housing is preferably contoured for strength, and preferably has rounded corners so as to reduce stress loads and shed precipitation. The housing is preferably an industrial gray or other neutral color, consistent with thermal dissipation and sun loading. The housing is preferably resistant to UV and corrosive atmospheres, including air pollution.

The housing is configured to accommodate the addition or integration of additional hardware, e.g. WAN communications devices, or the substitution of housing components to accommodate configurations including a gateway server module. The entire gateway controller, including any additional components or substitute housing components, preferably conforms to the dimensions noted hereinabove.

The housing is configured and held together in such a way that casual tampering is difficult, yet field-service technicians can open the case with tools that they commonly have. For example, Torx screws may be utilized.

The housing preferably includes one or more labels affixed to the outside thereof, one of which preferably includes the UID of the gateway controller and a barcode corresponding to the UID.

The gateway controller includes power and network connections accessible on the outside of the housing for Ethernet, power (plug-in), audio out (line level), and a serial port (RJ).

The connection ports each have a locking mechanism to inhibit accidental or casual disconnect and do not degrade housing integrity with respect to dust or water.

The gateway controller includes indicator lights visible on the outside of the housing to indicate whether power is on or off, LAN connectivity, and WAN connectivity. The lights are configured to maintain housing integrity. The lights are designed to minimize crowding on the housing, yet preferably have a diameter of at least one and a half millimeters. The RSN is preferably configured such that various combinations of lights illuminate and flash in a meaningful manner during diagnostics.

The gateway controller is configured to be reset to its factory defaults via a non-wireless means that is accessible through the housing.

The gateway controller preferably weighs less than four and a half pounds even with a full suite of WAN radios and a gateway server module.

Elements of the Solution: PADDs

As described below in greater detail, handheld devices are preferably utilized for the secure sealing and unsealing of containers. More specifically, these handheld devices are used to effect association, closure, and initiate authorized opening of seals on containers. These handheld devices are preferably configured for communication with a customer/user application, i.e., a seal management application (SMA), as well as databases, to effect on-site, e.g., on a dock, arming and disarming of seals. These handheld devices include a processor, computer readable memory for storing computer executable instructions as well as data, and an RF component for wireless radio communications, such as, for example, Wi-Fi communications, and are capable of executing application software, such as, for example, an arming/disarming application to allow a user of the handheld device to arm and disarm seals. These devices are thus characterized as Portable Arm/Disarm Devices (PADDs), and such software is characterized as PADD software.

A PADD in accordance with one or more preferred embodiments may comprise either an integrated hardware and software solution, i.e., a dedicated communications device with PADD software loaded thereon, or may simply comprise a software solution, i.e., user-loadable software for installation onto a user-owned PDA. In implementations utilizing a dedicated communications device, the device is preferably preloaded with a basic load of software and firmware minimally required for basic functioning, running the PADD application, and post-factory configuration.

As used herein, unless otherwise noted, the term "PADD" is intended to refer both to the PADD software; to any communications device having—or configured to have—PADD software loaded thereon for use in the Solution, including a user-owned PDA; and any combination thereof. Further, the terms PADD hardware and PADD device are intended to refer to both a dedicated communications device, and a user-owned PDA, unless otherwise noted.

PADDs preferably include barcode-reading capability for reading a unique ID of a seal from a barcode located on seal. PADDs may comprise either general personal digital assistants (PDAs), or other commercially available communications devices, that have PADD application software loaded thereon, or alternatively may comprise dedicated devices designed and configured specifically for use with PADD software. Either way, the wireless device is preferably configured to receive software updates and downloads wirelessly from a gateway, and to transfer files and uploads wirelessly to a gateway.

The PADD application software and graphical user interfaces thereof renders a limited and generic suite of network and resource reporting/command/communications functions described in more detail hereinbelow for managing seals and tracking their status. Briefly, this includes arming and disarming of seals. As a security feature, however, PADDs do not communicate directly with seals. Rather, communication occurs indirectly via data and commands that are routed through a gateway, to an appropriate SMA instance, and then back through the same gateway, to the seal in question.

Notably, the PADD software is preferably suitable for loading and operating on fixed servers for remote user access and suitable for loading and operating from common user computers. Further, it is preferably accessible via the MMR, compatible with APIs that permit exchange/comparison with common logistics management applications, and preferably includes a seal configurator.

In this regard, a configurator is a software tool, e.g. is loaded on a computer, that is used to set parameters for system operation. For example, a configurator would be used set the times during which container movement or seal removal raises an alarm. The seal management application noted above can be characterized as a configurator, as it allows a user to, inter alia, configure the association of network location types with seal profiles, as described in more detail hereinbelow. The SMA further enables visibility of seal activity and status, displays related notifications, records seal association data, and sends seal association confirmations to PADDs.

While PADDS are used to arm and disarm Seals, servers host logistics-management software applications and other applications—such as database applications—in accordance with the Solution using data received from PADDS and Seals. The customer application software is generally referred to herein as SMA and serves to provide clarity of and security for shipping containers as they travel from origin to destination. Access to SMA may be provided via local network or Internet. Servers also host system and network-management applications, such as, for example, configurators. The SMA is discussed in further detail below.

Data presented or input via a PADD is available for retrieval and presentation by a PADD or SMA, from some combination of system and local-host databases. A standard ID convention is used by all network hardware and applications that uniquely identifies entities, i.e., companies, that are valid users. A database stores these IDs in association with the entities they represent, and user applications may communicate with that database, as required, upon a proper login. For users, a database is maintained that associates seal UIDs to entities such that users may view and act on only those seals that are associated with the user's entity, as indicated by the user's login credentials. Notably, e-bolts are preferably not part of this database, and there is preferably no tracking of e-bolts until they are inserted into and associated with a specific seal.

Additional specific details of PADDs are now set forth below.

PADD: Authentication

In at least some implementations, upon power-on and after POST, the PADD application launches automatically. The PADD application then performs application-specific diagnostics, a battery check, and a network-connectivity check. An anomaly causes an appropriate explanatory message to be displayed, together with instructions for a user.

Figure 16:
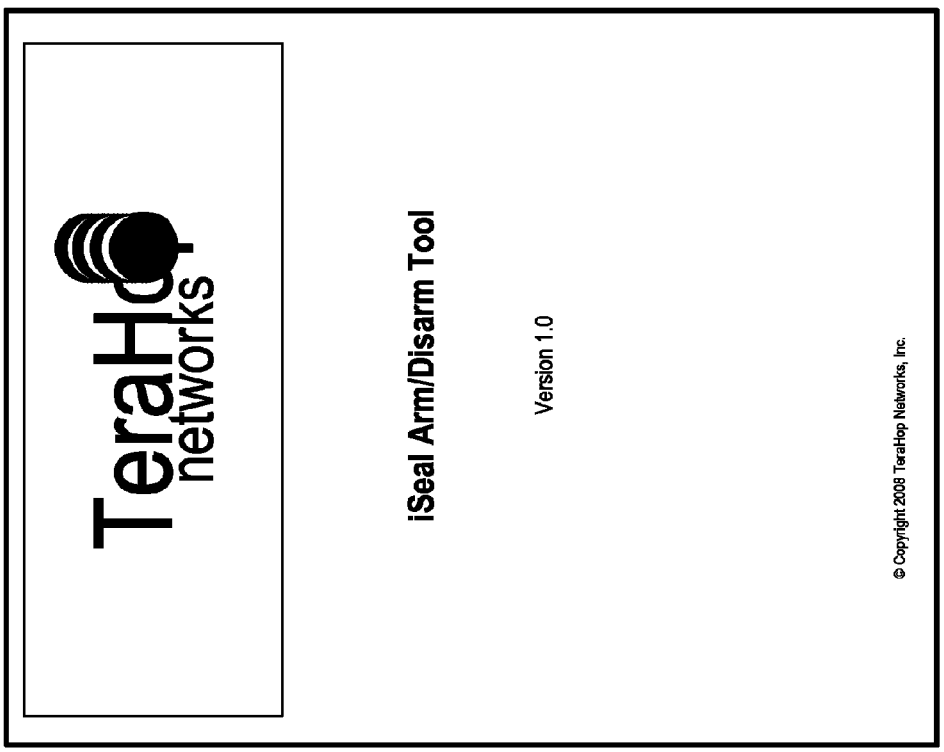
FIG. 16 illustrates an intro screen of software for execution on a PADD in accordance with the Solution.

Subsequently, the PADD displays an intro screen, as illustrated in FIG. 16. Notably, a logo displayed on the intro screen may be changed, based, for example, on a login. Several seconds after the intro screen appears, a popup appears that requires a user to authenticate his permission to use the PADD hardware and/or the PADD application. Authentication may be accomplished via entry of an authentication code, an ID/password combination, by scanning an identifying barcode, such as, for example, a barcode located on a transportation worker identity card, or by any other appropriate means, such as, for example, those commonly in use. This functionality is preferably a user-configurable option, selected during offline configuration.

Figure 17:
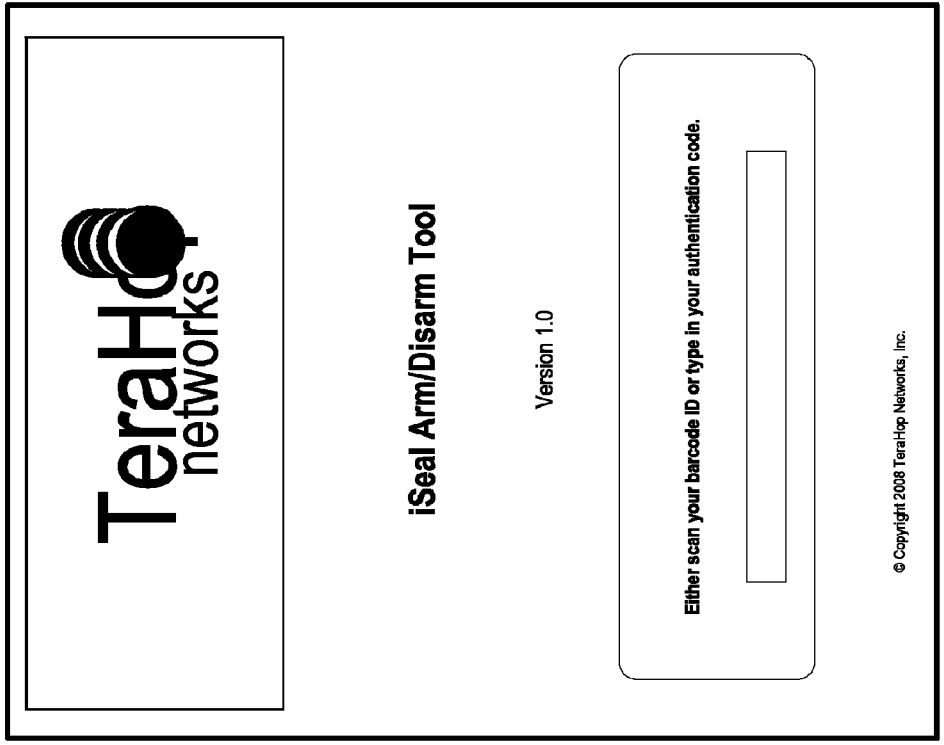
FIG. 17 illustrates an exemplary authentication popup of the PADD software.

An exemplary authentication popup is illustrated in FIG. 17. Authentication of the PADD hardware and its user is made via reference to a profile that is configured offline and stored in a remote server.

Figure 18:
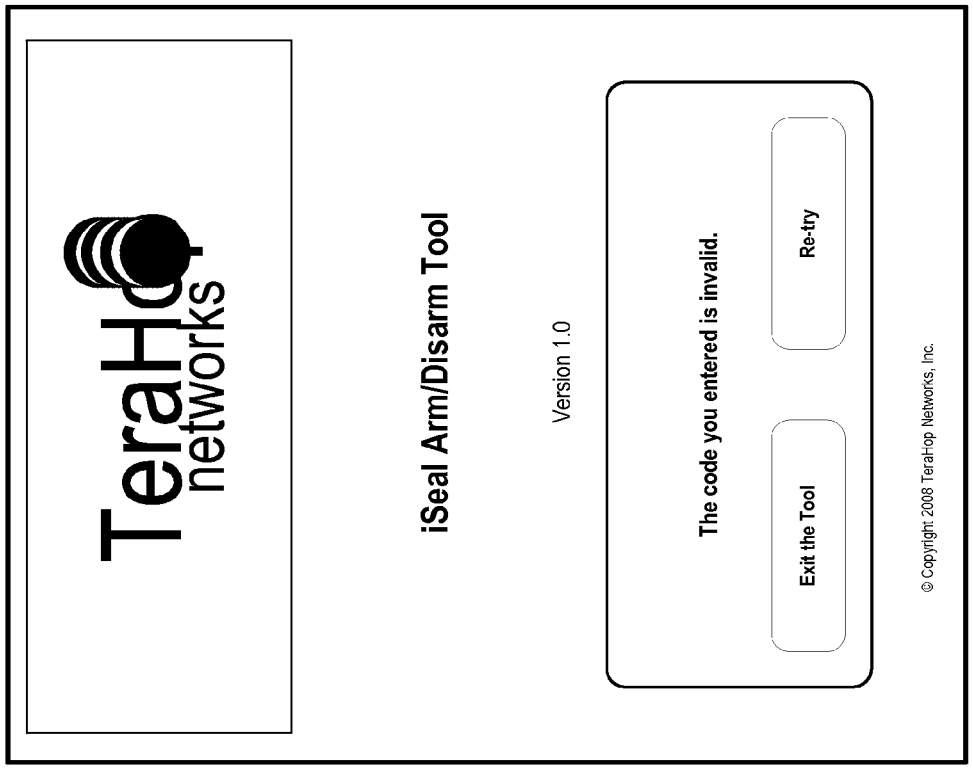
FIG. 18 illustrates an error popup of the PADD software that occurs upon an unsuccessful login attempt.

Upon an unsuccessful login attempt, a corresponding error popup is displayed, as illustrated in FIG. 18, and the entry field or fields at the PADD are reset to be blank. A given instance is allowed four retries before being blocked from logging in. Upon the occurrence of five consecutive failed login attempts, a popup is displayed conveying that login has been blocked due to repeated failures and that someone with administrator-level permissions will be needed to remove the block. Such a block is removable by a person with administrator-level permissions using a utility in the SMA.

A PADD is configured with the capability of adopting common-name profiles, which are used to uniquely identify a PADD device and its user in human-readable data files and on-screen messages as they appear on other display devices and applications, such as the SMA. Each profile has a unique login authentication associated with it. The profile that is adopted by the PADD is determined by the login entered when the PADD is turned on.

The profiles are established during configuration, and can be read and displayed by appropriate display devices. Profile elements include: a PADD device identifier, e.g. a serial number; a common entity or customer name or ID; a user name or ID; and an authorization level. Each field is configured to store at least fifteen characters, including spaces and punctuation. Each common entity name must be unique, for example "Smith Logistics 1" and "Smith Logistics 2" could be used as each is unique.

Each profile must be associated with unique login credentials. Any PADD may assume any configured profile as defined by the login credentials used, but login credentials may be used on only one PADD at a time. When a duplicate logon request is detected, then the later requester receives a notification that her login credentials are already in use and that login is denied.

If a user is logged in and her PADD is idle, i.e. there is no interaction for two consecutive hours, then that user is automatically logged off. A time out message is sent to the user's PADD, and the PADD displays a corresponding popup.

Each profile is preferably associated with one of four authorization levels. These levels include a "Standard User" level, which applies to ordinary dock/yard workers and which limits accessible functionality; an "Administrator/supervisor" level, which enables all features and capabilities regarding the user's seals, but excluding DHS functionality; a "Read-only" level; and a "DHS" level, which is a read-only level, but which allows interrogation of any seals, regardless of ownership entity, and which enables the setting and canceling of special security flags.

The configuration of log-ins and profiles allows an individual user to select from a drop-down menu which entity's seals he may interact with and with what permission level, for a single login. This drop down is provided if, when trying to interact with a particular seal, the user receives an error message based on the fact that the seal he has selected does not belong to the entity that he is currently logged in for. This functionality allows a single user to arm or disarm seals associated with different entities without having to login separately to interact with seals belonging to each entity.

Figure 19:
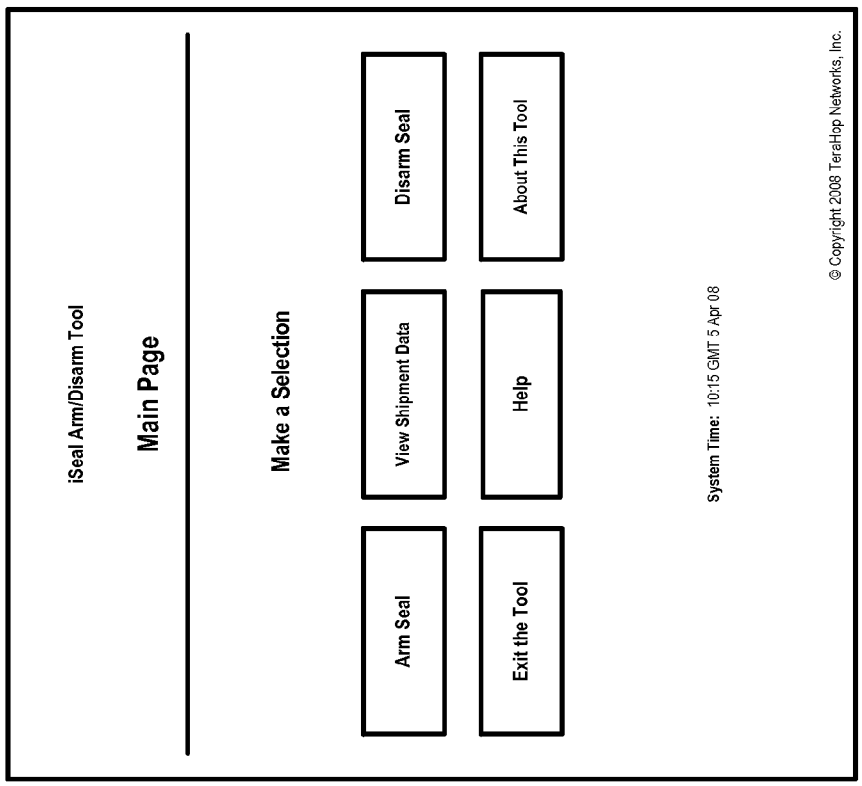
FIG. 19 illustrates a main page of the PADD software that is displayed upon a successful login attempt.

Upon a successful login, a user is presented with a main page, as illustrated in FIG. 19. From this main page, the user can arm a seal, view shipment data, disarm a seal, view application information, or exit the application.

PADD: Arming and Association of a Seal

The PADD is configured to facilitate the secure sealing of a container utilizing a seal and a bolt. More specifically, the PADD provides for the secure arming of a seal, and the association of that seal with a shipment, via an SMA instance.

To begin, a seal is attached to a designated container and aligned, doors of the container are closed, and a handle hasp of the container is properly positioned.

A PADD, in communication with the SMA, and with appropriate system servers and databases, allows for successful activation, i.e. arming and association, of a seal. Such activation requires that a worker is present at the seal with a PADD and has physical access to the seal, that the seal and PADD are in communication with appropriate applications and databases, and that a compliant bolt is available. The PADD provides a step-by-step process with confirmation that requires input from the worker. The process includes confirmation via screen messages or colored light indicators.

Preferably, arming and association begins when a user, e.g. a worker, selects to begin via a PADD. An exemplary arming and association screen is displayed in FIG. 20. The user enters a UID of the seal, or scans a barcode located on the housing of a seal that corresponds to the UID of that seal. An exemplary input popup is illustrated in FIG. 21. Upon entry of an invalid seal number, i.e. a number that does not correspond to a valid seal UID, an error popup is displayed, as illustrated in FIG. 22. The user is presented with the choice to either abort the arming process, or try again.

Preferably, these steps are repeated for input of a shipment number and container number. The user is then prompted via a similar input screen to input a bolt and enter a bolt number. Arming requires that a compliant bolt be inserted into the seal. In a preferred, if an e-bolt is inserted, the e-bolt's serial number is automatically read, while if a non-e-bolt is inserted, manual entry of the bolt's serial number is required. This serial number is preferably both communicated to the SMA, and stored in memory of the seal. Notably, arming will not be possible utilizing a non-compliant bolt.

Association is accomplished when all steps have been completed, in the proper order, with appropriate inputs, and confirmations from the SMA. Preferably, however, the only data that must be entered for successful association is the seal's UID. The various numbers entered during the process are reported to appropriate user applications as separately identified elements of an identified associated group, for display and storage by those applications.

Notably, arming is preferably automatic upon insertion of a compliant bolt. Arming and association each generate their own event data record (EDR), which is communicated or reported to appropriate user applications. A successful association causes an "Authorized" security flag to be set in the seal. If a successful association does not occur within fifteen minutes of a seal being armed, an EDR is generated and reported. Such an armed, but un-associated, seal otherwise behaves and is treated as if associated, but it is "Not Authorized." Such a seal may be subsequently associated, i.e. authorized, at any time after it has been armed.

Following arming and association, the user is preferably prompted to confirm that the container is ready to ship, for example by the exemplary popup illustrated in FIG. 23, and a main arming screen is updated with the armed information, as illustrated in FIG. 24. Upon confirmation, a ready-to-ship indicator is set in the SMA database, and a corresponding status indicator is displayed when a user logs in to the SMA.

Notably, although the steps outlined above for arming and association have been described as being accomplished in a particular sequence, it will be appreciated that in alternative implementations these steps may be performed in an alternative sequence.

PADD: Disarming of a Seal

The PADD is also configured to facilitate the unsealing of a sealed container. More specifically, the PADD is configured to disarm a seal. Such disarming requires that a worker is present at the seal with a PADD and has physical access to the seal, and that the seal and PADD are in communication with appropriate applications and databases. The PADD provides a step-by-step process with confirmation that requires input from the worker. The process includes confirmation via screen messages or colored light indicators.

Preferably, disarming begins when a user, e.g. a worker, selects to begin disarming via a PADD. An exemplary disarming screen is displayed in FIG. 25. The user enters a UID of the seal, or scans a barcode located on the housing of a seal that corresponds to the UID of that seal.

The entered seal UID is checked against a list of seal UIDs that are associated with that user or his entity, per his login. If the user is not associated with the entered seal UID, i.e. it is an invalid entry, then a popup is presented on the PADD to that effect. The user may abort or try again. Upon entry of a valid seal UID, the user is instructed to cut the bolt and push the bolt stub out of the seal, such as by the exemplary popup of FIG. 26. If this is not successfully accomplished, the user is again prompted to do so, such as by the exemplary popup of FIG. 27.

During a standard seal opening, EDRs are reported corresponding to the granting of authorization, the seal UID, the bolt serial number, an identification of the PADD to which authorization was granted, a bolt cut or push out event, and the location, i.e. a gateway controller location, of the seal at the time the bolt was cut.

If the seal is armed with an e-bolt, the cutting of that e-bolt will cause the seal to report an opening, while if the seal was armed with a compliant non-e-bolt, the seal will report an opening only when the bolt is pushed out of its opening.

Following such an opening, the PADD presents to the user the option of having the seal immediately enter an idle state. If a new compliant bolt is not inserted within five days of an authorized opening, then the seal automatically de-activates.

Notably, although the steps outlined above for disarming have been described as being accomplished in a particular sequence, it will be appreciated that in alternative implementations these steps may be performed in an alternative sequence.

Arming and Disarming Scenarios

Table 1 shown in FIG. 28 illustrates various scenarios that may occur in arming and disarming a Seal.

PADD: Viewing Seal Data

The PADD is also configured to facilitate the viewing of data associated with a seal when selected via user input at the PADD. The PADD prompts the user to input information used to look up the data associated with a seal. An exemplary lookup screen is displayed in FIG. 29. The user either: enters a UID of a seal, scans a barcode located on the housing of a seal, enters a shipment number, enters a container number, or enters a bolt serial number. The input information is used to lookup, either via the SMA, a configuration tool, a user application, or in one or more databases, information associated with a seal. An exemplary data screen for a Seal is illustrated in FIG. 30.

Preferably, one or more notes may be associated with a particular seal. The PADD is configured to allow a user to add a note associated with a seal for which data is being viewed, or read notes entered by other users. The PADD will not, however, allow a user to edit or modify notes that have previously been entered. All notes will be stored in association with a timestamp and user identification corresponding to the note's entry. Notes are preferably displayed in a last in first out manner, and stored notes that are older than ninety days are preferably overwritten.

PADD: Seal Alarm Popups

The PADD is configured to present a seal alarm popup if, when seal data is queried, an alarm flag has been set for that seal, as reported by the seal and recorded in the one or more servers, which may be either user owned or owned by a managing entity. For example, such an alarm popup may be displayed upon an attempt to disarm a seal if an alarm flag has been set, as illustrated in FIG. 31.

This functionality might be used by a government agency, such as, for example, DHS, when they wish to query a seal. If DHS is suspicious of a particular container, an alarm flag could be set with respect to that container which would cause an alarm popup to appear on a PADD that attempts to disarm that container.

An alarm preferably includes: an alarm type, such as, for example, a low battery alarm, a critical low battery alarm, a motion alarm, a shock alarm, a seal breach, i.e. unauthorized bolt cut or removal, alarm; a reporting location, i.e. the common name of the reporting location; an event time, i.e. a time recorded by the seal when the alarm is triggered; and a reported time, i.e. a time when the alarm event was received or recorded by a seal management application or other server or application.

If the user has logged in with a sufficient authorization level, the alarm popup also includes a "Clear Alarm" button in the lower right, which is preferably red. Clicking this button clears the alarm and effects recording of an EDR which includes the ID of the PADD and its user.

PADD: Interface

The PADD software, i.e. a PADD application, is compatible with operating systems commonly found on PDAs used in industrial environments. Preferably, Windows Mobile for PDAs is utilized.

The PADD application includes a GUI environment having a touch screen with a QWERTY keyboard, although the PADD is preferably configured to allow for the use of a standard QWERTY keyboard as well. The size of text and control buttons, and the amount of information that is visible per screen, is preferably configured to allow for the use of input via an ungloved finger, or a gloved hand with a stylus. The PADD application is configured to guide a user step-by-step through each function. Visual presentation utilizes large control buttons that are application-generated and minimizes the number of them on a given screen or popup. The PADD application utilizes recurring colors and recurring control button positioning to aid users who use the PADD infrequently.

Preferably, screen images occupy the entirety of the screen area of the PADD hardware, and are used for displaying information and controls that need to persist. Popups are used for temporary messages and controls, occupy less than the entire screen area, and partially cover the underlying screen. When popups appear, controls of the underlying screen are grayed-out and inoperable until the popup closes, or is closed.

The PADD and its communications methods and protocol are implemented so as to minimize any user perception of intermittent connectivity, including disruption of a given arm or disarm session. Preferably, the PADD includes an on-screen connectivity indicator, which preferably is a Wi-Fi connectivity indicator. The indicator may be a signal-level meter or simply a go/no-go indicator, e.g. a green light/red light setup. This indicator is positioned in an unobtrusive location on the PADD screen, but is always visible. Further, the PADD preferably provides a notification of loss of radio contact. If a connectivity issue is detected when a user attempts to enter data or is awaiting a confirmation from the SMA, e.g. in the middle of an arming session, a popup is presented on the PADD screen that network contact has been lost. The popup preferably prompts the user to reposition herself. The PADD preferably also utilizes automatic retries and message buffering to minimize disruptions due to connectivity loss.

The PADD includes an indicator that displays automatically when execution of a command or activity is in process, and when display of an output or change is delayed by more than 5 seconds. For example, an hourglass or spinner might be displayed in the center of the screen.

For all screens on which they appear in the PADD, container number fields preferably accommodate exactly the syntax: "ABCD123456 78E9", i.e. four letters, six numbers, a space, two numbers, one letter, and one number. Data-entry fields for container numbers includes a separator at the space location of the defined syntax. Depending on field feedback, the container-number requirement may be truncated by the last 2 characters, which identify venting type.

Shipment number fields preferably accommodate fifteen characters of any type, including punctuation and spaces.

Seal number and bolt number fields preferably accommodate twelve characters, each of which may be either a number or letter.

Regardless of whether a dedicated communications device is utilized, the versions of any PADD software or firmware is preferably viewable via the PADD application, and able to be queried by other network elements, or via a user application or configuration tool. FIG. 32 illustrates an exemplary "About" page displaying this information. PADD software and firmware is preferably capable of post-factory updating and upgrading, both wirelessly and through a wired port.

PADD: PADD Hardware

PADD hardware includes sufficient non-volatile and volatile memory such that it has adequate capacity to store the OS, software/firmware, data, and instructions needed to fulfill The PADD includes a clock. Time is preferably displayed in 24-hour GMT format. When in contact with a gateway controller, time is synchronized with GPS time. All records requiring a time stamp, e.g. EDRs, are stamped per this time, date included. This time is preferably displayed on pages and popups as "System Time".

PADD hardware preferably includes a user-replaceable battery. The battery is rechargeable using either AC or DC power via the same port, which is compatible with both a dedicated charger and a vehicle lighter plug-in charger. The battery life is preferably at least eight hours on a single charge. The battery has a useful life of at least 2 years. The PADD is operable while being charged. Charging, as well as connecting and disconnecting the charger, does not cause any loss of data.

PADD hardware preferably includes a USB 2.0 port. This port is configured to be used, for example, for software or firmware updating or upgrading, device configuration, or EDR downloads.

The PADD is preferably capable of monitoring its own battery level and displaying a low-battery popup when its battery level is within 30 minutes of device shut-down. Further, the PADD preferably automatically dims the screen if the screen or keyboard has not been touched for a certain period of time, such as, for example, five minutes.

The PADD software, as well as PADD hardware, preferably is configured to allow for the use of an integrated mobile phone, preferably GSM/3G/4G (or later version), CDMA, or Nextel/iDEN.

PADD shall have capacity for an optional integrated mobile phone.

PADD hardware preferably includes audio output capability, preferably including a transducer, e.g. to produce a "beep" to indicate successful actuation of controls and to announce presentation of popups. A user preferably can turn this functionality on or off, and select a volume level.

PADD hardware preferably includes Wi-Fi capability in accordance with IEEE 802.11, and more preferably in accordance with 802.11a, sufficient to communicate with gateway controllers and to provide the functionality described herein.

PADD hardware preferably includes a barcode reader.

PADD hardware preferably includes an external label that includes a serial number and a barcode corresponding to the serial number.

In at least some implementations, PADD hardware includes a shoulder or carry strap, or a removable snap-clasp which mates with a snap-clasp of a should strap.

In implementations utilizing a dedicated communications device, the device preferably includes a power button or switch.

A contemplated accessory for convenience with the PADD includes a carrying pouch or holster for securely holding the PADD when not being used. Such a pouch or holster preferably includes adjustable fabric shoulder strap, of width and length suitable for wearing comfortably over work clothes or a parka. The pouch preferably includes a cover flap with a tongue-in-slot closure, for secure closure, but easy access. Suitable materials for the pouch or holster include, for example, Cordura and composites.

Elements of the Solution: Seal Management Application (SMA)

As described hereinabove, PADDs are configured to communicate with a Seal Management Application (SMA) to effect seal arming and disarming. The SMA further allows a user to view and edit data associated with seals. Such an SMA in accordance with one or more preferred embodiments will now be described. The SMA preferably operates on a desktop computer or terminal in a Windows environment.

SMA: Authentication

The SMA preferably requires an authenticating login before it can be used to see displayed data or to act on that data. The login format is comparable to those commonly in use, i.e. logging in may require an ID and password combination. Login credentials are set up via a utility in the SMA. Login credentials are associated with both a user identity and an entity identity. This entity identity is used to identify the entity, such that seal data for all seals assigned to (or owned by) that entity are forwarded to only those SMA instances using login credentials associated with that entity.

Each user identify is preferably associated with one of four authorization levels. These levels include a "Standard User" level, which has restriction permissions; an "Administrator/supervisor" level, which enables all features and capabilities regarding the user's seals, but excludes DHS functionality; a "Read-only" level; and a "DHS" level. DHS level authentication shall enable a user to read any/all data regarding any seal, regardless of whom it is owned by; place indicators in a seal's shipment record that correspond to those of the Automated Targeting System used by US Customs; and change or remove those indicators.

A user's login ID is stored in an action log together with actions to identify who took a given logged action. This action log is viewable by users with administrator level permissions.

SMA: Data Management

Figure 33:
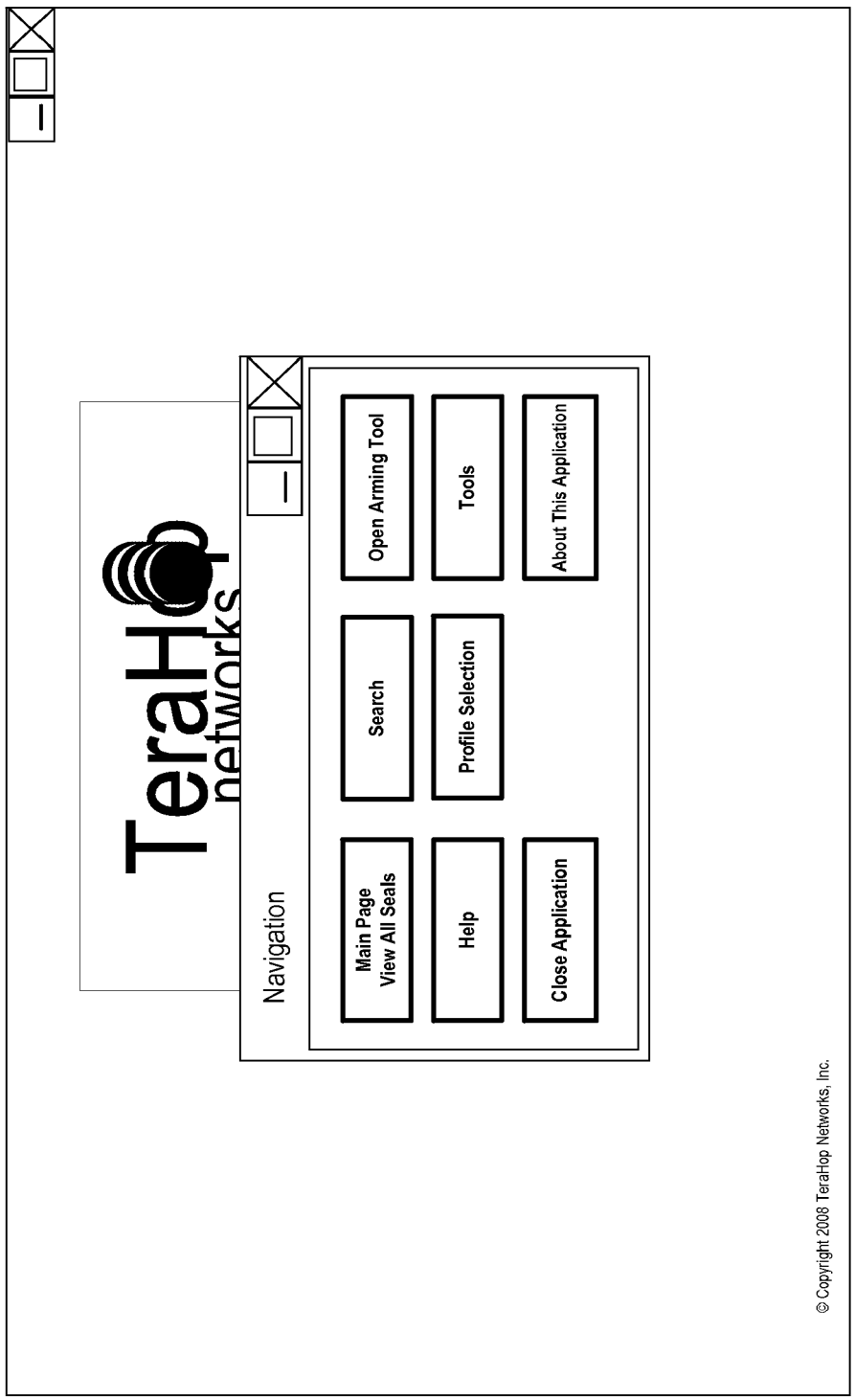
FIG. 33 illustrates an exemplary navigation menu of software for the SMA.

Upon logging in, a user is preferably presented with a navigation popup. FIG. 33 illustrates an exemplary navigation menu. The SMA preferably includes a main page a user can navigate to by clicking a main page button from the navigation popup. FIG. 6 illustrates an exemplary main page. This page is sort-able by column header. The main page is populated with the data for all seals that are currently assigned to (i.e., owned, rented, or leased) by the entity associated with the user's login credentials. The common name of this entity, such as, for example, "Fenwick Logistics", is preferably displayed, as illustrated in FIG. 6.

Notably, the "Last Reported Location", is preferably the common name that corresponds to the Area ID of the location that most recently reported the presence of that seal. It may indicate one terminal of a multi-terminal port, e.g. Charleston Wando, the common name of a ship, e.g. SS Minnow, or the common name of a truck stop, e.g. "Big Bob's 66". In an alternative implementation, however, the location name instead corresponds to a gateway router last associated with the seal.

Furthermore, it should be understood that use of the term "location" in this particular context is considered to a coverage zone or coverage "island" that is covered and defined by a gateway or network of gateways. A Seal may be simultaneously in multiple locations. For instance, a Seal may be within the location of a ship docked at a port. It's physical presence within overlapping coverage areas, however, does not define its "presence" within those locations; instead, presence is defined with regard to the location of the gateway—or network of gateways—by which the Seal communicates or last has communicated.

When any row on main page is clicked, navigation is effected to a current summary page. FIG. $$2C illustrates an exemplary current summary page. The current summary page summarizes current data pertaining to the seal/shipment of the clicked row.

An "Add Missing Data" button is configured to open a popup that enables the user to add information about the shipment that may not have been available previously (e.g., if the Seal were armed at an unmonitored location). FIG. 34 illustrates an exemplary such popup.

A "Read Shipment Notes" button is configured to open a popup (or an MS Notes-like applet) that presents all notes that were added to the seal/shipment record from PADDs, stored by the seal number. The notes are displayed in most-recent-to-oldest, i.e. LIFO, order, going back at most 90 days. Notes are kept for a rolling 90-day period, then automatically overwritten. Notes are not be editable, however, notes may be added by a user.

A "Location Details" button is configured to open a location details popup. FIG. 35 illustrates an exemplary such popup. Selecting "View Map" from the navigation buttons causes a mapping application to open that automatically maps the location per the stored location, such as, for example, Google Maps.

A "Location History" button is configured to effect display of a location history page that displays the history of a shipment/seal, going back no more than 365 days. FIG. 36 illustrates an exemplary location history page.

An "Alarm Details" button is configured to effect display of an alarm details page. FIG. 37 illustrates an exemplary alarm details page. If the displayed data is for a seal that is currently in use, then a "Current" tag is conspicuously displayed.

An "Arm/Disarm History" button is configured to effect display of an arm/disarm history page. FIG. 38 illustrates an exemplary arm/disarm history page.

SMA displayed data shall refresh automatically every 60 seconds, for all open or displayed popups and screens.

On the Main Screen, for those seals (by seal UID) that have had a change in status since the previous refresh, their entries move to the top of the displayed list. This refresh forces the display to sort the remainder of the entries by seal UID, and the display stays in this sorting until changed by the user or by a subsequent refresh. Those entries that have had a change in status are also highlighted by a change in font, color, or cell color. Preferably, upon each refresh, the SMA causes an audible sound to be emitted by the user's computer if there has been a change in any status indicator of any seal that is associated with the user's entity. Those status indicators include, for example, use status, security alarms, and a last reported location. The type of sound is user-selectable via the Windows Control Panel. The user may disable this feature.

The SMA includes a search function, which is activated when a user clicks a "Search" button. This function enables the user to enter any one of the four seal association numbers and have the "Current Summary" page of that seal/shipment be displayed. FIG. 39 illustrates an exemplary search popup. Notably, the search function only operates on any seal number belonging to the user-entity or on any other argument that is currently associated with one of the user-entity's seals. The SMA preferably also supports barcode reading as an entry method for a search. Searching further preferably accommodates the user of wildcards.

The SMA preferably allows a user to store PDF or Word files, such as, for example, manifests, and to subsequently view and print them. Viewing and printing may be executed by the opening of Acrobat or Word, if available on the user's computer.

SMA: Seal Profile Association

Figure 41:
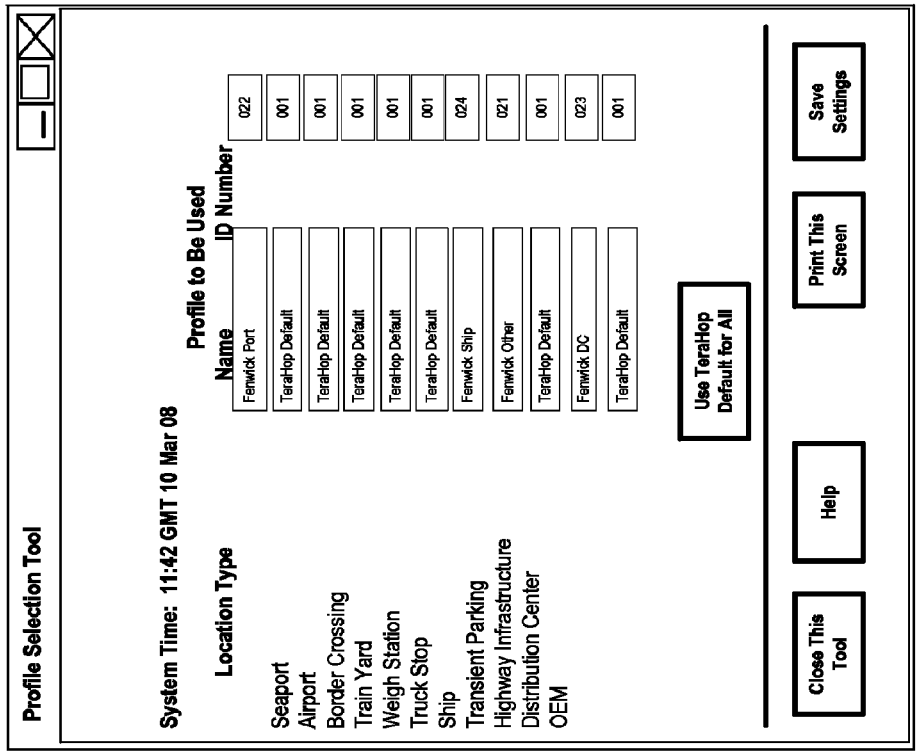
FIG. 41 illustrates an exemplary profile selection tool popup screen of the SMA.
Figure 40:
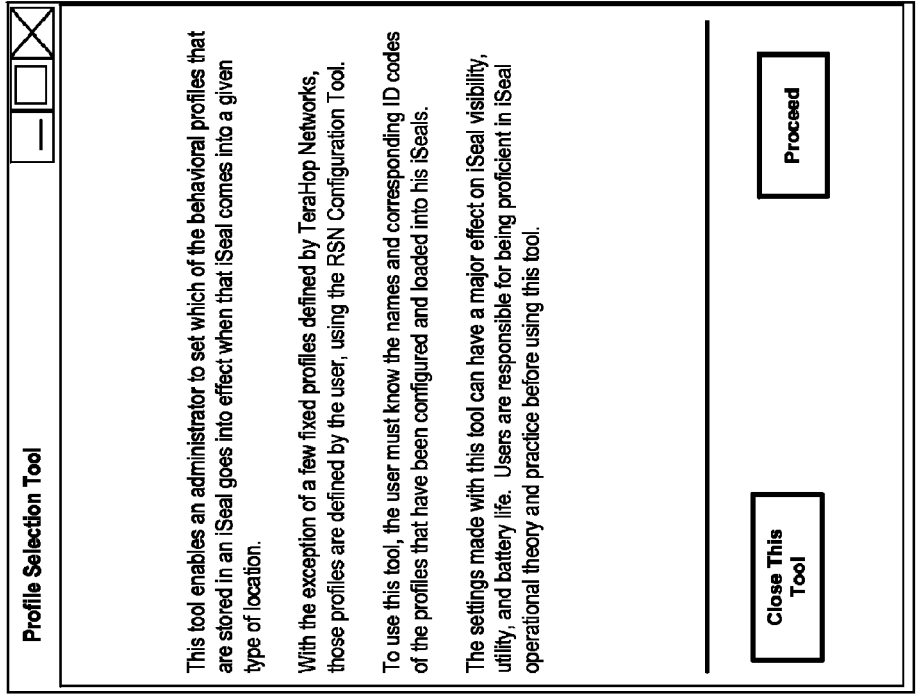
FIG. 40 illustrates an exemplary profile selection tool intro popup screen of the SMA.

The SMA includes a profile selection tool which allows for configuring the association of network location types with seal profiles. Notably, this tool is only available to administrators. FIG. 40 illustrates an exemplary profile selection tool intro popup, and FIG. 41 illustrates an exemplary profile selection tool popup.

The configuration table is, by default, populated with the standard default profile for all location types. The user may change any of the default associations by manually entering other profile identifiers. Notably, these profile identifiers must correspond to profile identifiers of profiles stored in one or more seals to have any effect, but this is preferably not checked by the utility.

Profiles are stored in a seal using an RSN/seal configuration tool. Preferably, profiles stored in seals are be engaged upon a seal's registration with a given location. A location-type indicator is included with the registration-event message sent from the location to the user's instance of the SMA (or to the database that it accesses), and that indicator is compared to the stored location-type-to-profile association established by this tool. A message is then sent from the SMA to the seal instructing the seal to engage the matching profile.

If no such profile is stored in that seal, then a database, e.g. a Tag Configuration Database (TCD), where the profile may be found is queried. If found in the database, the profile is then downloaded into the seal and engaged. If no profile is found, then the profile that is currently engaged remains engaged.

If it is sensed or determined that the currently engaged profile of a seal is harmful or inappropriate, then the location gateway server sends a profile-error message to a user-identified address, causes a similar message to be presented on the SMA, and forces the seal to engage the default profile.

Preferably, a managing entity is able to override, i.e. block or possibly change, profiles, such as, for example, to curb inappropriate profile-driven behavior.

SMA: Arming and Disarming

Figure 42:
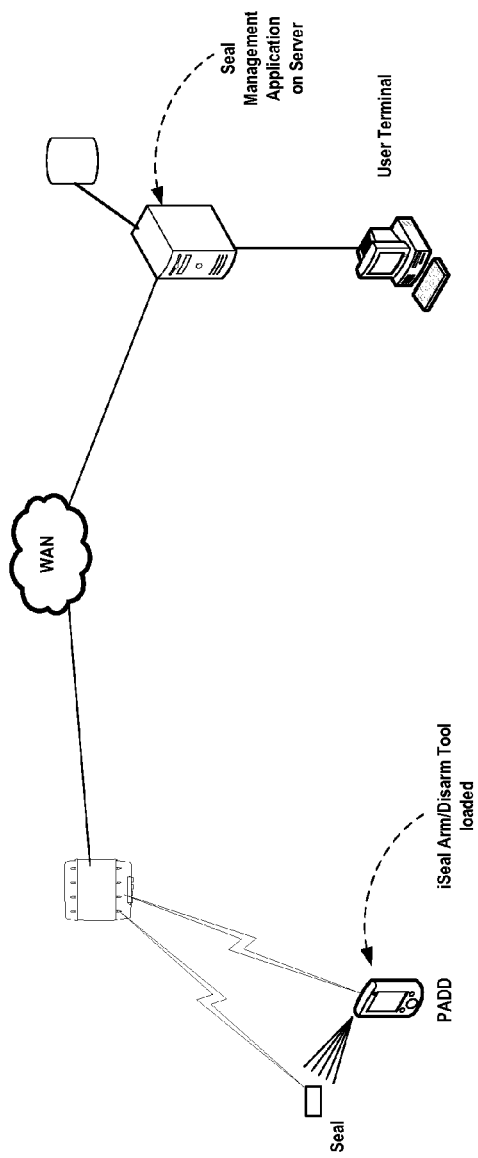
FIG. 42 illustrates that the SMA is configured to communicate with a PADD to effect arming or disarming of a Seal as outlined therein.

The SMA is configured to communicate with a PADD to effect arming or disarming of a seal, as outlined in FIG. 42. Specifically, the SMA opens an arm/disarm session upon receipt of an appropriate message from a PADD; sends a confirmation to the PADD of each arm/disarm step; makes and records an association between a seal UID, a bolt number, a container number, and a shipment number; checks the validity of the seal UID and the other supplied numbers and communicates confirmation of such validity to the PADD; and sends and records authorization to open/disarm a seal. Notably, this interaction does not require the participation of a user at the SMA.

The SMA preferably also includes an arm/disarm tool which provides functionality substantially similar to that of a PADD to enable a user at a seal who does not have a PADD to arm or disarm a seal with the assistance of a remote SMA user.

SMA: PADD Management

The SMA preferably includes a utility configured both to block access of any specific PADD with respect to seals associated with a specific entity, and to disable a PADD for all seal functions, regardless of entity. This utility is available only to administrator level users. This utility requires the user to enter a specific PADD's ID number.

The utility provide the SMA user the choices of: preventing data retrieval or entry from that PADD for seals associated with the SMA user's entity; disabling the PADD for all seal functions; or re-enabling the PADD for all seal functions, which also re-enables a PADD that was blocked for repeated invalid login attempts.

Operational Characteristics And Features Of The Solution

The following relates to operational characteristics and features of the Solution.

Operational Characteristics: No Seal Transmissions Unless Prompted

The Seals preferably do not transmit (by any means) unless prompted/triggered to do so. Prompts/triggers may include: activation during an arming process; bolt cutting and/or bolt removal; response to a gateway broadcast; response to a PADD-originated message; triggers from onboard sensors; triggers from external sensors; and requests for hopping from other Seals of an acceptable class.

Operational Characteristics: Event Records and Date/Time Stamp

All sensor events, all changes in presence status, and all changes in state (whether commanded or automatic) preferably result in an Event Data Record (EDR) describing the event and having a date/time stamp. If at a monitored location, the date/time stamp preferably includes a location indicator. If communications are available, all EDRs preferably are immediately reported to appropriate network elements and to applications. If communications are not available, then EDRs are stored/buffered until communications are available, whereupon stored EDRs preferably are reported immediately Operational Characteristics: Presence Detection & Reporting, General Case The Solution preferably is capable of establishing presence, as described in the incorporated patent references and discussed elsewhere herein. The Solution further preferably is capable of reporting presence (and changes thereof) in user applications by user-selected association attributes (e.g., by container number, shipment number, etc.). The Solution preferably automatically attempts to report to appropriate user applications any instance of a change in presence status. If communications are not available for reporting, then a data record of the event is stored until communications are available, whereupon the report is automatically made, preferably immediately. The Solution also preferably is capable of reporting a Seal's presence location by the location's gateway common name. Additional information about the location (e.g., lat/long) preferably is able to be queried by the user application.

Operational Characteristics: Special Content for Inbound Seal Messages

In addition to content that is required for establishing network formation and path set-up, all inbound Seal messages preferably include: a flag setting indicating whether the Seal has a bolt in; a flag setting indicating whether its current bolt-state is authorized; and the serial number of the bolt currently in, if any. The flags preferably are set by receipt of radio messages originating from appropriate applications. The data preferably is reported to appropriate applications.

Operational Characteristics: Loss-of-Contact Reporting

The Solution preferably is capable of detecting and automatically reporting to designated applications when network contact has been lost with a registered Seal. The user application determines whether the loss-of-contact state warrants raising an alarm and by what means. The reporting location preferably corresponds to the gateway with which the Seal was most recently registered. That location is identified in the user application by the location's gateway common name. Additional information about the location (e.g., lat/long) is able to be queried by the user application. The Solution supports user applications' being able to configure under which conditions an alarm is raised (e.g., time-of-day at the reporting location).

Operational Characteristics: Auto Revert to Free State

The Solution operates such that any Seal that was registered with a given island location automatically reverts to a free state when it can no longer communicate with the GW of that location. The conditions that must be met before reversion occurs are configurable using a Configurator. The conditions are configurable such that a given Seal may behave differently depending on the type of island location with which a Seal might register. For example, the conditions for a port may be different from those of a ship. Preferably, a Seal includes different profiles each corresponding to a location or a particular type of location.

Operational Characteristics: Message ACK

Acknowledgements of receipt of a message by an intended recipient (ACK) are preferably provided in accordance with the networking protocol that is used in any given implementation.

Operational Characteristics: Multiple Entities Per Island

A system of the Solution preferably is be capable of handling/managing Seals from multiple entities sharing the infrastructure of a given location. The sharing includes: GW-to-Seal messaging; GW-PADD messaging; collecting and reporting of tracking data in the Seal Management Applications; and importing/exporting Seal data to users' logistics management applications.

Operational Characteristics: Seal Deactivated State

The Solution includes a means to put Seals into a deactivated state. The Deactivated state is one in which Seals are not in use for sealing purposes, nor expected to be used for an indefinite period. This state is for use when Seals are taken out of service, for relocation, storage, maintenance, etc. Seals is rendered into the Deactivated state by receipt of a radio command that originates from an appropriate application or by other means as may be defined elsewhere herein. Upon receipt of a de-activation command, Seals shall issue a message to the effect they are going to de-activate. If Seal is rendered into a Deactivated state, all stored/buffered data still in the Seal are preserved. When in this state, Seals are not registered with any local island network and do not respond to any radio signals. When in this state, Seals can be activated only by insertion of a compliant bolt. See "Standard Activation and Association with a PADD."

Operational Characteristics: Seal Idle State

Similarly, the Solution includes an Idle state for Seals. The Idle state is the state that a Seal is in immediately after its bolt has been removed and all messaging related to bolt-cutting and removal has been completed. A Seal may come into the Idle state only after it was previously activated (by the insertion of a bolt). A Seal may stay in the idle state indefinitely. Check-in frequency is configurable for specifically the idle state, with a default value. The default frequency is once per week. When in the Idle state, the Seal may be registered or it may be commanded to enter the deactivated state, if registered.

Operational Characteristics: Seal Standard Activation and Association Using a PADD|aka "Arming"

Arming/sealing generally refers to the act of inserting/seating a bolt in the bolt housing. A Seal is armed/sealed when a bolt is seated therein. Association is the act of associating the Seal's ID number with the ID numbers of the other container and shipment elements, and confirmation is received from the SMA, as described below. Before sealing, the Seal is attached to the designated container and aligned, the doors are closed, and the handle hasp is positioned into place. The steps for standard association includes (but do not necessarily need to follow the order of): a user being at the Seal, having a PADD that is in communication with the SMA and other required system elements, and whose application is running and ready to arm a Seal, with the Seal being in communication with the system; selecting "arming" from the PADD navigation interface, whereupon the PADD prompts the user to read the Seal's UID (which preferably is done using a barcode scanner of the PADD, else using the PADD's keyboard); prompting the user, by the PADD, to activate the Seal; if not already active, then activating the Seal by the user by inserting a bolt (any bolt that meets the dimensional and conductive requirements of the orifice will minimally suffice, whereupon activation causes the Seal to perform self-diagnostics; passing then causes the Seal to interact with the System and cause arming/association messages to be displayed on the PADD, as described further below, and failure causes a Seal-failure EDR to be generated and sent to the system, and causes a Seal-failure message to be displayed by the PADD, prompting the user to use another Seal and to have the failed one serviced, whereupon the failed Seal then automatically goes into the dormant state; upon successful activation, causing an EDR to be sent to the system to signal that a Seal has been activated (e.g., for billing purposes) and to await subsequent association steps; and then automatically sensing by the Seal whether the bolt is an e-bolt and, if an e-bolt, then automatically attempting to read the serial number of the e-bolt by the Seal, and if not an e-bolt, then the Seal, SMA, and PADD function so as to display a message to the user that he needs to enter the bolt serial number manually. The process additionally includes: once a serial number has been successfully entered, then displaying by the PADD a positive-progress indicator (e.g., a green light or checked box) and issuing a short beep, then prompting the user to enter the container number; entering the container number using the PADD's keyboard (and clicks "Enter," as required); checking, by the system, the container number for proper syntax and, if an issue arises, then prompting by the PADD the user to re-enter the data with a popup and, once successful with the container number, displaying by the PADD a positive-progress indicator (and beeps), and then prompting the user to enter the shipment number. Once that number has been entered, the PADD displays a positive-progress indicator (and beeps), and the PADD asks the user whether to arm the seal (i.e., execute final association) with a Yes/No choice. If the user selects "Yes," then final association is made and recorded by the system, accompanied by a positive-progress indicator and a triple beep from the PADD. The completed association (with all the IDs and numbers) is recorded as an EDR, such that a check using the SMA shows that the Seal status is "Authorized." An indicator of the authorized status is also set in the Seal, along with a record of the bolt serial number. If the user selects "No" for arming, then all previous steps of the association are purged (and the associations revert to zero). Moreover, if an e-bolt serial number is not read successfully (Seal and system make as many attempts as can be done in five seconds), then: the PADD displays an error popup, displays a negative-progress indicator (a red light or "x" box), issues a long beep, and prompts the user with a choice to try a new bolt or to enter the serial number manually. Regardless whether by trying a new bolt (of either type) or by manual entry of the serial number, if the association fails a second time, then a Seal-failure EDR is generated, the Seal enters the dormant state, and the PADD displays a message to the effect that the Seal needs service. A Seal shall not be able to be associated without a bolt that fits and is secure in the bolt orifice. Additionally, entering and associating the container's transport chassis number is incorporated into the process and data records.

Operational Characteristics: Standard Seal Opening Using a PADD

A standard Seal opening is one that is legitimate/authorized and that otherwise meets the criteria below and set forth in Table 1 of FIG. 28. In this respect, standard opening of a Seal occurs when a worker is present at the Seal and is able to physically manipulate it and has a PADD, and when the Seal and PADD are in communication with appropriate applications. The process includes: the worker using the PADD to read the Seal's UID, whereupon the PADD indicates to an appropriate application that the Seal is about to be opened legitimately, and receives authorization for such; the worker cutting the bolt and pushing the remainder of the bolt out of the Seal; and the reporting of EDRs to appropriate applications by the Seal. EDRs (with date/time stamp) for a standard Seal opening include: the granting of an authorization event; the Seal UID; the Bolt serial number; an identification of the PADD to which the authorization was granted; the Bolt cut event or bolt push-out event; and the location (GW common name) at which the Seal was located when Bolt was cut. The facilitation accommodates an e-Bolt, which, when cut, causes the Seal to report an opening. The facilitation also accommodates a non e-bolt, which, when pushed out of the Seal's bolt orifice, causes the Seal to report an opening (due to the detection of the absence of the bolt in the orifice). This facilitation follows a step-by-step-with-confirmation process that requires input from the worker. Confirmation includes screen messages and/or colored light indicators. Process includes, via the PADD, an offer to the worker to immediately de-activate the Seal. If a new bolt is not inserted within five days of an authorized opening, then the Seal automatically de-activates itself.

Operational Characteristics Non-Standard Seal Association

Seals may be Associated only after activation. Activation may be achieved only by insertion of a compliant bolt into the Seal's bolt-orifice. If a compliant bolt is unavailable, then no activation nor Association can occur. Non-standard Association is any association that otherwise does not meet the conditional criteria required for standard Seal Association. Seals that have non-standard Association shall handle subsequent bolt-cut and other sensor events as if the Seal were fully Associated. The network/system shall also handle subsequent bolt-cut and other sensor events as if the Seal were fully Associated. The Solution and its processes shall facilitate non-standard Association for the following scenarios: o Seal is not registered with any location, and no PADD is available (either due to the lack of a useable PADD or because there is no PADD-to-application communications), and no communications between the worker at the Seal and someone with access to a Seal Management application are available. Seal is not registered, but a PADD is available. o Seal is not registered, and no PADD is available, but communications between the worker at the Seal and someone with access to a Seal Management application are available. o Seal is registered, and no PADD is available, but voice communications between the worker at the Seal and someone with access to a Seal Management application are available. Seal is registered, but no PADD is available, and no communications between the worker at the Seal and someone with access to a Seal Management application are available. Refer to Appendix B for a table that describes how each scenario is handled.

Operational Characteristics: Non-Standard Seal Opening

A non-standard Seal opening generally is any Seal opening that does not meet all of the conditional criteria of a standard Seal opening. Any and all Seal openings that involve the cutting or removal of a bolt of an activated Seal is detected and reported. Moreover, any and all openings are reported immediately, provided communications to an appropriate user applications are available. Storage (buffering) of any/all opening messages is available when communications to an appropriate user application are not available, within the limits of RSN and GW capabilities, and any and all Seal openings are then auto-reported when communications become available. User applications determine whether to raise an alarm based on the reports, in accordance with configuration settings and user preferences. The Solution and its processes facilitate non-standard openings for the following scenarios: Seal is not registered with any location, and no PADD is available (either due to the lack of a useable PADD or because there is no PADD-to-application communications), and no communications between the worker at the Seal and someone with access to a Seal Management application are available; Seal is not registered, but a PADD is available; Seal is not registered, and no PADD is available, but communications between the worker at the Seal and someone with access to a Seal Management application are available; Seal is registered, and no PADD is available, but voice communications between the worker at the Seal and someone with access to a Seal Management application are available; and Seal is registered, but no PADD is available, and no communications between the worker at the Seal and someone with access to a Seal Management application are available. Table 1 of FIG. 28 illustrates the handling of scenarios regarding non-standard seal openings.

Operational Characteristics: Security Flags

Security flags (or their absence) are data notations that are used to indicate to Solution applications that some unexpected or suspicious condition exists regarding a Seal's sealing and opening. The Solution is capable of generating, accepting, setting, and responding to security flags as specified elsewhere herein.

Operational Characteristics: Motion Detection and Reporting|Mechanical Shock Detection and Reporting For Activated Seals, the System is capable of detecting motion or mechanical disturbances that would be consistent with tampering with the Seal, circumventing the Seal, breaching the container, and moving (rolling, carrying, lifting, etc.) the whole container. Whether this detection capability is active is configurable with THN configuration tools and appropriate user applications. Solution shall attempt to report any/all detected-motion event data immediately, provided communications to an appropriate user applications are available. Solution shall provide storage of any/all motion-detected event data when communications to an appropriate user application are not available, within the limits of RSN and GW capabilities. Solution shall provide auto-report of any/all detected motion events when communications are restored. The user application shall determine whether to raise an alarms and by what means. when communications are restored. Detection threshold is configurable as described in RSN Requirements.

Operational Characteristics: Preferential Registration (Minimizing Registration Confusion Among Multiple Islands)

Solution is capable of causing Seals to register preferentially with certain types of islands when multiple islands are in close proximity. (For example, Seals may be set to prefer to register with a port over any other island type when Seals may be able to "hear" other islands in the vicinity of a given port.)

Seal Visibility Seal Status, and Notifications

A user is able, via an appropriate user application, to view the current (or last-known) island location of his (and only his) Seals and the current (or last-known) status of his Seals' sensors. Visibility is selectable by a user from any of: Seal UID; container number; and shipment number. This capability is available in a simple standalone Seal Management Application (SMA), loaded on users' computers or servers. This capability also is available in a simple Seal Management Application (SMA), available to users online via an Internet connection, which online application appears and functions generally in the same form and manner as the standalone application. A user and is able, via the online application, to select any one of his (and only his) Seals by any of its associations, then select a type of change in Seal status of interest (from a defined set), and the System automatically sends a notification to a user-selected address notifying (the user) when the change occur, as reported by the Seal or gateway in the System. The set of status changes includes changes in: activation; association; cut or removal of a bolt; change in location (moves to another island); movement or disturbance (any kind); and deactivation. Methods of notification that are selectable by the user include: email; text message; and an API message that causes a popup to appear on a target application.

Operational Characteristics: Logistics Management Integration

Data feeds and exchanges of commands are supported such that Seal visibility, status monitoring, notifications, auto-alarming conditions setting, and querying can be conducted using selected commercial logistics-management applications.

Operational Characteristics: Seal Low-Battery Alert

A Seal having a low-battery condition is detected and reported to appropriate user applications.

Operational Characteristics: EDR Collection and Upload

System and devices shall collect and upload EDRs to appropriate servers as defined in RSN Requirements, GW Requirements, and in Network Protocol and other system-operation documents.

Operational Characteristics: Intermittent Connectivity

The Solution accommodates intermittent communications connectivity, including: Seal to GW; Seal to Seal; GW to GW; and GW to WAN.

Operational Characteristics: Auto GC Backup & Reconfigure

System shall accommodate having redundant GCs (or a GR that can take over as a GC) at a single location and automatically reconfigure to accommodate failure of a GC, so as to minimize loss of capability, functionality, and data at that location.

Operational Characteristics: System Capacity, Scalability & Hopping

Preferably, A system in accordance with the Solution is able to manage simultaneously, at a single monitored site, and with no degradation in network or operational performance: at least one hundred Seals; at least ten gateways; at least four Seal-to-Seal hops; and capacity increases to one thousand Seals; to fifteen Seal-to-Seal hops; and capacity increases to ten thousand Seals and fifty gateways.

Operational Characteristics: RF Range

Preferably, the LOS range between any GW-Seal or Seal-Seal pair is 100 feet minimum and an average of 300 feet, in a port environment.

Operational Characteristics: Latency

System shall render average latency between a Seal event and reporting of the event to a user application of no more than 5 seconds, excluding WAN set-up time, including any/all local network communications and hand-offs.

Operational Characteristics Data Security

Electronic and other security means is employed to inhibit interception, deciphering, and/or corruption of messages/data by those persons or entities for whom the messages/data are not intended. Applies to Seals, GWs, and PADDs.

Operational Characteristics: Ignore Mass Movement

System shall ignore mass movement—events for which many Seals report movement at the same time, from the same location (e.g., an earthquake).

Operational Characteristics: Shared Infrastructure

Seals and infrastructure (e.g., GWs and data links) and their supporting and constituent software shall accommodate sharing among the different entities using the ports, terminals, and other non-private locations where infrastructure is deployed. This sharing shall also accommodate private hopping and security of data that those entitles do not wish to be read by others when using shared infrastructure.

Operational Characteristics: Government Data Access

System/Solution accommodates access by authorized agents of governments to Seal, container, and shipment data, in accordance with local laws.

Operational Characteristics: Seal Authentication & Validity

The Solution incorporates means to check Seal authentication, as well as validity to be "on the network" and to use the network services. Any discrepancies with any given Seal causes an appropriate flag to be rendered in the Seal and network management applications, as appropriate. Discrepancies may also cause other actions to occur, including: changes in billed charges & rates; no forwarding of Seal messages; no forwarding of messages to Seals; deregistration of Seals; and/or deactivation of Seals.

Operational Characteristics: Auto-Sense of Bolt Status

Seals is capable of detecting, storing, and reporting whether a bolt is seated in the bolt orifice. This capability engages upon proper seating of a bolt. Seals is capable of detecting, storing, and reporting the event of cutting of an e-bolt. The Seal is capable of detecting, storing, and reporting the event of the removal of any seated bolt.

Operational Characteristics: Auto-Sense of Bolt Type & Reading of Serial Number

Seals is capable of sensing, storing, and reporting whether a seated bolt is a e-bolt or an ordinary bolt. If an e-bolt, Seals is capable of reading, storing, and reporting the electronic serial number of such a bolt.

Operational Characteristics: Standard Seal Opening (AKA Disarming)

A standard opening, i.e. disarming, of a container having an armed seal requires that a user is at the Seal, he has a PADD, the PADD is in communication with the SMA and required other System elements, the PADD application is running and ready to disarm the Seal, and the Seal is in communication with the System. Notably, the following steps accomplish such a standard opening, but it will be appreciated that the order of these steps may be varied.

First, "Disarming" is selected from PADD navigation. The PADD then prompts the user to read the Seal's UID. Preferably, the Seal's UID is obtained by scanning a barcode located on the Seal with a barcode scanner of the PADD, but alternatively may be obtained by user entry via the PADD's keyboard. The System checks the entered Seal UID against the list of those that are associated with that user, i.e. his entity, per his login. If the entered Seal UID is invalid for that user, then a popup is presented on the PADD to that effect. The user can acknowledge the popup to proceed, and may thereafter try again. If, on the other hand, the entered UID is valid, a disarming session is opened in the SMA, and the System is alerted that an authorized disarming of that Seal is in progress. Upon successful entry of the Seal's UID, a positive-progress indicator (and beep) is displayed on the PADD. A popup is then displayed to prompt the user to cut the bolt and to push a stub of the bolt out of the Seal. Upon successful removal of the bolt stub, a positive-progress indicator (and beep) is displayed on the PADD. Further, a popup is displayed to notify the user that disarming is complete. Upon successful completion, an EDR is generated, the Seal enters a stand-by state (and has no bolt serial number associated with, and the SMA database is updated to indicate that the Seal is in the stand-by state.

Operational Characteristics: Arming in Un-Monitored Locations

Preferably, Seals are capable of being armed in un-monitored locations, i.e. locations that have no network or in which the Seal cannot communicate with the System. When in an un-monitored location, if not already armed, a Seal preferably arms upon insertion and seating of a bolt. The date/time of the bolt-insertion event, and that it occurred without System communications, are stored in the Seal. If using an e-bolt, the Seal reads the e-bolt's e-serial number and stores that number in the Seal as well. At the first opportunity to do so, the Seal reports these events to the System. Preferably, because the events occurred without System communications, the Seal status displayed in the SMA for this seal is flagged as "Unauthorized." Notably, if there are subsequent bolt or other anomalous events detected by the Seal, they are either reported or stored, as for a fully-associated Seal. The Seal and the System shall otherwise behave as if the Seal had been fully associated.

Operational Characteristics: Remote/Non-Standard Seal Arming & Association

Seal and System shall accommodate arming and associating Seals when at monitored locations, under the following non-standard conditions: there is a person at the Seal in voice communications with another person who has access to the SMA, but the person at the Seal has no usable PADD; and/or there is communications between the System and SMA, and between the System and the Seal; the Seal is in good working order and its UID can be visually read or is otherwise known and a compliant bolt is available. The Solution further shall accommodates using serial numbers and IDs that are visually read by the user at the Seal, and communicating by voice with the person using the SMA, to complete the same arming/association steps as described above in "Standard Arming and Association." A Seal so armed and associated is treated as if armed by the standard process (i.e., no special flags to indicate anything out of the ordinary).

Operational Characteristics: Remote/Non-Standard Seal Disarming

The Solution accommodates disarming Seals when at monitored locations, under the following non-standard conditions: there is a person at the Seal in voice communications with another person who has access to the SMA, but the person at the Seal has no usable PADD; there is communications between the System and SMA, and between the System and the Seal; and the Seal is in good working order and its UID can be read or is otherwise known. The Solution further accommodates using the visually-read Seal UID and communicating by voice with the person using the SMA, to complete the same disarming steps as described above in "Standard Seal Opening." A Seal so disarmed is treated as if disarmed the standard process (i.e., no special flags to indicate anything out of the ordinary).

Operational Characteristics: Seal Opening Detection and Reporting—Presumptive Breach Case The presumptive-breach case for opening applies when a Seal is opened when the Seal's UID cannot be read and reported, including when not at a monitored location; when the bolt-reading/status capability of the Seal is defective or damaged (e.g., due to vandalism); when at a monitored location, but there is no access to a usable PADD (due to PADD failure, login failure, communications failure, etc.); and/or when at a monitored location, and a usable PADD is available, but reading or entering of the Seal's UID fails. If a Seal has an e-bolt inserted, then: any time that the e-bolt is cut, the Seal attempts to establish contact with the System (via a GW). If contact is established, then the Seal sends a Seal-breach message to the System and SMA. If contact with the System cannot be immediately established, then the Seal stores the event data internally and reports the event data (and Seal-breach message) to the System at the first opportunity. If a Seal has an ordinary bolt inserted, then: any time that the bolt is removed from the bolt orifice, the Seal attempts to establish contact with the System (via a GW). If contact is established, then the Seal sends a Seal-breach message to the System and SMA. If contact with the System cannot be immediately established, then the Seal stores the event data internally and reports the event data (and Seal-breach message) to the System at the first opportunity.

Operational Characteristics: Activated-But-Not Armed State

An idle state is a state that Seals are in when they are fully functional and ready to be used for a shipment, but either no bolt is seated in the bolt orifice, or battery-conservation measures are in effect (e.g., no hopping assists, long check-in periods, etc.). The System is capable of using the entering or leaving of this state to trigger billing-rate changes Operational Characteristics Dormant State The dormant state is for use when Seals are taken out of service—for, long-term storage, maintenance, etc. Seals are put into this state by either an appropriate wireless command, or a command received over the RSN electro-mechanical data interface of a Seal. Seals in this state do not respond to any RF signals. The Seals preferably are awakened to a stand-by state by insertion of a special (e.g., non-latching) bolt in the bolt orifice or by a defined interaction with the Seal's magnetic switch (e.g., 3 triggers in rapid succession). When a dormant Seal awakens (and is in a covered location), the Seal reports to the system, and the system reports its location and generates an EDR to appropriate network and user applications. A dormant Seal stays in the dormant state until it receives an awakening command. The System is capable of using the entering or leaving of this state to trigger billing-rate changes.

Operational Characteristics: User Memory Capacity & Clearing

Seals preferably have user file-storage capacity of about 8 MB. This capacity is addressable for read and write by an appropriate user application, assuming network connectivity. User memory is clear-able by command from a user application (e.g., from the SMA), again assuming network connectivity.

Exemplary Walk-Through: Flute Shipment

A walk-through example of the transportation of a shipping container of flutes from an origin to a destination in accordance with the Solution—and the resulting advantages—are now set forth for purposes of facilitating understanding and appreciation of the Solution.

As described herein, a system of electronic container security seals may be used in transoceanic and intermodal shipment of ISO containers, and products and systems such as those described hereinabove are deployed and used to manage those seals and the associated containers. The operation of these products and systems in such an implementation may perhaps be better appreciated through the following exemplary illustration, wherein a shipment of goods from a Chinese manufacturer to a U.S. buyer is traced in order to explain how these products and systems may be used to track that shipment.

In the exemplary illustration, a U.S. company, Smith Band Instruments, Inc., of Abilene, Kans., contracts with the Wang Chung Musical Instrument Company, of Suzhou, China for the manufacture of products, to be shipped from Suzhou to Abilene. In particular, as has been their practice since outsourcing manufacture of their low-cost flute line five years ago, Smith places the spring issue of their bi-annual orders for flutes from Wang Chung. Smith orders bi-annually so as to get a favorable price for the flutes, which is a major consideration for their low-cost line, which is aimed at junior-high musicians.

There is also considerable expense for arranging, managing, insuring, and transporting shipments, further justifying bi-annual ordering. The combination of low-cost outsourcing to China plus tight controls on the timing of the arrival of shipments reduces Smith's cost of goods sold (COGS), as well as increases their cash flow.

However, by having two large orders per year, they have a considerable investment in each shipment, of which the loss or disruption of just one could have severe consequences. Specifically, for each shipment, Smith orders about 10,000 flutes. This quantity yields a nearly-full 20-foot ISO-standard shipping container load. It also yields a shipment value of about $16M.

So, to mitigate the risk, they choose Westco Shipping of Tacoma, Wash., to handle all the shipping arrangements between Suzhou and Abilene. Westco handles or manages the shipments end-to-end, making arrangements for all handling, drayage, storage, inspections, document preparation, transport, etc. In China, they use trusted contractors, while in the US, they handle some of the shipments themselves, as well as use other trusted handlers and transporters.

Smith has been quite pleased with Westco's performance since they started their outsourcing to China. However, by deploying the products and systems described hereinabove to security-seal the container doors and otherwise to monitor the movement and condition of containers, Westco enhances their management and control over high-importance shipments like Smith's.

Exemplary Walk-Through: Loading & Departure from Wang Chung

When Wang Chung completes manufacture and packaging of its spring shipment of flutes to Smith, it fills a container brought to its manufacturing facility by Taigang Logistics of Shanghai, a trusted provider hired by Westco.

While a group of Wang Chung dock workers are loading the flutes into the container, another worker mounts a seal housing to the container door. He then uses a handheld device to access the logistics-management system via Wi-Fi and find the shipment of interest by its shipment number, or to enter the shipment number directly. A dialog via Wi-Fi is then initiated regarding that shipment. He then uses the handheld device to read the seal number (by scanning the barcode), types in the container number as read visually from the container itself, and then enters a command to associate the two numbers with the seal shipment number. All three numbers and their common association are sent via Wi-Fi to a gateway controller located at Wang Chung's shipping dock, and from there to Wang Chung's logistics-management system, which prepares the manifest and other shipping documents.

Once the entire order is loaded and secured, Wang Chung's dock workers close the container doors and insert an e-bolt through the locking hasp on the container door handle and into the seal housing, using the process illustrated in FIG. 4 and described with reference thereto. The insertion of the bolt is sensed by the seal, and the bolt number is automatically read by the seal and associated with the seal number, the container number and the shipment numbers, thereby providing the last identification element needed before shipping. A message that the container has been sealed and is ready for shipment, and that includes the serial number of the seal e-bolt, is sent from the seal to the gateway controller and on to Wang Chung's systems, including the logistics-management server and the logistics-management application, as described elsewhere herein. The logistics-management system sends a message back to the handheld device, via the local Wi-Fi network, that the association has been made. The ready-to-ship condition is confirmed to the dock workers by a green light on the handheld device, and a corresponding message is also relayed (via data link) to Westco and Smith, enabling them to plan accordingly. The logistics-management system also sends a confirmation message to the seal that includes the container number, the shipment number, and the time, date, and location where the association was made. This information, including the e-bolt number and the seal number, is stored in the seal, that it may be retrieved later at other locations and/or by other authorized users. Finally, the yard worker makes it known (per existing procedures) that he has received a "green light" on the handheld device, indicating that the sealing procedure was properly completed and that the container is ready to be picked up.

Loading is completed late in the day, and as a result, the container is scheduled to leave Wang Chung's facility the next morning. Overnight, the facility's gates are locked, and the perimeter security is turned on. Nonetheless, intruders get over the facility's fence and make their way to a container adjacent to the one destined for Smith. The intruders cut the conventional security seal on the adjacent container and open the doors of the container. However, an intruder's grasp on one of the doors slips, and that door crashes into the container destined for Smith. The impact is sensed by the motion sensor in the seal on Smith's container, and the event is immediately reported to Wang Chung's logistics-management system. The night watchman is on the other side of the facility and does not notice the noise. However, the logistics-management system notes that the disturbance occurs outside of normal business hours, which triggers an alarm. Wang Chung has configured the system to cause a siren to blare and all facility lights, indoors and outdoors, to come on, as well as to send an alarm to the local police station and to the mobile phone of Wang Chung's owner.

The night watchman reacts to the alarm. However, by the time he gets to the container, the noise and lights have scared the intruders off. When the police and owner arrive about 10 minutes later, all is back to normal. The owner cancels the alarm.

Meanwhile, the motion and the alarm have also been reported to Westco's logistics-management system. Because it is daytime in Tacoma, and per Westco's configuration of the system, an alert message pops up on the shipping manager's computer screen. She opens the message box and sees when the events occurred and also sees that the alarm was cancelled by Wang Chung shortly thereafter. Seeing that the alarm was quickly cancelled, Westco's shipping manager is confident that the events have been taking care of by Wang Chung. Nonetheless, per procedure, she sends an email message to Wang Chung asking for details.

The next morning, Taigang sends a tractor to truck the container to one of the terminals at the port of Shanghai, to have it loaded on a container ship. Before leaving Wang Chung, the driver collects the manifest and other shipping documents. Moments after the container leaves the Wang Chung facility, its absence is noted by Wang Chung's logistics-management system and is communicated to both Westco and Smith. However, no alarms sound since the absence corresponds with the expected departure of that container, as was previously loaded into Wang Chung' logistics-management system.

Exemplary Walk-Through: At the Port

Since the container is full, Taigang drives directly to the terminal without stopping at a consolidation yard. The container passes through the security checkpoint at the terminal entrance. Gateway controllers located at the terminal detect the seal, and thus the container, as it approaches. The container's presence is reported (via data link from the terminal) to Westco, Wang Chung, and Smith, allowing all three to track the progress of the container and compare it to norms. Since no disturbances have been recorded by the seal during its transit from Wang Chung, the security checkpoint is not alerted that anything is amiss. So, the security checkpoint simply verifies that the container was expected, that it has a parking location, and that it is scheduled to be loaded on the SS Captain Kidd in 2 days time. Once verification is complete, the checkpoint directs the driver to the appropriate location to have the container unloaded from the trailer.

The driver drives the container to the designated yard location, where a yard crane removes the container from the trailer and places it on a stack. By the end of the day, the Smith container is surrounded by other containers, several on each side, and top and bottom.

Much of the movement and jostling of the container during transit and unloading has not triggered disturbance messages to be sent by the seal. Just before departure from Wang Chung, a message from the logistics-management system was relayed by the Wang Chung gateway controller to the seal on the Smith container to go into its in-transit state. Similarly, when the Smith container arrived at the Shanghai terminal, the gateway controller there relayed a message to the seal to go into its at-port state. These states have been configured such that the seal does not respond to normal transit and loading movement or disturbances. For those few movements that did trigger messages from the seal, no alarms were issued since the movements corresponded to expected movements, as stored in Westco's logistics-management system.

However, during the first night while awaiting loading onto the ship, a maintenance crew accidentally bumps the bottom container of the stack in which the Smith container is located. The seal detects the bump and, despite the Smith container's being surrounded by densely packed containers, the seal is still able to communicate with a gateway controller, via hopping, to report the event. The hopping is facilitated by seals on other containers in the yard, most of them on containers not managed by Taigang or Westco.

So, the seal sends a message, received by both the terminal's port-operations system and by Westco, that a disturbance has occurred. Because normal terminal operations are suspended for the night, an alarm is sent to port security. Security immediately dispatches a patrol car to investigate the disturbance and to report back.

Meanwhile at Westco, the timing of the event also triggers an alarm, and the circumstances cause the shipping manager to place a telephone call directly to port security. Just as the call is being answered and language difficulties are worked out, the patrol unit radios back to dispatch what has happened. Security cancels the alarm and explains what has happened to the Westco shipping manager. Before the phone conversation ends, the Westco shipping manager sees from her logistics-management system that the alarm has indeed been cancelled.

All of the incident events are recorded/archive by both Shanghai port security and Westco for later analysis and application towards process improvements.

Exemplary Walk-Through: On the SS Captain Kidd

Two days later, port workers begin loading the Smith container onto the Captain Kidd. Per the loading plan, the Smith container is to be loaded below deck, near the bow, roughly amidships, and about halfway between the keel and the main deck level. As the Smith container nears the Captain Kidd, gateway controllers on the Captain Kidd detect the container's presence and reported that presence to Westco (via satellite data link). Consequently, per instructions configured into the Westco logistics-management system, the gateway controllers on the Captain Kidd send a message to the container's Seal to change to its shipboard state. In this state, the Seal uses a special set of hopping instructions so as to facilitate hopping, yet conserve battery. On the long trans-Pacific voyage, too many message relays among potentially hundreds of containers in close proximity could otherwise drain batteries.

During the voyage, a designated gateway controller on the Captain Kidd continually updates its GPS position and reports that position on an hourly basis. As is their practice, Westco periodically checks the position of high-value shipments to be sure all are progressing as expected. Westco already has plans to incorporate voyage planning and tracking into their logistic-management system so that course, speed, and position anomalies are automatically detected and alarmed (obviating manual checking).

Exemplary Walk-Through: At the Port of Tacoma

The Captain Kidd reaches the Port of Tacoma without incident. As the container is unloaded from the Captain Kidd, gateway controllers at the port detect the presence/arrival of the seal, and thus the container. That arrival is reported to Westco's logistics-management system, as before. Westco also forwards the arrival information to Smith, who begins planning for the arrival of its flutes in Abilene. An instruction from Westco's logistics-management system is automatically sent to the seal to revert to its in-port state, and the Westco shipping manager schedules a tractor/trailer to pick up the container the following day.

Ordinarily, the container is stacked in the yard for almost immediate discharge from the terminal. However, during the voyage of the Captain Kidd, an agent with US Customs and Border Protection (CBP) has misread the manifest as "medical instruments" (rather than "musical instruments") and has flagged the container for an open-door inspection. Medical instruments can have radioactive materials, and CBP takes a keen interest in shipments that may have radioactive materials.

So, the Smith container is taken to a special CBP area for an open-door inspection, which does not happen until the following day. When CBP breaks the seal e-bolt to open the doors, the event is immediately reported to Westco. Since the event is unexpected, an alarm is flashed to Westco's shipping manager. She checks the shipment event records and sees that the container is at the Tacoma port. She calls port security and is informed that CBP has unexpectedly selected the container for an open door inspection.

While this call between port security and Westco is underway, CBP discovers its error, closes the container and inserts a new serial-numbered e-bolt into the Seal, having taken a new e-bolt from a supply stored in the container. The seal automatically reads the bolt serial number and reports the sealing event and the new e-bolt number to Westco via the gateway controllers at the port and wireline data link. By the time that the Westco shipping manager gets off the phone with port security and is about to re-schedule the pick-up tractor/trailer, the Westco logistics-management system reports the re-seal event.

CBP releases the container, and all shipping documents and port security are updated accordingly. Appropriate information is transmitted to Westco by the port, and Westco dispatches the pick-up. The pick-up tractor/trailer arrives at the terminal a couple of hours later, passes through the entry checkpoint, drives to the designated place for the pick-up, and is loaded. Since the container has an e-bolt, and since the port security's system is in communication with the seal and there are no reported anomalies, the driver exits the terminal immediately via a designated "green lane," bypassing a 10-minute-long line of other exit traffic waiting to pass through security. Once the container is away from the terminal, its absence, via its seal, is automatically detected and reported to Westco.

The driver drives the container to the Tacoma rail yard to have the container transferred to a railcar for transport to Kansas City, where the container is transferred to a tractor/trailer for transport to Abilene.

Exemplary Walk-Through: At the Tacoma Rail Yard

Upon the container's arrival at the Tacoma rail yard, its seal is detected by the gateway controllers located there, and the arrival is reported to Westco's logistics-management system (via wireline data link). No disturbances were detected (or stored) by the seal between the port and the rail yard, including from the 45 minutes the driver stopped for a coffee break at a diner along the way. So, the seal has nothing to report to the Tacoma rail yard gateway controllers when it arrives.

The container is transferred to a rail car without incident. As the train departs and leaves the coverage area of the local gateway controllers, the container's absence is detected and reported. Since the absence corresponds to a scheduled departure, no alarm issues. However, if the absence had been detected under other conditions (e.g., any other time), an alarm may have sounded.

Exemplary Walk-Through: At the Kansas City Rail Yard

As at the Tacoma rail yard, gateway controllers located at the Kansas City rail yard provide the same presence-detection and message-sending processes. When Smith receives notice that the container has left Kansas City, they schedule a temporary crew to unload the container the next day.

Exemplary Walk-Through: En Route to Abilene

The tractor/trailer carrying the Smith container travels west on I-70 towards Abilene. The driver decides to stop for lunch along the way at a large truck-stop catering to long-haul truckers. The truck-stop is equipped with a gateway controller and a cellular data link that is shared by several logistics companies. That gateway controller detects the presence of the Smith container, and that information is relayed to Smith's logistics-management system. The logistics manager at Smith notes the time and location of the report and calculates that his unload crew will be on-hand when the container arrives, as planned.

Exemplary Walk-Through: At Smith Band Instruments, Abilene, Kans.

As the container approaches Smith's facility, a gateway controller installed there detects and reports the arrival with enough notice that the unloading crew is at the dock ready to unload as the container is backed in. The seal reports no anomalies during the drive from Kansas City. Nonetheless, the dock supervisor uses a handheld device to scan the barcode on the seal, looking for a green-light indicator (based on data from Smith's own logistics-management system, which has received and stored all events and data related to this shipment) that it is okay to open the seal and unload the container. When he gets a green light, cuts the e-bolt and has the crew unload the container. Had he received a red light, his procedure would have been to consult higher authority.

When the e-bolt is removed, the removal is automatically detected and reported as before. If the removal was expected (e.g., the container's having arrived at a Westco transshipment location), then no alert is made. If the comparison reveals that the removal was unexpected (e.g., on a Sunday night), then an alert is made (to whomever the logistics provider has designated, via email, audible alarm, text message, etc.).

After unloading, a Smith dock worker uses a handheld device to de-activate the seal, putting it into a dormant state. With the deactivation, the system terminates and closes the spring shipment's transit episode. The system has been configured to report the closure to all principals in the logistics chain—Smith, Westco, and Wang Chung. The seal is then removed from the container and stored until mailed back to Westco for re-use.

The seal is put into the dormant state to conserve battery. It remains in the dormant state and normally does not respond to any messages until a new e-bolt is inserted and the seal re-activated, which would start a new transit episode.

Although dormant, the seal may be configured to respond to housekeeping messages, which could be used to help identify the location of the seal, to query its current operational statistics and version level, and/or to place it in a state to receive updated profile or software loads.

Exemplary Walk-Through: At Westco

The shipping manager at Westco sees the report of another successful transit for Smith and is pleased. Since deploying the products and systems described herein, Westco has reduced its losses enough to attract new customers and to get reduced rates from their insurance carrier. They also thwarted a major fraud incident by being able to use their seal event data to prove that a theft from a container had been committed while the container was in the custody of the party claiming a loss. Westco has also been able to schedule and use their own tractors and crews more efficiently, shaving a few percentage points off their operating costs. The only incremental operating costs have been relatively minor: managing the return of seals and communications charges for the various data links. However, the shipping manager expects that the use of seals will spread to a degree that seals stay with the containers (obviating their management). She also expects that gateway controller infrastructure will spread, with the costs being shared by more logistics companies, as well as increasing the resolution and coverage area for tracking/locating/monitoring containers.

Use of the Solution in the context of the CSD RFI issued by DHS is now set forth.

The Solution in a Conveyance Security Device (CSD) Context

In at least some embodiments, the system D10 of the present invention meets all of the functional objectives of the DHS Conveyance Security Device (CSD) Requirements Request for Information, version 1.2, dated Dec. 10, 2007. Additionally, the system D10 meets the needs of commercial interests for a minimally-intrusive means of securing their shipments and tracking and monitoring the custody, condition, and progress of their shipments as those shipments move from origin to destination, globally, by land, sea, or air. The system is applicable to International Standards Organization (ISO) shipping containers, over-the-road tractor/trailers, air freight Unit Load Devices (ULD) containers, as well as custom cargo containers.

The system D10 provides automatic, near-real-time reporting of events as they occur, wherever they occur, provided the CSDs D12 are in a monitored location. If the CSDs D12 are not in a monitored location, event records are stored, and then reported immediately upon arrival in a monitored location. Events include seal make and break, door breach, seal tampering, container breach/shock, and improper motion, as well as the arrival of containers into monitored locations. In at least some embodiments, private, shared, and public "islands of coverage" may be provided throughout the logistics chain that will allow the monitoring of the CSDs D12 as they appear and are stored in these locations. When an event of interest occurs, authorized users can be automatically notified of the events and their location. There is no need to manually interrogate CSDs D12 or to wait until they pass by some fixed reader location to determine their status.

For commercial entities, the system D10 can greatly reduce theft, claims, and insurance costs, and may help improve operating costs (e.g., reduced demurrage). For governments, in addition to on-site discovery of compromised shipments, the system D10 facilitates deep-water notification and green-lanes, while enhancing ATS risk-scoring.

In a currently-contemplated implementation, the system D10 marries an ISO-17712-compliant security-bolt seal with movable wireless sensor network technology to render a solution that is implemented in a manner that is nearly identical to that now employed for mechanically sealing containers D14. In so doing, the system D10 also provides security-related visibility to both government and commercial entities, all along the supply chain cycle. This combination of a high-security physical door seal and an electronic detector/recorder/reporter provides superior resistance to theft and tampering. Through our flexible product design, future implementations can include wire seals, fiber optic lanyard seals and any other specialty seals required for the level of security dictated by the cargo.

A CSD Implementation: System Design Approach

As more fully described elsewhere herein, design goals for the system D10 of the present invention may include: low per-shipment cost to be practical in the highly-competitive worldwide shipping market; unobtrusiveness and non-disruptiveness so that existing personnel and procedures could still be followed without impacting the overall throughput of the supply chain; equally effective domestic local and worldwide operation to allow users to adopt one system for all of their needs independent of size or points of embarkation or destination; scalability to accommodate users with varying volumes and usage frequency which could be as low as the shipment of one domestic container quarterly, to as large as thousands of international containers annually; allow users to self configure and control their usage and monitoring when and where they so desire; operability with minimal infrastructure to reduce capital and operating cost and complexity; the provision of flexible monitoring capability including the ability to monitor sensors that relate to the condition of the asset in near-real-time so that corrective actions can be taken when the event/condition occurs; highly flexible integration capabilities to allow customers to add the Company's capabilities to customers' existing business methods and procedures; usability in areas of limited, intermittent, or no radio coverage that reflect the varying "real-world" conditions of the supply chain; the accommodation of multiple simultaneous users with high degrees of security and the ability to partition and isolate usage between customers; and the legal operability in any jurisdiction, worldwide, without diminished performance.

A system in accordance with one or more preferred embodiments of the present preferably meets all of the goals listed above. Preferred design constraints that are preferably accommodated in meeting these goals include, but are not limited to, the following. First, the system preferably does not rely on the mandatory use of stationary readers as "choke points" because monitoring preferably needs to occur at any time and at many diverse locations, some of which cannot accommodate readers that are perhaps owned and operated by others. In addition, the system preferably does not require the re-arrangement of assets or fundamentally change the way users run their businesses. Therefore, containers must be "readable" where they are and not require containers to be un-stacked or moved to certain areas, or passed by certain points to accommodate the system. Further, the system is preferably usable by existing personnel with minimal training and virtually no new required skill sets. Still further, the asset-mounted devices preferably include local processing intelligence and memory to trap and save events as defined by each customer with different event triggers activated based upon the sensed condition or location of the asset. Still further, the system preferably accommodates large concentrated quantities of devices that may be stored in one place in an inactive state during off-peak times. Still further, each asset-mounted device may need to supply data to multiple, different users at different times. Still further, the system is preferably operable in very challenging and varying radio frequency environments with an infrastructure that is easy to install and need not be exact-location specific. Still further, the system is preferably not limited by "self-interference" with each device contributing to the "pollution" of the radio frequency environment in high-density locations. Still further, the system preferably operates on an event-exception basis; that is, under normal conditions, it preferably operates "quietly and automatically" and requires user action or intervention only when an anomalous condition is detected. The system of the present invention preferably accommodates all of these fundamental requirements/applications as described above.

A CSD Implementation: Underlying Technology of the System

Figure 43:
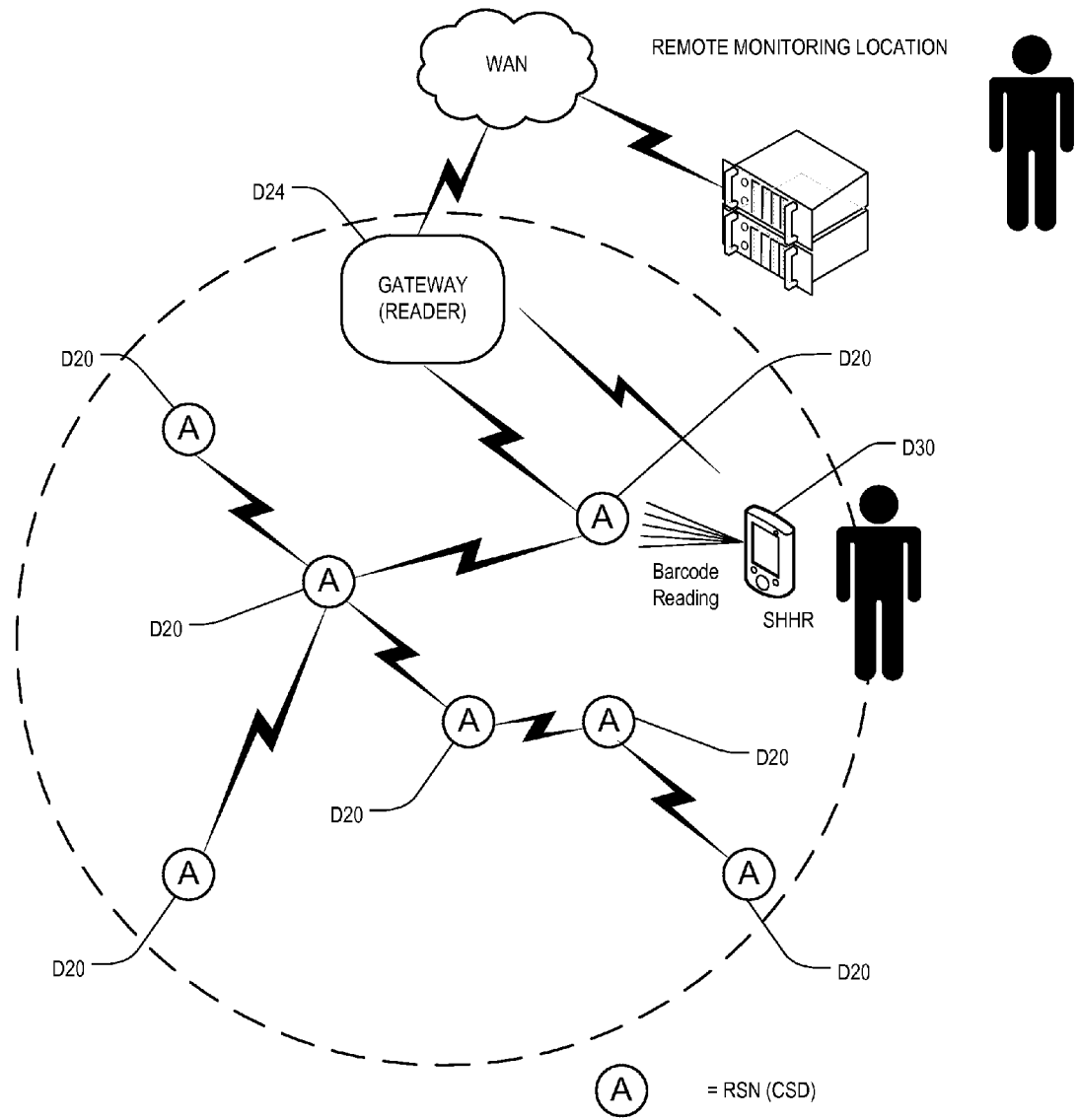
FIG. 43 is a schematic diagram of a basic wireless sensor network configuration.

An underlying technology of the system D10 of the present invention is a movable wireless sensor network. FIG. 43 is a schematic diagram illustrating the configuration of a basic wireless sensor network. In a preferred implementation, these movable wireless sensor networks comprise two major components. The first is the Remote Sensor Node (RSN) D20, which is attached to assets that are to be monitored. The second is the Gateway D24, which is used to collect and deliver messages to/from RSNs D20, and to connect the local network of RSNs D20 to the outside world and to user applications via Wi-Fi, cellular, satellite, or wired Ethernet. When an RSN D20 comes into the radio range of a Gateway D24 (either directly or by hopping via other RSNs D20), communications are established, and the presence of the RSN D20 is known to the system D10 as being at the location of that Gateway location. This "presence" information is then reported to other systems within the network.

Moreover, preferred embodiments of the invention preferably include methods and systems for determining presence of RSN as disclosed in Ser. No. 12/343,822; USPA Publ. No. 2007/0155327; and USPA 61/140,887, each of which is incorporated herein by reference.

As will be described later in detail, RSNs with electronic bolt-type locks correspond to CSDs, and the term "CSD" is sometimes generally used interchangeably with "RSN," as will be evident from the context of its usage. Similarly, Gateways generally correspond to Readers, and the term "Gateway" is sometimes used interchangeably with "Reader," as will be evident from the context of its usage.

A CSD Implementation: Remote Sensor Nodes (RSNs)

FIG. 44 is a perspective view of an RSN D20. As shown therein, each RSN D20 is a self-contained, battery-operated device, about the size of a deck of cards that acts as a local sensor and wireless network router. Each RSN D20 contains radios, antennas, a controller, memory, sensors, and batteries internal to the housing. Besides communicating directly with Gateways D24, each RSN D20 can listen to and repeat messages from other RSNs D20 (i.e., hops), thereby greatly extending the range of the system and reducing the number of Gateways needed to cover a given site. Settings within each RSN D20 control the hopping capability such that only units in certain groups, referred to as Classes, participate in the process. Operating in the globally-accepted, unlicensed 2.4 GHz band, single RSNs D20 have radio ranges of up to 300 feet in typical industrial environments. With the hopping capability, the effective range of the system can be extended many times farther than the 300 feet. In fact, the system can relay a message from one unit to another over sixteen hops, thereby greatly increasing the system's range without requiring large infrastructure deployments.

Each RSN D20 may contain an internal motion sensor, a shock sensor, and a reed-relay/magnetic switch. These internal sensors can be used to detect improper or unexpected motion or handling, and to detect the opening or closing of a door or hatch. Depending on the user application and its configuration, these sensors can be used to trigger alarms and notifications, all automatically. Additionally, each RSN D20 may be equipped with a bi-directional data interface bus that can receive and store inputs from binary or serial-data external sensors, such as for temperature, gas concentration, or other contaminant levels. In addition, it can be used to interface with a GPS receiver to provide location data for each asset. In normal operation, the internal batteries can power an RSN D20 for more than two years. In the DHS-specified CSD application, it is expected that battery life will far exceed the two-year specification that is based on two hundred message receptions/transmissions per day.

Gateways (Readers) D24 are shoe-box sized standalone devices that are equipped with radios to communicate with RSNs D20, with other Gateways D24, and with the outside world. FIG. 45 is a perspective view of a Gateway D24 with the RSN D20 of FIG. 44 for size reference. They also include standard Ethernet interface capability for wired or point-to-point radio network configurations. Gateways D24 are also equipped with a GPS receiver, which permits localization of in-range RSNs D20 when the Gateways D24 are mobile or are at temporary/remote sites. Gateways D24 are mounted to buildings or other structures (e.g., light poles), or may be mounted to vehicles, powered from either local AC power, or from the vehicle. Multiple Gateways D24 can be connected to provide increased coverage at a given site or area. When so configured, the overall coverage area is referred to as a coverage "island." The islands can vary in size from a small lot to the largest port facility. Each Gateway D24 provides coverage that is roughly the size of two football fields placed side by side. Of course, local coverage obstacles will cause radio coverage variability.

A CSD Implementation: "Wake Up" and "Classes"

The system D10 of the present invention preferably makes use of core technology, suitable implementations of which are available from TeraHop of Atlanta, Ga.

Figure 46:
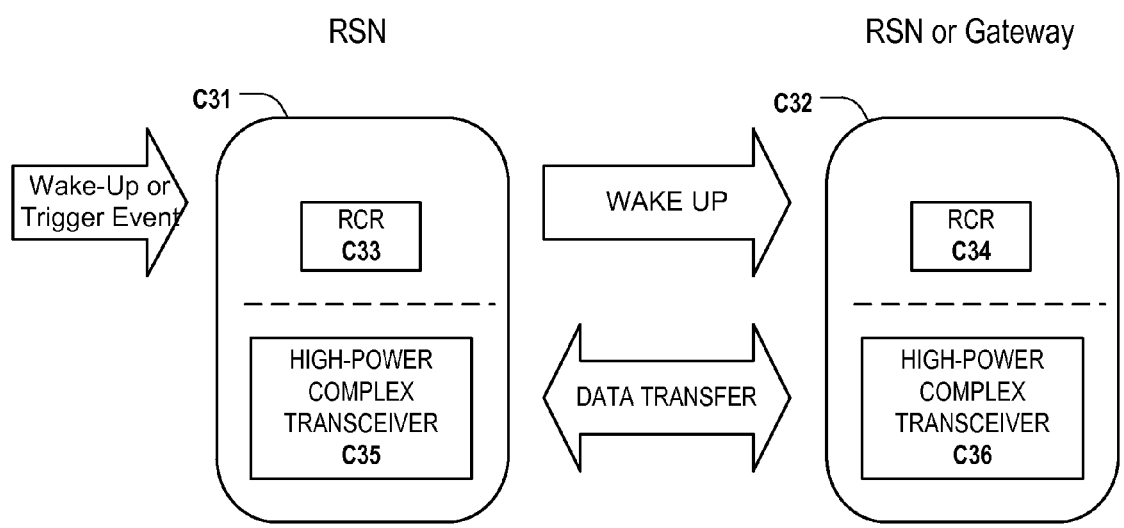
FIG. 46 is a block diagram illustrating a wake-up process.

A first core technology is the use of a simple, extremely low-current-drain radio to control or "wake up" a higher-powered, more sophisticated radio, with the sophisticated radio used for larger data transmissions and transactions. For example, FIG. 46 is a block diagram illustrating an RSN (CSD) Wake-Up process utilizing a 2-Radio Concept. When a triggering event occurs or a request/command is received, the simple radio wakes up and establishes a communications link with its counterparts in other RSNs D20. Based on the message content, one of the other RSNs D20 then wakes up its sophisticated radio that, in turn, forms a communications link with the originating RSN D20 to forward the specific data. This process continues until the data reaches a Gateway D24. Each device monitors the success or failure of the communications and takes appropriate retry, acknowledgement, or negative-acknowledgement actions.

This approach provides an "always alert" network that is ready to transmit data whenever a triggering event occurs or when a user application requests data. By using the combination of radios, extremely long-life (multi-year) battery operation is possible while supporting the use of a high-power radio that provides long-range transmission. In at least some embodiments, the high-power radio is a Class One power Bluetooth® radio. By using the low-current-drain radio instead of the Bluetooth radio for inter-node communications link establishment, the standby current drain required may be reduced by a factor of one thousand.

A second core technology is the use of unique group addresses sometimes referred to herein as "Classes." In the implementation provided by TeraHop, for example, over four billion Class addresses are possible. The Class address space is divided into three fields to allow highly selective partitioning of the system. As part of the wake-up process, the low power radios in the RSNs broadcast one of their stored Class addresses. Only RSNs D20 and Gateways D24 that are programmed to listen for that particular Class will respond. This arrangement allows multiple, separate users to operate in the same area, at the same time, using the same infrastructure, but independently of each other—effectively operating as virtual private networks. Class messaging also can be used to partition large networks such that much higher-density operations can be accommodated, due to the minimized transmissions that result from Class messaging. Lastly, Class messaging reduces the number of times an RSN wakes up since it wakes only when the Classes that are contained in its memory are addressed, thereby further conserving the battery.

Each RSN D20 can contain and respond to multiple Classes. Based upon logic within each RSN D20, a different Class can be transmitted. For example, an RSN D20 may try to communicate with one Class and, if unsuccessful, could retry with another Class. For example, FIG. 47 is a schematic diagram illustrating class-based networking. As shown therein, "A" RSNs D20 communicate only with other "A" RSNs, and "B" RSNs D20 communicate only with other "B" RSNs, and "C" RSNs D20 communicate only with other "C" RSNs, despite being in close proximity to other RSNs D20.

These two technologies, when applied simultaneously, enable ad hoc networks that are formed only when there is a need to send information and only involve a subset of all present network nodes (RSNs). In addition to greatly improved scaling, longer battery life, reduced RF pollution, and virtual private network capability, Class-based networking may be used by governments to identify and segregate assets by designated attributes, such as by owner, type of asset attached, or some security marker. For example, containers that have been identified as high risk as part of ATS risk-scoring could have a Class marker assigned (downloaded) to them, such that when arriving at any monitored location, those containers can be automatically and quickly identified for segregation and closer inspection. Similarly, Class-based messaging could be configured to allow authorized government entities to query the status of all containers, whereas individual shippers/carriers would be able to query the status of just their own containers.

These foregoing underlying technologies of the Solution are further discussed in greater detail below.

A CSD Implementation as a DHS Solution

Figure 48:
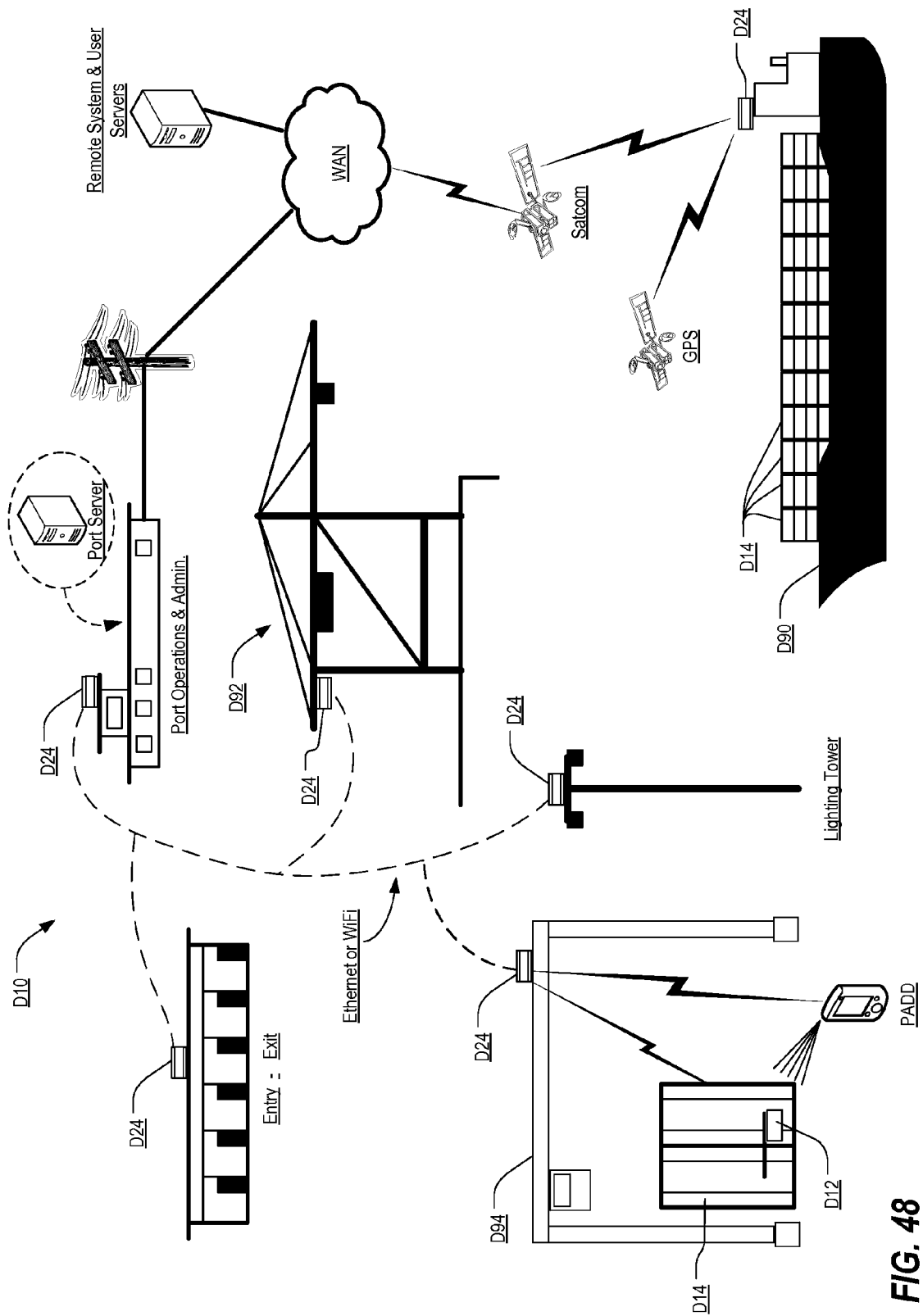
FIG. 48 is a schematic diagram illustrating a variety of deployment possibilities for a system in accordance with one or more preferred embodiments of the present invention.

FIG. 48 is a schematic diagram illustrating a variety of deployment possibilities for a system D10 in accordance with one or more preferred embodiments of the present invention. In particular, in one commercial implementation, the RSN D20 described above is integrated with an ISO-17712-compliant electronic security-bolt seal to create a CSD D12. The Gateway D24 described above becomes the Reader. Other system elements (servers, applications, user devices, etc.) are equivalent to those described in the DHS RFI. The CSDs D12 collect/store data about the containers to which they are attached, then communicate that data to Readers D24, and the Readers D24 route and communicate that data to appropriate user applications.

More particularly, in the aforementioned commercial implementation, an ISO-17712-compliant security-bolt seal is married with movable wireless sensor network technology to render a solution that is implemented in a manner that is nearly identical to that now employed for mechanically sealing containers. This combination of a high-security, physical door seal and an electronic detector/recorder/reporter provides superior resistance to theft and tampering. Standard RSNs D20 (as opposed to CSD-specific RSNs) could also be included to further extend the utility of the system D10. For example, standard RSNs D20 could be placed inside cartons or other items placed inside the containers D14. Their presence and sensor data could then also be monitored and relayed through the door-mounted CSD D12 and its RSN D20.

In preferred embodiments, bolt-type seal lock modules of USPA Publ. No. 2008/0315596, which is hereby incorporated herein by reference, are used with RSNs to form the CSDs.

The system D10 provides area-wide coverage at monitored locations, obviating the need for choke points. Monitored locations can be anywhere and/or mobile, including ports, ships, logistics transfer points, factories, truck stops, and weigh stations. These locations are data-linked to provide end-to-end trackability across the country or across the globe. The system D10 generates data that can be easily integrated into existing logistics or security applications. Further, the same basic solution can also be applied to common semi-trailer, common trucking, rail, and air transport. The same basic technology can also be integrated into site security systems (e.g., gates, doors, perimeter fencing).

As one example of how the movable portion of the network could operate, Gateways D24 may be easily mounted on port Rail Mounted Gantries (RMGs) D92 that lift containers D14 onto and off ships. When in the presence of the RMG-mounted Gateway D24, a CSD D12 that has detected a door breach could forward this information and immediate action could be initiated. With this approach, there is no need for an operator D32 to approach each container D14 to query its status nor is it necessary to pass a CSD-equipped container D14 past a fixed Reader D24 at a choke point.

Notably, use of a system D10 in accordance with the present invention requires very few changes in normal container operations or management along the entire end-to-end shipping path. Readers D24 are installed at various selected monitoring locations (e.g., at ports). Communications links are set up between Readers D24 and servers, and on to appropriate user applications. The integrated RSN-bolt seals (the CSDs D12) are applied to containers as is done with ordinary bolt seals. The CSD-Reader system operates in the background, monitoring the CSDs D12 and supplying data to existing logistics-management and security systems, to communicate status and alarm information. Alarms are raised only when conditions warrant, per user-defined configurations. The only noticeable added activity is the management of the CSDs D12 between shipments, which the system D10 greatly eases.

It will be appreciated that the particular DHS-focused implementation described herein is not the only implementation that may be supported by the technology. For example, the RSN D20 could also interface with wire seals, fiber optic lanyard seals or any other specialty seal dictated by the security requirements of the container. Following these descriptions are details on how the bolt seal components can be combined to form a network that can process and integrate the event data generated from each of the CSDs D12 into an overall highly effective network solution that can be used by commercial users as well as DHS.

A CSD Implementation: Main Elements of the System

Figure 49:
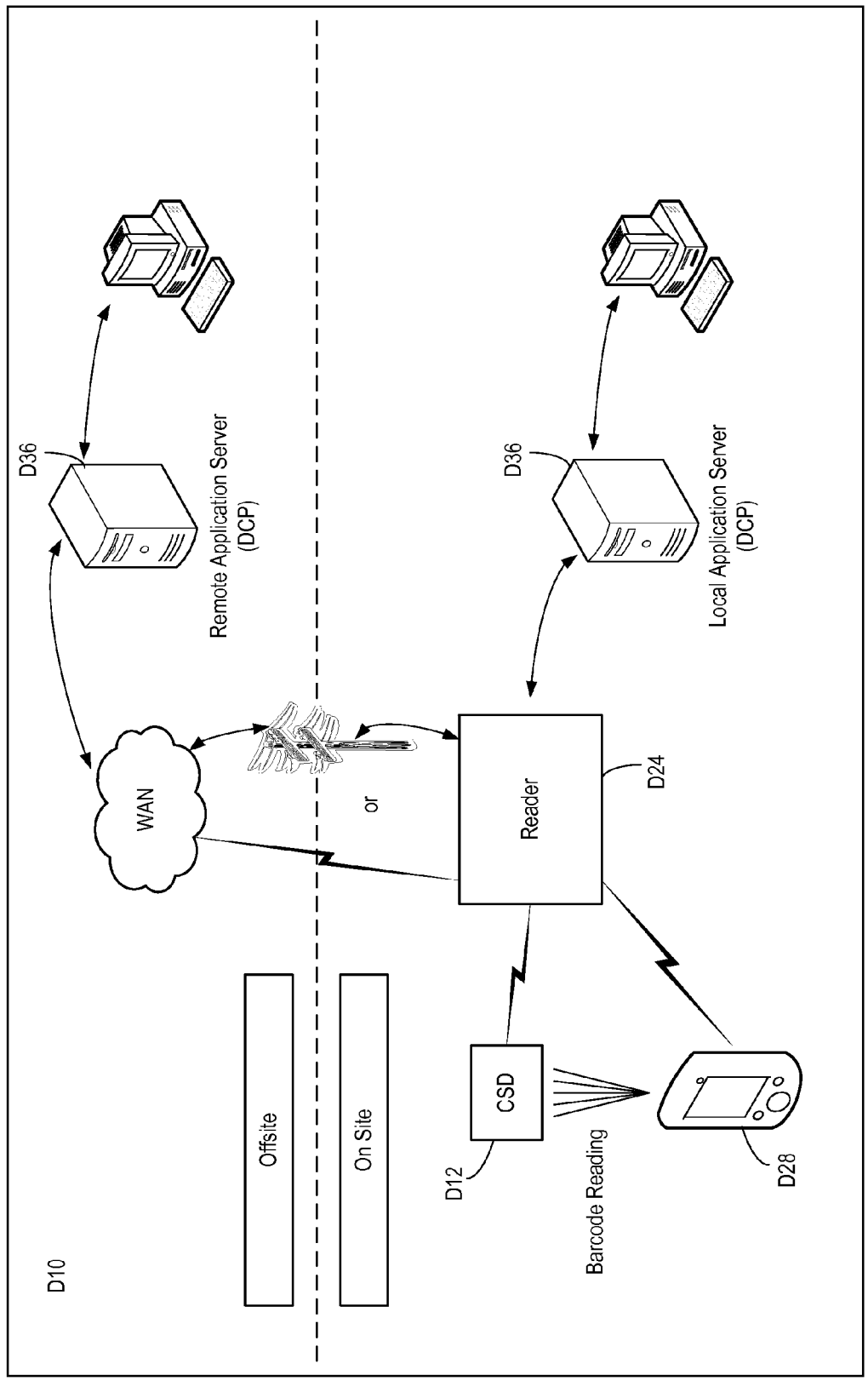
FIG. 49 is a block diagram of a basic system according to one or more preferred embodiments of the present invention.

FIG. 49 is a block diagram of a basic system D10 according to one or more preferred embodiments of the present invention. As shown therein, components supporting the system D10 may include CSDs D12, RSNs D20, Readers D24, Secure Handheld Readers (SHHRs) D28, Data Collection Points (DCPs) D36 and other servers (not shown), and Configurators (not shown). The CSDs D12 may be described as integrated RSN-bolt seals. The RSNs D20 may be standard nodes used for other asset monitoring applications. The Readers D24 may be Gateways-Controllers (GCs). The SHHRs D28 may be PDA-like devices that cargo operators can use to initiate and complete the sealing process of the CSD D12. It will be appreciated that non-secure PDAs can be used by cargo operators and others who are not directly associated with the DHS application. The DCPs D36 and other servers are provided to host system-management and user applications (security and logistics). The Configurators are utilized to set operating parameters of the CSDs D12 and Readers D24. Each of the components is described in greater detail hereinbelow.

A CSD Implementation: Conveyance Security Devices (CSDs)

FIG. 5 is a perspective view of an integrated CSD D12, shown installed on a container D14. The CSD D12 includes an ISO-17712-compliant, serially-numbered electronic bolt D22 and matching bolt ring, a housing D18 into which the bolt D22 is inserted, and an RSN D20 packaged in the CSD housing D18. The bolt D22 may be nearly identical to bolts currently in use, except that it preferably has an embedded, non-alterable, unique electronic serial number that matches the one stamped on its exterior. The bolt D22 passes through a matching thin metal ring with the same serial number printed on an attached metal tab. In operation, the bolt D22 is inserted through the container's locking hasp, through the thin metal ring and into the CSD housing D18. The two-piece bolt/ring design, each with the same serial number, is a security measure to thwart the use of counterfeit bolts. Once inserted into the CSD housing D18, the bolt D22 can only be removed by being cut off, which is the accepted practice today. Bolt seal technology suitable for use with the preferred embodiments of the present invention was formerly offered by Intelli-Que, LLC, of Woodinville, Wash., and is described and disclosed, for example, in U.S. Patent Application Publication US 2008/0315596 A1, incorporated herein by reference.

The CSD housing D18 is segmented and hinged to allow the bolt-holding segment D19 to move to accommodate hasp and handle positioning, while allowing the RSN segment D20 to remain securely affixed to the container door D16. The entire CSD D12 is held to the container door D16 by high-strength magnets, strong enough to withstand container handling, yet allow removal of the CSD D12 and mounting it on other containers D14. This arrangement does not require any alterations to the container D14 and can be mounted by a cargo operator D32 with no special tools or techniques. It is further contemplated that if attachment of the CSD to a container is by non-magnetic means, then a CSD may also be armed or disarmed by using a magnet to change the state of a magnetic reed switch within the CSD, used to change the operational state of a CSD (e.g., from dormant to activated), or used for both functions; however, this physically direct arming/disarming of the CSD and activation/deactivation of a CSD, is not preferred. Instead, wireless communications to the CSD conveyed through a Reader Server—and not directly from a handheld PDA or SHHR (as more fully described elsewhere herein)—is preferred.

The RSN D20 is permanently integrated within the CSD housing D18. Each RSN D20 also has its own embedded, unalterable, unique identifier code that, as part of the CSD D12, becomes the unique ID of the CSD D12. It is the unique CSD ID that the system D10 tracks, with the bolt serial number used as part of the alarm detection mechanism. As the serialized electronic bolts D22 are inserted in the CSD housing D18, the CSD D12 reads the bolt's serial number and associates each new bolt serial number with the CSD's ID, thus forming a unique paired combination. The CSD D12 records the date/time that each bolt is inserted or removed from the housing. This information is stored in non-volatile memory inside the CSD RSN D20. If the bolt insertion takes place at a monitored location, the CSD RSN D20 immediately transmits all of the new bolt/CSD physical association to a Reader D24, and to an on-site or remote server.

After the container door D16 is locked through the process outlined above, the cargo operator D32 can then, using a Secure Handheld Reader (SHHR) D28 or non-secure handheld reader (PDA) D30, enter the container's number and associate the CSD RSN D20 with the particular container D14.

Because of the sensing ability for shock, vibration and unexpected movement, the CSD RSN D20 will notify the appropriate personnel of any attempted breach of the left hand door D16. This approach will deter the introduction of any foreign substance or object such as chemicals, contaminates, contraband, or explosive devices.

Through the RSN's internal motion and shock sensors, attempts to remove the bolt D22, tamper with the CSD D12, or force the doors D16 will similarly trigger a notification event. Whether the event triggers an alarm depends on user-application settings such as sensitivity, time of day or day of week, or downloaded status. Since bolts D22 are serial-numbered and since the CSD RSN D20 reports all changes in bolt serial numbers (plus when/where they occurred), there is traceable history of bolt insertions and removals for each transit. If the electronic portion of the CSD D12 is damaged or destroyed (e.g., deliberately bashed with a sledge hammer), the bolt D22 will still be intact, protecting the doors D16, but there will be visible evidence that something is amiss. In addition, the CSD RSN D20 will fail to check in upon arrival at the next monitored location, also giving an indication of something potentially being wrong.

Consequently, due to the layering of features and sensors, the CSD D12 and other elements of the system D10 of the present invention offer superior reliability of protection against unauthorized removal or addition of contents, and against unauthorized movement of the container D14.

Additionally, the CSD bolt-seal arrangement has no appendages inside the container D14. Available volume is, therefore, unaffected, and the risk of impairment of CSD performance from shifting cargo is zero. Nonetheless, for special cargo monitoring (e.g., perishables, radioactive materials, etc.), the CSDs D12 can relay (through hopping) any sensor-triggered events detected by interior mounted RSNs D20 that are associated with some of the cargo. Those sensors would communicate with and be monitored by the CSD RSN D20, and any events related to those sensors would be treated as CSD events. With an exterior mounting arrangement of the CSD D12, superior radio performance can be obtained over any interior-mounted CSD approach.

A CSD Implementation: Readers

Readers D24 are equivalent to Gateways as that term is used elsewhere herein. One gateway suitable for use as a Reader (Gateway) D24 in the preferred embodiments of the present invention is available from TeraHop Networks, Inc. of Alpharetta, Ga. The TeraHop product is about the size of a cigar box. In many cases, Readers (Gateways) D24 are mounted on fixed structures, but they may also be mounted on vehicles, including but not limited to boats, ships, trains, trucks, and the like. When fixed-mounted, they are generally powered from a commercial power source. If mounted on vehicles, they are adapted to use vehicle power. Since the Readers D24 preferably provide area coverage, their exact placement is not critical, although it is preferable for them to be mounted high on poles or other structures. This characteristic can be important because it relieves any undue burden on the site operators to carefully accommodate the Readers D24 as they change site layout and operations. With their recommended aerial mounting, they are also less likely to be tampered with or disturbed.

Each Reader D24 has the same two bi-directional radios (wake-up and Bluetooth) for communication with CSD RSNs D20. They also have other bi-directional radios (and/or wireline capability) to communicate with SHHRs D28 and to communicate outside the local CSD network using other communications services, such as but not limited to Wi-Fi, mobile phone, satellite, or the like. Readers D24 are also equipped with data-storage media (e.g., solid state hard drives) to store event and local network data, and are equipped with a GPS receiver. The GPS receiver can be used for determining the location of a Reader D24 should it be mounted to a conveyance (e.g., a ship), and, by association, locating all the CSDs D12 that it is servicing. All antennas are preferably internal, in which case there is no need for mounting and aiming separate antennas and running cable to them, and they are less prone to damage.

At a given site, Readers D24 are arranged to communicate with each other (i.e., they are networked) so as to maximize coverage of the site using the fewest Readers D24. Fixed Readers D24 may be networked using Wi-Fi or broadband wireless point-to-point links, or wireline Ethernet or DSL links that are commonly available at most fixed sites.

The group of Readers D24 at a particular site form a single coverage area, referred to as a coverage "island". Each island can be operated on a standalone basis with the appropriate application servers and/or can be connected with other islands to provide an overall, wide-area network. One Reader D24 in each island acts as the Reader Server and controls all other Readers D24 associated with it. It also contains routing tables to direct messages to the appropriate host computers. Routing tables associated with each CSD RSN D20 that automatically registers in a given coverage island are held in the Reader's memory. Different routing paths can be associated with different message types (events) or Class assignments. End-to-end encryption, as described later, is also supported for Restricted messages.

A CSD Implementation: Handheld Devices (SHHRs and PDAs)

In at least some embodiments, the system D10 supports two logical forms of handheld devices D28,D30 that field personnel can use. The difference between these two device categories only involves the level of security and, therefore, the access that can be obtained through their use. Configuring the handheld device as an SHHR D28 allows access to restricted information and would only be made available to personnel designated by DHS. Configuring the handheld device as a PDA D30 allows access to all commercial information in the CSD RSNs D20. Both devices D28,D30 require user log-in and credential verification before the units become active. As discussed further below, the SHHR D28 may, in some embodiments, be specially configured to provide some out-of-network capabilities. This special configuration could be particularly useful if, for example, DHS determines that such capabilities would be beneficial.

Both device types (SHHR and PDA) contain similar hardware and communications capabilities. Their only difference may be in the applications software that is loaded into the devices. It is contemplated that standard, commercial off-the-shelf ("COTS") products may be offered for both applications. This approach is believed to provide the best combination of user functionality and configurations while being very cost effective. By the very nature of the field application of these devices in challenging environments, rugged units that can be replaced easily are viewed as being valuable.

Each device will be equipped with a screen, keyboard, internal memory and processing power to perform the required functions, as well as a bar code scanner for reading the CSD's barcode and a Wi-Fi radio link for communications with Readers (Gateways). Microsoft™ Windows Mobile™ Operating System (currently version 5.0) is a suitable operating system for each device. The user interface will follow the guidelines included in the DHS RFI and will also include simple "go" and "no/go" icon displays that can be understood easily by cargo operators as they use these devices in their daily routines.

Except as noted below, the SHHR and PDA devices D28, D30 will not ever directly communicate with the CSDs D12. Instead, they will communicate only with Readers D24 over a secure Wi-Fi radio link. This approach helps to ensure the overall integrity of the system by requiring on-line validation of every sign-on and query made by the device and its user. This should minimize inadvertent or malicious use by someone who obtains one of the handheld devices by inappropriate means or clones a legitimate device. Also, this approach minimizes the data stored in each device. In fact, records are preferably not stored in the device; they are only buffered for uploading to secure servers or held for the operator's immediate use.

Either type of device D28,D30 can be used in the container sealing and arming process. After a serialized bolt D22 is inserted into the CSD D12, an association is automatically established between the bolt D22 and the CSD D12 and stored in the CSD D12. Once this occurs, the association, along with the date and time of the association, is forwarded to a Reader D24, assuming that the CSD D12 is within one of the coverage islands. Either before the bolt D22 is inserted into the CSD D12 or immediately after, the operator D32 would enter the container number either through keyboard entry or by scanning its barcode. Next, the operator D32 would scan the CSD's barcode, which corresponds to the unique ID of the CSD's RSN D20. The operator D32 would then initiate an "association" command that would result in the Wi-Fi link forwarding the container number and the bar-coded CSD number to the Reader D24. If the handheld device D28,D30 is not in range of the Reader D24, the associated information is buffered and transferred when the device is in the coverage area of any Reader D24.

Once the Reader D24 receives the information, it will associate the stored bolt serial number, CSD identification number and the container number together and forward the associated data to appropriate applications. The application, in turn, would issue a download command to the CSD D12 with the container number so that the CSD D12, in any message transmission, can send both its ID and the container ID.

In addition, the PDA D30 could be integrated with the Transportation Worker Identification Credential (TWIC) governmental program—which is a biometric credential that ensures only vetted workers are eligible to enter a secure area of a Maritime Transportation Security Act-regulated port or vessel unescorted—to speed up the authentication of users and associate the arming and disarming of the CSD to a specific individual.

In a contemplated commercial implementation, the CSD RSN D20 contains 128K bytes of non-volatile data storage capabilities. 64 Kbytes of this memory may be used to store manifest or other user-entered and -controlled information. Preferably, the design of the CSD RSN D20 does not preclude increasing the size of the internal memory and could, for example, accommodate up to 8 M bytes. Transferring this amount of data may require special considerations in the overall system operation. It will be appreciated that the approach for the CSD D20 and for the network solution may be further refined or developed when specific DHS or other requirements become available.

A CSD Implementation: SHHR-PDA Differences

The difference between the SHHR and PDA devices D28, D30 pertains to the capabilities associated with reading data held within the CSDs D12 and connected host applications. The SHHR units D28 will be able to access the secured and encrypted data that is stored within the CSD D12. This data, in addition to event logs such as those specified in the DHS RFI, may also include specific information about the container, its contents, point of origin, or any other items that may be of interest to authorized DHS personnel. This information may have been added at the Point of Arming (POA) by another authorized user through a Restricted host application or, perhaps, by another operator who inspected the container at a designated DHS Intermediate Transmit Point (ITP) and opened the container along the way and replaced the bolt D22 with another serialized bolt D22. The SHHR also can officially "de-arm" or stop the monitoring at a Trip Termination Point (TTP). Once the CSD D12 is de-armed, all of its secure stored event log contents and any other associated information can be uploaded to appropriate applications.

The unsecure PDAs D30 will have similar capabilities to the SHHR D28 except that they will have no access to any secured and encrypted data that is used by the DHS system and their designated partners. From all outward appearances and PDA user interactions, there will be no means of identifying CSDs D12 dedicated to DHS or those used only by commercial entities. Further, from shipment to shipment, any particular CSD D12 can change, and for any given shipment may be a commercial-only CSD, a DHS-only CSD, or a combination-usage CSD.

A CSD Implementation: Special SHHR Configuration

As previously described, the SHHR and PDAs cannot communicate directly with the CSDs D12. This method of operation has been implemented purposely to provide an added level of security in the system by requiring network-level authentication before a handheld device could interact with a CSD D12. However, in at least some embodiments, and particularly if required by DHS, a specially-equipped SHHR included that circumvents this approach. The special SHHR would still use an off-the-shelf PDA as a hardware and software foundation. In addition, a specially configured RSN would be attached to and used with the SHHR. This RSN, with its dual radios, could wake up a CSD D12 and then communicate directly with the CSD D12 through a Bluetooth connection. With this arrangement, an authorized operator could directly access a CSD D12, query its contents and change its operating parameters, and upload and download free format text files. In implementing this capability, a special-code software load may be required in the CSDs D12 as well as in the SHHR D28. In implementing this approach, it is preferable that the supplier work directly with DHS in defining all of the functional requirements. Issues such as requiring a one-to-one match between an SHHR D28 and the initiating RSN D20 or requiring the initiating RSN D20 to periodically receive a refresh key from the network should be considered.

A CSD Implementation: Configurators

Configurators are special PC and/or PDA software applications for setting the thresholds and limits of the various sensors in CSDs D12 which trigger detection of events, and for loading Class and identification information. For example, a configurator would be used to set the times of the day during which container movement raises an alarm, with such times being applicable to when the CSD is at certain predefined locations or places where movement during the times of day is unexpected and not planned. CSDs D12 can be thought of as moving in and out of various behavioral states based upon their downloaded profiles. The state changes occur based upon some pre-set conditions or thresholds. Some of the variables that can be used to change states and, therefore, the behaviors of a CSD may include, but are not limited to, its status (e.g., active, inactive, etc.), its geographical location (as determined by GPS data from associated GPS receivers, or GPS receiver associated with nearby CSDs or Readers), the current time of day, the current day of the week, the locking bolt status, a particular sensor value, or the like. The set of thresholds and limits corresponding to such variables effecting transition in states of the CSDs may be referred to herein as operational parameter sets and preferably are part of the information contained within the profile stored and maintained in the memory of a CSD. Moreover, the operational parameter sets may be included in new profiles downloaded by CSDs.

The configuration file associated with a CSD D12 can be created off line. It can be created "from scratch" or can be based upon an existing, stored configuration that can be loaded into the tool and changed accordingly. The resulting file can be downloaded into a Gateway D24 and then forwarded to a CSD D12 when it appears in a Gateway coverage island. The file could also be held in queue at the network level and downloaded to the CSD D12 whenever it appeared at any Gateway island location. Finally, and perhaps most commonly, a CSD profile file could be loaded into a CSD D12 at some central storage/staging area for CSDs D12 that would then be shipped to a Point of Arming (POA) for installation and arming.

A CSD Implementation: Data Consolidation Points (DCPs)

As previously described, each coverage island in the system D10 is under the control of one Gateway Server D24 that manages all communications to and from each CSD RSN D20 that appears within that coverage island. The Gateway Server D24 can be thought of as a Reader-concentration device that coordinates the activities and messages of a collection of nearby Readers D24. The Gateway Server (or Reader-concentration device) D24 needs to interact with a host application to make informative decisions, authenticate users and devices, provide security and encryption keys, and store data for analysis.

The DHS RFI introduced the notion of a number of Data Consolidation Points (DCPs) that will be provided by DHS that will serve this purpose. In at least some embodiments, the system D10 of the present invention accommodates this arrangement and provides data through an application program interface (API) as specified in the CSD Reader-to-Data Consolidation Point (DCP) Interface Control Document (ICD), version 1.0, dated Dec. 10, 2007. In other embodiments, alternative approaches are provided that are consistent with the approach included in the RFI but which provide significantly increased functionality. In such embodiments, the alternative approaches do not compromise the design or overall intent of the DCP approach as specified in the RFI. These alternative approaches are described in greater detail in the following sections.

A CSD Implementation: Overall Network Topology

Figure 50:
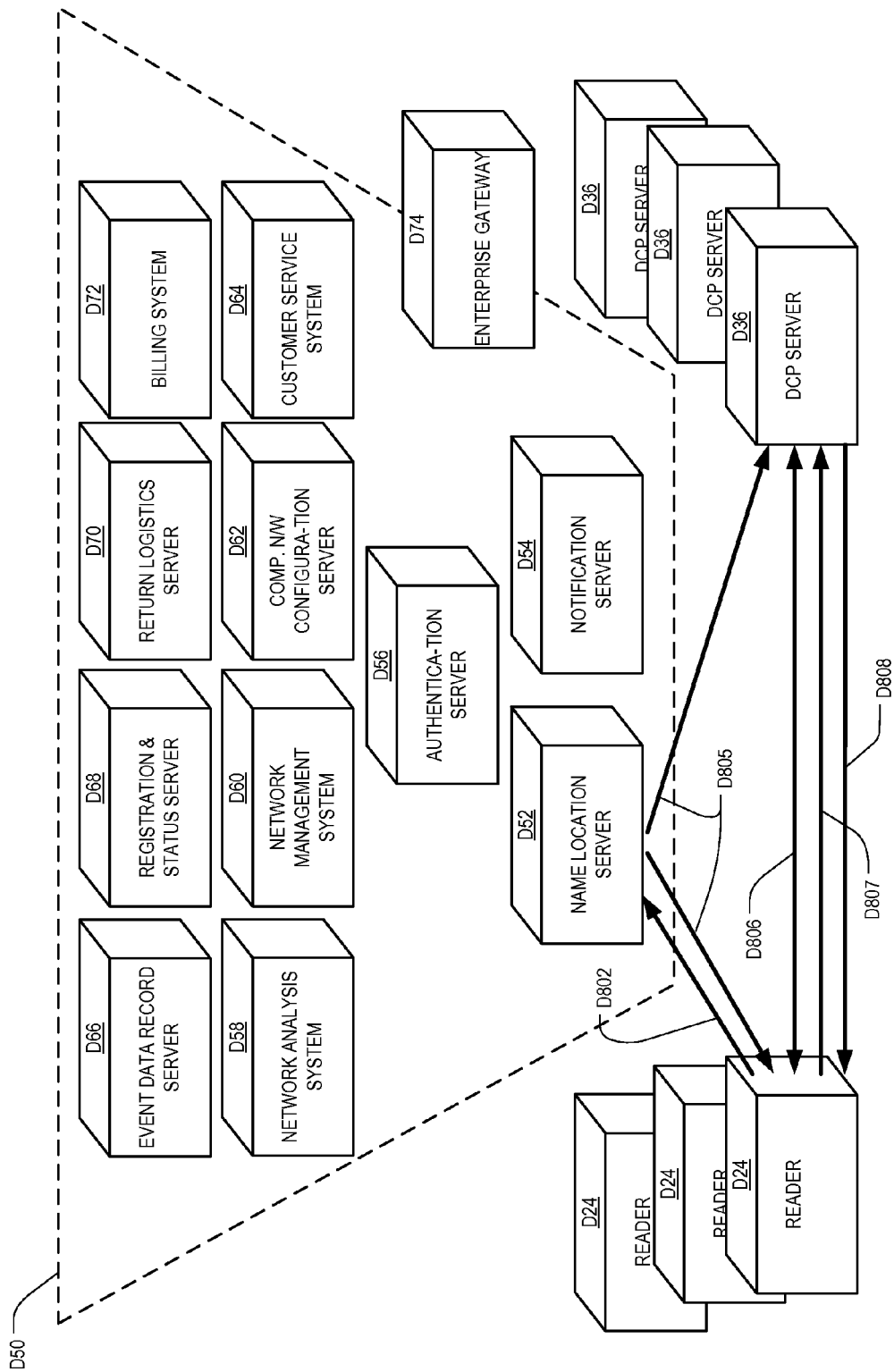
FIG. 50 is a block diagram of a Message Management and Routing System in accordance with one or more preferred embodiments of the present invention.

FIG. 50 is a block diagram of a Message Management and Routing (MMR) System D50 in accordance with one or more preferred embodiments of the present invention. In particular, FIG. 50 shows the major logical elements in the MMR System D50 and their relationship to Readers D24 and DCP Servers D36. Any number of Readers D24 can be connected to the MMR D50. As described previously, Readers D24 can be fixed or mobile and can communicate over dedicated private line facilities or through secured public data links. The entire system is designed to accommodate intermittent connectivity and varying bandwidth channels between the Readers D24 and the MMR D50.

Similarly, any number of DCP Servers D36 can be connected to the MMR D50 through the same, versatile connectivity arrangements as shown in the diagram. However, as will be described later, the preferred method of DCP Server connectivity will be through an Enterprise Gateway Server D74, supplied by a system management entity, which would act as the major focal, management, and message-translation point of the system D50.

The overall topological model incorporates concepts that have proven useful and effective in wireless data, cellular, and both public and private IP networks. Overall, the MMR D50 is based on the Session Initiation Protocol (SIP) model. In this model, the network elements primarily authenticate and orchestrate communications between end devices. In this case, the network elements enable Readers D24 and DCP Servers D36 to form associations with each other and transfer data. The user data itself, whether it is Restricted or Unrestricted, does not pass through the components of the MMR D50.

In at least some embodiments, the architectural plan for the MMR System D50 identifies a plurality of discrete major "server" functions that, in combination, can meet the needs of virtually any user, including DHS. FIG. 50 shows the overall functional elements included in the architectural plan. These functions can be provided in one server with provisioned logical entities or distributed among multiple servers at the same or at multiple locations based upon the volume of data and the depth required in each server function. In at least some embodiments, this "back office" system may be designed to be equally applicable to a standalone first responder application in which the system D50 resides on one laptop server that is used at an incident, as well as for a national network supporting hundreds of coverage islands and tens of thousands of RSNs. DHS can follow either model or can implement an overlay, independent system following the plan described in the RFI.

In the architectural plan illustrated in FIG. 50, eleven discrete major server-based functional components are identified, including a Name Location Server (NLS) D52, an Authentication Server D56, a Notification Server D54, a Customer Service System D64, a Complementary Network Configuration Server D62, a Network Management System D60, a Network Analysis System D58, an Event Data Record Server D66, a Registration and Status Server D68, a Return Logistics Server D70 and a Billing System D72. The logical functions of these various elements is described briefly below.

Figure 51:
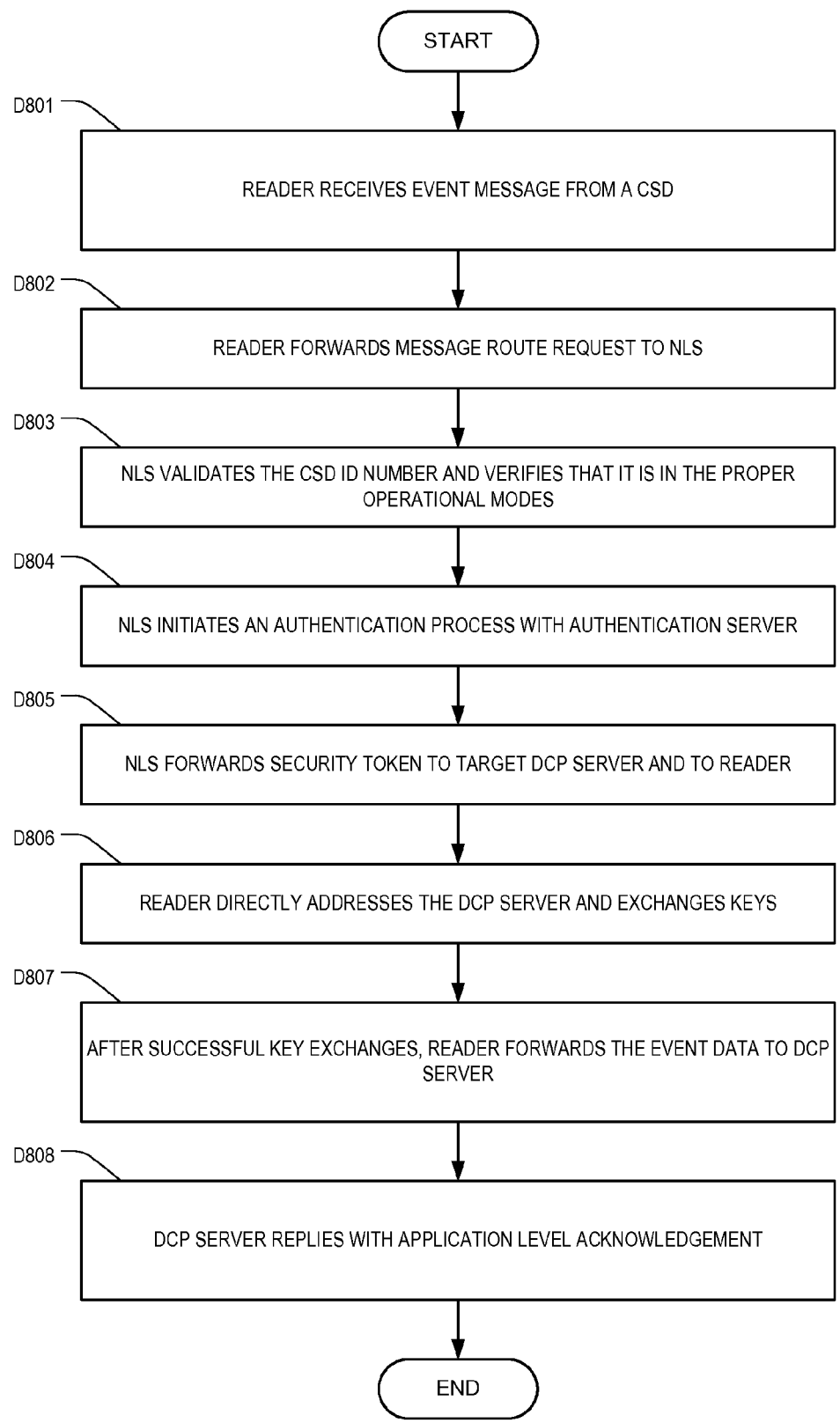
FIG. 51 is a flowchart illustrating the steps of a validation and authentication process carried out by the NLS and Authentication Server of FIG. 50.

The NLS D52 and the Authentication Server D56 are utilized in the flow of messages involved in an inbound (toward the network) message caused by the occurrence of an event in a CSD D12. FIG. 51 is a flowchart illustrating the steps of a validation and authentication process carried out by the NLS D52 and Authentication Server D56 of FIG. 50. With reference to FIG. 50 and FIG. 51, this operational flow, greatly simplified, is described as follows. When a Reader D24 in a coverage island receives an event message from a CSD D12 at step D801, it will forward a message route request at step D802 to the NLS D52. The NLS D52, after validating the CSD ID number and that it is in the proper operational modes at step D803, will initiate an authentication process with the Authentication Server D56 at step D804. The NLS D52 will then forward a security token to both the target DCP Server D36 and the Reader D36 at step D805. The Reader D24 will then directly address the DCP Server D36 and they will exchange keys at step D806. After successful key exchanges, the Reader D24, at step D807, will forward the event data to the DCP Server D36, which will reply with an application level acknowledgement at step D808.

The Notification Server D54 tracks and queues requests for either inbound (toward the host application) or outbound (toward a CSD) messages or actions. For example, the Notification Server D54 could automatically launch an email to DHS personnel when the presence of a CSD container D14 is detected in a coverage island.

The Customer Service System D64 allows management entity personnel to assist customers in their use of the system D50. The customer service representatives can run diagnostics, check the location, mode status, and configuration of CSDs D12 and other system components, but cannot access any Restricted data or issue any Restricted commands.

The Complementary Network Configuration Server D62 enables management entity personnel to configure Gateway Emulators to interface with other types of wireless asset management systems to provide one, standard, and composite view of all assets independent of the technologies used to monitor the assets and forward the information.

The Network Management System D60 is preferably Simple Network Management Protocol (SNMP) based and provides the ability to manage, control, and monitor all system elements.

The Network Analysis System D58 provides real-time monitoring of network probes strategically located in coverage islands to constantly provide feedback on the performance of the network. Latency, response time, and RF link performance are some of the factors that are preferably monitored regularly, if not constantly.

The Event Data Record Server D66 is the system repository for all CSD, application, or user-initiated events that occur within the system. The type, time, location, and classification of events are stored. Specific customer data, Restricted or Unrestricted, is generally not captured or stored. Properly authorized users can access the stored data for their particular CSDs D12.

The Registration and Status Server D68 is the single registration point for all CSDs D12, customers, and network components in the system D50. It also maintains the status of each device and propagates status changes to other elements, as required, when they occur.

The Return Logistics Server D70 stores instructions and addresses for the handling and re-distribution of CSDs D12 that are returned to the depot for customers that choose to use this service.

The Billing System D72 filters the records stored in the Event Data Record Server D70 and bills customers accordingly based upon their contract arrangements.

The remaining element shown in the figure is the Enterprise Gateway (EGW) D74. This element, shown on the "edge" of the MMR network, bridges the gap between the standard message flows and handling within the MMR system D50 and the customer's environment. One or more EGWs D74 are associated with each customer. The EGWs D74 contain custom code to allow them to communicate with individual customer systems using the protocols, addressing, and security arrangements that they prefer. One of the most important functions of the EGW D74 is to map CSD unit IDs to customer-controlled container (or other asset identification) numbers. By so doing, each customer application does not have to use or even know the internal details or routing of messages or even the basic addressing scheme used by the network. Each customer can implement whatever naming and addressing scheme that he so chooses. The EGW D74 also authenticates individual customer users and restricts access to commands and data as determined in the customer-controlled user profiles.

As mentioned above, the EGW D74 may be especially appropriate for use by the DHS as the main interface point to the system D10. This will relieve DHS of implementing many of the functions within their DCP network that will already be in place in the MMR D50 for commercial customers.

A CSD Implementation: Interconnected "Islands" of Coverage

Each Reader D24 establishes a coverage zone for monitoring a location—in effect, creating an island of coverage. Multiple Readers D24 can be used to extend coverage over a large site. However, the number of Readers D24 required is considerably fewer than would be expected from other networks that use the same frequency band and similar RF characteristics. This reduced infrastructure requirement is a result of the ability of each CSD RSN D24 ability to act as a wireless router and relay information from other CSD RSNs D20 that are not in direct coverage contact with a Reader D24. As previously described, each CSD RSN D20 may have a nominal range of approximately 300 feet, and up to sixteen relays (hops) can occur. In an idealized situation, the range from the farthest CSD RSN D20 to a Reader D24 could be 4,800 feet (300 feet times sixteen hops). Of course, real world propagation conditions and actual placement of assets would reduce this theoretical range.

Each island is established by the Reader(s) D24 broadcasting a Class-based radio beacon that CSD RSNs D20 within radio range (and have a proper Class assignment) receive. CSD RSNs D20 that hear the beacons periodically repeat them to extend coverage. As a container D14 with a CSD D12 enters the coverage island (within radio range of a Reader D24 or another CSD D12), the CSD RSN D20 responds to the beacon with an "I am here" message. The "I am here" message is repeated through a series of CSD RSNs D20 until the message reaches a Reader D24. Upon receipt of the message, the Reader D24 queries the NLS D52 to validate that the CSD D12 is a valid unit and can gain access to the network through the Reader D24. The NLS D52, shown in FIG. 50 of the MMR D50, then downloads a security token (after authenticating the CSD D12) and routing information that will be used to forward CSD messages.

The presence of that CSD D12 (and of the container D14 with which the CSD D12 is associated) is detected and logged by the Reader D24 as an Event Data Record (EDR), and those EDRs are forwarded via a data link to appropriate logistics-management systems D34 and to archival storage. This detection and reporting are near-real-time (within several seconds). Based upon the behavioral state of the CSD D12 and any stored alarm conditions, event messages can then be forwarded to the Reader D24 which, in turn, will route them to appropriate applications based upon the stored information.

Each CSD D12 that is accepted into a given island can subsequently send a periodic check-in message to the Reader D24 along with a time interval indicating the next time that it intends to send its next check-in message. The Reader D24 forwards this information to the customer's application. Based upon customer preference, the application may take action if the time period has elapsed and expected message has not been received. At any time, a host application can query the NLS D52 to determine the last time and location that a CSD message was received. With the last known location information available, an application can launch an outbound query request to locate the CSD RSN D20 and check its status. However, with the automatic presence log-in and continuous sensor and presence monitoring capabilities of each CSD D12, outbound queries should be required rarely. Even rarer will be the requirement for an individual D32 with an SHHR D28 to physically approach and query a container D14 as outlined in the DHS RFI.

If an event occurs at a CSD D12, such as a container door breach, after-hours movement, or excessive shock, the CSD RSN D20 will automatically initiate a message that will be routed to the appropriate host application. The resulting location-management capabilities allow CSDs D12 to be tracked as they move from coverage island to coverage island. By establishing islands at factories, collection/distribution centers, weigh stations, truck stops, ports, ships, military bases, and the like, the progress and condition of a container D14 can be monitored end to end. Since the operating frequencies of all the devices are in the 2.4 GHz band and the frequencies and power levels are otherwise automatically adjusted per the Reader's GPS-reported location, islands may be located anywhere in the world, even when mobile or on board a vessel. Global coverage is possible.

The DHS DCP servers D36 could mimic the function of the NLS D52 or could simply take advantage of it. In the first instance, each coverage island Reader Server D24 would contain fixed (but downloadable) routes that would be used to direct all DHS-related, CSD traffic directly to the targeted DCP server D36 after the network validated the CSD's identity. In the other case, the NLSs D52 could contain DCP server addresses that are entered and updated through a secure link to DHS. With this approach, a number of the other functions associated with the network would be available to DHS. Some of these services include automatic notification of the appearance of a CSD D12 and automatic downloading of queued messages or files to a CSD RSN D20 when it appears in any island. Other features of the network that would be available include the ability to set operating and response modes in the CSD RSNs D20, query each CSD RSN D20 to upload diagnostic statistics and peg counters, and the ability to set and query for specific CSD parameters and profiles.

Unlike most other electronic seals, the CSDs D12 preferably do not continuously "blink" (periodically transmit a short burst of data to assist in their being found). Except for occasional beacons, CSDs D20 are RF-silent (no radio-frequency radiation) until a sensor input wakes them up, a command is received from a Reader D24, or another CSD RSN D20 requires a relay. Once data/commands have been sent, CSD RSNs D20 go silent again, until the next event. This mode of operation dramatically reduces the amount of network traffic and therefore, self-generated interference and congestion. It also relives Readers D24 from processing meaningless data.

This wake-up-only-when-needed behavior significantly helps maximize the battery life of CSDs D12. This mode of operation plus the nature of the preferred technology provides very long battery life (two or more years), making it unnecessary to ever have to remember to turn a CSD D12 on or off. (For this reason, in at least some embodiments, the CSDs D12 have no on-off switch.) The two-year battery life specification includes each CSD RSN D20 receiving up to two hundred messages daily and forwarding a large portion of them. These loading conditions are only likely to occur at very high density sites such as shipping ports with thousands of CSDs D12 present.

The DHS RFI requires operation in ambient temperature environments to as low as −40 degrees C. Such low temperatures greatly diminish battery life. The CSD D12 of the present invention will still operate under this extreme and unlikely condition. However, at that temperature, it may not be able to maintain the two hundred messages per day reception rate over a two-year period, but it is preferably able to fully comply with the 70-day trip requirement. Under any usage scenario with any reasonable ambient temperature profile, the CSD's battery capacity will remain closer to the two plus-year specification than the seventy-day requirement listed in the DHS RFI.

Since the CSD RSNs D20 make no transmissions when not in the presence of a Reader D24, the system D10 is suitable for air transport applications. CSDs D12 could be attached to air-freight containers (ULDs), which, when put aboard an aircraft, would no longer be able to "hear" any Readers D24 at the airport and would, therefore, cease all transmissions, thereby avoiding interference to aircraft navigation and communication systems. The CSD RSNs D20 would subsequently transmit again only when unloaded from the aircraft, when they could again "hear" a Reader D24 or the beacon of another RSN D20.

A CSD Implementation: High-Level Logical Message Flows

FIGS. 9-15 provide samples of some of the message flows and their interaction between the various components in the system D10. They have been simplified for the sake of clarity. Notably, the system D10 may utilize either a direct Reader-to-DCP Server network configuration or a Reader-to-MMR-to-DCP Server network configuration.

A CSD Implementation: CSD Arming

Figure 52:
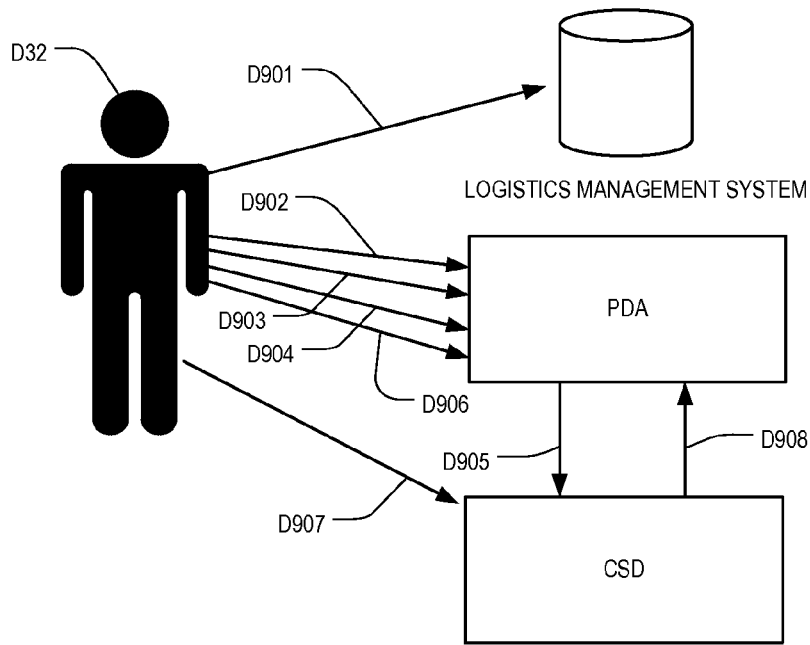
FIG. 52 is a schematic diagram illustrating the operational flow of a process of arming a CSD with a PDA.

FIG. 52 is a schematic diagram illustrating the operational flow of a process of arming a CSD D12 with a PDA D30. For purposes of illustration, it will be assumed that the PDA D30 is a non-secure PDA and that the operation takes place at a location that is within coverage of a Reader D24. The user's PDA D30 uses a Wi-Fi connection to access the shipping database to associate the CSD D12 and container D14.

Figure 54:
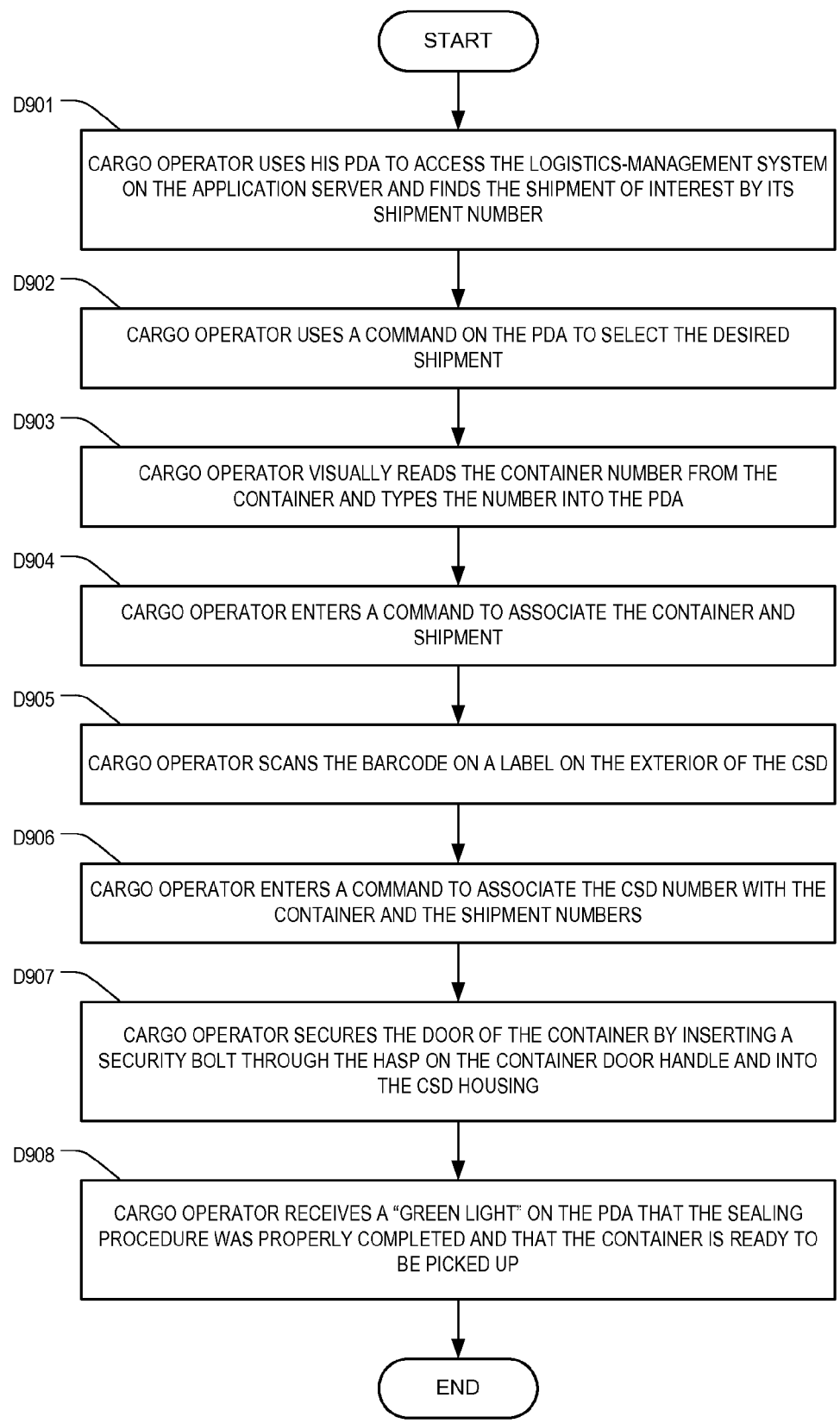
FIG. 54 is a flowchart illustrating the steps of the process of FIG. 52.

FIG. 54 is a flowchart illustrating the steps of the process of FIG. 52. As shown therein, and with reference to FIG. 52, a cargo operator D32 uses his PDA at step D901 to access the logistics-management system D34 on the application server and finds the shipment of interest by its shipment number. In step D902, the cargo operator D32 uses a command on the PDA to select the desired shipment. In step D903, the cargo operator D32 visually reads the container number from the container D14 and types the number into the PDA. In step D904, the cargo operator D32 enters a command to associate the container D14 and shipment. In step D905, the cargo operator D32 scans the barcode on a label on the exterior of the CSD D12. In step D906, the cargo operator D32 enters a command to associate the CSD number with the container D14 and the shipment numbers. In step D907, the cargo operator D32 secures the door of the container D14 by inserting a security bolt D22 through the hasp on the container door handle and into the CSD housing D18. In step D908, the cargo operator D32 receives a "green light" on the PDA that the sealing procedure was properly completed and that the container D14 is ready to be picked up.

Although not separately illustrated, it will be appreciated that in a variation, the actual sealing of the container D14 (inserting the electronic bolt D22 through the container hasp and into the CSD D12) could have taken place in any area, independent of Reader coverage. In this case, there would be no association between the container number, shipment, and CSD. Any tampering with the CSD D12 would still be captured within the CSD D12 and reported as soon as the CSD D12 was in range of Reader. The association between the CSD D12 (and electronic bolt D22) and the container and shipment numbers could occur whenever a cargo operator D32 with a PDA D30 (or SHHR D28) was in range of a Reader D24. They would then follow the steps outlined in the scenario.

Figure 53:
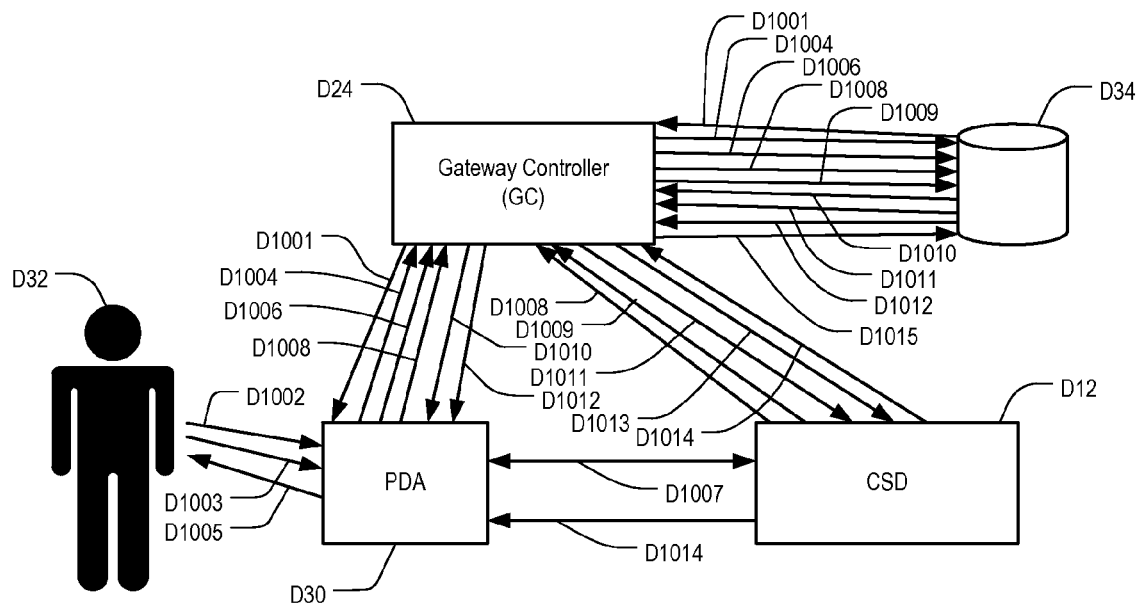
FIG. 53 is a schematic diagram illustrating the logical data flows associated with a cargo operator arming a CSD.

FIG. 53 is a schematic diagram illustrating the logical data flows associated with a cargo operator arming a CSD D12. It will be appreciated that here, the "Reader" is shown as a Gateway Controller. This terminology helps to emphasize the fact that in at least some embodiments, the system D10 is equally applicable to both the private sector and DHS. Further, it will be appreciated that the components and connections of the Gateway Controller to the Message Management and Routing (MMR) system D50 are not shown in FIG. 53. Instead, the logical flow of data from the Gateway Controller to the logistics application (of the logistics-management system D34) is shown.

Figure 55:
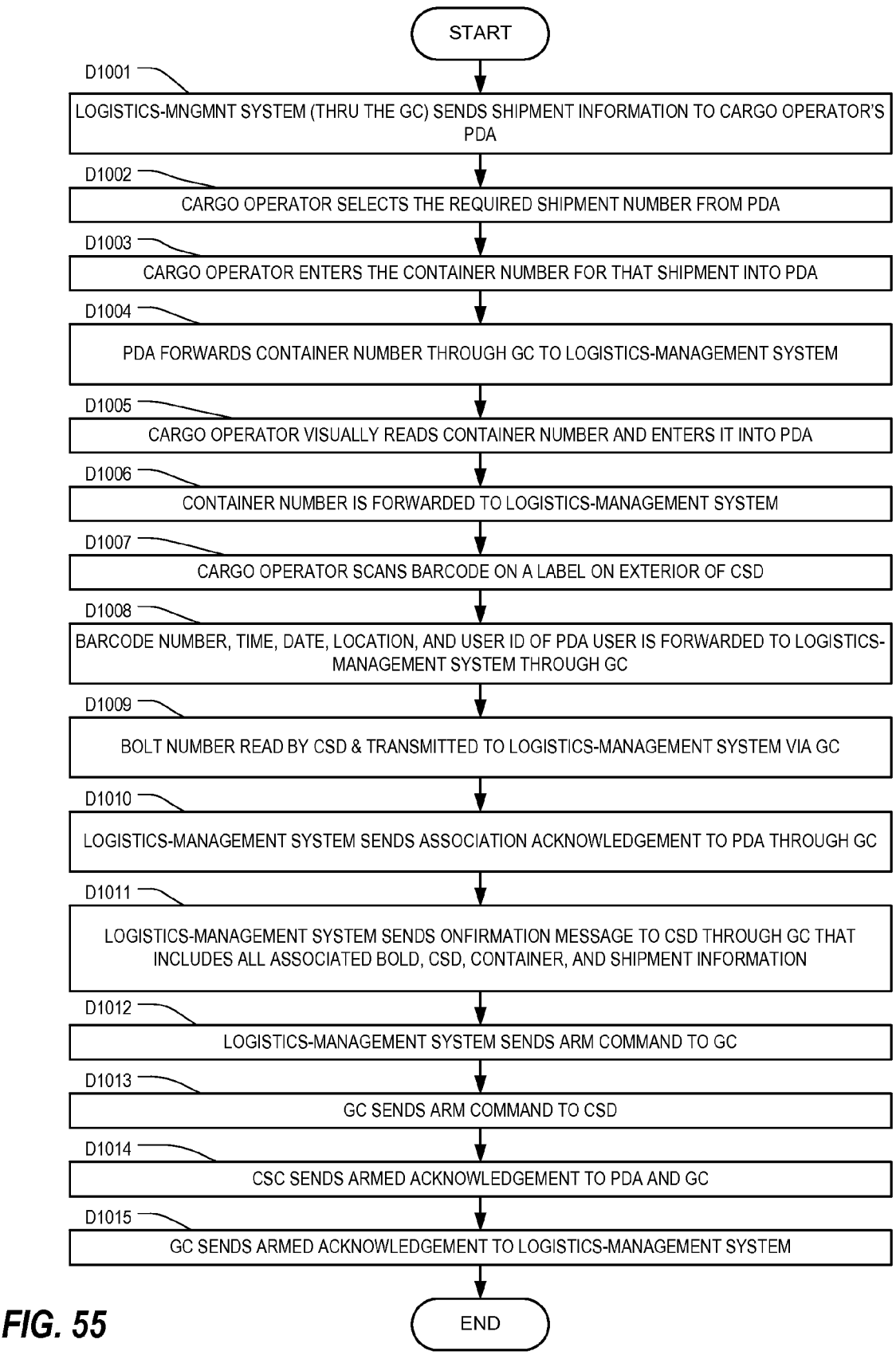
FIG. 55 is a flowchart illustrating the steps of the process of FIG. 53.

FIG. 55 is a flowchart illustrating the steps of the process of FIG. 53. As shown therein, and with reference to FIG. 53, at step D1001, the logistics-management system D34 (through the Gateway Controller) sends shipment information to the cargo operator's PDA D30. At step D1002, the cargo operator D32 selects the required shipment number from the PDA D30. At step D1003, the cargo operator D32 enters the container number for that shipment into the PDA D30. At step D1004, the PDA D30 forwards the container number through the Gateway Controller D24 to the logistics-management system D34. At step D1005, the cargo operator D32 visually reads the container number and enters it into the PDA D30. At step D1006, the container number is forwarded to the logistics-management system D34. At step D1007, the cargo operator D32 scans the barcode on a label on the exterior of the CSD D12. At step D1008, the barcode number, the time, the date, the location and the user ID of the PDA user is forwarded to the logistics-management system D34 through the Reader Server. At step D1009, the bolt number is read by the CSD D12 and transmitted to the logistics-management system D34 via the Gateway Controller. At step D1010, the logistics-management system D34 sends an association acknowledgement to the PDA through the Gateway Controller. At step D1011, the logistics-management system D34 sends a confirmation message to the CSD through the Gateway Controller that includes al of the associated bolt D22, CSD RSN D20, container D14, and shipment information. At step D1012, the logistics-management system D34 sends an Arm command to the Gateway Controller. At step D1013, the Gateway Controller sends the Arm command to the CSD. At step D1014, the CSD D12 sends an Armed acknowledgment to the PDA and Gateway Controller. Finally, at step D1015, the Gateway Controller sends an Armed acknowledgment to the logistics-management system D34.

FIG. 56 is a schematic diagram illustrating the logical data flow between CSD RSN D20, Reader D24, and DCP D36. In FIG. 56, the DCP D36 has been added to the system. In this configuration, the DCP has a direct connection to the Readers (previously referred to as Gateway Controllers). Messages to/from the CSD RSN D20 and DCPs D36 would be routed directly between these components, while commercial data would be routed through the MMR (not shown) and then to the logistics-management system D34.

FIG. 57 is a flowchart illustrating the steps of the process of FIG. 56. As shown therein, and with reference to FIG. 56, the Reader first establishes communications with the DCP at step D1101, and the Reader establishes communications with the CSD at step D1102. Thereafter, at step D1111, the Reader sends a CSD Status Message request to the CSD. At step D1112, the CSD logs Reader command. At step D1113, the CSD RSN D20 sends a CSD Status Message to the Reader D24. At step D1114, the Reader sends an acknowledgement to the CSD. At step D1115, the Reader D24 forwards the CSD Status Message to the DCP D36.

It will be appreciated that the DCPs D36 could also be connected to the MMR as previously described to allow the DCPs D36 to take advantage of the MMR capabilities. Restricted messages between the SHHR, CSD and DCP components would be enveloped and pass through the MMR transparently and not be accessible to any MMR system or users.

A CSD Implementation: Deep Water Notification Capabilities

With both CSDs D12 and Readers D24 capable of storing event information, the system D10 of the present invention may be utilized to provide a very flexible deep water notification system. FIG. 58 is a schematic diagram illustrating the logical data flow between a CSD D12, a DCP D36 and an application server in a logistics-management system D34 in deep water for Deep Water Notification. In this example, CSDs D12 on containers D14 would store their status information internally. This information would include any container breach information that occurred at any past time or place. Readers D24 located on-board ship at strategic locations, perhaps in holds and on-deck, would monitor the CSDs D12. Utilizing unique hopping capabilities, CSDs D12 can forward messages and assist other CSDs D12 that do not have direct radio paths to communicate with Readers D24. Any reported events would be stored in the Readers D24 or, perhaps, forwarded to an on-board application in a logistics-management system D34 that is connected to all Readers D24.

Either the Readers D24 themselves or the on-board application of the logistics-management system D34 could be connected to a satellite link to relay any triggered event data to a land-based DCP Server D36. Alternatively, the event information could be stored and forwarded when another reader-equipped vessel approached and, with the correct credentials, queried the system.

Even without the occurrence of an event, an approaching vessel could issue a command that queried all or some selected (by Class) group of CSDs D12 to determine their presence, condition, and status.

FIG. 59 is a flowchart illustrating the steps of the process of FIG. 58. As shown therein, and with reference to FIG. 58, the CSD RSN D20 senses an event at step D1201 and sends an event message to a Reader. At step D1202, the Reader D24 records the event parameters, time data, and CSD ID. At step D1203, the CSD D12 records event parameters and time data. At step D1204, the Reader D24 sends an acknowledgement to the CSD RSN D20. At step D1205, the Reader D24 sends an event message to the container owner's on-board logistics-management system D34. At step D1206, the Reader D24 sends an event message to the DHS DCP D36. At step D1207, the DHS DCP D36 sends a response/actions to respective authorities D38.

A CSD Implementation: CSD De-Activation

Figure 60:
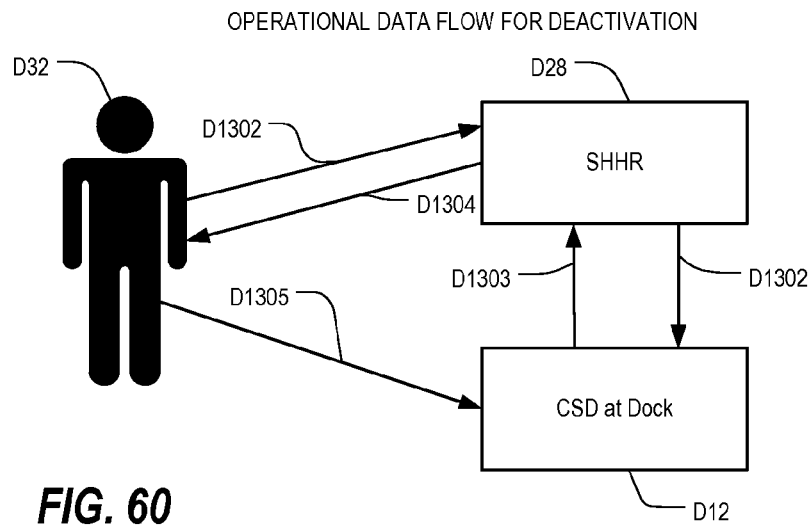
FIG. 60 is a schematic diagram illustrating the operational data flow for a CSD deactivation process.

FIG. 60 is a schematic diagram illustrating the operational data flow for a CSD deactivation process. In this case, as a ship D90 arrives and begins the unloading process, any CSDs D12 on-board the ship D90 either through the ship-mounted Readers D24 or a Rail Mounted Gantry Reader D24 would receive a presence message from any DHS designated CSDs. Through the DCP application or, perhaps, an MMR application, a DHS cargo operator D32 would be notified on their SHHR D28 that certain CSDs D12 have arrived. They would then proceed to the CSD/container location and perform the steps described below.

Figure 61:
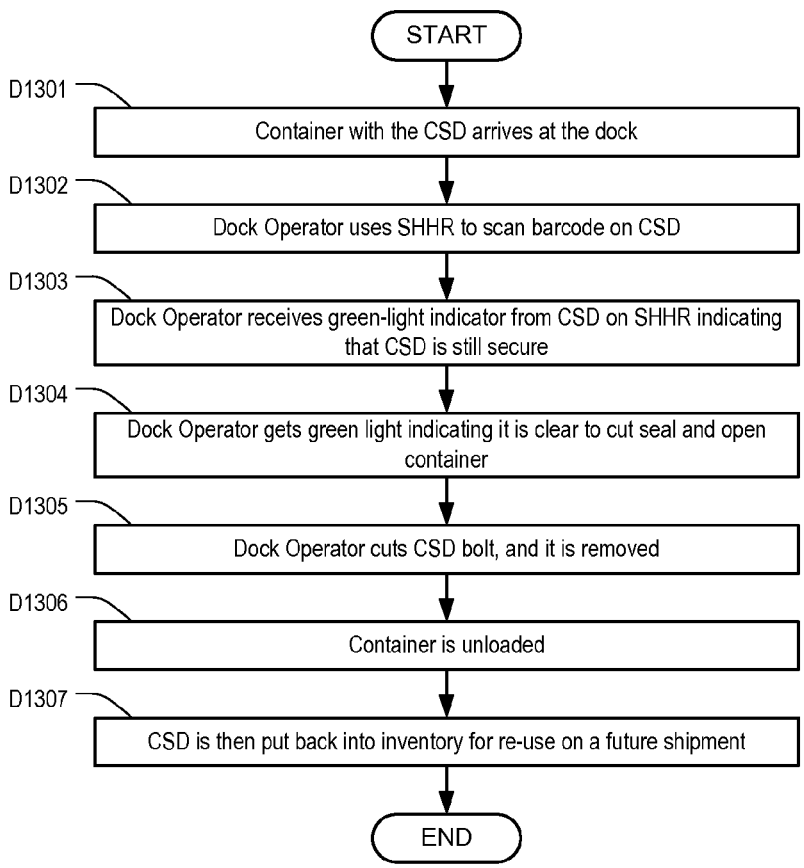
FIG. 61 is a flowchart illustrating the steps of the process of FIG. 60.

FIG. 61 is a flowchart illustrating the steps of the process of FIG. 60. As shown therein, and with reference to FIG. 60, the container D14 with the CSD D12 arrives at the dock at step D1301. At step D1302, the cargo operator D32 uses an SHHR D28 to scan the barcode on the CSD D12. At step D1303, the SHHR D28 receives a green-light indicator from the CSD RSN D20 indicating that the CSD D12 is still secure. At step D1304, the cargo operator D32 views the green-light indicator on the SHHR D28. The green-light indicator also may be provided by an LED that forms part of the CSD housing, and additionally or alternatively, the "green light" indication may be audibly provided by speaker associated with the CSD or with the SHHR. In still yet other embodiments, an infrared (IR) indicator is included in the CSD for providing a "green" light, wherein the indication is only visible with equipment for viewing infrared light, whereby the condition of the CSD is not observable by the naked eye without such IR-viewing equipment.

At step D1305, the cargo operator D32 cuts and removes the CSD bolt D22. At step D1306, the container D14 is unloaded, and at step D1307, the CSD D12 is put back into inventory for re-use on a future shipment.

If the notification message indicated that a CSD breach had occurred, special handling instructions could immediately be made and the container isolated accordingly.

Figure 62:
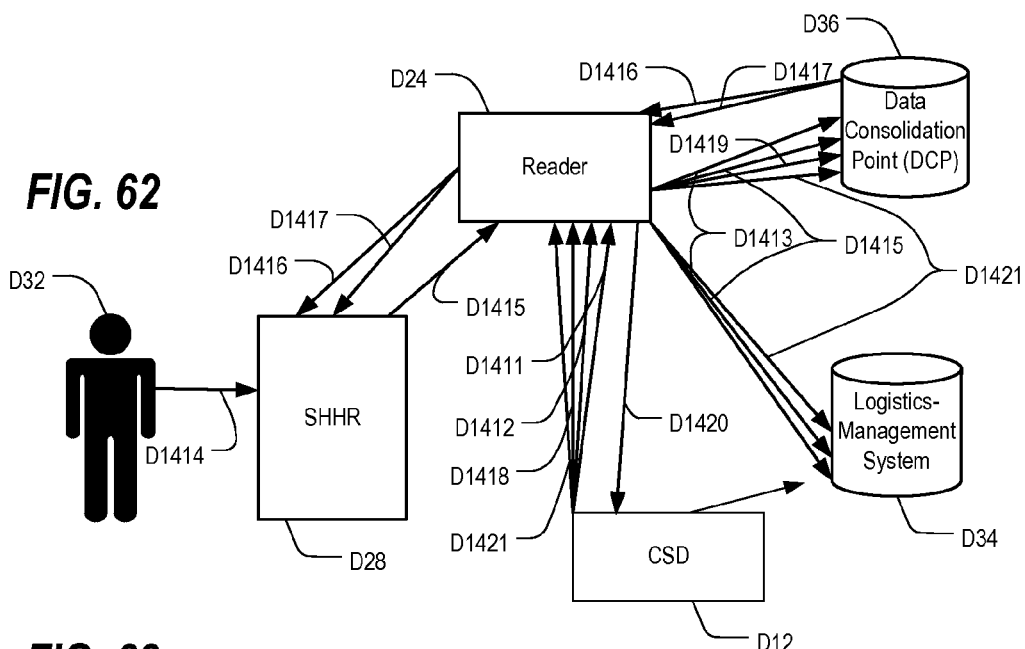
FIG. 62 is a schematic diagram illustrating the logical data flows associated with a cargo operator deactivating a CSD.

FIG. 62 is a schematic diagram illustrating the logical data flows associated with a cargo operator D32 deactivating a CSD D12. It will be appreciated that there is no direct messaging interaction between the SHHR D28 and the CSD D12. All data flows involve the Reader D24 and/or an application. This arrangement significantly enhances security and accountability.

Figure 63:
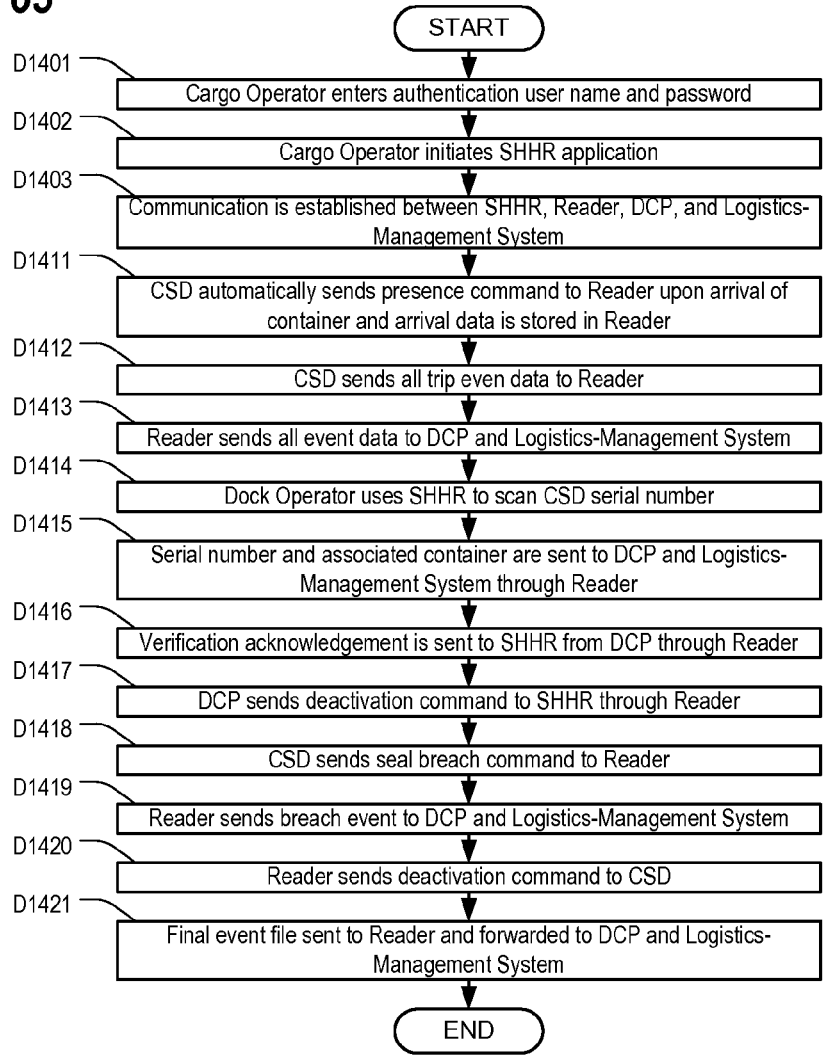
FIG. 63 is a flowchart illustrating the steps of the process of FIG. 62.

FIG. 63 is a flowchart illustrating the steps of the process of FIG. 62. As shown therein, the cargo operator D32 first, at step D1401, enters an authentication user name and password into an SHHR D28. At step D1402, the cargo operator D32 initiates the SHHR application. At step D1403, communication is established between the SHHR D28, the DCP D36, and the logistics-management system D34.

Thereafter, at step D1411, the CSD RSN D20 automatically sends a presence command to the Reader D24 upon arrival of the container D14 and the arrival data is stored in the Reader D24. At step D1412, the CSD RSN D20 sends all trip event data to the Reader D24. At step D1413, the Reader D24 sends all event data to the DCP D36 and the logistics-management system D34. At step D1414, the cargo operator D32 uses the SHHR D28 to scan the serial number of the CSD D12. At step D1415, the serial number and associated container identifier are sent to the DCP D36 through the logistics-management system D34 through the Reader D24. At step D1416, a verification acknowledgement is sent from the DCP D36 to the SHHR D28 through the Reader D24. At step D1417, the DCP D36 sends a deactivation command through the Reader D24 to the SHHR D28. At step D1418, the CSD RSN D20 sends a seal breach command to the Reader D24. At step D1419, the Reader D24 sends a breach event to the DCP D36 and to the logistics-management system D34. At step D1420, the Reader D24 sends a deactivation command to the CSD RSN D20. At step D1421, a final event file is sent to the Reader D24 and forwarded to the DCP D36 and the logistics-management system D34.

A CSD Implementation: Summary of Topology

Figure 64:
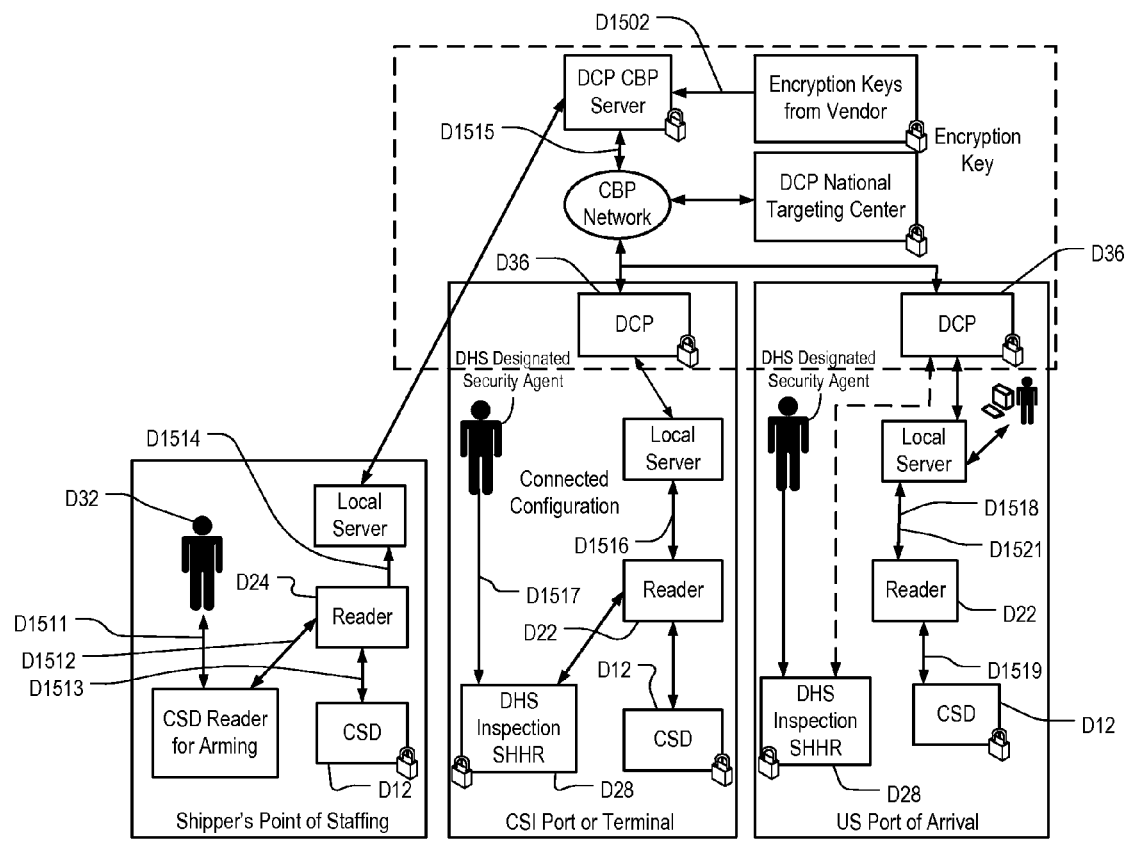
FIG. 64 is a schematic diagram illustrating, in summary form, the overall topology for end-to-end data flow in the system for a transoceanic shipment of intermodal shipping containers.

FIG. 64 is a schematic diagram illustrating, in summary form, the overall topology for end-to-end data flow in the system D10 for a transoceanic shipment of an ISO 668 container D14. With the availability of the components of the MMR system D50 implemented as either small, standalone systems, or in the nationwide shared network model, a number of different configurations can be used in a number of different combinations to meet the needs of DHS, other government agencies, and commercial entities alike.

Figure 65:
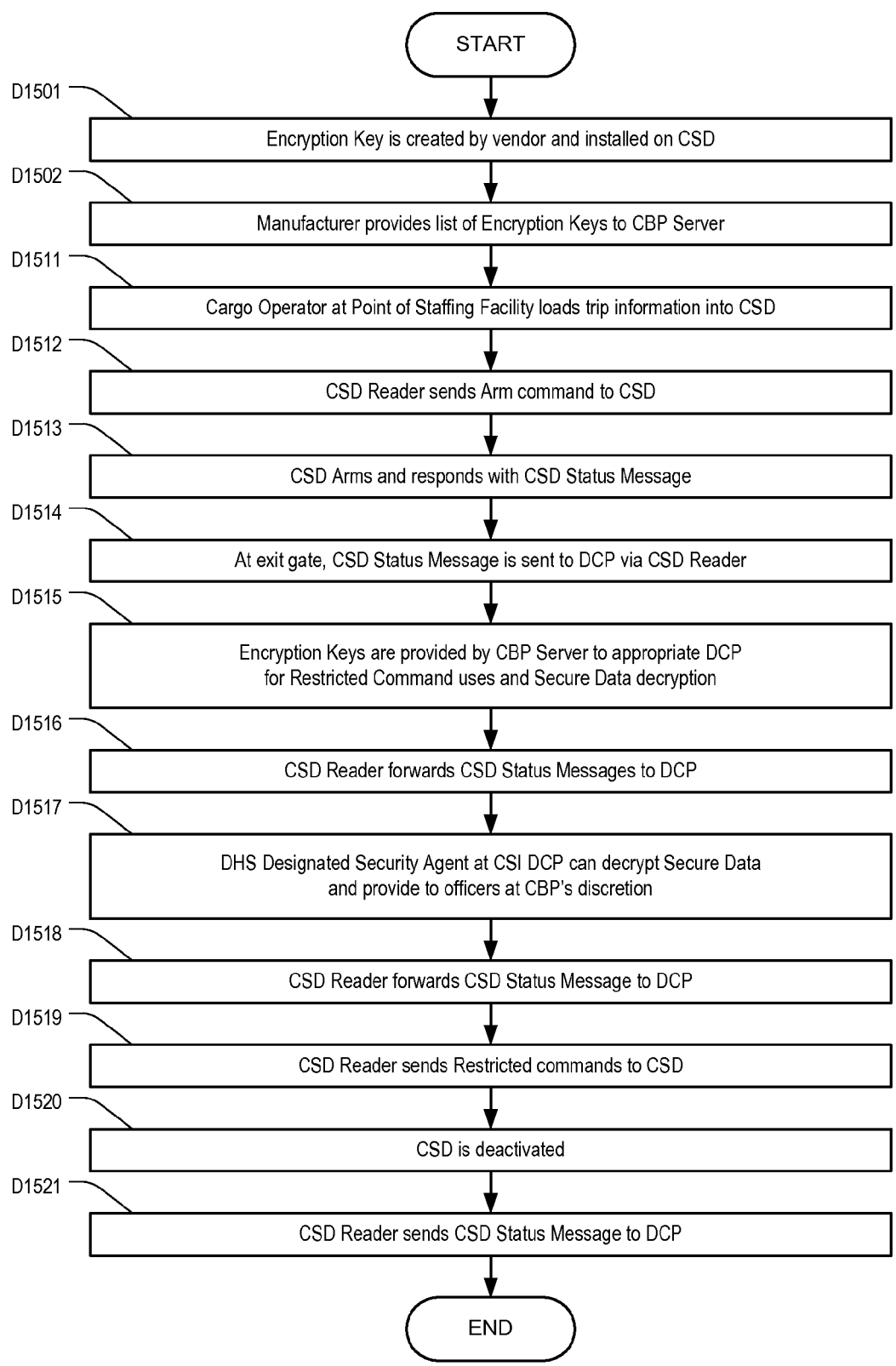
FIG. 65 is a flowchart illustrating the steps of the process of FIG. 64.

FIG. 65 is a flowchart illustrating the steps of the process of FIG. 64. As shown therein, and with reference to FIG. 64, an encryption key is first created, such as by the CSD vendor, and installed on the CSD D12, and the manufacturer provides a list of encryption keys to a Customs and Border Protection (CBP).

Thereafter, the cargo operator D32 at the Point of Staffing Facility loads trip information into a CSD RSN D20 at step D1501. At step D1502, the Reader D24 sends an "arm" command to the CSD RSN D20. At step D1503, the CSD D12 is armed and the CSD RSN D20 responds with a CSD status message. At the exit gate, the CSD status message is sent, at step D1504, to the DCP D36 via the Reader D24. At step D1505, encryption keys are provided by the CBP server to the appropriate DCP D36 for Restricted Command uses and secure data decryption. At step D1506, the Reader D24 forwards CSD status messages to the DCP D36. At step D1507, a DHS Designated Security Agent D42 at a Container Security Initiative (CSI) DCP D36 can decrypt the Secure Data and can provide it, at CBP's discretion, to officers. At step D1508, a Reader D24 at a U.S. port of arrival forwards the CSD status message to a DCP D36. At step D1509, the Reader D24 at the U.S. port of arrival sends Restricted commands to the CSD RSN D20. At step D1510, the CSD D12 is deactivated, and at step D1511, the CSD Reader D24 sends a new CSD status message to the DCP D26.

A CSD Implementation: Network Availability, Failure Modes, and Event-Detection Reliability The system D10 of the present invention applies technology, redundancy, and layering, all coordinated with the personnel and site security measures typically applied in the cargo-transport industry, to provide a robust solution. In architecting, designing, and building system components, trade-offs must be made. These trade-offs are often subtle, with their implications not obvious except in rare or anomalous situations. In designing the system D10, a rigorous process may be applied to all components and subsystems to help prioritize the design decisions and trade-offs necessary. In one approach, a variety of characteristics are preferably considered for each system element. These thirty characteristics may be rank ordered in terms of their overall importance to the operation of the entire system D10. Based on the component in question and its function in the overall system D10, significant variations in the rank order between components exist. Thirty exemplary characteristics that are preferably considered and listed in ordered of priority for each component in the system D10 include: analyzability; financial viability; predictability; availability; flexibility; recoverability; buildability; graceful degradation; reliability; capability; installability; resilience; compatibility; integratability; stability; configurability; interoperability; supportability; diagnostics; maintainability; testability; documentation; modularity; traceability; expandability; optionability; usability; extendibility; performance; and vulnerability.

In particular, the foregoing approach may be utilized to meet desired goals with regard to such areas as network availability, failure modes, and event-detection reliability, all as further elaborated upon hereinbelow.

A CSD Implementation: CSD Specification Requirements

The various elements of the system D10 are preferably designed, engineered, and manufactured for use in the intended environments and for the expected handling, including what is found in ports, aboard ships, in rough weather, as well as in the deserts of the Middle East. The same products (RSNs D20 and Gateways D24) may also, for example, be used for systems deployed in the fire and rescue services where life/death situations are encountered on a regular basis. State-of-the-art materials, design rules, and processes are preferably utilized in how the system elements are manufactured, site-engineered, maintained, and, if needed, repaired, with the result being a robust, reliable, yet flexible system, resulting in high availability of both the system D10 and of individual components.

MIL-STD-810F is preferably the standard to which the components are specified and designed. Criteria include operating temperature, storage temperature, thermal shock, water immersion, water spray, saltwater spray, freezing water spray, salt fog, drop/shock, vibration, steam, corrosive atmospheres, explosive atmospheres and electrostatic discharge (ESD).

A CSD Implementation: CSD Failure Modes

CSDs D12 also have diagnostic routines that are periodically queried by the system D10 or run when requested by a system operator. From a network point of view, it is difficult to differentiate a CSD failure from a CSD RSN D20 being out of radio coverage range. The out-of-range condition could be a result of the container D14 or other CSD asset actually moving out of the coverage island, the signal path (hopping path) no longer being available, or perhaps the presence of a high level of interference. These conditions are not unique to a system of this type and can occur in any radio-based system. The inherent intelligence of the CSD RSN D20 plus host application logic can mitigate some of these conditions. These approaches are not applicable to systems that use stationary Readers D24 and require CSDs D12 to pass through them before CSD updates are made.

The following approaches are all supported by the design and basic capabilities of the system D10. Each customer, including DHS, can choose to utilize these features or not. Any and all of these capabilities can help to determine the condition of a CSD. These features and capabilities include, but are not limited to, the following. First, using the motion detection feature, a CSD RSN D20 could send a message to the system D10 whenever the CSD D12 is/has moved. Also, a host application could send a "next update interval" time to the CSD RSN D20 and then wait for a response at the end of the interval. Further, a host application could periodically query the network for "last heard from" time and location for a CSD RSN D20. Still further, a host application could periodically query the CSD RSN D20 and request that it forward its stored event log or other information. Still further, a host application could periodically send a command to a CSD RSN D20 requesting that it: perform a self-test; upload its stored network management related statistics and peg counters; or send its battery charge status.

Regardless if and where a CSD (electronic) failure occurs, the CSD security bolt D22 continues to protect the container D14 and its doors D16 until the CSD D12 can be replaced. Similarly, if the electronic portion of the CSD D12 is destroyed (deliberately or accidentally), the security bolt D22 will continue to protect the container D14 and its doors D16. Conversely, the CSD RSN D20 would report the failure of the bolt's electronics as in any other event, but failure of the bolt's electronics would not affect bolt mechanical integrity, nor the CSD's other functions.

A CSD Implementation: Battery Failure Avoidance

Battery discharge is an expected failure mechanism. As previously described, the CSD batteries will preferably last at least two years and probably considerably longer for most usage models. The CSDs D12 continuously monitor the health of their internal batteries and report an event when a Low Battery, then a Critical Low Battery, condition exists. When this initial Low Battery condition occurs, the CSD D12 will be able to continue to operate for a reasonable period of time.

After this condition is detected, the CSD D12 will, based upon its profile setting, begin to operate in a battery conservation mode in which it will only participate in hopping (message repeating activities) that involve its primary Class. This will, in turn, further reduce the current drain. When the critical Low Battery state is reached, the CSD RSN D20 will send in a message and will record the time/date of this event internally and then systematically shut down, preserving all of its stored data.

A CSD Implementation: Event-Detection Reliability

With the CSD D12, detection of a door-opening event is essentially one hundred percent reliable, and the opening tolerance is zero. With the built-in motion and shock sensors, the system will detect virtually all door and door component removal attempts, as well as left-hand door breach attempts.

If the CSD D12 does not function (or has been destroyed), the bolt D22 still serves as a security seal (which requires bolt cutters to remove). If the bolt D22 is cut and not replaced, its absence would be noticed by visual inspection at the location's entrance. If the bolt D22 is replaced, the mismatch of serial numbers (versus what would be in the logistics-management system D34) would be noticed at the location's entrance. If the bolt D22 is replaced with a standard bolt that does not contain an embedded serial number, the CSD RSN D20 would record (and forward) the event and note that a non-readable bolt was inserted.

Lastly, a failure of the CSD circuitry would be noticed when a comparison of gate/dock arrival data in the appropriate logistics-management system D34 and the absence of data reported from the location's Reader D24 about the same shipment and CSD D12 reveals a mismatch.

A CSD Implementation: Event-Communications Reliability

Once an event is detected, it must still be communicated so that it can be acted upon. The communications reliability of the system of the present invention, compared to that of other approaches, is enhanced by features including, but not limited to, the initiation of communication at the time of the event, not just when passing a reader D24; long life of CSD batteries; high power of CSD radios; hopping; class-based messaging; multiple communications technologies; and the requirement for all messages to be acknowledged by the host application (continued persistence). These features are described in greater detail hereinbelow.

The long battery life enhances reliability by reducing the probability that a battery will fail at a critical moment. The internal power regulation circuitry of the CSD also helps keep the available power nearly constant throughout the battery's life, helping to sustain full-power operation. Low-battery reporting further reduces the probability that a CSD will fail mid-transit (since the CSD can be swapped out before failure occurs).

The high power of CSD radios delivers long range and deep penetration, reducing the probability that a given CSD D12 is left in an area of a monitored location and cannot communicate with a Reader D24.

Hopping (relaying messages from one CSD RSN D20 to another) effectively extends the range of Readers D24, as well as deepens penetration. Hopping-derived deep penetration is particularly important when CSDs D12 are attached to containers D14 that are in large stacks, both aboard ship D90 and in port staging areas (commonly referred to as "iron mountains").

Class-based messaging can be used to partition the communications network of a given location such that only certain subsets of CSDs D12 communicate a given message. The resultant reduction in the number of CSD RSNs D20 that may try to communicate at the same time reduces the probability of interference that could disrupt communication of an event message.

Readers D24 can be equipped with multiple different communications modules, both wireless and wireline. The availability of multiple communications links afforded by these modules reduces the probability that a given location cannot communicate with remote servers and their applications.

CSD-originated messages involve a number of retry mechanisms to increase the overall reliability of message delivery. Each CSD D12 contains two antennas used by the low power radio that propagate with different polarities. These antennas provide transmit diversity that is quite effective in overcoming spatial propagation anomalies (e.g., multipath) that commonly occur in challenging RF environments. Unsuccessful message delivery attempts are also retried based upon some time-based algorithms. This technique mitigates temporal anomalies that can be caused by intermittent interferes (other CSDs or other unrelated devices). The retry algorithms are further supplemented with special receive signal sensing that inhibits transmissions when other signals are present (e.g., "carrier sense" or "listen-before-transmit" operation).

If the retry algorithms are not successful, the CSD RSNs D20 can initiate a "new path request" sequence in which it sends out a message to other CSD RSNs D20 within its range. These CSD RSNs D20 repeat the request through a sophisticated algorithm that attempts to establish a path to a Reader D24 and then responds to the originator Reader D24 which, in turn, can re-attempt message delivery.

Networking protocols that may be used in preferred embodiments of the invention include deterministic and non-deterministic networking as set forth, for example, in USPA Publ. No. 20070002792; USPA Publ. No. 2007/0002793; and Ser. No. 12/271,850, each of which is incorporated herein by reference.

The end result of these techniques is that the likelihood of event message delivery is extremely high in even the harshest, extended-range environments.

A CSD Implementation: Event Falsing

Theoretically, it may be possible to jostle or disturb a sealed (bolt-in) CSD D12 in such a manner as to cause the CSD RSN D20 to falsely sense the cutting or removal of the bolt D22. However, such an event is believed to be highly unlikely, and the mechanics of the bolt D22 and its housing D19 are so tight and robust as to make CSDs D12 all but immune to this theoretical situation. If such a rigorous disturbance were to occur, it is likely to be an indication of tampering with the CSD D12 which would be reported by either the internal motion or shock sensors.

A CSD Implementation: Network Considerations

The overall topology of the system D10 may differ somewhat from the approach outlined in the DHS RFI. In the RFI, individual Readers D24 are connected (only) to the DCP servers D36. These servers (not specified in the RFI) appear to be application-layer servers that, through the documented XML schema process, receive messages from the individual Readers D24 asynchronously. Obviously, the DCP servers D36 provide many other functions such as encryption key management, authentication services, data storage and retrieval, and user access control and interfaces.

However, these services still fall within the application services category. In some embodiments, the system of the present invention can support this operational approach. However, in other embodiments, the system includes all back-end functions to provide visibility, management, and control over all system components. Rather than treating each Reader D24 as a standalone entity, they may be managed collectively with processes and systems that can continuously monitor the health and condition of each Reader "island."

Included in this system D10 are remote network probes that send messages at pre-set intervals. These messages are continuously monitored and used to identify unusual conditions. Each Reader D24 will also contain SNMP connections to an overall network management system which will also monitor each component. Each component within the back-end system will also monitor its message traffic, looking for unusual patterns including unauthorized access attempts.

All of these processes and component interactions may be performed with virtually no processing or transformation of the actual CSD-generated data. Following the Session Initiation Protocol (SIP) model, the back-end components simply set up authenticated paths between the Readers D24 and the host applications (in this case, DCP servers D36) and, once set up, are no longer involved. This minimally invasive approach enhances user message throughput and reliability.

The servers, routers, and other hardware components are all high-quality, commercial-grade devices that will include the required level of backup and redundancy. Site disaster recovery plans may be formulated and implemented as the overall network (number of islands and users) grows.

A CSD Implementation: Deployment Configurations

Referring again to FIG. 16, Readers D24 may be mounted to fixed structures at the port (buildings and lighting masts), as well as mobile ones (e.g., Rail Mounted or Rubber Tire Gantries D92,D94). Similarly, Readers D24 may be mounted on the superstructure, above the deck, and within the holds of a ship D90. If mounted in the holds, the Readers D24 would need to be interconnected with some deck-mounted telecommunications equipment to relay the information through a terrestrial radio or satellite link.

Although standalone operation at each location is possible with local application servers collecting, consolidating, and storing the event data, interconnected operation as described above provides a dramatic increase in overall system functionality. Reader "islands" could operate autonomously and only periodically connect with the overall network. This configuration could be used as part of a Deep Water Notification system. In this arrangement, Readers D24 mounted on the ship D90 or Rail Mounted Gantries (RMGs) D92 that are used to load the ship D90 would receive and store any container seal breaches of mismatched serial bolt, CSD, container ID associations. This information, stored on a server on board would be available through a satellite link or by a terrestrial radio link between vessels at sea. Further, if the breach occurred on board, the event and its time and location would be captured.

A CSD Implementation: CSD Reuse and Return

Other than through mandated use, which quite often results in delays and resistance, the commercial implementation of the CSDs D12 preferably does not place undue burdens on the existing supply chain. This may be especially true at high-volume operation points. The inherent ability of the system D10 to allow the collection and capturing of event data without requiring individual container inspection may be advantageous in avoiding new costs, complexity, and additional cargo handling delays. Also of value are the new processes that must be put in place that are associated with the de-arming, removal, data uploading, and the return of the CSDs D12 for future use. In another feature of the present invention, an overall program is utilized to automate this process and relieve each shipping end point (Trip Termination Point) from the burdensome task of managing the CSDs D12. The approach is equally applicable to both DHS personnel and commercial operators who may implement the system D10 independent of DHS for their own benefit. It is also applicable to both open-loop and closed-loop shipment scenarios.

With the extended battery life (more than two years) of the CSDs D12, the return logistics process is greatly simplified compared to other CSDs with much shorter battery life that need to be re-charged or replaced after virtually every use. The approach of the present invention involves the simple, single unit or bulk unit return of CSDs D12 to a central depot that will assume the responsibility for re-distributing the CSDs D12 to the appropriate party after performing the required "resetting" and "checkout" operations. Below is the sequence of events that will take place to accommodate the recovery and reuse of CSDs.

First, at the Trip Termination Point, an authorized operator will remove the CSD D12 after performing the necessary process steps with either the SHHR D28 or PDA D30. The operator, through the SHHR D28 or PDA D30, will be given the opportunity to send a message to the CSD to inhibit further radio transmissions unless specifically instructed to do so via a separate radio command. This radio-inhibit mode will prolong the life of the CSD's battery and eliminate needless polluting RF signals.

The operator will then give the CSD D12 to a designated person who is responsible for returning the unit to the central depot. Either the operator or the shipping clerk can optionally barcode scan the CSD D12 with the SHHR D28 or PDA D30 and inform the Return Service Depot that the unit will be returned. This notification can be performed on a unit-by-unit basis or when a number of units are accumulated and a bulk shipment is planned. Return shipping instructions, including a carrier account number and the address, are printed on a label on the back of each CSD D12.

After return and receipt at the Return Service Depot, a technician will examine the CSD D12 for any obvious physical damage. The operator will then scan the CSD D12 to activate it, run an automatic power-on-self-test (POST) routine, and verify proper operation and remaining battery life. The unit's event log and network management statistics will be purged and the unit will be placed in its original "factory fresh" state with default parameters and behavioral profiles established. During this process, the technician will not be able to read any of the stored data except the general owner information originally entered into the unit. Part of the testing process will include querying the unit to determine the condition of the battery. If necessary, the technician will replace the battery at this time.

The operator will then access an on-line site that will, based upon the CSD's unit ID, provide him/her with instructions on how to handle the CSD D12. Possible instructions include instructions for entering new, downloadable parameters and profiles, instructions for initiating an email to notify certain parties of the CSD's return and its condition, and/or shipping instructions including hold for bulk shipments or ship the CSD D12 to the address specified.

When the handling process is completed, the technician will once again barcode scan the CSD D12 and enter the necessary status information into the on-line system. This information will then be used to automatically update the network Registration and Status Server of the MMR D50 which, in turn, will propagate the availability and operational modes of the CSD D12 to all required subsystems.

Although in at least one implementation, a single common, nationwide depot is utilized, it is anticipated that DHS or other large users could decide to set up their own depots for CSDs D12 with their own shipping label attached.

A CSD Implementation: Network and Data Security

In the basic configuration with Reader (Gateway) Servers D24 communicating directly with DCP servers D36, the Reader Servers D24 will be connected over either a local area or wide area TCP/IP network to a DCP server D36 when a DHS CSD D12 is detected in the Reader Server's sub-network.

A Public Key Infrastructure (PKI) may be utilized as the foundation for the security architecture. In particular, the DCPs D36 preferably have third-party digital certificates. When CSD Reader Servers D24 are installed, digital certificates are generated by the DCP Certificate Authority (CA) and exported to each Reader Server D24.

A Web service model using Simple Object Access Protocol (SOAP) messages over HTTP may be used to exchange messages across the system with conformance to the Oasis WS-Security specification. Information from the digital certificate provides message authentication. The W3C's XML Encryption standard per WS-Security enables portions of the SOAP message to be encrypted to ensure message confidentiality using AES. Lastly, the W3C's XML Digital Signature provides message integrity.

In at least some embodiments, wireless CSD Readers D24 use 802.11i with WPA2 for connectivity to the DCP D36. Also in at least some embodiments, SHHRs D28 use 802.11i with WPA2 for connectivity to CSD Readers D24.

In the case of alternative configuration connecting the DCP D36 to a CSD system, similar technologies are maintained.

A CSD Implementation: Encryption

The SHHR D28 and CSD Readers D24 are preferably fully compliant with 802.11i using AES-CCM encryption.

Between the Reader Servers D24 and DCP servers D36, W3C's XML Encryption standard per WS-Security enables portions of the SOAP message to be encrypted to ensure message confidentiality using AES.

A CSD Implementation: Authentication

A PKI is used for entity authentication for the Readers D24 and DCPs D36. W3C's XML Digital Signatures provide message authentication on the CSD system Web services.

The AES-CCM algorithm from the 802.11i security protocol is used to provide Message Authentication Codes to insure message integrity on wireless links.

Usernames and Passwords are used to authenticate SHHR users D32.

A CSD Implementation: Spoofing Resistance

With point-to-point messaging between entities having been secured, managed private/public keys and digital signatures authenticated by a trusted CA, there is a high spoof resistance built into this system D10. In addition, message authenticity is enabled through the XML Digital Signature which attaches a fingerprint which is a message digest encrypted with the sender's private key.

The receiver validates the message digest AND message originators by decrypting the message digest with the originator's public key and finding the message originator's CSD system name. So, again, trying to spoof a message from one of the CSD system nodes is very difficult to do.

A CSD Implementation: Cloning Resistance

Each CSD RSN D20 operates in a defined Class-based network with a unique, permanent UID and current, saved routing information. A DHS CSD D12 or mixed mode CSD D12 could have additional cloning resistance built-in to the system with either diagnostic register challenges or Class-based network requests.

A CSD Implementation: Deployment Capabilities

The skill sets required to install Readers D24 are very similar to those associated with installing outdoor Wi-Fi access points; a task commonly performed by field technicians around the world. The Readers D24 preferably contain start-up software modules that allow a field user to simply physically install and energize the Reader D24. The start-up software will then contact the centralized network management system that will download the required system parameters for the particular Reader. The on-site installer will be able to observe externally mounted LED indicators to determine if connectivity has occurred and the installation and power up sequence has been successful. Field engineers will be available to help new installers and will also be available on line and by telephone to resolve any issues that might arise during the installation process.

Preferably, an existing service organization with service shops located across the U.S. will be utilized for the implementation of the infrastructure components. Such shops preferably regularly install, optimize, and maintain systems that are similar in many respects to the system D10 of the present invention. In fact, the majority of the planned network locations already have equipment on-site that is maintained by these companies. Therefore, familiarity with the sites, access protocols, hours of operation, and special installation and maintenance conditions are known to these companies thereby easing the installation and maintenance tasks associated with the infrastructure. These organizations will provide Level One and Level Two on site support with the on-line and on call help of an enterprise Customer Service Organization.

As part of the installation and on-going support activities, the supplying enterprise will make remote system monitors (referred to as System Probes) available for deployment at customer selected points within the coverage islands. These devices, which may, for example, be standard RSNs offered by TeraHop Networks, Inc., with a unique behavioral profile, will transmit and respond to pre-determined messages that are monitored by a Network Analysis Server on a real time basis. These devices will help alert Network Management personnel to any anomalous conditions discovered by the System Probes or the associated servers. During the Reader installation process, the System Probes can be used to verify system coverage performance.

Preferably, no special deployment practices need to be considered for the deployment of CSDs D12. Instructions are preferably be included in each CSD D12 and will also be available on line. The on-line training will also include a video clip that shows how to install and arm a CSD. Disarming CSDs will be covered with separate on-line instructions that have restricted access.

Based upon the operational mode selected by DHS, DHS can take on the responsibility of registering and managing the CSDs through their own systems, or DHS can delegate that responsibility to the supplying enterprise. The supplying enterprise may be performing these same services for commercial customers over secure links and with systems that manage individual user access. However, enterprise personnel are preferably not be able to access any Restricted stored data or transmissions to/from the CSDs D12 and the DCP servers D36.

In at least some embodiments, the supplying enterprise owns and operates the U.S. back-end MMR System D50 described previously and provide a shared service offering to commercial and government users. This same system by simple data communications extensions can service Readers D24 in any location outside the U.S. including Readers D24 used on board ships D90 or in vehicles. Based upon the growth of the system D10 and its international acceptance, the supplying enterprise may choose to operate networks in other countries, form joint ventures, or franchise the operation to others. In any case, the supplying enterprise may choose to retain sole rights to the architecture, design, and code of the system and offer it on a Right-to-Use license model only.

As a significant exception to the above planned configuration, the supplying enterprise may also offer scaled down, logical versions of the MMR System D50 for use in private, standalone configurations. The expected, most common use of this type of system is for Public Safety First Responder applications. In this scenario, all of the functional and logical entities would co-exist on a single laptop server that would be linked to vehicle-mounted Readers D24 that are driven to an incident site. In this configuration, the on-site system would operate as a closed system with selected updates passed to other systems with varying communication backbone connections as required.

Although in some embodiments the system D10 is best utilized in domestic markets, this same arrangement may also be offered to non-domestic entities. As an option to DHS, this standalone method of operation could be made available to DHS with DHS providing a similar "mobile" version of their DCP host.

A CSD Implementation: Internal Sensors

As described previously, the heart of the CSD D12 is a Remote Sensor Node (RSN) D20 such as one provided by TeraHop Networks, Inc. This self-contained unit may contain a number of internal sensors as well as a bidirectional interface that can be used to communicate with other devices. The following is a summary of these features along with some potential usage scenarios.

A CSD Implementation: Motion Sensing

A micro-electromechanical (MEMS) capacitive device included in each CSD RSN D20 is used to detect motion or its corollary, the lack of motion. The sensor is a three-axis sensor that supplies an analog output to the internal RSN processor. User inputs allow the setting of threshold values for detection. The motion sensor can be used to detect the beginning of the movement of a CSD (and, therefore, the container D14 or trailer). Comparing this movement event with other parameters such as time of day or day of week can be useful in determining if some unexpected condition exists. As an example, if a container D14 were being moved after hours, an alarm event could be sent to trigger action long before the container seal was breached.

A CSD Implementation: Shock Sensing

A piezoelectric sensor, specifically designed to sense shock events, is included in each device. It can measure G forces up to fifty Gs and provides an analog output to the on-board RSN processor. User inputs allow the setting of threshold values for detection. Aside from the obvious use to detect excessive shock that could damage the cargo itself, this sensor could also be used as an indication that someone is attempting to disable the CSD D12 or compromise the container's doors D16.

A CSD Implementation: Tamper Seal Switch

A reed switch that responds to the presence of an external magnetic field is included in each RSN D20. The internal processor of the RSN D20 will sense a change of state of the reed switch contacts and can create an event accordingly. The tamper switch could be used to monitor box lids, interior portions of packaged goods or other doors within a container using a separate RSN D20. When an event occurs, this RSN D20 would send a message to the CSD RSN D20 mounted outside the container D14 which, in turn, would relay (hop) the message to a Reader D24.

A CSD Implementation: External Interfaces

Each RSN D20 is equipped with a small input/output connector intended to accommodate an external interface device that is sometimes referred to as a "sled." Different sleds may be developed to accommodate different sensor/user requirements. A number of different signals appear on the interface connector, including but not limited to a Power In signal, an RS232 signal, a Serial Peripheral Interface (SPI) Bus, and a General Purpose Input Output (GPIO) Bus. The Power In signal allows an external power supply to be connected to the RSN to further extend its operational life. The RS232 (TTL) signal allows the bi-directional flow of serial data following the standard EIA signal lead definitions. The Serial Peripheral Interface (SPI) Bus is a three-wire, full-duplex synchronous data transmission standard that is commonly used to communicate between "master" and "slave" devices to transfer data such as sensor readings. The General Purpose Input Output Bus (GPIO) is a standard that allows each signal lead to be configured as an input or output to a processor. It can be used to interrupt the processor when some event trigger occurs. It can also be used to send a trigger to some external device.

Based upon the specific interface requirements, some or all of these interface circuits will be used by the custom configured sleds. For example, in a Transportation Security Administration test and demonstration project, conducted in 2005, that involved the nationwide tracking of chlorine rail cars, the TeraHop RSNs D20 were interfaced to a chlorine sensors that were activated every five minutes and then took a one-minute sample of the atmosphere near the chlorine rail car's valves. This information was then sent to the RSN D20 through a serial data link, converted, and then sent on to the customer and TSA.

Sled configurations can vary from the sophisticated sensor example described above to something as simple as a passive ignition sense to determine if a device is powered on or off.

A useful design approach is to be able to use a standard RSN and network and to provide customized solutions through sleds that meet specific customer requirements. This approach provides the best combination of standard products (with reduced high volume cost and reliability advantages) with custom solutions.

For DHS, sleds could be developed that monitor for specific conditions such as nuclear materials, certain levels of chemical contaminants, or even certain temperature or heat signatures. These devices (RSNs D20 with sleds) could be placed in containers D14 with their information automatically forwarded in either the clear or encrypted mode through the network. Different combinations of configurations could be placed in service for different shipments at any time.

With respect to some functional capabilities, one or more preferred embodiments in accordance with the present invention—and especially preferred embodiments: represent site-wide, automatic monitoring solutions that do not require choke points or operators to manually inspect each container attempting to discover anomalies; function with zero door opening, alarming for any combination of seal/door/container tampering or breach, improper motion, or shock; enable global end-to-end monitoring and near-real-time situational awareness reporting as events occur; enable deep-water notification and threat containment; can be implemented in fixed, temporary, mobile, and portable locations by DHS, other governmental agencies, or commercial users based on their respective needs; are scalable to thousands of conveyance security devices operating in the same area without requiring additional monitoring equipment or personnel; address commercial needs for custody tracking, status monitoring, and theft deterrence, while integrating into existing processes; are applicable for all sizes/volumes of commercial users with flexible purchase, lease, or rent alternatives for conveyance security devices and network costs based on paying for what services are used; has a projected user cost of approximately $40.00 per device per factory-to-customer oceanic transit; can be concurrently used by government agencies and commercial entities with segregated security, information collection, and reporting; can be implemented at little cost to the Federal Government; use conveyance security devices that have multi-year battery life that minimize on-going costs and field maintenance logistics; have the same basic design for both containers and trailers.

As will be appreciated from the foregoing, one or more preferred embodiments of the invention provide area-wide coverage at monitored locations, obviating the need for stationary readers at choke points. Monitored locations can be anywhere including ports, ships, logistics transfer points, factories, truck stops, weigh stations, military bases or any other location where assets are stored or may pass through. These locations are data-linked to centralized servers to provide end-to-end tracking, across the country, or across the globe. Users can monitor the integrity of a container without having to get near it, or without requiring the container to pass through a constriction, long before (and far away from) arrival. A movable network configuration is also included in the overall design that allows an operator in a vehicle to drive up to a site and automatically establish a wireless network that would quickly determine if any CSD-equipped containers were present and, if so, their status. As described later, the movable network operator could stay at the perimeter of the site and rely on the self-forming nature of the network to query all devices, independent of the size of the facility.

Two examples illustrate the power of this inherent network capability: First, a DHS representative with a Reader-equipped vehicle could pull up to a staging area and quickly query all CSDs to determine if a certain type of container were present and if any CSDs were in a compromised state. Second, a Federal Emergency Management Agency (FEMA) representative with a Reader-equipped vehicle could pull up to a storage yard and quickly query all CSDs to determine what kinds of goods are present. For both examples, the users could be commercial users instead of personnel associated with the government.

Consequently, the preferred embodiments of the invention require attention to individual containers only on an exception basis, by reporting to appropriate parties only when a problem arises, rather than requiring container-by-container gating or manual query.

As will also be appreciated, monitored locations can be fixed (e.g., ports), mobile (ship or vehicle), or temporary (e.g., overflow storage lots or vehicles). Preferred embodiments of the invention generate data that can be easily integrated into existing logistics or security applications. Further, the preferred embodiments of the invention are equally applicable to common semi-trailer, common trucking, rail, and air transport. The same technology, systems and methods can be integrated into site security systems (e.g., gates, doors, perimeter fencing) with the built-in motion, shock, and magnetic seal sensors serving as alarm triggers.

As will also be appreciated, preferred embodiments of the invention are scalable, permitting thousands of containers to be monitored at any one location at the same time, and permitting sharing of infrastructure, with data partitioned and private, across multiple users. The scaling and sharing, plus the features of the underlying technology, contribute to low infrastructure costs as well as low CSD and operating costs. The net result is that preferred embodiments of the invention could be deployed with commercial entities funding nearly all the infrastructure and bearing nearly all of the operating costs. Typical per-transit cost to users is expected to be about $40 per unit. CSDs can be sold, leased, and rented to customers under a wide variety of service offerings associated with monitoring and maintaining the CSDs and coordinating their return and re-use.

Lastly, CSDs can be reused, and the reuse can be by different owners, shippers, carriers, etc. As will thus be appreciated, preferred embodiments of the invention have a means for dealing with and managing CSDs when they are not being used, in a manner similar to container ownership and leasing that is consistent with CSD data security requirements. To aid in the reuse capability, the CSDs have a battery life that will exceed two years (as opposed to the seventy-day requirement in the RFI). This extended battery life capability will minimize handling logistics between trips. The battery condition is automatically monitored, and users can be notified long before battery operational threshold is reached. The battery is replaceable once the useful life has been exceeded.

CSD Implementation: Additional Applicability

It should be noted that the system can be applied to tractor trailers, air cargo, and even cargo at sea to aid in deep-water security monitoring long before potential threats arrive at U.S. or other ports. Although particular implementations, intended for example to comply with one or more requests for information by the U.S. Department of Homeland Security's (DHS) Conveyance Security Device (CSD) Requirements, are described herein, it will be apparent that the system is directly in line with the U.S. government's layered security model and can be an integral part of tracking and containing potential and real threats.

Additionally, it should be noted that the present invention encompasses the products to support the system, but also contemplates the development of a business model that will allow private companies to deploy networks that can be used by each company in a secure and private manner that utilizes a shared infrastructure. Networks may be installed at common area locations such as shipping ports, airports, and common staging and warehousing areas. In at least some embodiments, all customers, including DHS, have the capability of accessing these areas through secure networks. While in these areas, any container or trailer tampering or breaches could be automatically reported to the appropriate personnel without any manual activities or relying on the cargo passing by a particular gate-located reader (sometimes referred to as a "choke point").

With this arrangement, container/trailer tampering and breaches can be detected at hundreds of locations as the network is built out in the next few years. The implication for DHS of this approach is that with the required secure connections, DHS personnel could monitor container breaches in far more domestic and international locations than has previously been contemplated. In at least some embodiments, this dramatically increased functionality may be funded by commercial operators who also will be receiving benefits from the other inherent system capabilities. Thus, using the present invention, DHS can fulfill its functional goals without appearing to place a burden on commercial operators and will be able to do it at a very low cost to the taxpayer. The layered security solution is designed to be implemented incrementally as customers embrace it at a pace that is consistent with their needs and that of the government. Zero or minor changes to existing commercial systems allow customers, including DHS, to take advantage of the system almost immediately. With its highly flexible interface approach and open protocols, customers can take advantage of more system features and functionality based upon their schedules, funding, and desires.

Further, it will be appreciated that aspects and features described in the context of a CSD implementation, and/or a DHS solution, could well be utilized in accordance with other implementations outside of these arenas.

Technologies Underlying Preferred Embodiments of the Solution

As briefly mentioned hereinabove, preferred embodiments utilize CBN and WU technologies in the RSNs as well as hopping and other technologies. These underlying technologies of the preferred embodiments are now described in further detail. Reference furthermore is hereby made to the incorporated patent references, many of which are specifically directed to these underlying technologies of the preferred embodiments.

Underlying Technologies Class-Based Networking

In accordance with CBN technology, each node in a class-based network has at least one class designation assigned to it. Wireless ad hoc hierarchical networks form using transceivers of these nodes. Preferably, the transceiver is a standards-based radio, and the node also includes a second low-power radio for wake-up (discussed below) and a controller. The controller operates per class-based networking protocols and per self-configuration protocols that are optimized for class-based networking. This combination enables autonomous reconfiguration and behavioral changes of the node in response to changes in the node's location, the presence of other nodes, changes in a battery level of the node, environmental changes, or other changes.

Figure 66:
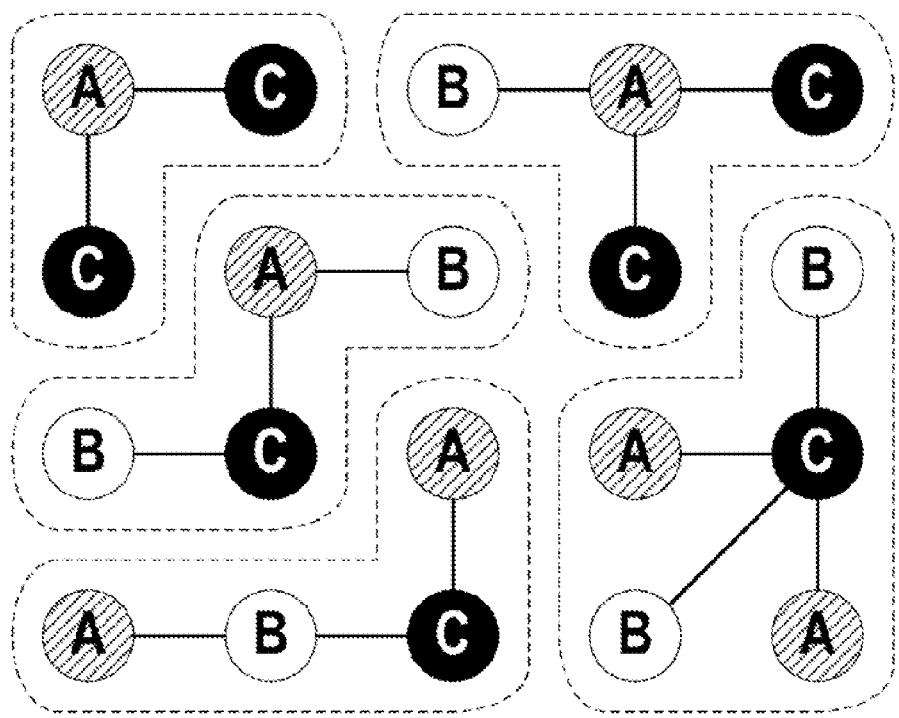
FIG. 66
Figure 67:
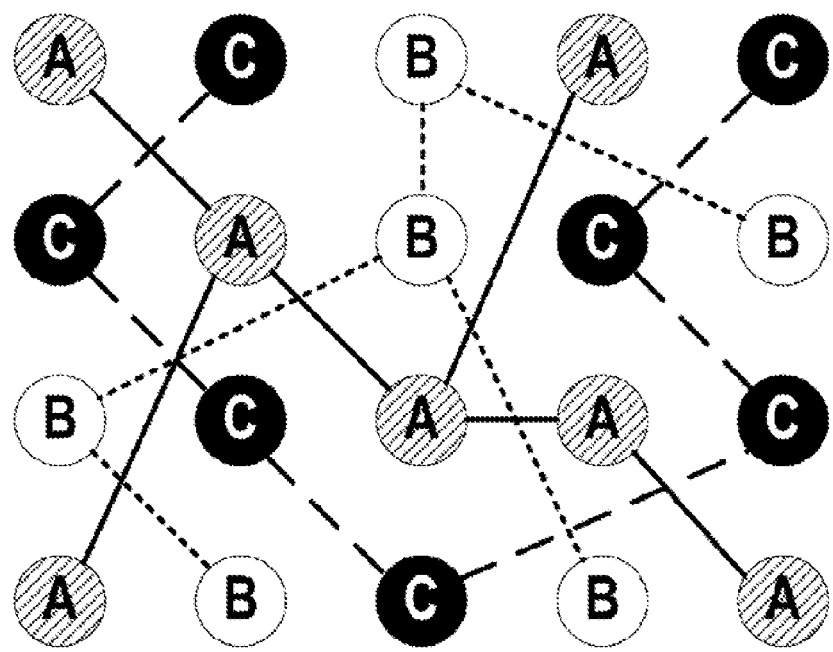
FIG. 67 illustrates the same array of nodes depicted in FIG. 66, only networked using CBN technology.

In contrast to CBN networking, and as described above, common wireless ad hoc networks form based on physical proximity and/or based on an effective radio range of the nodes. Only those nodes that are in radio range of one another (which typically means that they are physically close to one another) can communicate with each other and form a network. FIG. 66 illustrates point to multi-point networking where connectivity is determined by proximity. It will be appreciated that nodes enclosed within each delineated dotted line are connected and comprise a network. On the other hand, a class-based network forms among those nodes that have a class designation in common. Of course, the nodes still must be within radio range of each other or otherwise able to communicate through hopping, but other nodes that may be in close proximity but are not of the same class are ignored. FIG. 67 illustrates the same array of nodes depicted in FIG. 66, only networked using CBN technology. A class designator of each node is indicated by the letters "A", "B", and "C". A class may be a customer, an agency, a type of asset, etc., and nodes may have membership in multiple classes even though FIG. 67 illustrates nodes each of single class for simplicity. Nodes sharing a class in common (e.g., having membership in Class "A"s) communicate and form a network among themselves and are logically distinct and separated from the other non-A nodes (i.e., transmissions within the class A network do not cause any power consumption by the other nodes because the other nodes of class B and C do not receive and process or hop messages of class A.

Within the context of communications to and from shipping containers, RSNs and Gateways can be configured to allow only devices of certain classes to participate in certain networks, and RSNs and Gateways can be configured into several classes, any of which can be invoked at any time to admit or to restrict participation. Consequently, radio-seals on containers of various owners or of various cargo types can be monitored independently of all others that may be at a given locations (e.g., a port), yet all share the same network infrastructure. That is, networks can be logically partitioned and segregated, and that partitioning can be used to enable or exclude hopping by certain radio-seals.

It will be appreciated that use of the CBN technology contributes to the reduction in battery consumption by minimizing radio-seals' participation in networks that are of no value to the owners/custodians of the shipping containers to which the radio-seals are attached. CBN technology further contributed to the reduction in RF noise/interference by reducing the total transmissions that otherwise would be made in a conventional ad hoc network configuration, like in a mesh network. Importantly, however, CBN technology enables an entity such as a governmental authority (e.g., Customs) to address any or all radio-seals at a given location using an appropriate "super" class designation.

Underlying Technologies: Hopping

Figure 68:
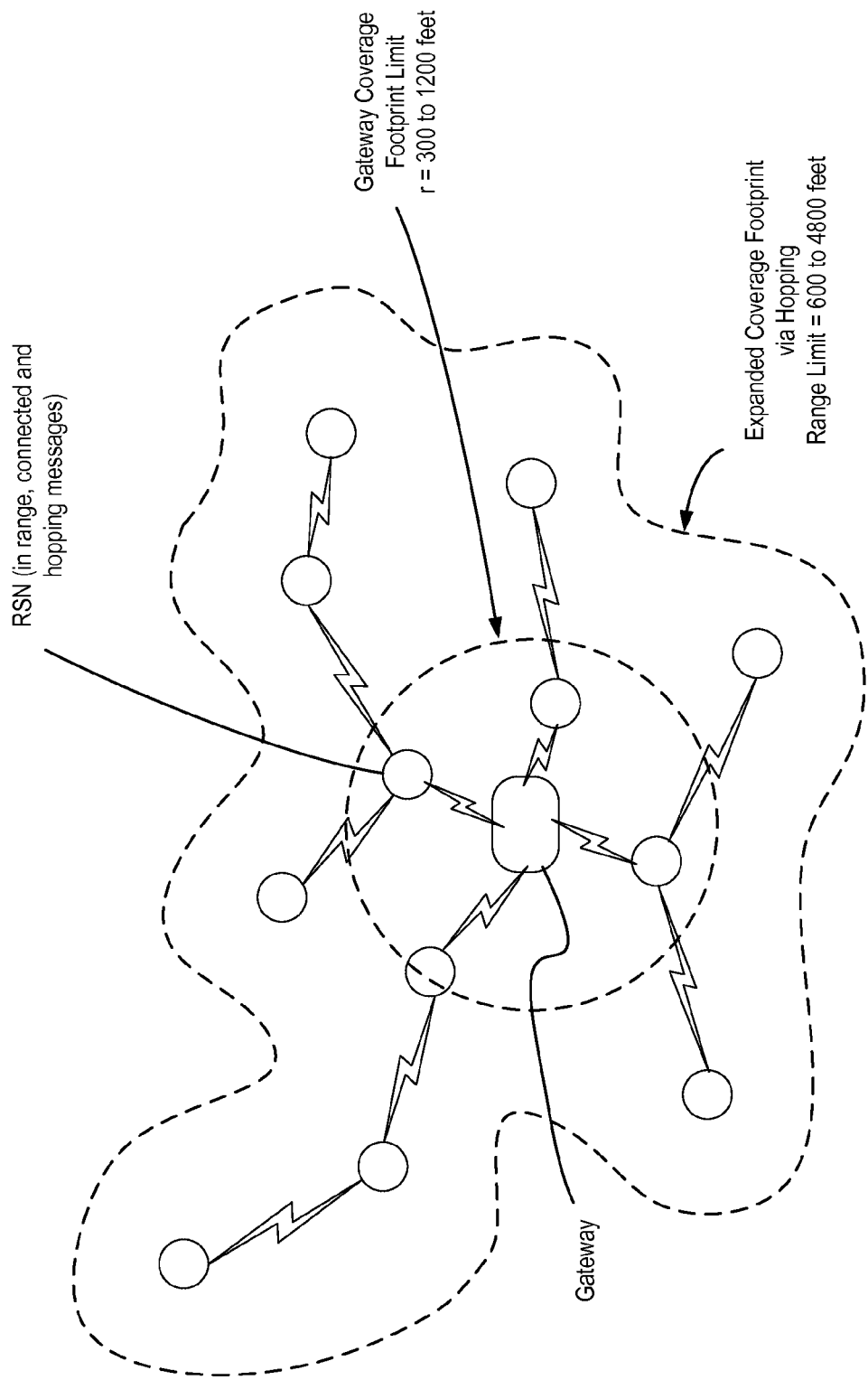
FIG. 68 illustrates an expanded footprint of a Gateway resulting from RSN hopping.

"Hopping" refers to the capability of RSNs to relay a message from one RSN to another until the message reaches a Gateway. Since each hop is at least 300 feet in typical environments, and since the technology supports up to 16 hops, the Solution can have expanded coverage or deeper penetration—such as into a stack of containers—when more RSNs are present at a location. FIG. 68 illustrates an expanded footprint of a Gateway resulting from RSN hopping. Preferably, the RSN utilize CBN networking in hopping messages.

Underlying Technologies: Wake-Up

Although transmissions from a wireless node consume battery power, it is the node's receiver that usually limits battery life. Typically, a node's receiver is always on so that transmissions from other nodes can be received at any time. Since this receiver is usually similar in complexity and capability to the transmitter from which data is received, the receiver drains significant current from the node's battery. Even when this receiver is cycled on and off, thus reducing its average current drain, battery life is still limited to days or weeks without re-charging.

Receiver current consumption can be dramatically improved by using a low-power transceiver to turn on a high-power complex transceiver. The complex transceiver of a node is a high-power standard-based radio, which is used for transferring files. The simple transceiver is a wake-up radio, which is used to establish a message path to other RSNs and to a Gateway. When there are no sensor inputs nor any messages to be relayed, an RSN is essentially dormant. Only the wake-up radio is energized, listening for messages that pertain to it. When it hears such a message, then it turns on other systems of that RSN such that a message is sent to a Gateway, either directly or through other RSNs via hopping. Each RSN that may be in the message path in turn wakes up, relays the message, then returns to its dormant state. Using such WU technology, the complex transceiver is turned on generally only when needed to transfer data.

FIG. 46 illustrates the preferred WU methodology wherein a first RSN C31 forming a node in a class-based network communicates with a second RSN C32 forming a node in the class-based network. First in this process, a wake-up transceiver comprising a reduced complexity radio or "RCR" C33 of the first node C31 signals a wake-up transceiver comprising a reduced complexity radio or "RCR" C34 of the second node C32. The RCR C34 of the second node C32 then wakes-up the complex transceiver C36 of the second node C32, and data communication commences between the complex transceiver C35 of the first node and the complex transceiver C36 of the second node C32. It should further be noted that the RCR C33 of the first node C31 may have received a wake-up signal, upon which the complex transceiver C35 of the first node C31 was awaken. Alternatively, the controller of the node may have awoken the complex transceiver C35 for communication, or a trigger event may have occurred as determined by an associated sensor of the node C31. After the data communication is complete, the complex transceivers C35,C36 of the nodes C31,C32 shut down.

Despite the simplicity of RCRs, selectivity in wake-up is achieved using CBN technology. Furthermore, because the amount of data exchanged by RCRs is tiny, it is believed that sensitivity of the RCRs are not a practical issue in container shipping implementations.

It further will be appreciated from the incorporated references that, in alternative variations of the foregoing, a simple wake-up receiver may be used in place of the RCR, and that the complex transceiver may be used to wake-up another RSN or Gateway using the complex transceiver. In this regard, the wake-up transceiver may be a passive transceiver similar to a passive RFID tag that is configured to awaken the complex transceiver upon receipt of an appropriate class-based wake-up signal, whereupon the simple receiver provides an electronic signal waking up the complex transceiver rather than "chirping" back to the incoming signal.

In any case, as a result of the WU technology, radio-seals have exceptionally long battery life (over two years in typical applications), yet radio-seals can communicate at high power when needed, which yields long range. Further, since RSNs make no transmissions unless they have message traffic, networks of radio-seals are stealthy, making it difficult to detect or spoof such networks.

Figure 69:
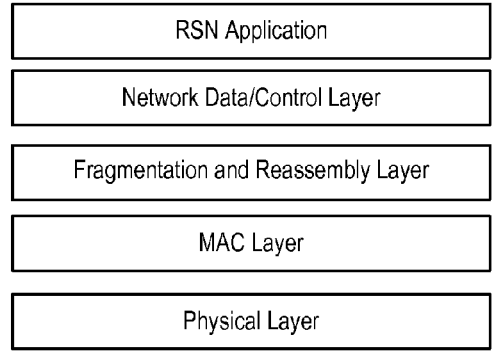
FIG. 69 illustrates layers in a preferred communication system of the Solution.

With further regard to network communications using WU technology, communication between nodes along a path, i.e. communication associated with a node's routing functionality, is provided by the MAC layer or the network layer, while communication between the end points is provided by the application layer. An RCR of each RSN provides low power consumption, reasonably low network bandwidth utilization, and flexible ad-hoc message routing, but is not intended for large payloads or streaming data. The RCR protocol is broken down into 2 distinct sub-protocols representing two distinct layers, i.e. the MAC layer and the network layer. Further, the network layer is subdivided into a reassembly and fragmentation (FAR) layer, and a data control layer. FIG. 69 illustrates these layers.

Underlying Technologies: Radio Network Communication—MAC Layer

Figure 70:
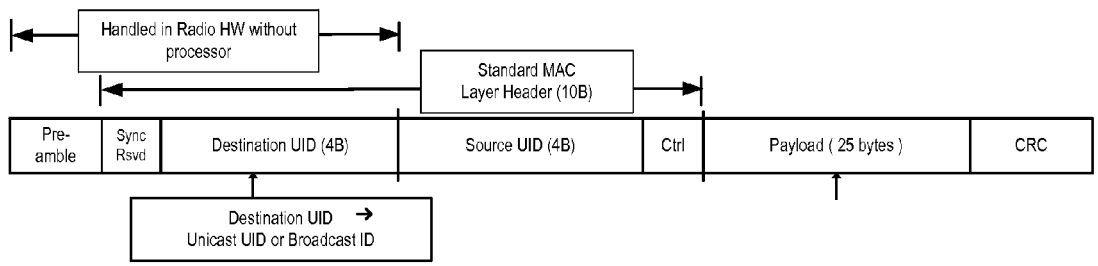
FIG. 70 illustrates a payload carrying frame in accordance with the Solution.
Figure 71:
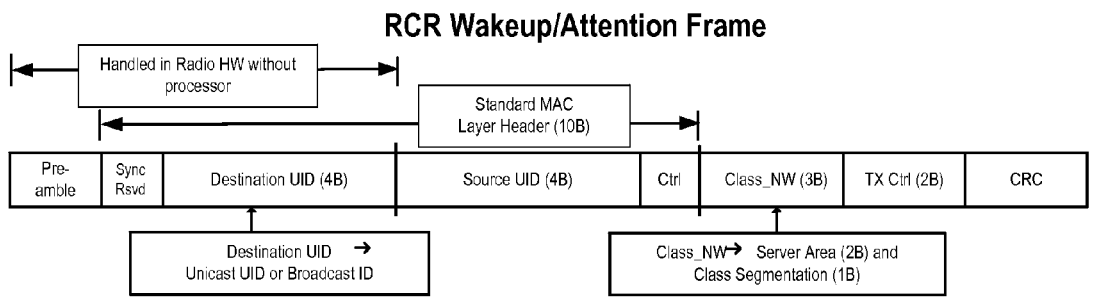
FIG. 71 illustrates a WU_ATTN frame in accordance with the Solution.

All node to node communications are implemented via node transactions at the MAC layer. A node initiates a transaction by transmitting a series of wakeup/attention (WU_ATTN) frames in repeated succession. The number of transmissions in the series is selected to ensure that the receiving device will "see" one of these frames within the total transmission sequence. These WU_ATTN frames differ from normal payload carrying frames. More specifically, they are differentiated by a different TYPE field within a frame control (CTRL) byte. FIG. 70 illustrates a normal payload carrying frame and FIG. 71 illustrates a WU_ATTN frame. Notably, WU_ATTN frames may not be required prior to communication with a gateway, as described hereinbelow.)

Each node is associated with a unique identifier (UID). Upon receiving a WU_ATTN frame, a node verifies that the frame contains either its UID, or a general broadcast address, which may comprise, for example, all 1s. As can be seen in FIG. 71, a destination UID corresponding to either a unicast destination node, or a general broadcast address, is located within the first five bytes. Due to this location, the processor will not have to wake up unless the message is directed to its UID or is a broadcast/all call message.

The node additionally verifies that the WU_ATTN frame includes a proper Area ID. As described more fully hereinbelow, an Area ID corresponds to a particular gateway server. If an Area ID contained in the WU_ATTN frame differs from an Area ID stored at the node upon joining the network as described hereinbelow, then the node will not respond to the WU_ATTN frame.

Similarly, the node verifies that the frame contains an allowable network class identifier. If a network class identifier of the frame does not correspond to a network class identifier stored at the node, the node will not respond to the WU_ATTN frame. This network class identifier may comprise all or part of a Class ID (as described hereinbelow), or may comprise a wholly different network class identifier. A node may contain multiple network class identifiers, for example, a node may be configured to contain up to six network class identifiers.

The node further verifies appropriate sequencing. The CTRL byte includes frame sequence information, as well as including an indication of whether a message is an acknowledgment (ACK) and an indication of whether an acknowledgment is required. A frame sequence of all ones denotes the special WU_ATTN frame.

Further, the receiving node will not respond to any WU_ATTN frame if it is in the free state, unless the WU_ATTN frame is part of the process of becoming joined to, or "captured" by, a network.

Assuming successful reception by a receiving node of a WU_ATTN frame which corresponds to the receiving node's UID and verifies as allowed based on the sequencing, Area ID, and Class ID of the frame, the receiving node will then wait until the transmitting node completes its entire sequence of WU_ATTN frames. This time to wait is calculated using a counter contained in TX count information of the TX CTRL field of the WU_ATTN frame. After waiting for an amount of time calculated based on this counter, the receiving node will acknowledge a successful wakeup to the transmitting node and change its receive channel to the data channel specified in TX data channel information of the TX CTRL field of the WU_ATTN frame. A disallowed transmission may be negatively acknowledged utilizing the same sequence, with a reason code set within an acknowledgment frame. A transmitting node that receives such a negative acknowledgment ceases its attempts to continue the transaction.

After switching to a specified channel for an allowed transaction, a transmitting node transmits a plurality of data packets on the specified channel. This plurality of data packets collectively form a sequenced and potentially fragmented datagram. If all data packets are received at the receiving node and the full datagram is reassembled in its entirety, then the receiving node will acknowledge to the transmitting node that the transaction is complete. If one or more data packets are corrupted or otherwise in error, the receiving node will provide a negative acknowledgment to the transmitting node, and the transmitting node will repeat the transmission up to a maximum of three times.

Notably, the above sequence describes unicast node transactions, i.e. transmissions to a receiving node that specifies the UID of that receiving node. Broadcast transactions, i.e. transmissions that specify a general broadcast address, follow a similar sequence except in that no acknowledgments of any type are provided by a receiving node.

Network Communication—Network Layer

Figure 72:
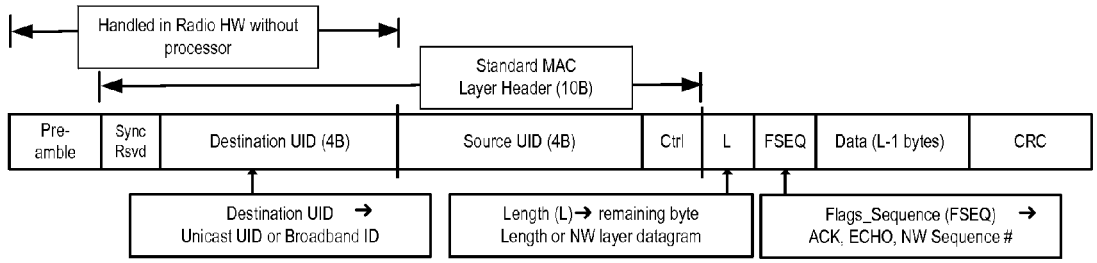
FIG. 72 and FIG. 73 illustrate exemplary messaging with respect to layers of FIG. 69.
Figure 73:
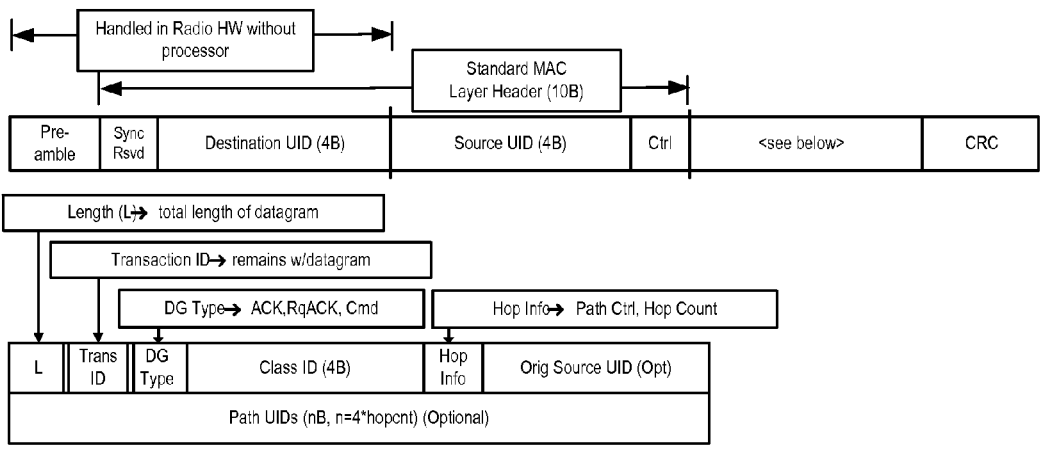

With both broadcast and unicast transactions, a successfully received transaction will be forwarded up to the network layer of the protocol stack for further processing. The network layer resides on top of the MAC layer and includes the FAR layer and the data control layer. FIG. 72 and FIG. 73 illustrate exemplary messaging at each of these layers.

Communication routing within the network is characterized as asymmetrical. This is because routing of data from an RSN inbound to a gateway, i.e. inbound data, is handled differently than routing of data outbound from a gateway to an RSN, i.e. outbound data. Both inbound and outbound routing will now be described.

Underlying Technologies: Radio Network Communication—Network Layer—Inbound Routing Inbound data routing utilizes a next hop approach, i.e. each node is unaware of an entire path needed to deliver a datagram to a gateway, and is instead only aware of specific nodes which are potential "next hops", i.e. potential next destinations for an inbound datagram.

Each captured node of the network contains a next hop table with three entries corresponding to three potential next hop nodes. Each entry includes an address, i.e. the UID of that next hop node, a hop count, representing a number of hops required to reach the gateway node using that next hop node, and a qualifier. The qualifier is a number from zero to one hundred which indicates a next hop node's preference as determined by several factors, with higher numbers indicating less desirability. Whenever a first node communicates with another node in the course of routing data, acknowledgments of that data contain indicators of a general traffic load of that other node. The first node uses this information, as well as transmission failure counts and, when available, signal strength indications to generate the qualifier value corresponding to other nodes. A qualifier corresponding to a particular node is updated each time communication occurs with that particular node. The qualifier corresponding to each node can be used to "qualify" and order nodes for use in routing.

When selecting a next hop node to forward a datagram to, both efficiency, i.e. hop counts of potential next hop nodes, and a probability of success, i.e. the chance that a transmission will fail to reach its destination, are taken into account. Inbound datagrams contain a current hop count which starts at zero and is incremented with each node traversed, i.e. with each hop. A node preferably utilizes this current hop count in conjunction with the hop count corresponding to each potential next hop node in its next hop table to select a next hop node such that the datagram will not exceed a maximum system hop count.

A node acquires its next hops, i.e. populates its next hop table, either when it first joins a network by listening for broadcast traffic, or by requesting that available nodes around it signal their status as potential next hops. A node makes such a request by broadcasting a NEXTHOP_REQUEST datagram. When a node receives such a request, it utilizes a random back-off timer, and then responds in kind to signal that it is a potential next hop. Use of the random back-off timer helps ensure that responses from a plurality of nodes are spread out, rather than being received all at once, thus likely allowing more to propagate through.

A node issues a NEXTHOP_REQUEST when there are no valid next hop entries in its next hop table. A next hop entry corresponding to another node is invalidated when an attempt to communicate with the other node fails, or if the hop count of the entry indicates that routing communications through the other node would cause the soon-to-be-requesting node to have a hop count greater than the maximum system hop count.

A node also issues a NEXTHOP_REQUEST when two next hop entries in its next hop table are invalid or empty, and the qualifier associated with each entry is a high value. In this case, a NEXTHOP_REQUEST is sent to attempt to find new next hop nodes with better qualifiers. Notably, however, such a request is only sent when network traffic is at a minimum and is only sent at a very low rate. An exponential back-off timer is utilized to prevent a node with poor next hop qualifiers from continually and rapidly sending out NEXTHOP_REQUESTs.

A NEXTHOP_REQUEST broadcast by a requesting node includes a hop count of the requesting node. In order to minimize possible path loop issues and maintain network efficiency, any node which receives the NEXTHOP_REQUEST does not respond to the request if its hop count is greater than the hop count of the requesting node. Additionally, upon receiving responses to its NEXTHOP_REQUEST, the requesting node validates the hop count of each responding node against its own perceived hop count. Similarly, no node will respond to a NEXTHOP_REQUEST if its hop count is greater than or equal to the maximum system hop count, and no requesting node will validate a response from a node whose hop count is greater than or equal to the maximum system hop count.

It will frequently be the case that a requesting node does not have any valid entries in its next hop table, and thus essentially has no hop count. A requesting node which does not have any valid entries in its next hop table sets its hop count to negative one (−1) to indicate that all nodes receiving its NEXTHOP_REQUEST should respond, and validates a response from any node whose hop count is less than the maximum system hop count.

If a node broadcasts a NEXTHOP_REQUEST and receives no replies, the node retries this request three times, utilizing an exponential back-off timer between each retry. If, following the third retry, the node has still not received a reply and no next hop has been acquired, the node will transition to a free state, i.e. consider itself removed from the network. (It is noteworthy that each of these three retries may be retried utilizing a different network class identifier, which may comprise a different Class ID. Further, each of these retries may be retried utilizing soft-preferential class based networking.)

On the other hand, any node which does acquire a new next hop, either via a NEXTHOP_REQUEST or from listening to network traffic, sends a NEXTHOP_UPDATE datagram containing the current entries in its next hop table to the gateway for forwarding to a gateway server. NEXTHOP_UPDATE is the only network layer datagram which requires a gateway response. After beginning a transaction by sending a NEXTHOP_UPDATE, a node queues the transaction as pending awaiting acknowledgment by the gateway. The node uses its current known hop count to determine a time frame, such as 3 seconds per hop, within which an acknowledgment response should be received. If no acknowledgment is received during this time frame and the current information in its next hop table is still valid, the node retries sending the NEXTHOP_UPDATE. If, during this process, the node determines that information (i.e. one or more entries) in its next hop table is not valid, then it updates this information, possibly using NEXTHOP_REQUEST as described hereinabove. The node continues to retry sending a NEXTHOP_UPDATE datagram until either an acknowledgment is received or the node determines that it is no longer part of the network and is in a free state.

When a node receives an inbound datagram from another node, assuming the node includes one or more valid next hop entries in its next hop table, the node will forward the datagram to a selected most desirable next hop in its next hop table, the selection being guided by various factors as described hereinabove. Before forwarding the datagram, however, the forwarding node inserts its own UID. As a datagram travels along a path and traverses a plurality of nodes, each node insert its own UID, thus generating path information for the path the datagram has taken.

After selection by a forwarding node of a next node to hop to from its next hop table, transmission of the datagram to that next node may fail. In this event, the forwarding node selects a different next node to hop to from its next hop table. If transmission to each potential next hop node in its next hop table fails, the forwarding node broadcasts a NEXTHOP_REQUEST to attempt to obtain valid next hop entries. During this time, the datagram to be routed is kept queued and ready for transmission. Thus, even if a transmission fails, if the forwarding node is able to acquire a valid next hop, then the datagram continues on a path to the destination gateway.

If, on the other hand, the attempt to acquire a valid next hop is unsuccessful, the forwarding node generates a FAILED_ROUTE datagram, which is a copy of the original datagram to be forwarded with its type set to a FAILED_ROUTE enumerator. The forwarding node utilizes the path information within the original datagram to forward the FAILED_ROUTE datagram back to the originating node of the original datagram. This message may or may not propagate back to the originating node. Nodes receiving a FAILED_ROUTE datagram along a path back to the originating node can retry forwarding the message along a different path to the destination gateway by selecting a different next hop node from their next hop table if routing conditions permit, e.g. if the next hop table includes other valid entries. FAILED_ROUTE datagrams utilize outbound routing mechanisms as described hereinbelow.

A FAILED_ROUTE datagram will also be generated if the hop count corresponding to each potential next hop in a next hop table of a forwarding node is such that the maximum system hop count would be exceeded utilizing any of the potential next hops. This case is potentially a common occurrence. To more rapidly propagate hop count changes, all network datagram node to node acknowledgments contain the current hop count of the receiving node.

Underlying Technologies: Radio Network Communication—Network Layer—Outbound Routing In contrast to inbound routing, outbound routing utilizes a simple "known route" approach. As described hereinabove, path information is appended to a datagram as it travels inbound towards a gateway. This inbound path information is used to generate an outbound full path and store the UID of each node along this full path within a network header. An outbound datagram can thus be identified by the use of a FULL_PATH option within a network header, and a final destination which is not a known gateway. When a node receives an outbound datagram, the node removes its own UID from the full path and then forwards the datagram to the node corresponding to the next UID in the full path. If this forwarding fails, the node retries three times, unless a negative acknowledgment is received that informs the forwarding node that the datagram cannot be received.

If each of these three retries is also unsuccessful, the forwarding node converts the datagram to a broadcast message that is set, with DG_ECHO, to cause nodes receiving the broadcast to repeat the broadcast. If such a broadcast datagram is received by the final destination node, the final destination node updates the path information of the gateway/gateway server. If the datagram is destined for the application layer, then this update can be accomplished via a reply generated by an application at the node. If, however, the datagram is not destined for the application layer, this update can be accomplished via a NEXTHOP_UPDATE.

Underlying Technologies: Radio Network Communication—Application Layer

Network communication is completed at the application layer. Where the MAC and network layers can be characterized as providing node to node communication and path discovery, the application layer can be characterized as providing end to end communication.

With the notable exception of NEXTHOP_UPDATE, network layer communication does not typically include end to end acknowledgment capability. This is essentially because it is not required at a base level. The utilization of FAILED_ROUTE network datagrams provides meaningful levels of reverse communication in the event of a routing breakdown.

However, most application layer communication will desire acknowledgment that communication with a final destination occurred successfully. Therefore the application layer utilizes a protocol of its own which provides end to end acknowledgment capability. As the network layers view data sent from an overlying application as simply raw data, this application protocol is thus fully encapsulated and acted upon by the application alone.

Preferably, an application within an RSN is ultimately be in control of the networking layers, regardless of the fact that these layers can act autonomously in terms of routing network datagrams and seeking out networks and routing paths. Thus, since this application is ultimately responsible for network system activities such as registration and authentication, the application can shut down the network layers in the event that such activities are unsuccessful.

Underlying Technologies: Radio Network Formation—Beaconing

Radio network formation between a captured gateway and an RSN, i.e. a node, is now described with reference to an exemplary radio network. It is a characteristic of the system that RSNs arrive and depart from coverage areas at any time, in any order, and even change position relatively within a coverage area. A free RSN that becomes aware of a radio network, attempts, if appropriate, to connect wirelessly to that radio network.

In order to make a free RSN aware of a nearby radio network, a process known as beaconing is used. More specifically, a beacon is a radio signal that is periodically broadcast by a node, e.g. a gateway, that contains identification information (as well as a check-in period, as described hereinbelow). The beacon effectively announces the presence of a gateway and identifies it. The identification information includes an address of a node that broadcast the beacon, an Area ID corresponding to a gateway server the node that broadcast the beacon is associated with, and a network class identifier. This network class identifier may comprise all or part of a Class ID (as described hereinbelow), or may comprise a wholly different network class identifier.

When a free RSN receives such a beacon, the network class identifier contained in the beacon is compared to one or more network class identifiers contained in the RSN, at the MAC layer of the RSN. If the network class identifier of the beacon matches any network class identifier contained in the RSN, information contained in the beacon is passed to the network layer of the RSN, which informs the application layer of the RSN of a detected radio network as well as information associated therewith, including the Area ID and node address. The RSN, at the application level, decides whether or not to activate the network layer of the RSN, i.e. attempt to join the radio network and transition the RSN to a captured state. If the RSN decides to join the radio network, the network layer will utilize the node address as a next hop and transmit a communication (which preferably contains a network class identifier of the RSN, and if the RSN contains multiple network class identifiers then preferably includes a primary network class identifier, e.g. a primary Class ID, as described hereinbelow), to the node, for communication to the gateway server corresponding to the Area ID, to attempt to register with the gateway server. Upon attempting to register, the RSN enters a tentative capture state. During this tentative capture state, the tentatively captured RSN can communicate over the radio network, but no other RSN can hop messages through the tentatively captured RSN.

Registration is dependent upon the application layer, as described more fully hereinbelow, and the RSN remains in the tentative capture state until an affirmative acknowledgment of registration is received, at which time the node transitions to being fully captured by the radio network. Each RSN stores the Area ID of the gateway server it is currently associated with. Notably, a negative acknowledgment (NACK) could be received instead, thus indicating that the RSN is not allowed to join the network. Each RSN stores a list of Area IDs that it is not allowed to attach to. If a node receives a negative acknowledgment upon an attempt to join a radio network corresponding to a particular Area ID, it places that Area ID within this list of Area IDs that it is not allowed to attach to. Notably, it is possible for registration to be dependent upon a human decision utilizing a customer application, and it is possible for an RSN to move directly into a full captured state if desired.

Once in a captured state, an RSN ignores messages associated with other gateway servers, i.e. messages including other Area IDs (as described hereinabove and described more fully hereinbelow). After being captured by a radio network, an RSN serves to expand the coverage area of the radio network. This is because RSNs are configured to retransmit, or pass, messages from other RSNs, as described more fully hereinbelow, such that the coverage area of the radio network is greater than just the coverage area of the gateway itself.

It will be appreciated that simply expanding the coverage area of a Gateway through hopping, however, does not necessarily expand the range at which RSNs become aware of the radio network if beacons are only received by RSNs within range of the gateway. Thus, it is advantageous to expand the area in which beacons of a radio network can be "heard". An expanded area of beaconing increases the probability that RSNs will hear a beacon and join the radio network, as well as the probability that they will do so sooner and farther away than they would otherwise.

In order to effect this expansion of the beaconing area, RSNs connected to a gateway via the radio network are used to "repeat", i.e. retransmit, the gateway's beacon. In conventional systems, this is sometimes accomplished by requiring every node in a network to broadcast a beacon during a beacon interval, or alternatively by synchronizing the entire network.

In a radio network, however, the following methodology, described in the context of a radio network which includes a captured gateway and a plurality of RSNs, is preferably used.

Beacons are transmitted by the gateway at regular intervals, i.e. a beacon interval "Tb". When an RSN receives a beacon, the RSN selects a random variable between (Tb-X) and (Tb), where $0 \leq X \leq Tb$. The value of X is selected for each radio network and is tweaked appropriately for the radio network. If a time corresponding to the randomly selected variable passes before another beacon is received, then that RSN broadcasts its own beacon and resets its timer to the maximum value, i.e. Tb, such that it will not broadcast another beacon at least for a period corresponding to this maximum value. However, each RSN keeps track of an amount of time since it has broadcast a beacon of its own, and if this amount of time exceeds a "must beacon" interval, and the RSN still sees beacons of a lesser hop count, then the RSN will broadcast a beacon regardless of whether it has recently received a beacon. This allows distant RSNs to remain a part of a radio network even if statistics have worked out such that the RSN has a significantly reduced beacon rate. If an RSN does not receive a beacon after M*Tb, where M is an integer and M*Tb is greater than the "must beacon" interval, then the RSN decides that it has lost connection with the radio network and takes appropriate action to find it, or else goes free.

Figure 74:
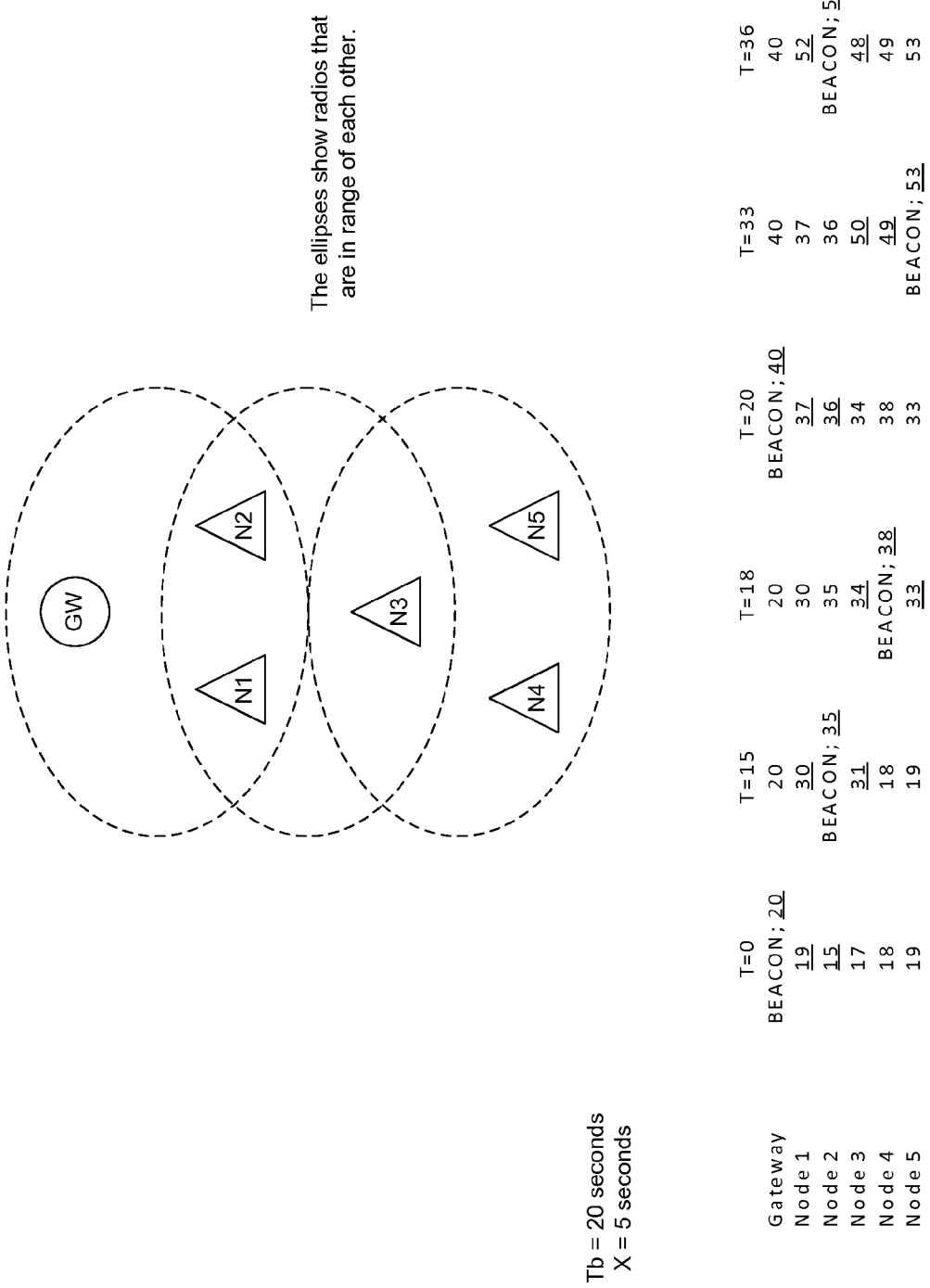
FIG. 74 illustrates a radio network comprising a captured gateway and five RSNs, wherein Table 2 of FIG. 74 provides an example of beaconing in the radio network of FIG. 74.

FIG. 74 illustrates a radio network comprising a captured gateway and five RSNs. The radio network is configured such that Tb=20 seconds and X=5 seconds. Thus, when an RSN receives a beacon, it randomly selects a value between (Tb-X), i.e. (20-5), or 15, and Tb, i.e. 20. This selected value between 15 and 20 is then set as a countdown timer for determining when to broadcast a beacon. Table 2 of FIG. 74 provides an example of beaconing in the radio network of FIG. 74. More specifically, each column of the table represents a specific time value, from T=0 to time T=36. The first row of the table is associated with the gateway of the radio network, and each subsequent row is associated with an RSN of the radio network. Each field corresponding to a row and column represents a next beacon time value of the gateway/RSN associated with that row at the time represented by that column. Each next beacon time value indicates the time at which that particular RSN/gateway is next configured to beacon based on a countdown timer of that RSN/gateway. Notably, this next beacon time value represents the time T at which each RSN's respective timer will expire, rather than indicating the amount of time left until the timer expires. Further, although countdown timers are preferably utilized, it will be appreciated that alternative timing methodologies may be utilized in various, alternative implementations. Further, in the table, broadcasting of a beacon, by a particular gateway/RSN, is indicated by "BEACON", and resetting of a countdown timer, at a particular time T by a gateway/RSN, is indicated by an underlining of the next beacon time value of the field corresponding to that RSN/gateway and that time value T.

As can be seen in the table, at time T=0, the gateway broadcasts a beacon. This beacon is received by RSNs 1 and 2, each of which sets its timer to a random interval between Tb-X (in this example, 20-15, i.e. 5 seconds) and Tb (in this example, 20 seconds). Here, RSN 1 sets its timer to expire in 19 seconds, i.e. at time T=19, and RSN 2 sets its timer to expire in 15 seconds, i.e. at time T=15. It will be appreciated that both of these values fall between 15 and 20, as specified. Note that RSNs 3, 4, and 5 do not receive the beacon broadcast by the gateway, and thus do not reset their timers. After broadcasting this beacon, the gateway resets its timer to 20 seconds such that it will broadcast another beacon at time T=20.

At time T=15, RSN 2's timer expires, thus causing RSN 2 to broadcast a beacon. This beacon is received by RSNs 1 and 3. In response, RSNs 1 and 3 each reset their timers to a random period between 15 and 20 seconds. RSN 1 resets its timer t1 to expire in 15 seconds, i.e. at time T=30, and RSN 3 resets its timer to expire in 16 seconds, i.e. at time T=31.

RSNs 4 and 5, being out of broadcast range of RSN 2, do not receive the beacon broadcast by RSN 2 and thus do not reset their timers. RSN 2, after broadcasting the beacon, resets its timer to the maximum period, i.e. Tb, or 20, such that its timer will expire at time T=35.

At time T=18, RSN 4's timer expires, thus causing RSN 4 to broadcast a beacon. This beacon is received by RSNs 3 and 5, which, in response, each reset their timer to a random period between 15 and 20 seconds. RSN 3 resets its timer to expire at time T=34, and RSN 5 resets its timer to expire at time T=33. RSNs 1 and 2 are out of broadcast range of RSN 4, and thus do not reset their timers. RSN 4, after broadcasting the beacon, resets its timer to expire at time T=38.

At time T=20, the gateway broadcasts a beacon, which is received by RSNs 1 and 2, causing each of them to reset their timer to a random period between 15 and 20 seconds. RSN 1 resets its timer to expire at time T=37, and RSN 2 resets its timer to expire at time T=36. RSNs 3, 4, and 5, being out of broadcast range, do not receive the beacon broadcast by the gateway and thus do not reset their timers. After broadcasting this beacon, the gateway resets its timer to expire at time T=40.

At time T=33, RSN 5's timer expires, thus causing RSN 5 to broadcast a beacon. This beacon is received by RSNs 3 and 4, which, in response, each reset their timer to a random period between 15 and 20 seconds. RSN 3 resets its timer to expire at time T=50, and RSN 4 resets its timer to expire at time T=49. RSNs 1 and 2 are out of broadcast range of RSN 5, and thus do not reset their timers. RSN 5, after broadcasting the beacon, resets its timer to expire at time T=53.

At time T=36, RSN 2's timer expires, thus causing RSN 2 to broadcast a beacon. This beacon is received by RSNs 1 and 3, which, in response, each reset their timer to a random period between 15 and 20 seconds. RSN 1 resets its timer to expire at time T=52, and RSN 3 resets its timer to expire at time T=48. Notably, RSN 3 actually resets its timer to expire sooner than it was previously set to expire. RSNs 4 and 5 are out of broadcast range of RSN 2, and thus do not reset their timers. RSN 2, after broadcasting the beacon, resets its timer to expire at time T=56.

It will be appreciated that this method allows for an organized use of a channel when many RSNs are gathered together. Further, it helps to extend the range of a radio network when RSNs are much farther apart, while minimizing the amount of power required to maintain the network. In accordance with the above-described methodology, RSNs will beacon less often on average than under a conventional pattern of beaconing every Tb. Notably, this method can be utilized with non-radio networks as well, and in fact can be utilized with both synchronous and asynchronous networks, although works best with an asynchronous network.

Figure 75:
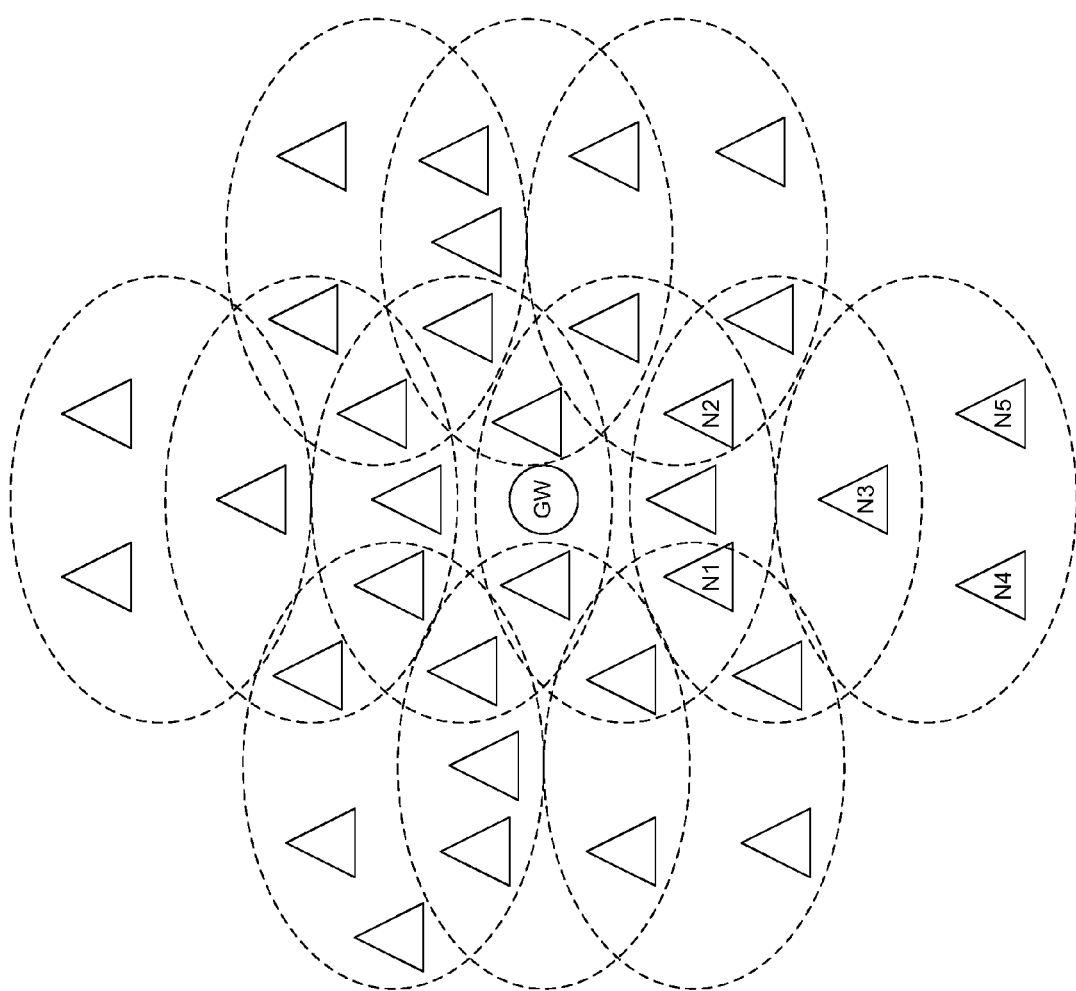
FIG. 75 illustrates the addition of a plurality of RSNs to the network of FIG. 74.

This implementation, however, assumes that the beacon interval, i.e. Tb, stays constant. If additional RSNs, however, move into the coverage area of the network, and join the network, then continuing to beacon at the beacon interval of twenty seconds could potentially increase the level of network congestion. FIG. 75 illustrates the addition of a plurality of RSNs to the network of FIG. 74. Preferably, in anticipation of, or in response to, increased congestion, the beacon interval Tb is adjusted upwards to attempt to reduce network congestion. For example, the beacon interval Tb could be set to 60 seconds, rather than 20 seconds.

In a preferred implementation, the gateway senses a level of network congestion, or alternatively a lack thereof, and autonomously adjusts its beacon interval to a value appropriate to the sensed level of congestion. This beacon interval is preferably propagated to RSNs of the network, such that each node will itself beacon in accordance with this updated interval.

Further, if the gateway is aware of attributes or values associated with RSNs of the network, such as, for example, types of assets that the RSNs are attached to, then the gateway can take this information into account when selecting an appropriate beacon interval.

Alternatively, in at least some preferred embodiments, RSNs themselves autonomously update their own beacon intervals, based upon a sensed level of network congestion, or lack thereof, as well as other information as described with respect to gateways. In at least some embodiments, this updated beacon interval can be propagated throughout the network as well, and, in at least one embodiment, other RSNs, and/or gateways, can elect whether to adjust their own beacon intervals.

Underlying Technologies: Gateways

As previously discussed, a gateway is responsible for maintaining connectivity with a gateway server in order to remain operational. A free gateway, i.e. one that is not connected to a gateway server, is not operational and will not broadcast a beacon, and will refuse communications of any kind from RSNs. When free, a gateway continuously attempts to connect to its known gateway server.

Notably, multiple gateways can be connected to a single gateway server, and in fact multiple gateways can exist in close physical proximity to each other, all being connected back to a single gateway server. (Moreover, multiple gateways in close physical proximity could also be connected to different gateway servers, in which case each would be associated with a distinct Area ID, and thus belong to a distinct coverage island, as described more fully hereinbelow. In some situations, two such islands could in fact merge together, as described more fully further hereinbelow.)

As described above, each gateway preferably includes a gateway RSN, although does not necessarily have to. Each gateway RSN is functionally equivalent to a standard RSN with a few exceptions. A receiver of each gateway RSN is always active, and therefore a repeated WU_ATTN frame is not required prior to data transmission. This can be changed, however, i.e. nodes can select and indicate whether they maintain a receiver that is always active.

Additionally, gateway RSNs do not perform any application layer protocol parsing. Rather, gateway RSNs pass application layer datagrams, as well as all non-acknowledgment network datagrams to a gateway processing element. It will be understood, as described hereinabove, that the gateway provides auto-acknowledgment capability that a datagram reached the gateway. Notably, this acknowledgment is provided irrespective of the gateway's ability to communicate with a gateway server.

The processing element of a gateway provides a very limited set of processing functions, generally comprising two way protocol conversion between a node network and a gateway server. Inbound datagrams are converted to an XML style format for transmission to the gateway server, and outbound XML formatted datagrams are converted to appropriate node-network level datagrams for communication via the gateway RSN.

When captured, a gateway is preferably in continuous communication with its gateway server, thus ensuring normal node communications. However, a gateway also allows for intermittent communication with a gateway server and does not immediately become free upon losing connectivity with its gateway server. Instead, a timeout period is utilized. During the timeout period, a gateway stores communications received from nodes that are intended for the gateway server. If communication with the gateway server is re-established, the gateway forwards these stored communications on to the gateway server. If, however, communication with the gateway server is not re-established, the gateway transitions to a free state and shuts down network operations. In this even, the gateway broadcasts an application level message across the node network indicating that the gateway is offline. Each node receiving this broadcast enters its own free state, and must then attempt to join a new network. Although some nodes may not receive this broadcast, routing mechanisms described hereinabove will cause all nodes to eventually transition to their free state and attempt to join a new network.

Underlying Technologies: Gateway Servers

A gateway server's primary role is to provide network resolution, although the gateway server further provides all system application interfaces to external client applications. As noted hereinabove, a gateway server is associated with an Area ID. Preferably, each gateway server is assigned a unique Area ID by the managing entity.

As alluded to hereinabove, a gateway server maintains a database of known network members, e.g. nodes, a status of each, and known outbound path information for each, including the gateway each node is communicating through. This database is maintained in several ways.

First, as described hereinabove, path information of each inbound message, including a UID associated with each node traversed by the inbound message, is appended to that inbound message and is thus available to the gateway server. Additionally, as also described hereinabove, information is provided to the gateway server via NEXTHOP_UPDATE messages.

Utilizing this database, the gateway server is likely able to maintain a variety of possible return paths to each node. Outbound traffic which does not successfully make its way to a destination node can be retried utilizing a different path. Typically, an unsuccessful attempt is retried three times utilizing alternate paths. If each of these retries is unsuccessful, the gateway server can direct the message to be sent as a cascaded broadcast, which is sent to all nodes via all known, connected gateways. It will be appreciated that such a cascaded broadcast is network intensive and is avoided unless it is determined to be essential.

When all retries and communication mechanisms outbound to a node have been tried unsuccessfully, the node, rather than being immediately removed from the gateway server's database, is notated therein as being inactive. If communication is re-established with the node before a system-determined timeout period, which can be specified by a user, then the node is considered active once again. If, on the other hand, the time-out period expires before communication with the node is re-established, the node is removed from the database.

Transmission of an outbound messages to an inactive node is attempted one time, and then the message is either queued or discarded, and an appropriate indication is provided to any connected client application. A message is only queued for delivery to an inactive node if the message is marked as persistent. A mechanism allowing a client application to specify that a message is persistent will be enforced.

Underlying Technologies: Presence

It will be appreciated that for some client applications, the regular determination of the presence of a node within a network, such as by use of a check-in message, is desirable in order to allow the client application to monitor and confirm the location of the node. To accomplish this, each node is configured to communicate a check-in message to its gateway at predefined intervals of time. This predefined interval of time, or check-in period, is communicated to each node via beacon, as noted hereinabove. Thus, "presence information" on each node can be gathered. The gateway communicates this presence information to the gateway server, which can then communicate it to one or more client applications.

Figure 76:
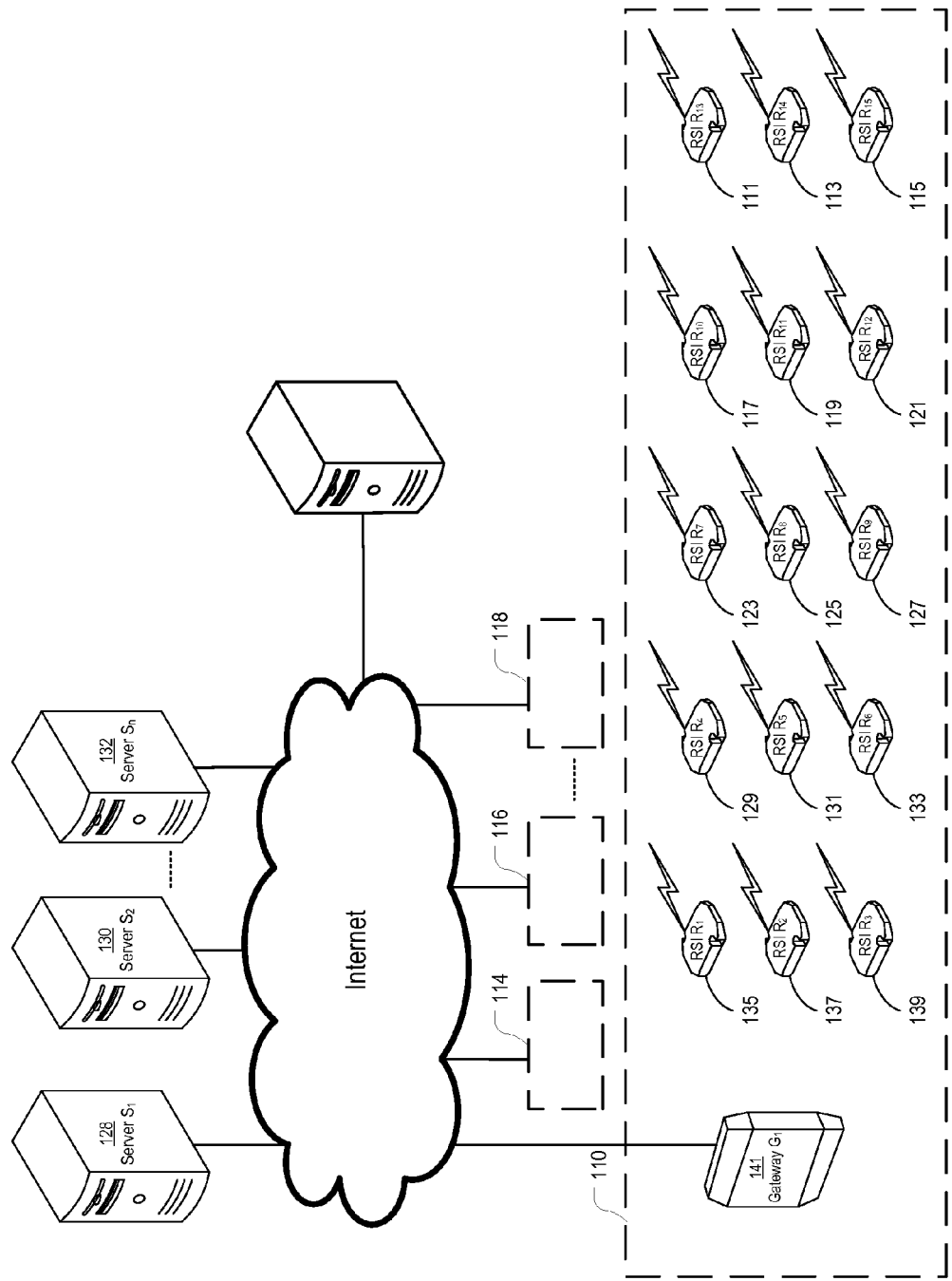
FIG. 76 illustrates a data communications network 110 having multiple user servers 128,130,132 and client applications as well as multiple locations, each having a presence server.

A client application which keeps track of presence information of a plurality of nodes can be characterized as a presence server. A client application may serve as a presence server for all nodes of a network, or alternatively for a subset thereof. The gateway server also may function as a presence server for one or more of the nodes. FIG. 76 illustrates a data communications network 110 having multiple user servers 128,130,132 and client applications as well as multiple locations, each having a presence server. For example, a plurality of nodes associated with shipments for Wal-Mart may be tracked, and the presence information thereof maintained, by a first presence server, while a plurality of nodes associated with shipments for Target may be tracked, and the presence information thereof maintained, by a second, different presence server, even though presence information (e.g., check-in messages) for both pluralities of nodes are communicated over the Internet by way of the gateway server.

Figures 77, 78:
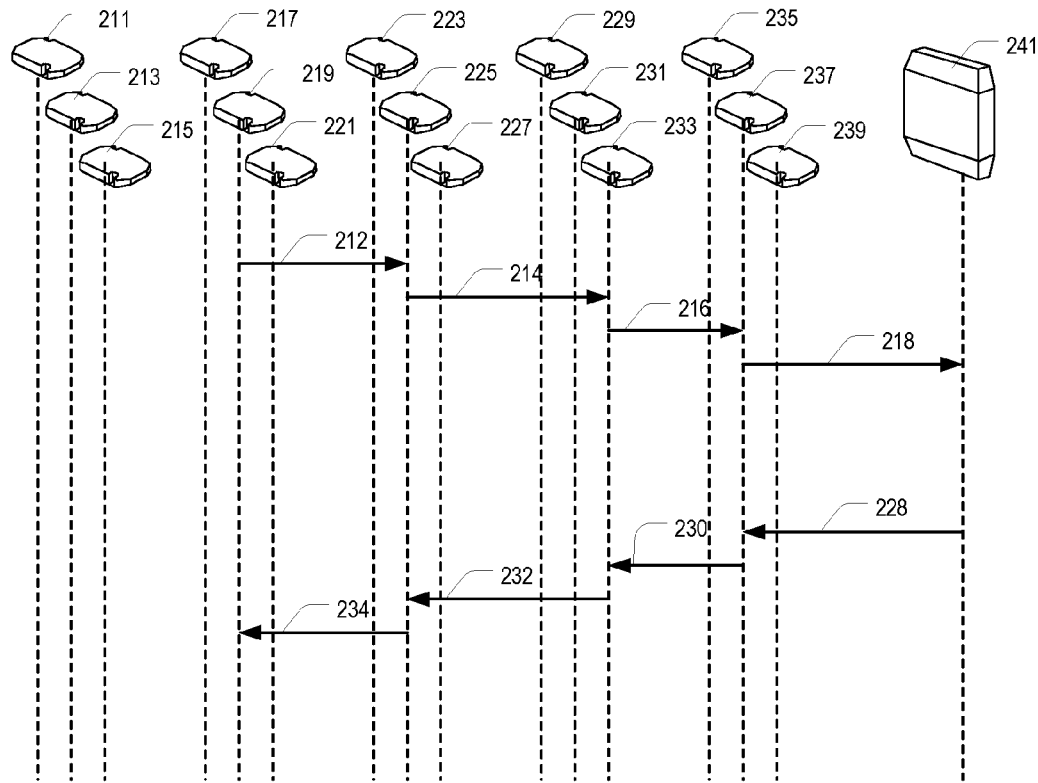
FIG. 77 illustrates an exemplary network 210 including fifteen nodes 211-239.
FIG. 78 illustrates that a check-in message originating at node 219 requires three hops to get from node 219 to the gateway 241.

FIG. 77 illustrates an exemplary network 210 including fifteen nodes 211-239 (odd). In FIG. 78, a check-in message originating at node 219 requires three hops to get from node 219 to the gateway 241. The path for the three hops is from node 225 to node 233 via hop 214; from node 233 to node 237 via hop 216; from node 237 to gateway 241 via hop 218. (Note that the initial transmission 212 by node 219 to node 225 is not considered or deemed a "hop" herein because it is the initial transmission, but this is a semantic difference.)

After the message has been communicated to the gateway 241, the gateway 241 returns an acknowledgment (hereinafter, "ACK") of the check-in message to the initiating node 219. The pathway by which the ACK is communicated is the reverse of the pathway by which the check-in message is communicated, and includes transmission 228 with hops 230, 232, and 234.

In total, communication of a check-in message from node 219 to the gateway 241 requires four total node transmissions (the initial transmission and three hops), and communication of an acknowledgment from the gateway 241 to the node 219 requires three node transmissions (each a hop) with the initial transmission being by the gateway 241.

It will be appreciated from the above description and FIG. 77 that nodes 211,213,215 each require four hops in communicating a check-in message to gateway 241; nodes 217,219, 221 each require three hops in communicating a check-in message to gateway 241; nodes 223,225,227 each require two hops in communicating a check-in message to gateway 241; nodes 229,231,233 each require one hop in communicating a check-in message to gateway 241. Nodes 235,237,239 do not require any hops in communicating a check-in message to gateway 241 as each directly communicates with the gateway 241.

The respective number of node transmissions for each of these sets of nodes is set forth in Table 3 of FIG. 78. For example, nodes 211,213,215 each require eight hops or node retransmissions to communicate a check-in message and receive an acknowledgment back. Multiplying these eight required transmissions by the number of nodes, i.e. three, results in a total of twenty-four required node retransmissions for check-in messages from nodes 211,213,215 per check-in interval, e.g., every fifteen minutes.

It will be appreciated that having a large number of nodes with a pathway to the gateway router 241 including a large number of hops greatly increases the total number of node retransmissions required for check-in messages. As can be seen in Table 3 of FIG. 78, the total number of node retransmissions required for a check-in message and corresponding acknowledgment for each of the fifteen nodes of network 210 is sixty.

This number can be reduced, however, by taking advantage of path information stored in inbound communications. Specifically, each communication of a check-in message preferably includes the UID of each node along the path the check-in message has actually been communicated along, as described hereinabove.

When the gateway 241 receives the check-in message from node 219, the gateway 241 identifies from the pathway the nodes along which the message has hopped, i.e., through intermediate nodes 225, 233, 237. In particular, the gateway 241 analyzes the message to determine the UID of each node along the pathway. Then, rather than only considering the check-in message of node 219, the gateway 241 further utilizes the UIDs of nodes along the path to determine the presence of these additional nodes. The presence information for each of these nodes consequently is updated.

Importantly, and as outlined hereinabove, the ACK that is sent to node 219 is sent along the reverse pathway by which the check-in message was sent to the gateway 241. This insures that each intermediate node receives and retransmits the ACK for delivery to node 219. In doing so, each intermediate node thereby receives its own acknowledgement that its presence, as indicated by the pathway information, has been acknowledged by the gateway 241.

In this respect, each intermediate node 225, 233, 237 remembers that it passed (hopped) an inbound check-in message from the initiating node 219 and, when it passes (hops) the ACK back to the initiating node 219, the intermediate node 225, 233, and 237 uses the ACK as a positive indication that the inbound check-in message was delivered. Based on this, each of the intermediate nodes 225, 233, and 237 causes its check-in timer to be reset to zero as if the respective node had sent a check-in message itself and received back an ACK. As such, none of the intermediate nodes will send its own check-in message until its respective time interval for doing so (starting at the time of retransmitting the ACK for delivery to node 219) has passed.

This methodology is utilized by a node not just when hopping check-in messages, but when hopping any inbound message. Thus, the intermediate nodes 225,233,237 benefit from hopping inbound messages, as each resets its chronometer (clock or timer) for counting down its check-in interval, none need to send a check-in message as quickly as it otherwise would have done if there had been no message hopping. As an example, the outside nodes 211,213,215 may send check-in messages every 15 minutes, with each of all of the other nodes serving as intermediate nodes for the outside nodes 211,213,215, whereby check-in messages for such intermediate nodes would not be required to be sent. In this scenario, only twenty-four retransmissions or hops thus are required, instead of 60 hops as set forth in Table 3 of FIG. 78 (a sixty-percent reduction!).

Underlying Technologies: Discrete Radio Networks

A radio network is typically defined by a single gateway controller, i.e. a gateway server and a captured gateway, which can be characterized as establishing an "island" of coverage. It will be understood that a gateway controller can utilize additional gateways, i.e. gateway routers, as nodes to effectively extend a coverage area of the radio network, and it will further be understood that RSNs which connect to the radio network can also function as nodes that extend the coverage area of the radio network. The entire radio network is associated with the Area ID of the gateway server of the gateway controller.

Figure 79:
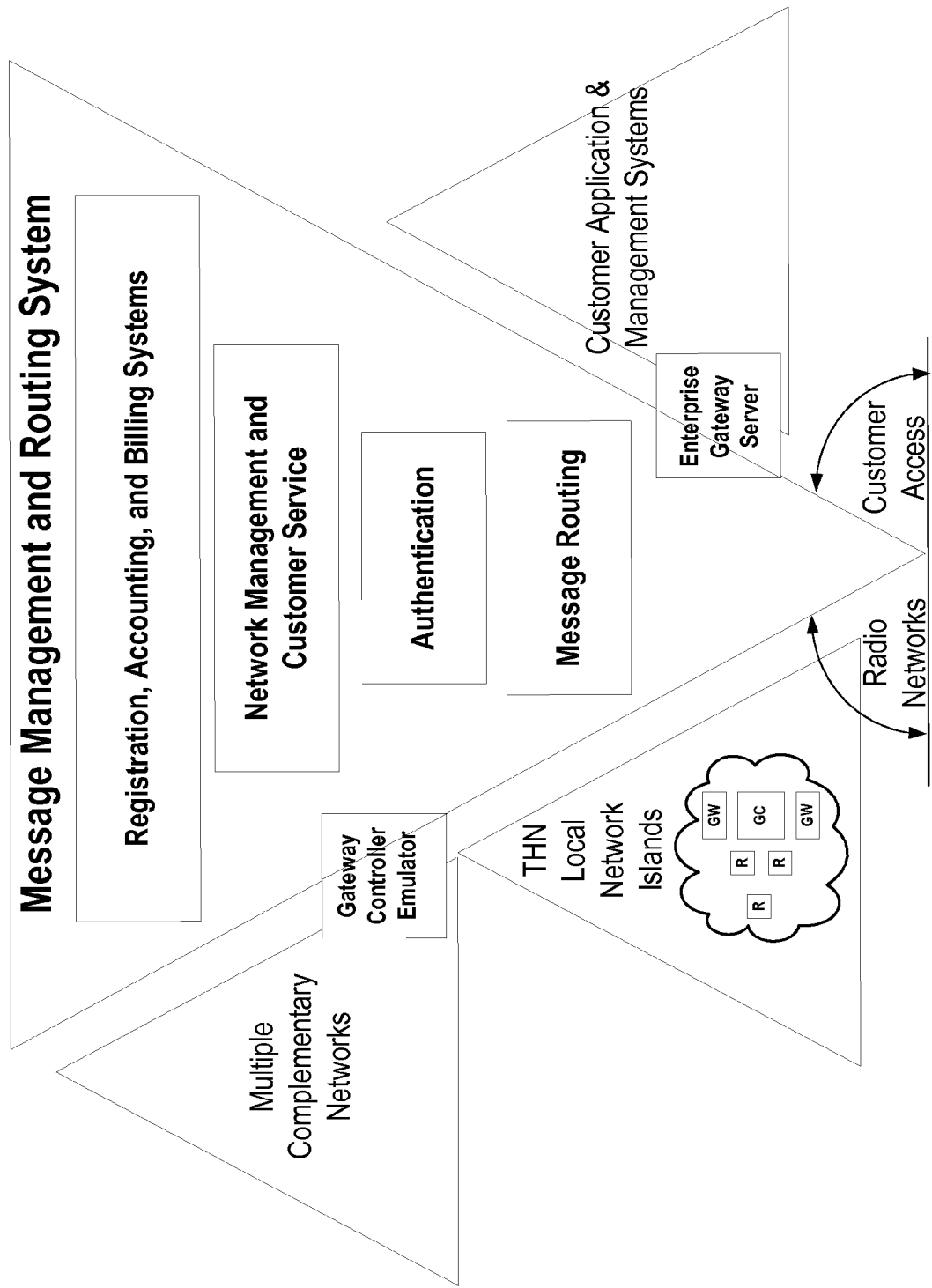
FIG. 79 illustrates a system comprising multiple radio networks, wherein each radio network includes a gateway controller, and further includes one or more gateways and RSNs.

Thus, in a system comprising multiple radio networks, each radio network includes a gateway controller, and further includes one or more gateways and RSNs, as illustrated in FIG. 79. Each of these radio networks is discrete in that each is controlled by a single gateway controller, which communicates with the MMR through an application program interface (API).

Because each gateway and RSN of a radio network is associated with the Area ID corresponding to the gateway server of the gateway controller of that radio network, although radio networks may overlap in physical area, they will still remain distinct, as nodes of each radio network will be associated with different Area IDs, and thus will not respond to communications utilizing a different Area ID. (Notably, however, radio networks may sometimes merge, as described hereinbelow.)

Each of these radio networks can be mobile or fixed in place, and can be public, shared, or private. A public radio network is owned and operated by the managing entity and is configured to allow RSNs associated with any customer to connect to it. A shared radio network is similar to a public radio network in that it is configured to allow RSNs associated with any customer to connect to it, but it is not owned by the managing entity. A private radio network is owned by a customer and is configured to allow only RSNs associated with that customer, or otherwise specified as allowed, to connect to it.

Underlying Technologies: Class ID

The functionality to allow only certain RSNs to access a private radio network is preferably provided utilizing Class IDs. In such a preferred implementation, each RSN of a radio network is associated with a primary Class ID. This primary Class ID defines who owns the RSN and preferably further defines additional grouping information using entity and asset type sub-fields within the primary Class ID field. This primary Class ID is sent to a gateway server with other information during a network registration process. Connection to a private radio network can be restricted based on Class ID.

A Class ID preferably is represented by a 32 bit (4 byte) field which is partitioned into three sub-fields: an owner sub-field, an entity sub-field, and an asset type sub-field. Each sub-field is defined hereinbelow and illustrated in FIG. 80.

The owner sub-field is configured to contain a value corresponding to a customer, i.e. a customer number associated with a customer. Owner sub-field values corresponding to each customer are preferably assigned by the managing entity. For example, the owner sub-field of a Class ID stored at an RSN corresponds to the customer that owns that RSN (or an asset the RSN is attached to). Connection to a private radio network can be restricted to RSNs having a specified customer number, i.e. RSNs having a certain value in the owner sub-field of their Class ID. A private radio network could be configured to allow access to a plurality of customer numbers. Notably, large customers may have two or more customer numbers, i.e. be assigned two or more owner sub-field values. Preferably, an RSN Profile Manager configuration tool (discussed in more detail hereinbelow) will only allow the owner sub-field of an RSN to be assigned to the primary Class ID of the RSN.

The owner sub-field can also be used to group nodes of different customers in some markets (i.e., to create one or more customer groups). For example, a "GA Public/Safety" customer group can be assigned, using the owner sub-field, to RSNs of multiple Public/Safety entities of different jurisdictions, thus enabling operation together at major incidents.

Utilization of Class IDs not only allows RSNs owned by different customers to be distinguished, but further allows customers to categorize, group, and label RSNs, which may be advantageous in organizing a plurality of RSNs when each RSN is attached to, or associated with, an asset.

The entity sub-field of a Class ID is definable by a customer and is used to create entity subgroups to help route RSN messages. Use of the entity sub-field allows a customer to address a particular subgroup of RSNs sharing the same entity sub-field value, without affecting all of its RSNs, and allocate billed events to different business entities. This field can be set to sixteen different values, fifteen of which can be defined by a customer, while "1111" is reserved as a broadcast to all defined entities, as described hereinbelow. As noted above, for customers with a large number of business entities, one or more additional customer numbers can be assigned, each additional customer number being understood as allowing for the definition of an additional fifteen entities.

The asset type sub-field is also definable, or selectable, by a customer and allows the customer to address a particular subgroup of nodes sharing the same asset type field value, e.g. an asset type of an asset a node is attached to. This field is used to help route messages to proper applications and can be used to address or perform an inquiry as to certain assets. Over one thousand different asset types can be defined.

The asset type sub-field is further split into two sections. One section is for standard, recommended asset types, and provides 960 different values, assigned from the top down. A list of recommended asset types, developed by the managing entity, is distributed for customers to use when possible. For example, if a "shipping container" is assigned a certain asset type value, all shipping containers of all users are addressable using this field. It will be appreciated that this capability works optimally only when customers utilize the recommended asset types. Preferably, as customers define asset types, the list of standard asset types will be revised and updated.

A customer also has the ability to configure up to 64 customer-specific asset types. These are assigned from the bottom up. Preferably, these user-configured asset types comprise subgroups that relate specifically to the user's business. For example, user-configured asset types could be defined for: Early AM Delivery, $3^{rd}$ day air, Flat-screen TVs, etc.

An RSN Profile Manager Configuration tool allows a user to define common names that are then associated with entity and asset type values. The tool will translate these common names to the assigned values to be configured into the user RSNs.

It will be understood that utilization of Class IDs is an implementation of CBN technology as described hereinabove, and can be used in a radio network to preferentially route messages to RSNs associated with a customer or customer group, entity, or asset type, and/or to limit nodes that can be used to route messages. This is referred to as preferential class-based routing.

Each RSN is configured with up to six Class IDs, the primary Class ID being one of the six. When an RSN receives a message, it determines whether a Class ID of the message corresponds to one of its stored Class IDs, and proceeds accordingly. As discussed herein, if a received message includes all "1"s in any sub-field of its Class ID, the RSN makes an automatic match for that sub-field.

Further, this list of Class IDs is used to select a Class ID for transmitted messages. Up to three Class IDs of this list are preferably used in a prioritized manner when attempting to send a message, such as an inbound message to a gateway controller. If an event message cannot be delivered using a selected Class ID, a node preferably attempts to communicate the message using another Class ID that may increase the probability of transmission success. For certain event messages, nodes in the network with any Class ID are used to assist in successfully transmitting the event message to a gateway server.

Each Class ID field (owner, entity, and asset type) will reserve a value of all "1"s. This reserved value indicates that the field is accepted with any value (i.e., anything is a match). This allows enhanced functionality to address groups of similar assets. For example, all of a customer's nodes can be addressed by utilizing that customer's customer number in the owner sub-field and placing all "1"s in the entity sub-field and asset type sub-fields of a message. As another example, a government agency can address all HazMat containers by placing a value corresponding to a standard HazMat asset type in the asset type sub-field and placing all "1"s in the owner and entity sub-fields. As still yet another example, a customer can address all nodes of one of their business entities by placing proper owner and entity values in those fields, and placing all "1"s in the asset type sub-field.

The procedures to configure Class IDs within an RSN will be in the RSN Profile Manager configuration tool.

Figure 81:
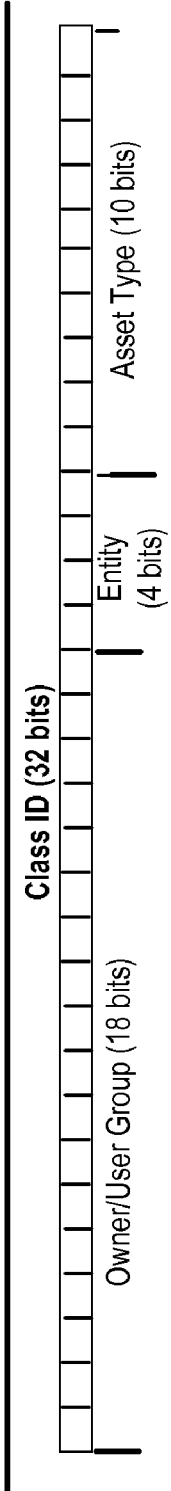
FIG. 81 illustrates a strawman example of Class ID partitioning for a shipping user, for example FedEx.

FIG. 81 illustrates a strawman example of Class ID partitioning for a shipping user, for example FedEx.

Underlying Technologies: Alternative Class ID

In an alternative preferred embodiment, a Class ID further includes a customer type field. The customer type field is populated by a selection from a standard, public list. It is used to group customers by their government level or business category. Government customers may choose from national, state/province, or county/local categories. Commercial customers may select from Standard Industrial Classification (SIC) based categories.

Underlying Technologies: RSN Configuration Tool

In a preferred implementation, an RSN configuration tool (RCT) is utilized to allow a user to select a customer type and asset type, as well as further configure properties of RSNs, such as, for example, RSN behavior and descriptive data regarding an asset an RSN is attached to. The RCT preferably utilizes drop-down selection lists, provides the ability to duplicate existing RSN configurations, and provides suggested configurations for RSNs.

Underlying Technologies: Complementary Networks

Figure 82:
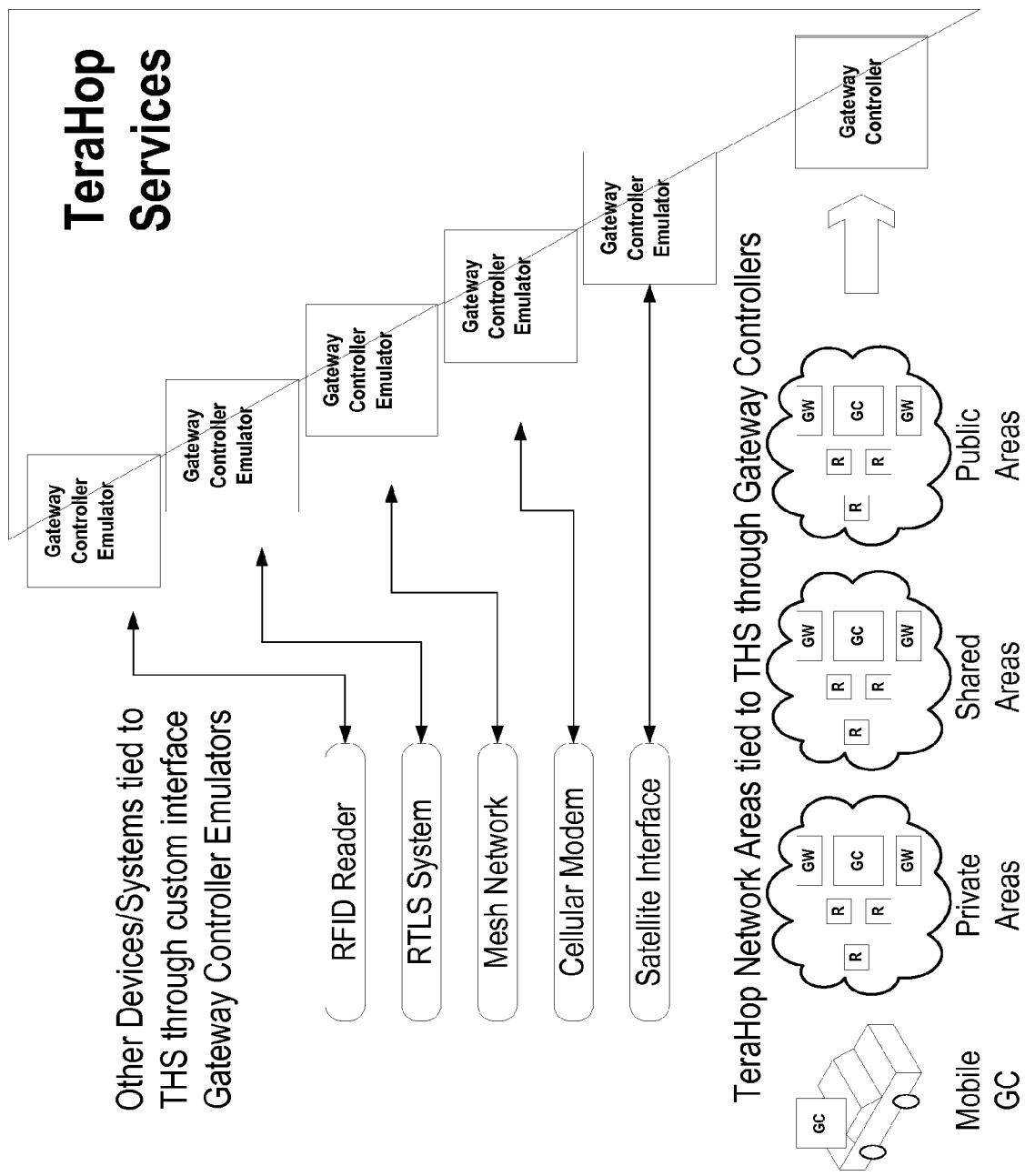
FIG. 82 illustrates that, in addition to radio networks, a system of the Solution can include one or more complementary networks as well.

In addition to radio networks, the system can include one or more complementary networks as well, as illustrated in FIG. 79 and FIG. 82. It will be appreciated from the description hereinabove that a radio network comprises a plurality of RSNs which can be characterized as non-fixed end points of the radio network. Complementary networks can include similar non-fixed end points, which are often termed "tags." Herein, the term tag will be used as encompassing any such non-fixed network end point, including both tags and RSNs. Further, any functionality described herein, either above or below, with respect to RSNs will be understood as having been contemplated with respect to other tags as well, to the extent possible.

As these complementary networks do not include a gateway controller, a gateway controller emulator (GCE) is utilized which translates messages to and from each complementary network that can be processed by the MMR. Notably, each GCE translates, on a one to one basis, an identification of a tag of a complementary network to a system UID for that tag.

Thus, messages flowing through the MMR to and from customer applications appear generally identical to communications from a radio network, except to the extent that additional functionality is provided by a complementary network that is not provided by a radio network. Several exemplary complementary networks will now be described, but it will be appreciated that this list is not intended to be exhaustive.

Underlying Technologies: Complementary Networks—Real Time Location Systems

Real Time Location Systems (RTLS), are typically on-site, fixed infrastructure systems that use small, asset-mounted tags that periodically broadcast a signal to fixed access points located throughout a building or complex. The infrastructure, i.e. fixed access points, in turn, determine a location of the asset with varying degrees of accuracy, and provide useful graphical location information to on-site users.

To integrate an RTLS complementary network with the MMR, an interface is provided which translates the information collected by the RTLS network before it is forwarded to a GCE. The GCE then relays the information determined by the RTLS system to the MMR System.

Underlying Technologies: Complementary Networks—Mesh Networks

Mesh networks are traditionally defined by a network topology, but in this context refer to a localized system that collects data from assets that are equipped with individual mesh nodes. Many proprietary systems falling under this umbrella that are aimed at many different applications have been deployed.

Multiple GCEs are required to interface with the various types of mesh sensor networks that are currently being deployed. The GCEs will connect to a common interface point and report the presence and mapped condition of sensors associated with each node. Each customer's application will be required to map the collected data into something that is meaningful for them.

Underlying Technologies: Complementary Networks—Cellular Networks

The general category of cellular networks is very broad. In this context, it is used to refer to the transfer of data associated with monitoring/tracking assets over a cellular network. There are no standards associated with the usage or interpretation of the data that is transferred over cellular system data channels.

To integrate a cellular network with the MMR, a number of different GCEs will be required. Each GCE contains a unique code associated with interpreting data sent over a cellular network from a device or from some centralized aggregation server.

Underlying Technologies: Complementary Networks—Satellite

Similar to cellular networks, there are a wide variety of satellite systems available, such as, for example, SkyBitz.

To integrate a satellite system with the MMR, a number of different GCEs will be required. Each GCE contains a unique code associated with interpreting data sent over a satellite system from a device or from some centralized aggregation server.

Underlying Technologies: Complementary Networks—RFID

There are many different methods and interfaces associated with passive and active RFID systems that are principally used in on-site, item-level, tracking systems.

To integrate an RFID system with the MMR, a customer-driven, unique GCE interface is provided. A GCE interface point varies from interfacing to a reader or portal system, a reader aggregation server, or even an application server.

Underlying Technologies: Customer Application Elements

Figure 83:
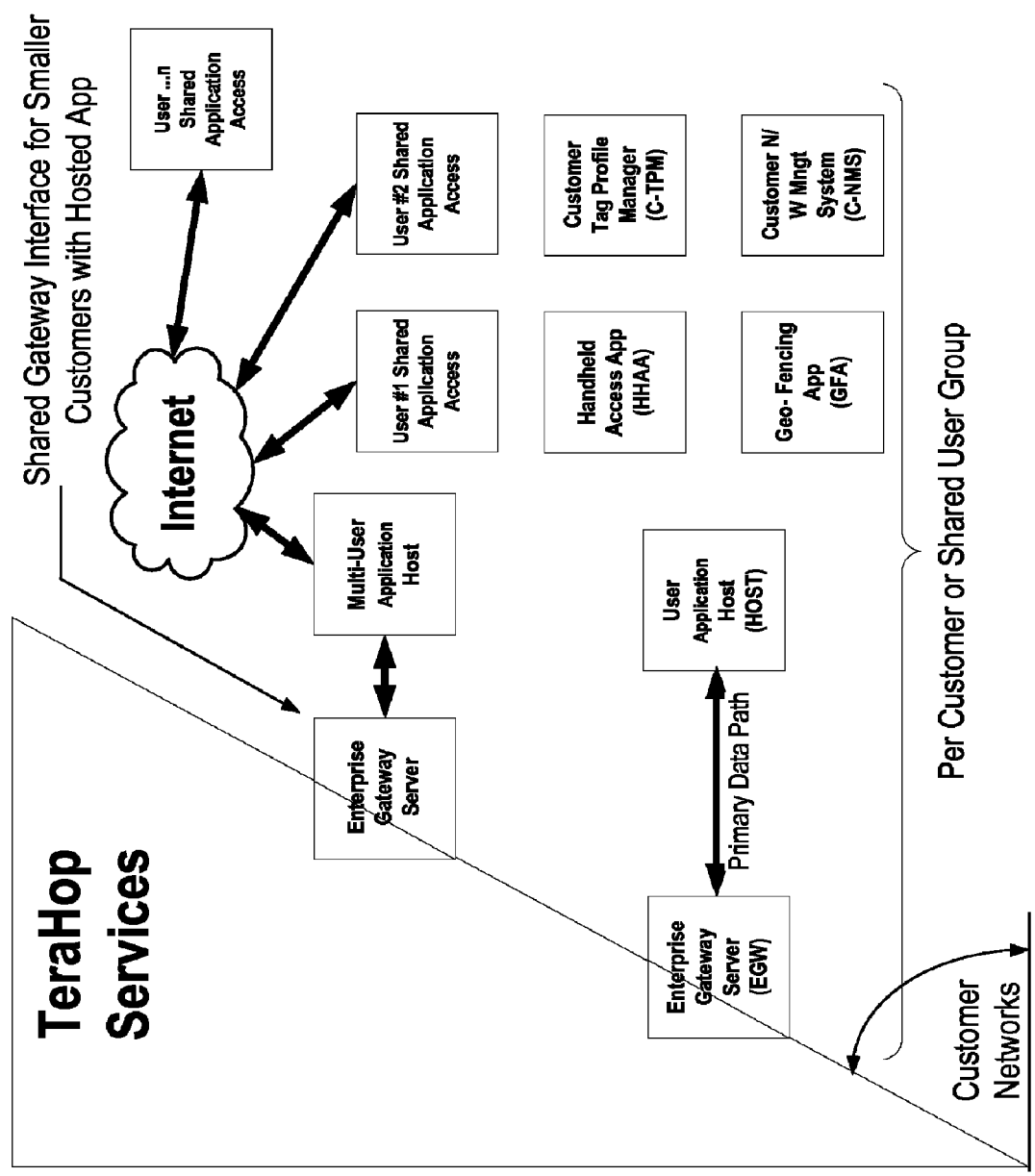
FIG. 83 illustrates major functional elements which support customer interaction with the system.

FIG. 83 illustrates major functional elements which support customer interaction with the system. Each of these elements interfaces with the MMR via an Enterprise Gateway Server (EGW). Like gateway controllers, each EGW communicates with the MMR through an API.

Each EGW provides for the mapping of an RSN or other tag associated with a certain UID to a customer-specified IP address. Further, each EGW also provides for the creation and enforcement of business rules relating to which personnel can access which subsystems within the system.

Each EGW can either be dedicated to a single customer, or shared by multiple customers. In a shared configuration, a shared application provides access to multiple customers. In an alternative shared configuration, a shared EGW provides access to applications of multiple customers. Conversely, a single customer can utilize multiple EGWs, each tied to a single application, or to the same application implemented in different regions.

The functional elements illustrated in FIG. 83 will now be described.

Customer Application Host (HOST)—Customer application hosts can vary widely from customer to customer and implementation to implementation. Generally, such customer application hosts comprise a collection of different hardware and software systems supplied by, and used by, customers. Customer application hosts typically translate data collected from RSNs (that is then communicated through a gateway controller and an EGW to the customer application host), such as, for example, presence and condition data, into useful business information to meet specific customer needs. Notably, there may often be a significant amount of custom code required for an interface between a customer application host and an EGW.

Handheld Access Application (HHAA)—This optional handheld access application supports basic interrogation and access functionality between tags and a handheld PDA or PDA-like device. This application will allow customers to utilize a PDA or PDA-like device to access the contents of an RSN, and possibly other tags as well, in the field. Such handheld access applications will be described in more detail hereinbelow.

Geofencing Application (GFA) This optional application allows a customer to create one or more geo-fences using a zip code, defined boundaries, or a defined radius around one or more locations, and then trigger a message when a tag (presumably attached to an asset) either enters or leaves the defined area. (To check for this event, a notification server (described hereinbelow) of the MMR will have a presence notification flag set and will request a name location server (also described hereinbelow) of the MMR to forward a "check location" message whenever it detects a new location from GPS or gateway controller area information that it receives when a tag sends in a message.)

Customer Tag Profile Manager (C-TPM)—This component allows customers to set, query, and download operational parameters within their RSNs to meet their application needs. Where it is both possible and practical, it will also support tags of complementary networks. It may, however, be more appropriate to use other tools supplied by the complementary network tag provided.

Customer Network Management System (C-NMS)—This optional subsystem is used to monitor and control certain network components and attributes. It is based on Simple Network Management Protocol (SNMP). Access to network components is limited to only those components that are owned or controlled by the particular customer.

Underlying Technologies: Message Management and Routing System

FIG. 79 illustrates the MMR as including four functional blocks, namely: a registration accounting and billing systems block; a network management and customer service block; an authentication block; and a message routing block. Each of these blocks represents a logical subsystem (which may itself be comprised of multiple logical subsystems), and each subsystem may reside on separate platforms or may be integrated. In some implementations, multiple instances of one or more of the subsystems are utilized.

Figure 84:
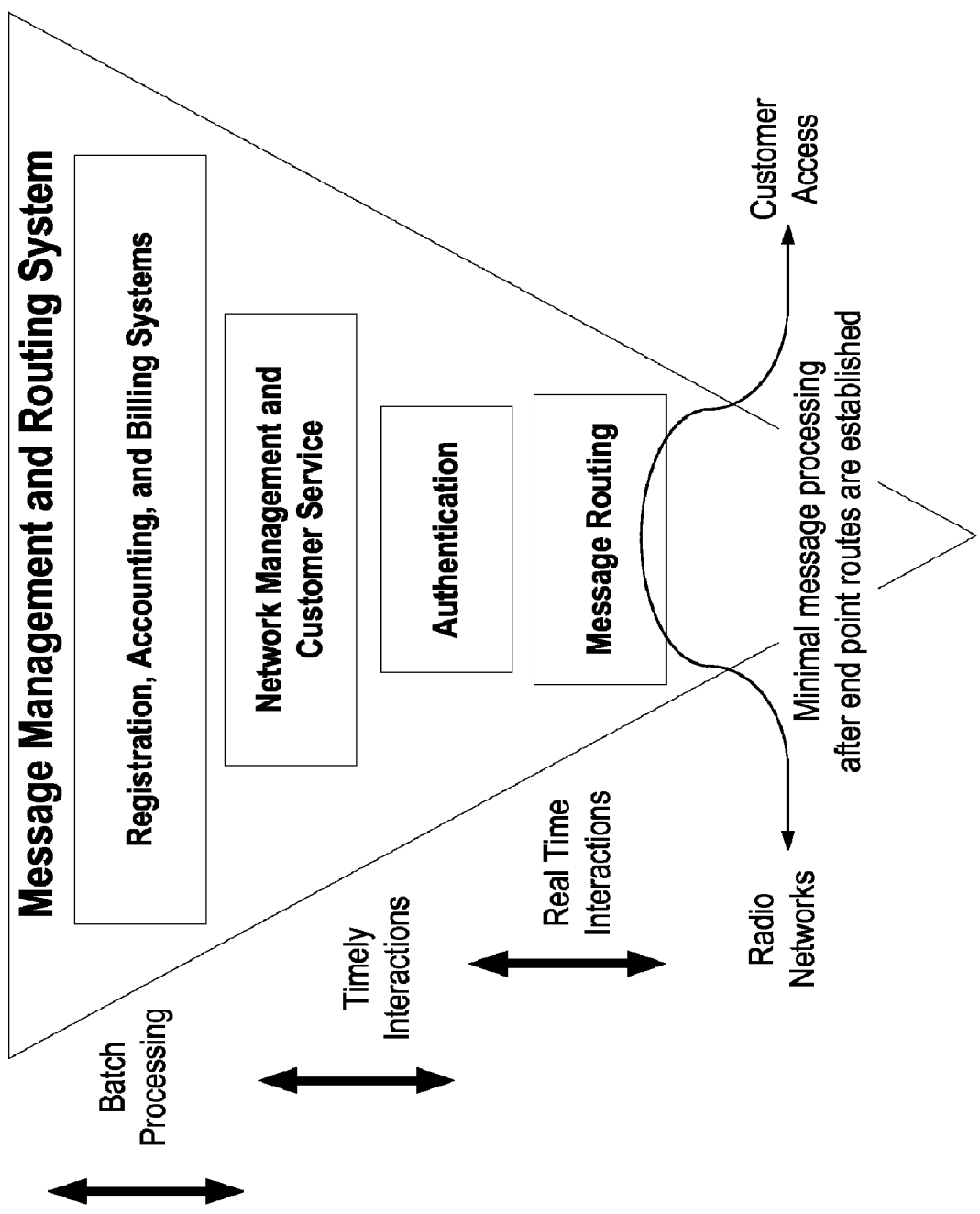
FIG. 84 illustrates latency requirements of each corresponding logical subsystem, which generally corresponds to the vertical ordering of the blocks shown in FIG. 79, and FIG. 84 additionally illustrates the flow of data between a wireless island—in this example a radio network—and a customer application host.

Notably, the vertical ordering of the blocks in FIG. 79 generally indicates the latency requirements of each corresponding logical subsystem, as can be seen in FIG. 84.

The upper most block corresponds to one or more subsystems that accumulate event-driven data and operator-entered data and primarily process it in batch modes.

The block below the upper most block corresponds to one or more subsystems that require "timely" latency and response time that generally involve responses to human inquiries following a classic client-server metaphor. Reasonable response times are required when queries are initiated by humans. In general, queries and responses are queued with round trip delays in the order of three to six seconds.

The lower most block corresponds to one or more subsystems that require real time message processing with minimum latency. These elements are heavily involved in most application message transactions. Their performance will characterize the entire system.

The authentication block, or functional layer, shown in the middle of the diagram provides authentication and access control for all elements within the network and all edge devices. In some instances, it will be involved in all requested transactions. In other cases, it will be involved on a once-per-session basis only. Notably, this is in addition to the authentication provided by EGWs as described hereinabove. Thus, the authentication functionality of the MMR manages access only on a macro level for each customer under the assumption that the EGWs will contain business rules and control individual application and user access.

The architecture of the MMR is designed such that messages containing data traveling between an RSN and user application are handled in real time with minimal practical latency, but an event data record (as described hereinbelow) that audits this transaction is queued or stored and forwarded for delivery when resources are not stressed.

Figure 85:
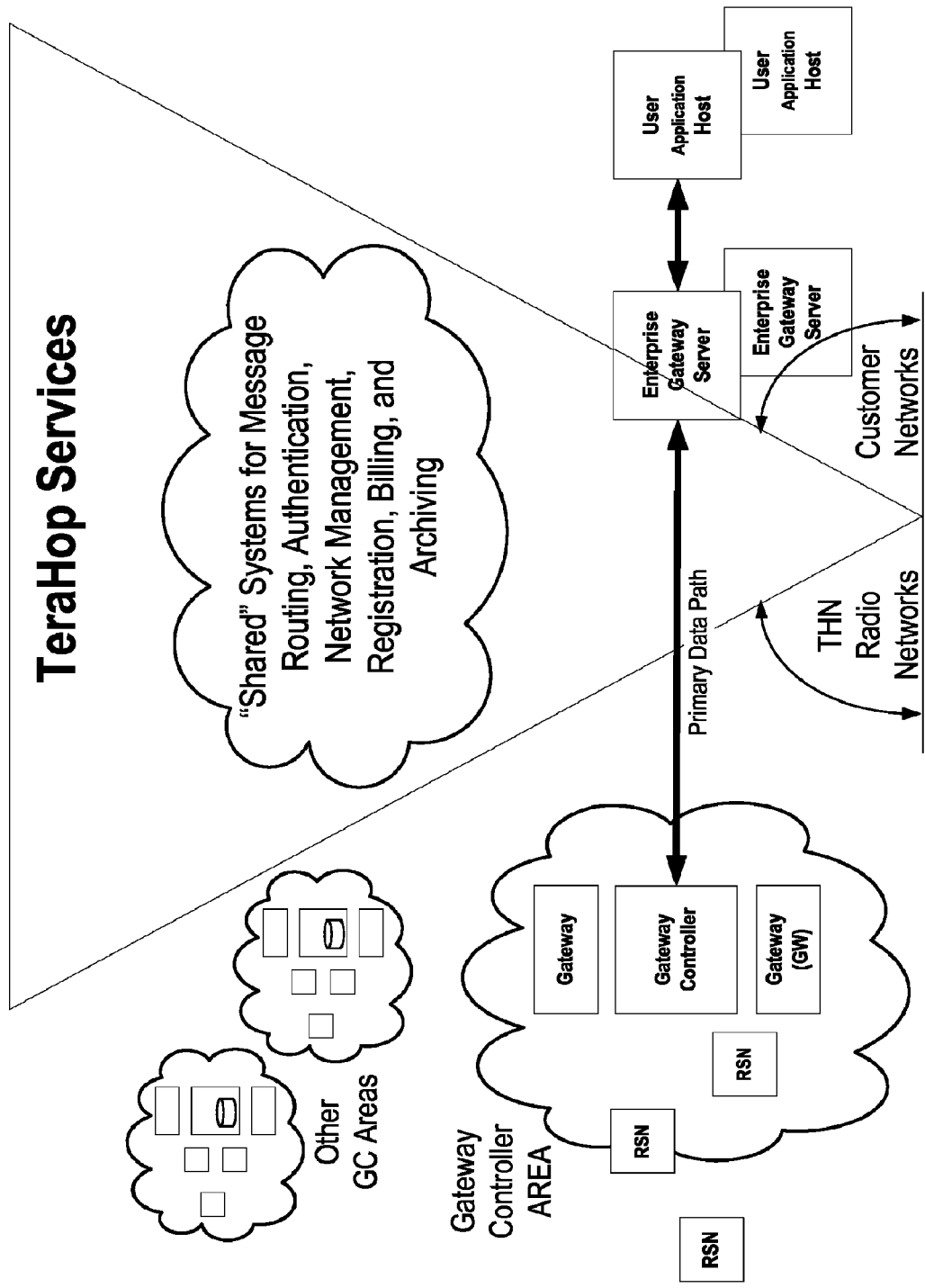
FIG. 85 illustrates that, in order to enable communication between a radio network and a customer application, the MMR routes addresses to both a gateway controller of the radio network and an EGW associated with the customer application, at which point communications between the radio network and the user application will follow the primary data path shown.

FIG. 84 additionally illustrates the flow of data between a wireless island, in this example a radio network, and a customer application host. These flows are illustrated in the bottom of the figure with the dual ended arrow that links the radio networks and customer access. Note that the flow is illustrated as passing through a bottom portion of the message routing block, or functional layer, of the MMR. This depiction represents the idea that the MMR is minimally invasive to data flow. In this regard, the MMR operates similarly to Session Initiation Protocol (SIP) in a VoIP network by receiving a request to route information, validating the request, and then returning a routing address. After this process is complete, the MMR is no longer involved in the actual data transaction. For example, in order to enable communication between a radio network and a customer application, the MMR routes addresses to both a gateway controller of the radio network and an EGW associated with the customer application, at which point communications between the radio network and the user application will follow the primary data path illustrated in FIG. 85. This approach minimizes latency and is highly scalable.

Figure 86:
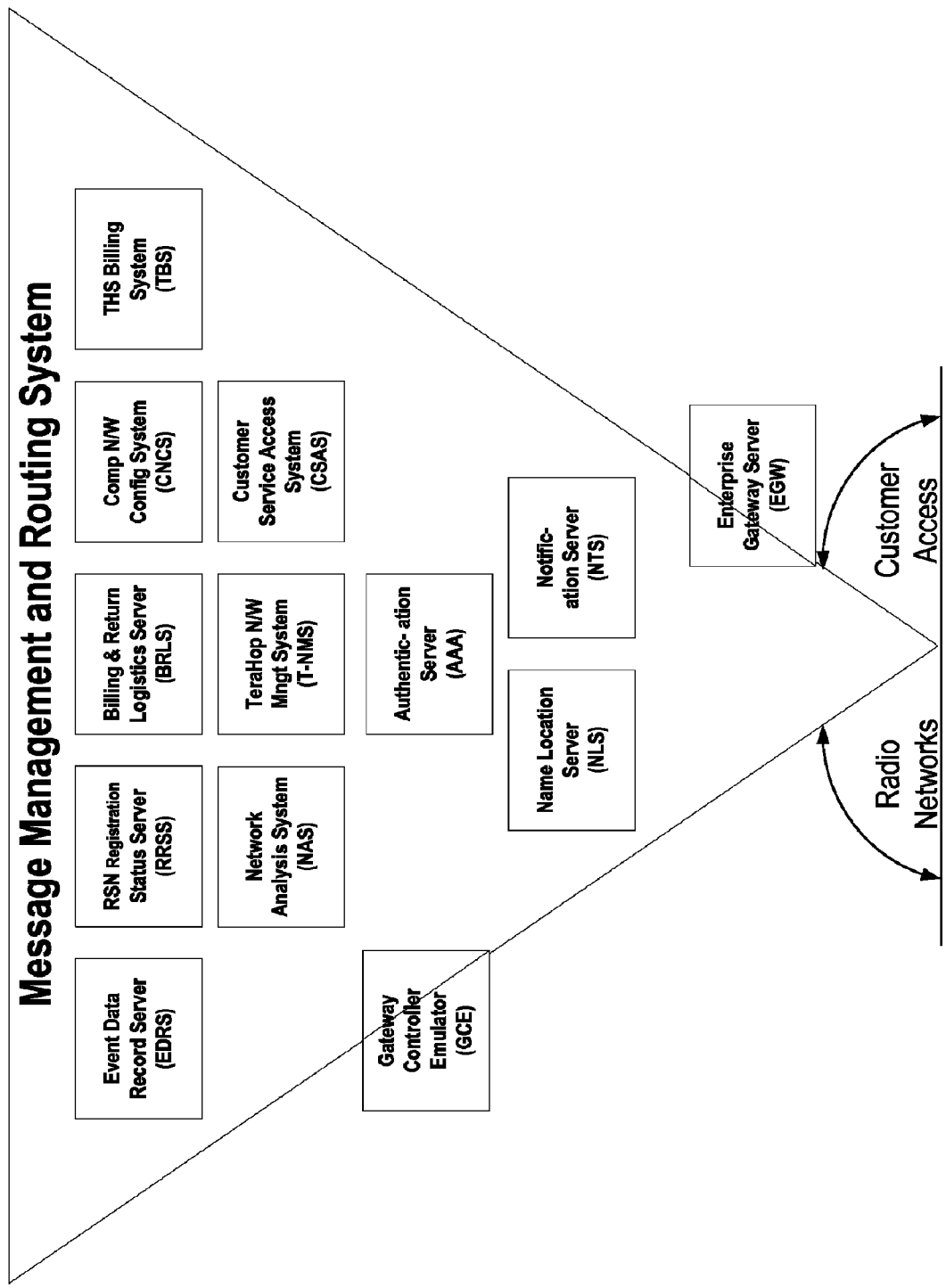
FIG. 86 is a more detailed reference model illustrating logical subsystems of an exemplary MMR implementation.

FIG. 86 is a more detailed reference model illustrating logical subsystems of an exemplary MMR implementation. GCE and EGW edge devices are shown for completeness. At each functional level, each subsystem, i.e. each labeled block, represents a logical element that may or may not be implemented as a standalone hardware system. Further, larger or more complex implementations will require multiple instances of one or more subsystems.

Figure 87:
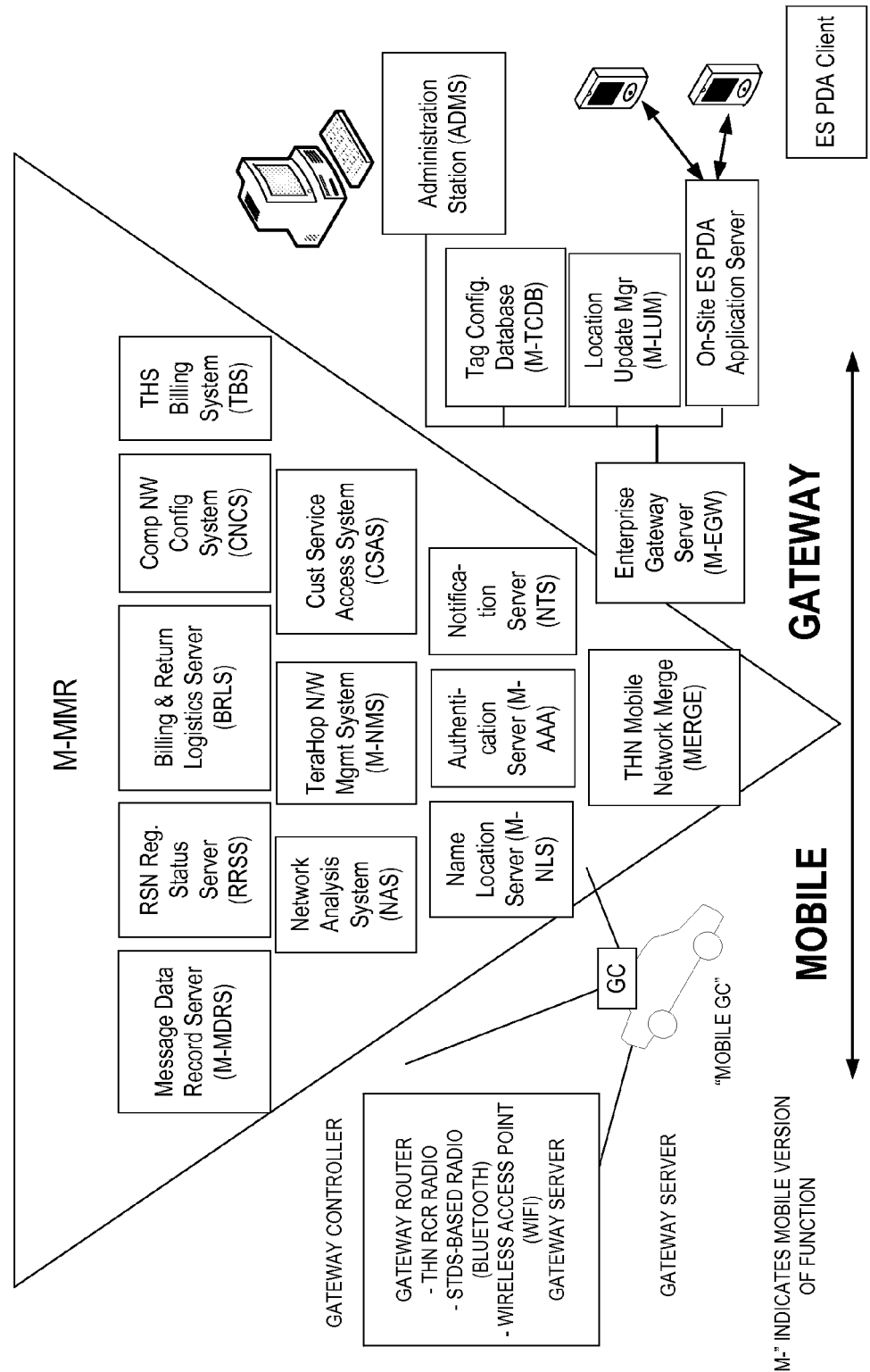
FIG. 87 illustrates, via the vertical placement of the subsystems, differences in the latency and response time requirements for each subsystem.

Notably, at least some MMR implementations will not require one or more of these subsystems, such as for example private systems which might not require a billing subsystem. In such implementations, all subsystems are preferably still at least programmatically "stubbed out" so that they can later be added in easily. The vertical placement of the subsystems within FIG. 87 differentiates the latency and response time requirements for each subsystem, as previously described.

Before describing each functional subsystem in more detail, functionality of preferred MMR implementations will be described.

Preferably, an MMR performs many of the same functions as "anchor" servers and systems that are used in other wireless and wireline networks, but combines and, in some cases, separates, functions that are commonly implemented in a variety of other networks. First-generation cellular infrastructure analogies may be used in this description. These functions are required because these networks share a large number of common, basic characteristics that have been successfully deployed for years.

Further, preferably, inbound and outbound radio channels are managed differently and require different control and usage strategies. Inbound channels are typically loaded with independent and unsynchronized message requests, while outbound channels are under the control of a server that can queue and prioritize message delivery. (This function, among many others, will be provided by GCs and GCEs.)

These functions can be accommodated by using a simple messaging scheme between the various components. Messaging preferably involves point-to-point messages with static source and destination IP addresses assigned to both a sender and receiver. Both connection-oriented TCP/IP and connectionless UDP protocol methods are preferably used, based upon a required function.

Notably, and as described hereinbelow, hardware (and software) can be collapsed onto a single hardware platform that contains all of the required functions so that the system can be used for dedicated on-site (at incident) deployments.

Authentication, Authorization, and Accounting System (AAA)—This subsystem controls and monitors all internal and external requests to access any of the components within the MMR. Both transaction-oriented and session-oriented checks and verification are made based upon the customer. The accounting portion of the system is limited to providing peg counters to the billing system (TBS).

Billing and Return Logistics Server (BRLS)—This subsystem is used to retain the status of active/inactive RSNs for billing purposes and also contains RSN return information for RSNs sent to a returns depot for re-distribution to shippers or other entities. It additionally may cover similar operational and logistic issues for complementary network tags.

Complementary Network Configuration System (CNCS)—This subsystem interfaces with various complementary networks of the system and is used to configure tags and other complementary network components that are integrated into the MMR.

Customer Service Access System (CSAS)—This subsystem is the focal point for registering and monitoring RSNs by the managing entity to assist customers. It also provides real time visibility to the system to help identify and correct anomalous conditions. It further links to, and is integrated with, the CNCS to provide visibility and control of tags associated with those systems.

Event Data Record Server (EDRS)—This subsystem comprises one or more servers that receive and store XML records generated by various network components that can be used to historically analyze message flows and events. The event data records (EDRs) stored on these servers will be available to customers as well as managing entity personnel, and will be automatically backed up and archived for future use and investigation.

Network Analysis System (NAS)—This subsystem monitors network probes (strategically deployed RSNs running a special application), as well as retries, denial of service, and other network conditions, looking for anomalous operations or usage.

Name Location Server (NLS)—This subsystem provides routing information for RSNs and hosts when queried. It also provides other functionality directly related to message routing based upon flags set by other components, as noted hereinabove and described in more detail hereinbelow.

Notification Server (NTS)—This subsystem works in conjunction with the NLS. It contains information regarding entities that should be notified, and stores information for such notification, when the NLS becomes aware of the presence of an RSN or other tag.

RSN Registration and Status Server (RRSS)—This subsystem contains a listing of all registered RSNs in the system and an indication of their status (i.e., active, inactive, etc). It works in conjunction with the CNCS, which performs a similar function for Tags associated with those networks.

Billing System (TBS)—This subsystem queries various other databases to determine billing amounts for particular customers for network usage, setup or configuration fees, host application fees, and device leasing or rental fees.

Network Management Server (T-NMS)—The network management server has total control of all managing entity components and attributes.

Underlying Technologies: MMR Scenarios

Several exemplary scenarios illustrating MMR functionality will now be provided.

The scenarios assume that all devices and subsystems mentioned are registered and properly configured. A third scenario is also included that describes how an individual RSN is added to a network.

Underlying Technologies: Exemplary Inbound Message Flow (RSN to Customer Application)

As described hereinabove, in order to join a radio network, a free RSN responds to a beacon broadcast by a captured RSN or gateway. This response represents a request to register with that radio network, and is forwarded on to the gateway server, or gateway controller, associated with that radio network.

The gateway controller updates its local server database with the fact that the RSN has appeared in its area. It also stores path information for reaching the RSN. This information is stored in a temporary location, awaiting confirmation that the gateway controller is authorized to provide service to the RSN.

Based on the message type, the gateway controller may also communicate an outbound acknowledgement to the RSN through the appropriate gateway. (In most cases, other network entities, and not the gateway controller, will generate outbound acknowledgements.)

The gateway controller next checks a local routing database it maintains to see if it has "recently" routed a message of the same message type and class, and associated with this RSN's UID, to another network entity. If so, the gateway controller uses the information used for the prior recent routing as described below. The gateway controller also stores the received path in its local database.

If the gateway controller has not recently routed a message associated with this RSN, it forwards the routing request by sending an inquiry to an NLS that is recognized as its default anchor NLS. The routing request includes a static IP address of the gateway controller, a two-character country code of the gateway controller, and GPS coordinates of the gateway controller, along with the RSN's UID, current class, and the message type associated with this data transfer.

The receiving NLS examines the received UID to determine if it stores routing information for the particular RSN corresponding to that UID. If it is not designated as the "home" NLS for that particular RSN, the receiving NLS will check an RSN/NLS visitor address table it maintains to determine if it has recently received an IP address for a home NLS of the particular RSN. If it has, it forwards this information to the gateway controller.

If the RSN is not registered to the receiving NLS, and the RSN/NLS visitor address table does not contain appropriate routing information, the NLS looks up static IP addresses of all NLSs in an NLS registry table, and attempts to locate the home NLS of the particular RSN, i.e. the NLS with an RSN registration record for the RSN corresponding to the received UID, by sending an RSN home query message to all NLSs. Each query message contains the RSN's UID.

If an NLS contains the registration record for the particular RSN, i.e. is the particular RSN's home NLS, that NLS responds to the originating, anchor NLS, with an affirmative response, containing its IP address, affirming it is the home NLS for the particular RSN.

Upon receipt of the affirmative response from the home NLS, the originating, anchor NLS that is connected to the initiating gateway controller will forward the affirmatively responding NLS's IP address to the initiating gateway controller. Notably, this backbone query process approach is advantageous if all NLSs have wireline, broadband connectivity while NLS-to-gateway controller links comprises lower bandwidth, higher latency, wireless links.

If, on the other hand, the anchor NLS does not receive an affirmative response from any NLS, it will send a Denial of Service (DoS) message back to the initiating gateway controller which, in turn, will send the DoS message to the particular RSN. The gateway controller includes functionality to ensure that repeated messages from the same RSN, e.g. a DoS attack, do not burden the system. Repeated requests and failures will be reported by the gateway controller to the NAS, which may, in turn, notify the managing entity, e.g. via a T-NMS operator, for investigation.

If, though, a home NLS for the particular RSN is located, the originating NLS records the address of the home NLS for the particular RSN so that if another request is received from this RSN, it will know its home NLS and will be able to forward that address back to the gateway controller without having to send queries to all other NLSs to locate the home NLS. RSN/NLS visitor address records are kept for a specified interval and then purged on a First In First Out (FIFO) basis to limit overall file size.

When the originating gateway controller receives the home NLS' IP address back from the originating NLS, it initiates a routing request to the home NLS' IP address.

Upon receiving the routing request, the home NLS, which contains the particular RSN's routing profile, adds the initiating gateway controller's static IP address to a historical routing table associated with the particular RSN that is accessed using a Last In First Out (LIFO) queue. A set number of gateway controller addresses, dependent upon a default parameter of the NLS, will be stored in the LIFO queue. Any duplicate gateway controller addresses will be eliminated, with each additional new duplicate address stored at the top of the queue. This historical routing table is used to attempt to reach the RSN in response to an RSN message delivery request from another network or application element.

The home NLS examines a current location file associated with the particular RSN to determine if the particular RSN last appeared through a different gateway controller. If so, the NLS send a de-register message to the previous gateway controller to remove the particular RSN from a current RSN presence table of the previous gateway controller, e.g. from a database of the gateway server of the gateway controller, which database was previously described hereinabove as a database of known nodes.

The NLS additionally checks various RSN modes (described hereinbelow). If any special triggers are set, the NLS takes appropriate action (also described hereinbelow). Assuming that all RSN mode checks are positive, the NLS proceeds with the following process.

The NLS sends a token request to an AAA server for a token that can be used for an RSN-to-EGW transaction. The token request includes an indication of a target EGW specified in a routing table associated with the particular RSN. The AAA server creates such a token based upon a stored encryption key associated with the target EGW, and sends the token to the NLS, which then forwards the token to the target EGW.

The target EGW responds to the NLS that it has accepted the token and verified that the particular RSN, based on its UID, is valid. The EGW indicates that it is available to participate in the RSN transaction.

Upon receiving a positive response from the EGW, the NLS stores the token for later use in sending transactions between the RSN and the EGW. After a pre-set time interval has expired, the token will be discarded and a new token request process will be initiated.

The NLS also queries an NTS it is associated with to see if there are any inbound or outbound notification flags set. The NTS accommodates multiple notification flags for both inbound and outbound queues that are processed on a FIFO basis and can be set by various network and application entities. An inbound notification is defined as alerting some entity to the fact that an RSN or tag has now appeared in a network. An outbound notification allows a stored command or action to be automatically sent to such an RSN or tag. The initiator of any inbound or outbound notification request is able to later cancel any request that they initiated.

If an inbound notification flag is set, the NTS either sends a predefined message to an EGW, or other entity, or takes other action such as initiating an email or user recorded voice message.

Additionally, if elected by a customer, the NTS initiates geofencing capabilities. In this case, the NTS examines GPS coordinates contained in the original message from the gateway controller. If the coordinates are different from the last set of coordinates received, and the geofencing option is active, the NTS will send a predefined message to the EGW which, in turn, will send a notification to a customer purchased GFA. The GFA will examine the received GPS coordinates and determine what, if any, appropriate actions should be taken. Notably, the NTS is only involved in forwarding location changes and does not participate in any application level logic related to the RSN's location or to geofencing.

If an outbound notification flag is set, the NTS forwards the standard message request to the current gateway controller the RSN is associated with for forwarding to the particular RSN. The RSN then acts upon the standard request in a normal fashion. The queued message could be, for example, a C-NMS request to forward certain stored parameters.

After the inbound or outbound notification request is received by the target entity, that entity sends an affirmative or negative acknowledgment in response. The NTS clears the Notification Flag if an affirmative acknowledgment is received.

Returning to the main process, the NLS forwards, to the gateway controller, the AAA-generated token along with routing information, including primary and back-up IP addresses, e.g. IP addresses for EGWs, stored at the NLS in a routing table associated with the particular RSN. Different routes may exist for different class and/or message types as well as for different potential applications and servers. For example, based upon a gateway controller's country code or a device's class or a communication's message type, a different EGW may be specified. Each EGW, in turn, may re-direct a communication to a specific customer-specified application or address.

At this point, the gateway controller sends a connection acknowledgement message to the RSN to stop the RSN from initiating any message retries.

Once the originating gateway controller receives the routing information, this information is stored in its temporary routing table associated with the particular RSN.

The gateway controller uses this routing information to determine an appropriate EGW to use for communication of the particular RSN's "presence", and then forwards a message containing this presence information to the determined EGW. Notably, the actual transfer of information does not "go through" any MMR subsystem. Instead, this message, as well as the AAA generated token, is communicated directly from the gateway controller to the EGW.

If communication of this message fails, and following appropriate retries, the gateway controller attempts to communicate the message utilizing the back-up IP address from the routing information.

If attempts utilizing the back-up IP address fail as well, the gateway controller will forward a failed EGW link message to the NAS, which will store this information for post-incident statistical analysis. Personnel of the managing entity are also able to access these records through a query of the NAS.

If, on the other hand, communication of the message to an EGW is successful, the receiving EGW examines the message, and, based upon a message type and class of the message, and the country code of the transmitting gateway controller, routes the message to an appropriate application. In addition to providing this routing functionality, the EGW translates the RSN's UID to a customer-specified device addressing scheme.

After the gateway controller has forwarded the message to the EGW, it creates an EDR and sends the EDR to the EDR Server. The gateway controller may also send an EDR to the EGW if the customer has requested this feature, and the stored routing information is set up accordingly.

The appropriate application which receives the message may comprise a HOST or other target application. If the application is configured to provide an acknowledgment, then such an application level acknowledgment is generated and sent to the EGW. Notably, in the context of a registration request as described in this exemplary scenario, the target application may make a determination as to whether to allow registration of the RSN, and provide either a positive or negative acknowledgment.

Upon receipt of an application level acknowledgement, the EGW translates a customer device address to the corresponding RSN UID, generates and sets an appropriate message type, and forwards such an acknowledgment message to the gateway controller.

Upon receipt of this acknowledgment, the gateway controller delivers the acknowledgment to the particular RSN, i.e. communicates the acknowledgment from the gateway server of the gateway controller to the RSN through one or more nodes as described hereinabove. Further, the gateway controller creates an EDR and sends this EDR to the EDRS.

Upon receipt of this acknowledgment, the particular RSN may, depending on its internal profile, (and particularly when not in the context of registration) generate a return confirmation acknowledgment message to send back to the EGW, via the gateway controller, which, in turn, would forward it to the appropriate application. If the particular RSN does generate a return confirmation acknowledgement message, the gateway controller will send a corresponding EDR to the EDRS upon forwarding the return confirmation acknowledgment message on.

Later, if the particular RSN transmits another message, the gateway controller is able to determine an inbound route based upon the routing information stored in its routing table, and use the same token if it has not expired.

Underlying Technologies: Exemplary Outbound Message Flow (Customer Application to RSN)

As a forward, it is notable that authorization and authentication occurs at two levels. At a customer application level, an EGW contains policies that authorize and authenticates users and applications accessing the MMR. Once so authorized, the MMR will not attempt to authenticate any individual users within a customer's organization or restrict certain types of messages that are generated by specific customer applications. From the MMR perspective, any valid API command that emanates from an EGW will be processed.

At the MMR, all authorization and authentication activities are preferably controlled by the AAA server that validates customers or a managing entity employee and their access to all network components.

An outbound message to an RSN can be initiated by an EGW, or from a HOST, C-NMS, C-RPM, HHAA, or GFA application traversing through the EGW, assuming that the message has the proper authorization to do so. Functional subsystems within an MMR, such as the T-NMS, can also initiate a message to an RSN. For this discussion, it will be assumed that a customer's application HOST has initiated the outbound message.

A gateway controller can also initiate an outbound message to an RSN that is located within its Area domain. This function, for example, could be part of a local "ping" or "Are you still there" dialogue that is beyond the scope of this document. (As an aside, if an RSN responds to this type of message, the inbound processing sequence as described above may or may not be followed.)

When a HOST wishes to communicate a message to an RSN, it sends a request to an EGW. The EGW checks its policies to validate the request. Assuming that the request is an authorized and valid request, the EGW translates a customer device address associated with the RSN to a UID based on a stored registration table. The EGW also utilizes this table to determine a home NLS associated with the RSN corresponding to the UID, i.e. the particular RSN.

The EGW sends an RSN route request message to the NLS determined to be the home NLS for the particular RSN.

If the NLS the route request message is sent to is the home NLS for the particular RSN, then the NLS will check an internal mode table for the RSN to determine if it can proceed with message routing. If not, the appropriate response messages will be generated and routing activities may cease.

If on the other hand, the NLS the route request message is sent to is not the home NLS for the particular RSN, that NLS sends a message to the RRSS to verify that the UID is valid and requests an address of a current home NLS of the particular RSN. Assuming the UID is valid, the RRSS responds with such address. The NLS that initiated the RRSS query forwards this address to the EGW which, in turn, updates its internal routing table and reinitiates the process. Notably, this technique will allow for the orderly re-distribution of RSNs to new NLSs as the system grows.

Once the proper home NLS is located, and upon receipt by this home NLS of a route request message, the home NLS sends a token request, including an identification of the EGW as a target EGW, to the AAA Server. Such a token will be used for an EGW to RSN transaction. Assuming proper credentials, the AAA Server creates such a token based upon the stored encryption key for the target EGW. The AAA server sends the token to the NLS, which in turn forwards the token to the EGW.

The NLS then examines a stored routing table to determine an appropriate gateway controller to contact to attempt to deliver the message to the particular RSN. This table is a Last In First Out (LIFO) table having a defined number of entries, each entry corresponding to a gateway controller through which communication with the particular RSN recently occurred. Using this table, the NLS determines a first gateway controller to contact, and sends a query message to this first gateway controller. The queried gateway controller determines if the RSN is present in the radio network it oversees, as described hereinabove, and returns either an affirmative response or a negative acknowledgment.

If the gateway controller cannot communicate with the RSN, it sends a negative acknowledgment (NAK) message back to the NLS. Based upon the returned message type, the NLS may set the Outbound Notification Flag in its associated Notification Server or it may report the RSN's unknown presence to the EGW for resolution by the EGW.

If the first determined gateway controller returns a NAK, the NLS attempts to determine, using the LIFO table, a second, "next oldest" gateway controller to query. Additionally, if a "default" gateway controller was manually determined and entered during registration of the RSN, a query is sent to this default gateway controller as well.

Upon receiving a query, if a gateway controller determines that the particular RSN is present, the gateway controller sends an affirmative response back to the NLS, and additionally creates and sends an EDR to the EDRS, indicating success or failure in locating the RSN.

The NLS, in turn, responds by sending the token received from the AAA server to the gateway controller.

The NLS also sends a message indicating it has found the particular RSN to the initiating EGW, along with the address of the gateway controller that indicated the particular RSN was present in its radio network. The EGW then sends an outbound message received from the HOST directly to the gateway controller that indicated the particular RSN was present.

Upon receipt, the gateway controller attempts to deliver the message to the particular RSN, i.e. attempts to communicate the message from the gateway server of the gateway controller to the RSN through one or more nodes as described hereinabove. The gateway controller also creates and sends an EDR to the EDRS, indicating success or failure in delivering the message to the particular RSN.

Any response to the message, from the RSN, will be treated as an inbound message as described hereinabove. This approach accommodates asymmetrical routing, as a response can be directed to an address that is different from the address of the HOST.

Underlying Technologies: Registration, Activation, and Initiation Process

The following scenario assumes that:

A customer has supplied to the managing entity the default and back-up IP addresses for EGW routing and their passwords for use by the AAA server.

The managing entity has established a customer profile in the RSN Registration Status Server (RRSS). This process includes the assigning of a default NLS and NTS server. It also involves identifying the customer to all other network entities so that they can process messages from the new customer.

The managing entity notifies the customer when RSNs are shipped. Included with the notification is a list of UIDs for all shipped RSNs.

The managing entity enters the RSN UIDs into the RSN Registration Server (RRSS) and changes the status for each device to Registered, Enabled, and Not Configured. The managing entity establishes home NLSs for the RSNs when customer data is first entered into the system.

The RRSS propagates the new registration information to the NLS and NTS and sends a message to the Billing and Return Logistics Server (BRLS) and Billing System (TBS) indicating that the particular RSN is now ready for configuration.

The RRSS also sends the RSN UID to the appropriate EGW. The EGW will then forward the RSN UID to the C-TPM to alert the system that a configuration profile needs to be created for this device.

The customer, through the C-TPM, creates a profile for the RSN and assigns a customer device ID number (of their liking and for their internal use) that corresponds to the RSN's UID. (Note that another method will exist that will allow the assignment of a profile to a device in the field when they are deployed through the use of the Handheld Access Application (HHAA). This method is not described in this scenario.) When the RSN profile has been properly created, the RSN UID to Customer ID number mapping is forwarded to the EGW.

EGW sends a Token Request to the AAA Server to allow it to access internal MMR Systems with registration information. The AAA Server examines the request and sends a validation message to the RRSS to match the RSN UID with the customer.

The RRSS responds to the AAA Server that there is a customer ID and RSN UID match, and all RSN Modes are OK to proceed. The AAA Server responds to the EGW with a Token. The AAA Server sends the same Token to RRSS, BRLS, TBS, NLS, NTS, and TBS.

The EGW will forward registration data to the components listed above. Each will respond with an acknowledgement. (The customer-assigned, device identification information is stored for reference only and is not used inside the MMR.)

When the RSN is first deployed and enters into a coverage area, it will forward a default configuration request message to the gateway controller.

The local-area gateway controller will forward the configuration request message to the NLS following the previously described inbound message process.

The NLS will check to see if the notification flag has been set by querying the NTS, which, in turn, will check to see if a Device Configuration Profile has been created for the device. It will then respond to the NLS appropriately.

The NLS will notify the various systems of the configuration request that will each update their device status tables accordingly. Assuming that a profile has been created, the NLS will forward this information (status) and appropriate EGW information to the gateway controller, which, in turn, will forward the configuration request to the EGW.

The EGW will then forward the request to the appropriate C-TPM. The C-TPM will send the profile to the EGW for the target RSN. The EGW will send the profile to the gateway controller following the outbound message delivery protocol outlined above. The gateway controller will send the profile to the RSN. The RSN will acknowledge profile reception to the gateway controller.

The Profile reception acknowledgement will be propagated back to all necessary subsystems including C-TPM (details of propagation have been omitted for brevity at this time).

The EGW will propagate RSN availability to all customer applications (details omitted at this time). The EGW will notify CSAS of RSN availability. The CSAS will notify all other MMR subsystems and initiate usage billing in the TBS.

Underlying Technologies: Customer Control in a Shared System

As will be appreciated from the description herein, one or more preferred embodiments of the present invention contemplate a shared system deployed at hundreds of public and private locations. The system comprises a plurality of network islands, including gateways and related equipment, that are connected with a variety of different types of communication links to an MMR. Using a number of partitioning techniques, the MMR and the associated gateways allow for the simultaneous use of the system by many independent customers. Preferably, fees are charged to customers or their agents for the use of the system using a number of billing options. To gain access to the system, each RSN, or seal, will need to be registered in the MMR. This process can be performed on an individual or group basis that is partially controlled by a managing entity of the MMR and partially controlled by each customer or their agent. During the registration process, a number of system variables and device operational modes and behaviors can be specified to meet customer needs.

Billing arrangements for the shared network access and usage service will fall into three broad categories, including flat rate monthly billing per device, usage based billing, and on-demand alert message billing. Other billing arrangements will be offered based upon market demand. A key aspect of the billing arrangements and the subject of this disclosure is the capability of an authorized user to suspend or curtail billing of each or all RSNs anytime without the involvement of any person or entity associated with the managing entity overseeing the system. This arrangement will allow customers to either manually or automatically reduce their periodic billing charges during periods in which they do not anticipate any usage of one or more of their RSNs. It is expected that this feature will be quite attractive to customers whose need for, and use of, the shared system will vary during different times of the year or during non-incident periods.

Preferably, access to the MMR's billing and registration server is provided to authorized and authenticated users. Via this access, the user is able, on an individual or group-wide basis, suspend or reduce the periodic billing arrangement for particular RSNs. The level of reduction, e.g. to zero or otherwise, or the change in billing or operational mode, preferably was previously jointly established, and agreed to, by the managing entity and the user. The user is able to enable or disable the reduced billing feature at any time, and will be able to specify both a start time and date and an end time and date for the reduced period to be in effect. Independent of the end time setting, the system will revert to normal billing automatically based upon certain triggering events. This revertive triggering capability eliminates the need for the user to remember to reinitiate normal billing that has been suspended by their manual intervention. Preferably, revertive billing triggers include: the detection of the presence of an RSN at a new location (indicating that it has been moved from its previously stored or last known location); the activation of an RSN effected by an internal or external sensor, such as, for example, the insertion of a bolt into a seal; the automatic triggering of an alarm associated with a sensor, such as, for example, shock or motion detection of a seal attached to a storage container that was expected to be dormant; and the changing of an operational mode of one or multiple RSNs by a host application or user, e.g. the mass mode change of all units from an inactive mode to an active mode.

In each of the above cases, when the triggering event or condition occurs, the associated RSN will trap the time and date of the occurrence, and, when connected to the shared network, will transmit a message accordingly. Upon receipt, the MMR will revert to standard billing either at the time of the receipt of the message or, alternatively, based on the time at which the triggering event took place. In either case, the action will be recorded within the billing system, and, as a user configurable option, can result in an email or other automated notification message being sent to a user specified application or person.

Attributes and Characteristics of Preferred Embodiments

It will be appreciated that an approach to tracking and monitoring moving/movable assets using a class-based networking architecture and point-to-multi-point radios that employ wake-up transceivers has been described above. The combination of class-based networking and wake-up transceivers offers several advantages over other wireless networking technologies, including: dramatic increase in radio battery life (years); significant reduction in RF noise; use of standards-based radios (e.g., Bluetooth® & WiFi); Mbps data rates; and radio transmission only when sending data (eliminating timer dependency and periodic "blinks"). Class-based networking also enables the concurrent operation of multiple radio types, in multiple architectures, to multiple standards, in the same area, sharing the same infrastructure, yet operating independently and without interference, thus facilitating global application.

Consequently, implementations of preferred embodiments of the present invention include one or more of the following attributes and characteristics: a system of networked devices and sub-systems that, using radio communications, automatically/autonomously collects data about specific assets and the environments that they are in, and using either wireless or wireline (landline) communications, forwards those data to user applications and data-storage servers, as the assets and/or users change location; a system of networked devices and sub-systems that accommodates assemblages of a gateway device and of sensor devices (for convenience, "RSNs") that are in the RF range of the gateway device, into local (stand-alone, separate, or isolated) network islands, such that the network islands automatically/autonomously form and adjust as RSNs randomly come and go, in quantities of 10,000 RSNs per island; a system of networked devices and sub-systems that provides automatic detection of initial presence, sustained presence, and absence of each/all RSNs in an island and automatically reports these states and changes to them, to user applications, for each/all RSNs; a system of networked devices and sub-systems that provides bi-directional radio communications between RSNs and gateway devices, for exchange of data, commands, and software/firmware updates; a system of networked devices and sub-systems that includes gateway devices that provide WAN connectivity between local RSN-gateway networks and remotely located servers, and that manage the associated to-from messaging, for quantities of 10,000 RSNs per local network, wherein the WAN communications include wireline, cellular, LMR data link, and satellite; a system of networked devices and sub-systems that renders a minimum 2 year RSN battery life, when used properly, in the most challenging application and conditions; a system of networked devices and sub-systems that provides a suite of sensors internal to RSNs that includes motion, shock, and magnetic switch; a system of networked devices and sub-systems that has RSNs that are of a size/weight that they can easily and comfortably be carried in a coat pocket or worn on a dress belt; a system of networked devices and sub-systems that provides minimum RSN-RSN, RSN-gateway, and gateway-to-local-user-device range of 300 feet; a system of networked devices and sub-systems that employs means that minimize the number of gateway devices needed to cover a given site and that significantly increase the probability that communications can be sustained between any given RSN and a gateway device, regardless of physical and electromagnetic conditions that would otherwise impair RF performance; a system of networked devices and sub-systems that includes an integrated RSN-seal that incorporates an RSN and an ISO-17712-compliant bolt seal, with automatic electronic serial number ID, insertion registration, and cut-detection and reporting; a system of networked devices and sub-systems that includes RSN measurement and reporting of its own GPS (or equivalent)-derived location; a system of networked devices and sub-systems that includes RSN measurement and reporting of runtime (e.g., engine hours) of an attached-to asset; a system of networked devices and sub-systems that includes RSNs equipped with an interface for common operational and environmental sensors, to collect and report data from those sensors; a system of networked devices and sub-systems that includes means for partitioning local RSN-gateway networks and managing how messages are handled such that RSNs attached to assets of certain user-defined groups can operate independently of other groups, yet all share the same local gateway devices to communicate with their respective applications; a system of networked devices and sub-systems that includes gateway devices that provide direct/local-site communications and manage messages between user applications hosted on local computers (stationary and movable) and RSNs of a local network, without having to use WANs or other off-site means; a system of networked devices and sub-systems that has gateway devices that incorporate GPS (or equivalent) measurement and reporting, of the gateway devices themselves and of RSNs that are associated with them; a system of networked devices and sub-systems that has means to exchange data and messages between local RSN-gateway networks and user applications and network-management applications using a common-to-THN set of data-interaction instructions; a system of networked devices and sub-systems that has gateway devices that are of a size/weight and are otherwise equipped to operate attached to mobile assets and provide local-network management, WAN connectivity/routing, RSN management and communications, local user-device communications, and event data storage, without requiring the use of facilities not on the mobile asset; and a system of networked devices and sub-systems that accommodates gateway-defined local-network islands that, on an ad hoc basis, can be merged with other islands to form a single larger island, under the management of a single controlling gateway device, with that merged island including all RSNs that were originally associated with the merged gateway devices, and that facilitates subsequent un-merging and the re-establishment of original gateway-RSN associations. These islands may be any combination of mobile, permanently stationary, or temporarily stationary; a system of networked devices and sub-systems that includes a PDA offering equipped with a simple first-responder application; a system of networked devices and sub-systems that includes a PDA offering equipped with a simple asset-management application; a system of networked devices and sub-systems that includes a PDA offering equipped with an RSN-seal management application; a system of networked devices and sub-systems that includes a centralized network and network-services management system that is accessible by RSN-gateway networks and by user applications, that manages message/data routing between user applications and local networks, stores event data, authorizes usage, manages billing, issues software/firmware updates, etc.; a system of networked devices and sub-systems that accommodates find-RSN and directed query of a specific RSN using user applications; a system of networked devices and sub-systems that facilitates users' uniquely associating RSNs to specific assets, such that user applications may address the asset by the asset's name (rather than by the RSN); a system of networked devices and sub-systems that accommodates mobile gateway devices' querying of specific RSNs or groups of RSNs that may be associated with a different gateway device, without having to interact with that different gateway device, nor with any other device/sub-system not contained on/in the mobile gateway's conveyance; a system of networked devices and sub-systems that includes gateway devices that can be subordinated to another gateway device, so as to provide extended range of the other gateway device; a system of networked devices and sub-systems that includes RSN and gateway devices that may be configured to autonomously assume/execute certain behaviors depending on sensor input, day-of-week, time-of-day, network command, application command, or any combination thereof; a system of networked devices and sub-systems that whose gateway devices all must be capable of being installed on their physical structures, configured, connected, and commissioned into their users'/owners' networks by associate-level technicians, using only common hand and datacomm tools, THN-supplied tools, and the support of at most one off-site technician, typically in 4 hours per device; a system of networked devices and sub-systems that whose devices all may have common-user-name and other user-defined attributes assigned to them by users, with those attributes capable of being read/viewed/changed by user applications; a system of networked devices and sub-systems that includes a tool for users (customers) that enables them to configure the descriptive and behavioral attributes of RSNs owned/controlled by them, without requiring a network connection, nor the involvement of THN personnel; a system of networked devices and sub-systems that may be operated with full-function/capability in any national or local jurisdiction, either by a single fixed set of parameters that accommodates all jurisdictions, or that automatically adjusts based on self-sensed location; a system of networked devices and sub-systems that accommodates same-site redundancy of gateway devices, with automatic switch-over should a primary fail, and the option of automatic or manual switch-back; a system of networked devices and sub-systems that whose devices all have the capability of having their operational software/firmware updated, either singly or as part of a mass update, either on command or automatically per schedule, and while the devices are either deployed and in use or are not in use; a system of networked devices and sub-systems that comprises hardware, software, firmware, and architecture that minimize the number of application-specific models and variants of devices; a system of networked devices and sub-systems that comprises hardware that, if used in non-controlled environments, can operate over the range of −30° to +55° C. and that otherwise can withstand the environmental rigors associated with firefighting, heavy-construction yards, and global freight-container transport; a system of networked devices and sub-systems that renders average latency between an RSN event and reporting of the event to a user application of no more than 5 seconds, excluding WAN set-up time, including any/all local network communications and hand-offs; a system of networked devices and sub-systems that maintains 99.99% availability; a system of networked devices and sub-systems that has RSNs within internal memory, for storing RSN attributes, asset ID data, sensor data, event data, and other data as may be useful for an RSN to establish and maintain communications with a gateway device, as may be needed to store data until those communications can be established, and as may be useful to support user applications; and a system of networked devices and sub-systems that accommodates find-gateway and directed query of a specific gateway using user applications.

Furthermore, it will further be appreciated that, in addition to minimizing interference, the use of class-based networking with RSNs having wake-up transceivers inherently provides a network that is electronically stealthy, i.e., a network that is hard to detect. In preferred embodiments where each RSN only transmits when in the presence of an in-class gateway controller and the frequency of subsequent transmissions is controllable by that controller, an RSN's presence or existence is very difficult to detect by electronic means. This is especially true in preferred implementations utilizing low power radios having a reduced RF signature.

It will also be appreciated that the area-coverage capability of the network means, for example, that an entire port facility may be covered and, consequently, that the presence of an RSN (and thus its associated container) can be known at any time (for example, via a query). Moreover, special detection lanes or choke points are no longer necessary.

The stealth of these networks can be useful in a wide variety of applications. For example, attaching a conventional transmitting node to a high-value asset can lead thieves directly to the high-value asset. A stealthy RSN, however, cannot be detected by thieves as easily, or at all, thus lowering the risk of discovery of the high value asset.

Similarly, conventional periodically transmitting devices can be hazardous on board aircraft, thus making their use for monitoring air cargo problematic. In a preferred CBN implementation, however, an RSN attached to air cargo ceases transmissions once inside an aircraft because it is unable to receive transmissions from a gateway controller (due to Faraday shielding).

A summary comparison of the major seal categories and what each offers the market is shown in Table 4 of FIG. 88, wherein features and benefits of the Solution are compared with those offered by GPS-based and RFID-based seals. Furthermore, although there are variants of both GPS-based and RFID-based seals, each with varying features, MATTS and CommerceGuard are used as proxies for all seals employing these respective technologies. Additional technology comparison is shown in Table 5 of FIG. 89.

In view of the foregoing, it will be apparent, in accordance with the Solution, infrastructure (and the systems that support it) accommodate sharing among the diverse users of the ports and yards. For example, with reference to FIG. 90, Maersk containers and Evergreen containers are able to share port infrastructure (e.g., GWs and data links) with each other and with port authorities. Similarly, containers with Samsung TVs must be able to share infrastructure with containers carrying Sony TVs. This sharing, though, accommodates preferential hopping and data privacy. Moreover, visibility at a remote monitoring location is provided through the transit process by the islands of coverage that are linked by the WAN, from origin to destination, as represented in FIG. 91.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method of alerting a user of unauthorized tampering with a shipping container, comprising:
   securing a seal device to a shipping container, the seal device including a bolt receiving area;
   inserting, by a user at the container, an electronic bolt into the bolt receiving area of the seal device;
   reading, by the seal device, a serial number stored in the electronic bolt;
   communicating, from the seal device, to a user application, insertion of the bolt;
   scanning, by the user via a handheld device, an electronically readable element on the seal device representative of an identification of the seal device;
   communicating, from the handheld device to the user application, the identification of the seal device;
   associating, in a database by the user application, the bolt serial number and the identification of the seal device;
   communicating, by the user application, a confirmation to the seal device;
   communicating, by the user application, a confirmation to the handheld device;
   receiving, at the seal device, sensor data indicative of tampering;
   communicating, by the seal device to the user application, an alert;
   wherein the seal device is one of a plurality of wireless communications devices, and wherein the method further includes connecting, by the seal device, to a network via a gateway of a plurality of gateways, each gateway of the plurality of gateways being associated with a location;
   wherein the method further includes communicating an indication of the seal device's connection to the user application;
   wherein the method further includes comparing, by the user application, the location associated with the gateway to a stored database;
   wherein the method further includes selecting, based on this comparison, a profile corresponding to the location associated with the gateway; and
   wherein the method further includes communicating, from the user application to the seal device, an identification of the selected profile together with an instruction to engage the selected profile.

2. The method of claim 1, further comprising comparing, by the seal device, the communicated identification of the selected profile to a list of profiles stored at the seal device.

3. The method of claim 1, further comprising determining, based on such comparison, that the selected profile does not correspond to any profile of the list of profiles stored at the seal device.

4. The method of claim 3, further comprising communicating, from the seal device, an identification of the selected profile to a remote database.

5. The method of claim 4, further comprising comparing, at the remote database, the communicated identification of the selected profile to stored profiles.

6. The method of claim 5, further comprising selecting, from the remote database, a stored profile corresponding to the selected profile.

7. The method of claim 6, further comprising communicating, to the seal device, the stored profile.

8. The method of claim 7, further comprising engaging, by the seal device, the identified profile.

9. A method of alerting a user of unauthorized tampering with a shipping container, comprising:
   securing a seal device to a shipping container, the seal device including a bolt receiving area;
   inserting, by a user at the container, an electronic bolt into the bolt receiving area of the seal device;
   reading, by the seal device, a serial number stored in the electronic bolt;
   communicating, from the seal device, to a user application, insertion of the bolt;
   scanning, by the user via a handheld device, an electronically readable element on the seal device representative of an identification of the seal device;
   communicating, from the handheld device to the user application, the identification of the seal device;
   associating, in a database by the user application, the bolt serial number and the identification of the seal device;
   communicating, by the user application, a confirmation to the seal device;
   communicating, by the user application, a confirmation to the handheld device;
   receiving, at the seal device, sensor data indicative of tampering;
   communicating, by the seal device to the user application, an alert;
   wherein the method further includes connecting, by the seal device, to a network via a gateway;

wherein the gateway is configured to
- (i) broadcast a beacon signal, including a location identification, upon expiration of a beacon timer of the gateway, and
- (ii) upon broadcasting the beacon signal, reset the beacon timer of the gateway based on a pre-selected maximum value; and wherein the seal device is configured to,
- (i) in response to receipt of the beacon signal, attempt to register with the gateway,
- (ii) when registered with the gateway, utilize a beacon timer of the seal device to control broadcasting of beacon signals,
- (iii) in response to receipt of another beacon signal which includes the location identification, reset the beacon timer of the seal device based upon a randomly selected value,
- (iv) upon expiration of the beacon timer of the seal device, broadcast a device beacon signal, which device beacon signal includes the location identification, and
- (v) upon broadcasting the device beacon signal, reset the beacon timer of the seal device based on the pre-selected maximum value.

10. The method of claim 9, wherein the seal device is further configured to, when registered with the gateway,
- (i) forward messages received from other wireless communications devices registered with the gateway to the gateway, and append an identification of the seal device to the message;
- (ii) communicate a check-in message to the gateway, upon expiration of a check-in timer of the seal device,
- (iii) upon communicating the check-in message, reset the check-in timer of the seal device.

11. The method of claim 10, wherein the gateway is further configured to, in response to receipt of a message originated by one of the other wireless communications devices that was forwarded by the seal device, communicate an acknowledgment message to the seal device.

12. The method of claim 11, wherein the seal device is still further configured to, in response to receiving the acknowledgment message,
- (i) reset the check-in timer of the seal device, and
- (ii) forward the acknowledgment message to the originating one of the other wireless communications devices.

13. The method of claim 11, wherein the other wireless communications devices are other seal devices.

* * * * *